(12) United States Patent
Kidwell et al.

(10) Patent No.: US 7,377,122 B2
(45) Date of Patent: *May 27, 2008

(54) COAXIAL-FLOW HEAT EXCHANGING STRUCTURE FOR INSTALLATION IN THE EARTH AND INTRODUCING TURBULENCE INTO THE FLOW OF THE AQUEOUE-BASED HEAT TRANSFER FLUID FLOWING ALONG THE OUTER FLOW CHANNEL WHILE ITS CROSS-SECTIONAL CHARACTERISTICS PRODUCE FLUID FLOWS THEREALONG HAVING OPTIMAL VORTEX CHARACTERISTICS THAT OPTIMIZE HEAT TRANSFER WITH THE EARTH

(75) Inventors: John E. Kidwell, Tulsa, OK (US); Michael L. Fraim, Corrales, NM (US)

(73) Assignee: Kelix Heat Transfer Systems, LLC, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/475,566

(22) Filed: Jun. 27, 2006

(65) Prior Publication Data

US 2007/0029066 A1    Feb. 8, 2007

Related U.S. Application Data

(63) Continuation of application No. 11/372,224, filed on Mar. 9, 2006, which is a continuation-in-part of application No. 11/076,428, filed on Mar. 9, 2005, now Pat. No. 7,347,059.

(51) Int. Cl.
*F25D 23/12* (2006.01)
*F25J 3/08* (2006.01)

(52) U.S. Cl. .......................................... 62/260; 165/45

(58) Field of Classification Search .................. 62/260, 62/293; 165/45, 142
See application file for complete search history.

(56) References Cited

U.S. PATENT DOCUMENTS 1,494,326 A * 5/1924 Adams ........................ 392/479

(Continued)

FOREIGN PATENT DOCUMENTS

| DE | 10322034 A1 * | 12/2004 |
| JP | 59081444 | 5/1984 |

OTHER PUBLICATIONS

Scientific presentation entitled "Experimental Study on Thermal Resistance of Vertical Ground Heat Exchangers" by Hiroaki Okubo et al., Department of Earth Resources Engineering, Kyushu University, Fukuako, Japan, pp. 1-15.

(Continued)

*Primary Examiner*—Mohammad M. Ali
(74) *Attorney, Agent, or Firm*—Thomas J. Perkowski, Esq., P.C.

(57) ABSTRACT

The coaxial-flow heat exchanging structures installed in the Earth, for facilitating the transfer of heat energy in the aqueous-based heat transfer fluid, between the aqueous-based heat transfer fluid and material beneath the surface of the Earth. Each coaxial-flow heat exchanging structure includes an inner tube section, a thermally conductive outer tube section, and outer flow channel between the inner tube section and the outer tube section. A turbulence generating structure is disposed along a portion of the length of the outer flow channel so as to introduce turbulence into the flow of the aqueous-based heat transfer fluid flowing along the outer flow channel, while its cross-sectional characteristics produce fluid flows therealong having optimal vortex characteristics that optimize heat transfer with the Earth.

15 Claims, 111 Drawing Sheets

SIDE CUT-AWAY VIEW

U.S. PATENT DOCUMENTS

| | | | |
|---|---|---|---|
| 3,456,319 A | | 7/1969 | Gier, Jr. |
| 3,680,705 A | * | 8/1972 | Happ et al. ............... 210/222 |
| 3,913,703 A | * | 10/1975 | Parker ..................... 181/206 |
| 4,317,268 A | | 3/1982 | Bowden et al. |
| 4,325,228 A | | 4/1982 | Wolf |
| 4,359,092 A | * | 11/1982 | Jones ..................... 166/265 |
| 4,392,531 A | | 7/1983 | Ippolito |
| 4,418,486 A | * | 12/1983 | Kober ........................ 38/58 |
| 4,419,802 A | | 12/1983 | Riese |
| 4,574,875 A | | 3/1986 | Rawlings et al. |
| 4,644,750 A | | 2/1987 | Lockett et al. |
| 4,741,388 A | | 5/1988 | Kuroiwa |
| 4,867,229 A | | 9/1989 | Mogensen |
| 4,993,483 A | * | 2/1991 | Harris ..................... 165/45 |
| 5,025,634 A | | 6/1991 | Dressler |
| 5,365,750 A | * | 11/1994 | Greenthal ................ 62/293 |
| 5,375,661 A | * | 12/1994 | Daneshy et al. .......... 166/278 |
| 5,461,876 A | | 10/1995 | Dressler |
| 5,623,986 A | | 4/1997 | Wiggs |
| 5,738,164 A | * | 4/1998 | Hildebrand ............... 165/45 |
| 5,816,314 A | * | 10/1998 | Wiggs et al. .............. 165/45 |
| 5,937,665 A | | 8/1999 | Kiessel et al. |
| 5,937,934 A | * | 8/1999 | Hildebrand ............... 165/45 |
| 6,138,744 A | | 10/2000 | Coffee |
| 6,212,896 B1 | | 4/2001 | Genung |
| 6,250,371 B1 | * | 6/2001 | Amerman et al. .......... 165/45 |
| 6,251,179 B1 | | 6/2001 | Allan |
| 6,450,247 B1 | * | 9/2002 | Raff ........................ 165/45 |
| 6,615,601 B1 | | 9/2003 | Wiggs |
| 6,672,371 B1 | | 1/2004 | Amerman et al. |
| 6,789,608 B1 | | 9/2004 | Wiggs |

OTHER PUBLICATIONS

2007 Product Brochure for the Turbotec Tru-Twist™ Heat Transfer Tubes, Turbotec Products, Inc., Windsor, CT, 2 pages.

2007 Product Brochure for the Turbotec Titanium Coaxial Heat Exchanger Series, Turbotec Products, Inc., Windsor, CT, 2 pages.

2007 Product Brochure for the Turbotec Titanium Heat Transfer Performance Comparison, Turbotec Products, Inc., Windsor, CT, 2 pages.

2007 Product Brochure for the Turbotec Pool-Safe™, Turbotec Products, Inc., Windsor, CT, 1 page.

2007 Webpage for Hangzhou Shenshi Heat Exchanger Co., Ltd., http://www.coaxial-coils.com/advanatages.asp, 1 page.

2007 Webpage for the Heat Pump Coaxial Coils by Hangzhou Shenshi Heat Exchanger Co., Ltd., http://www.coaxial-coils.com/Heat-pump-coaxial-coils.htm, 2 pages.

2007 Product Brochure for Coaxial Heat Exchanger by Hangzhou Shenshi Heat Exchanger Co. Ltd., Hangzhou City, China, 25 pages.

2007 Flotek™ Product Brochure for the Spiral Vane Centralizer by Flotek Industries, Inc., Houston, TX 2 pages.

2007 Flotek™ Product Brochure for the Turbo-Lok™ Rigid Vane Turbulator by Flotek Industries, Inc., Houston, TX 2 pages.

PCT Search Report for Int'l Application PCT/US06/08551 conducted Sep. 14, 2006.

* cited by examiner

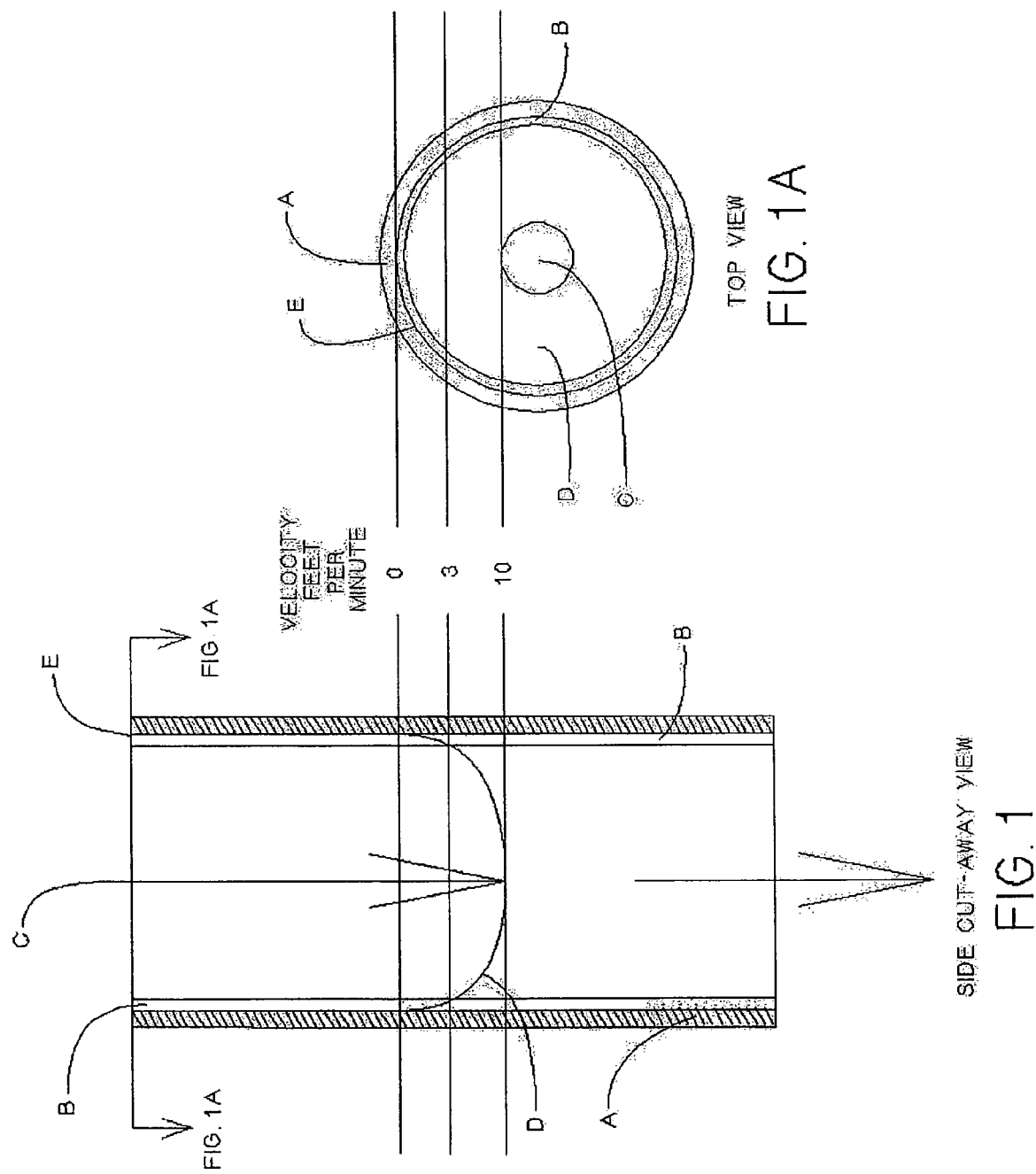

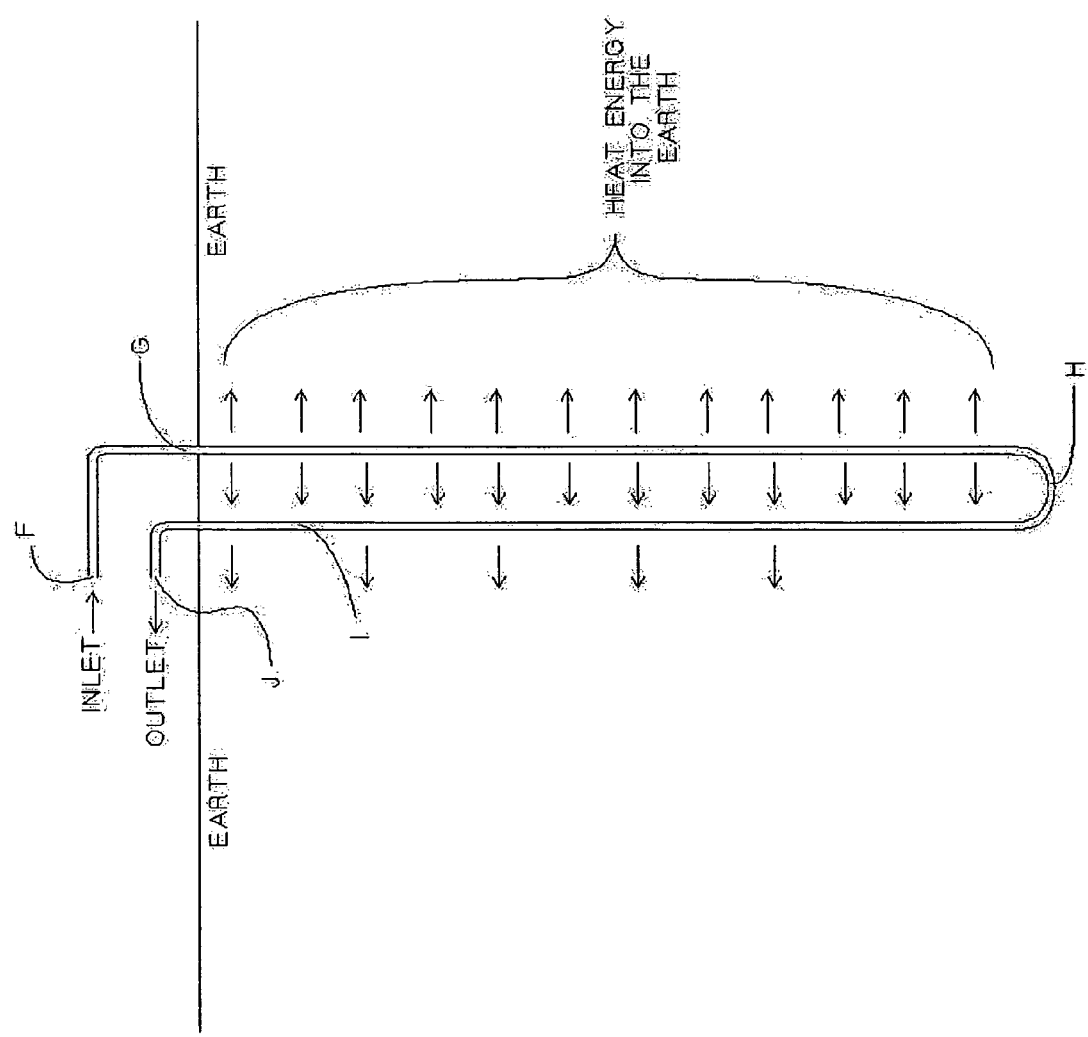

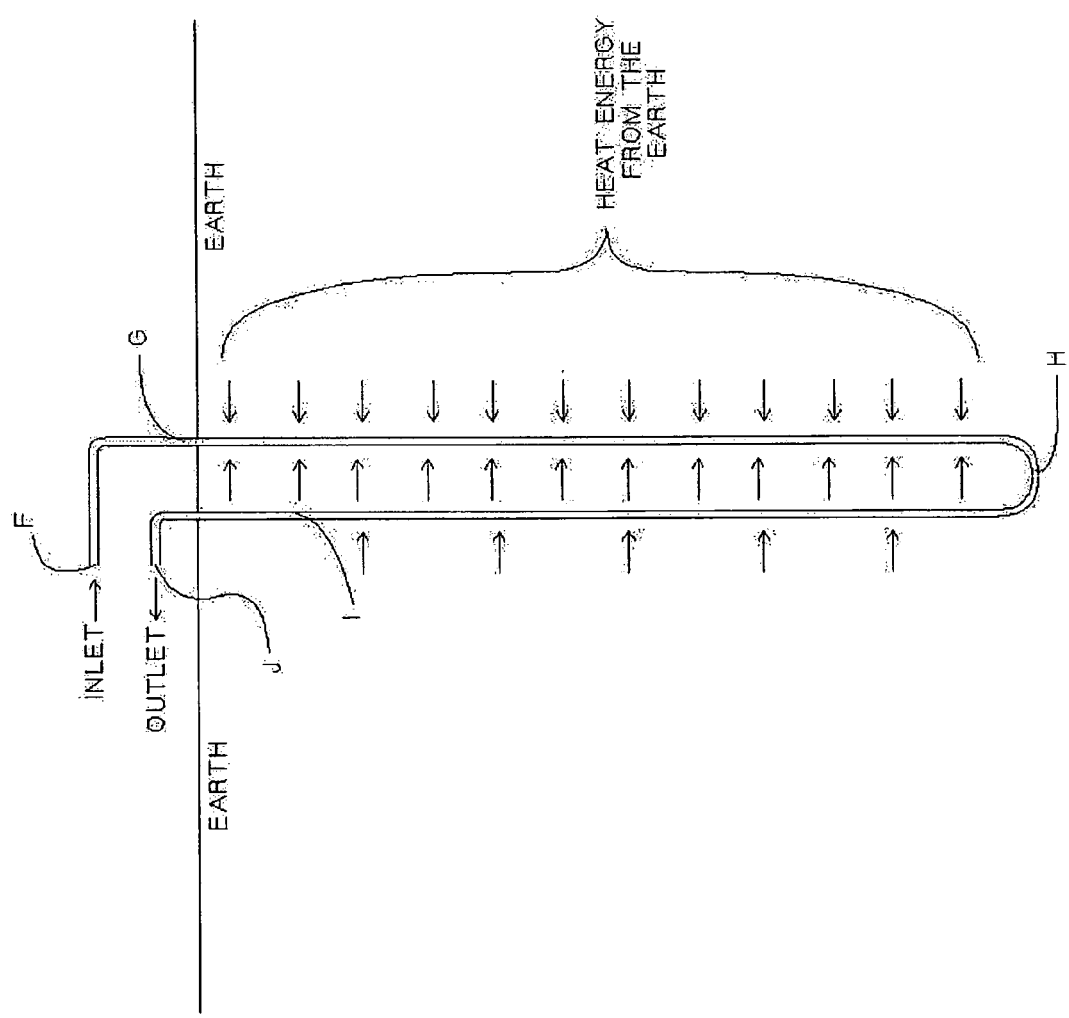

TOP VIEW

FIG. 13 FRONT VIEW

SIDE VIEW

TOP VIEW

FRONT VIEW

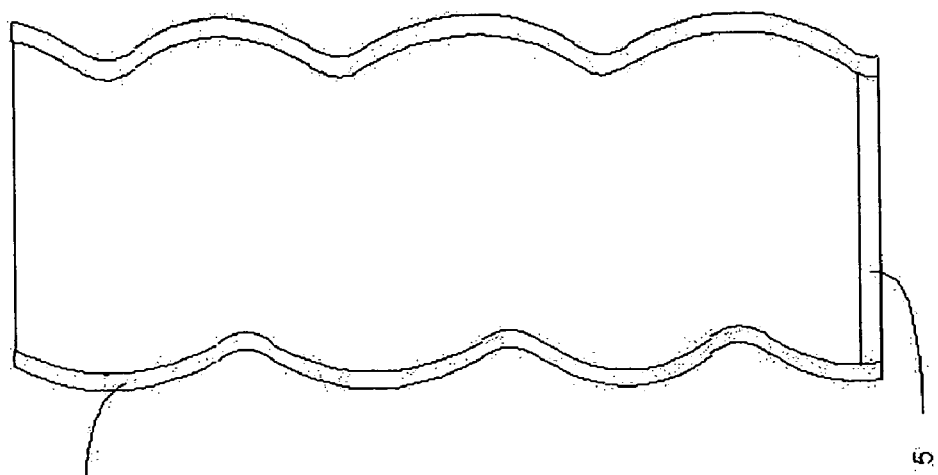
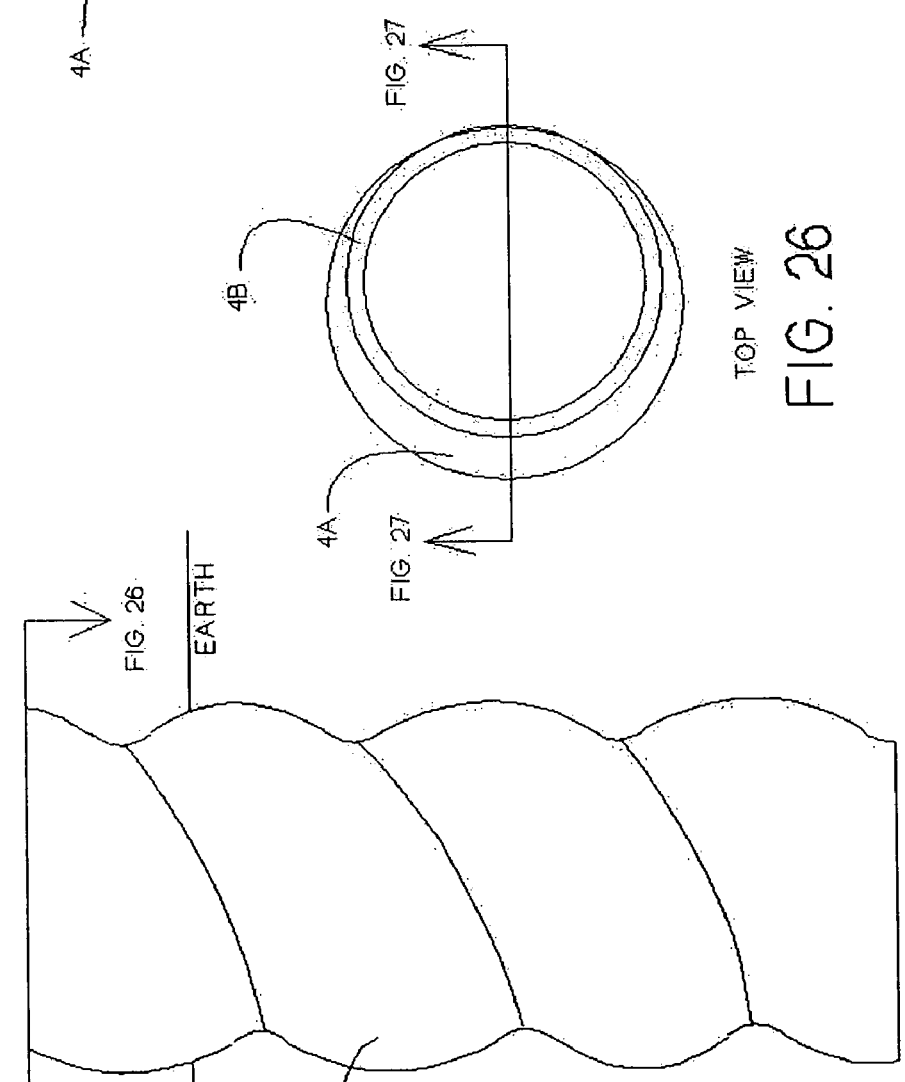
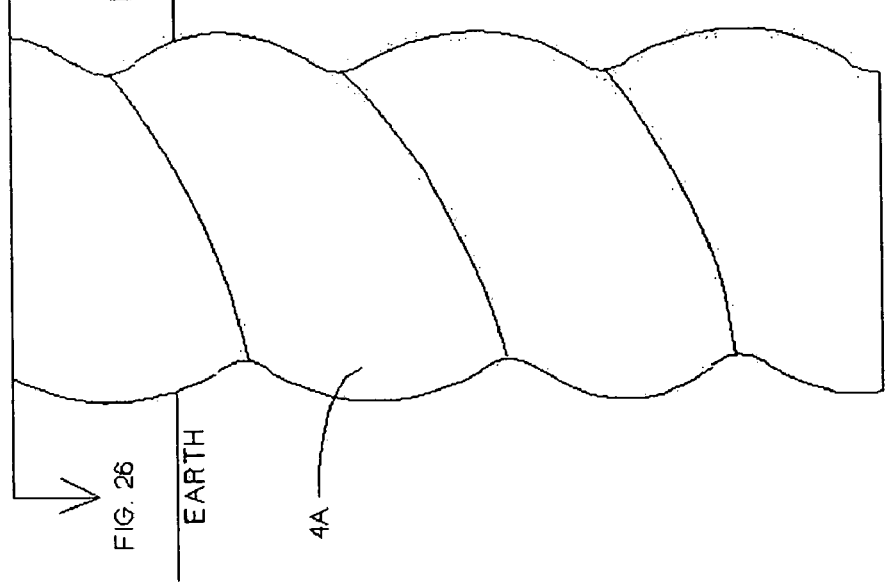

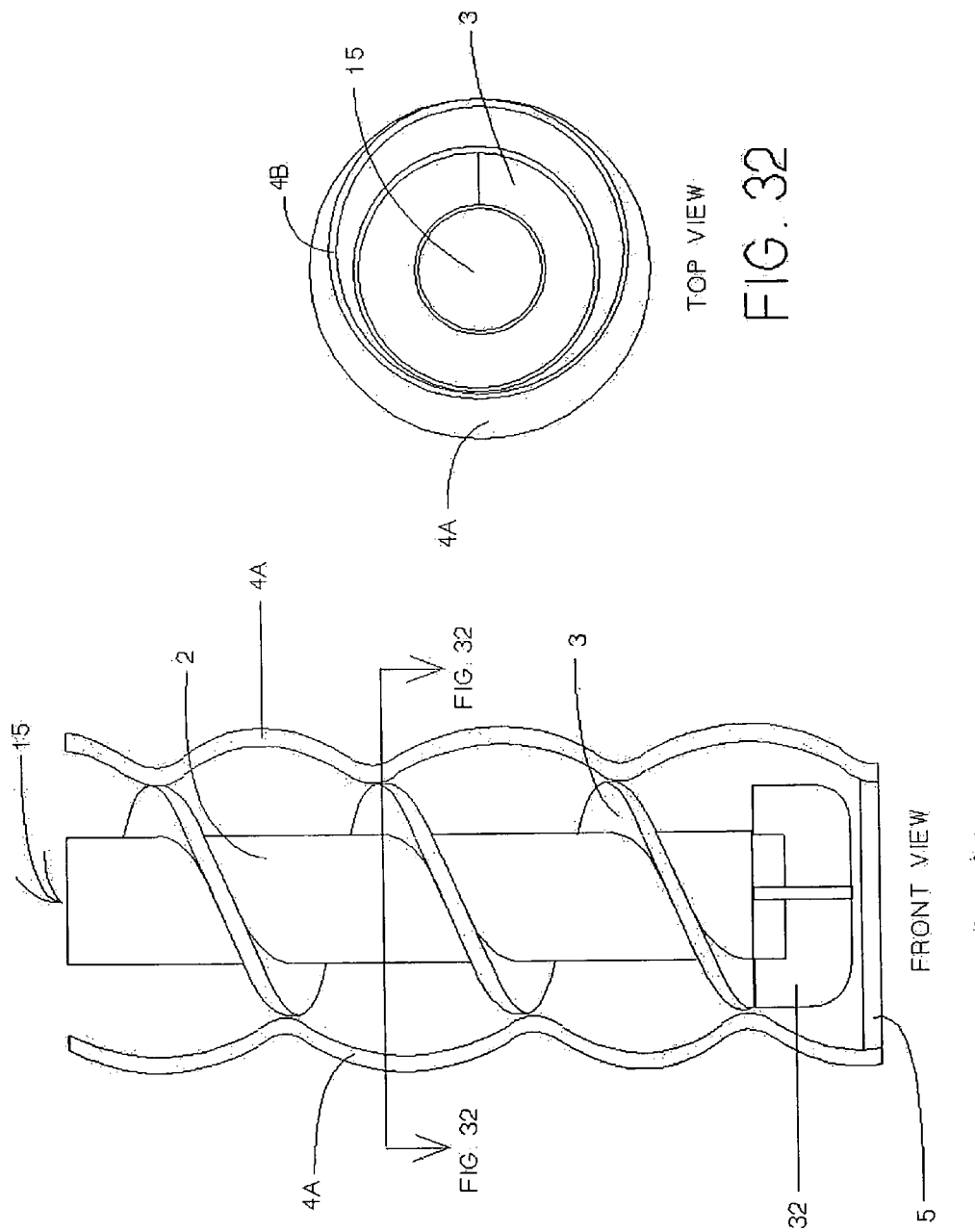

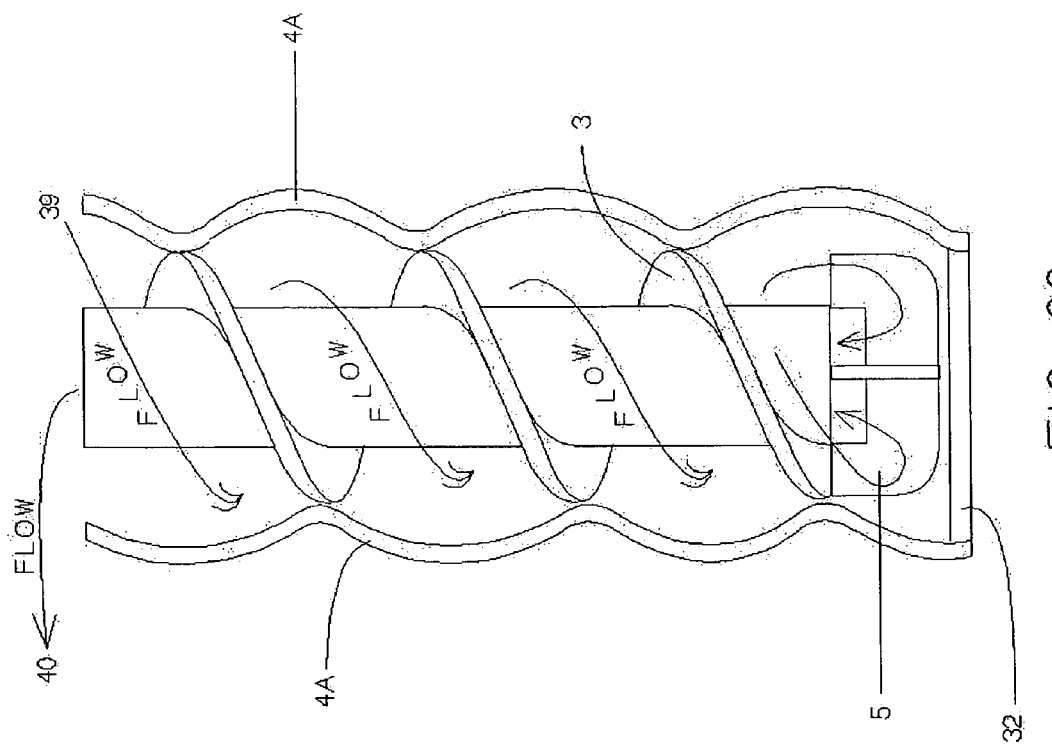

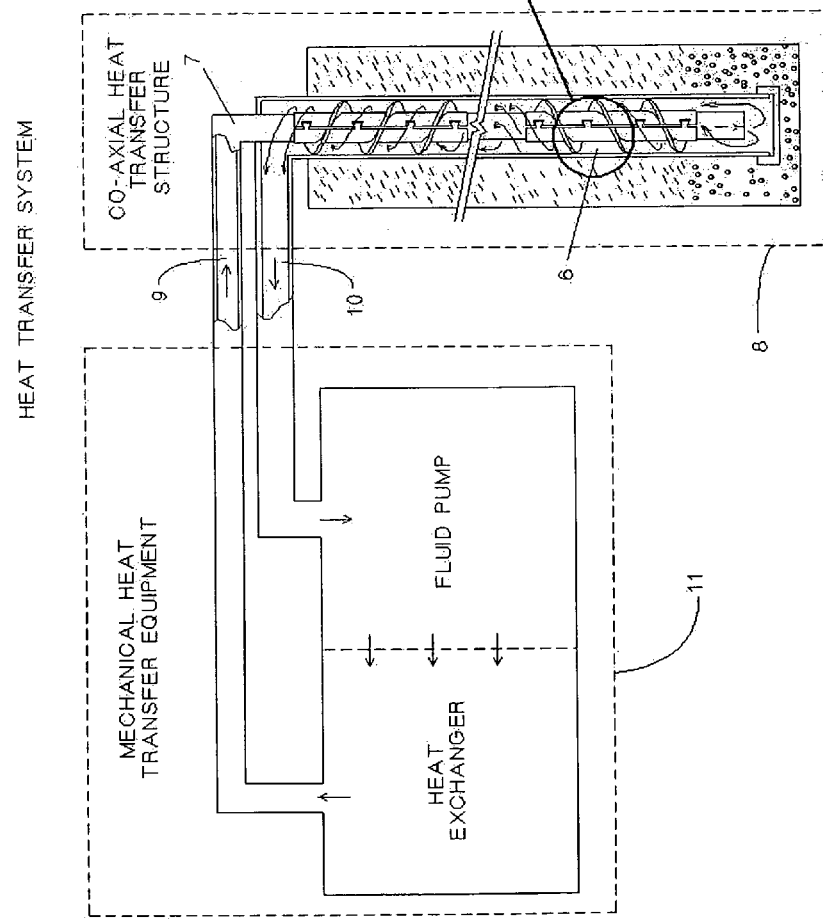
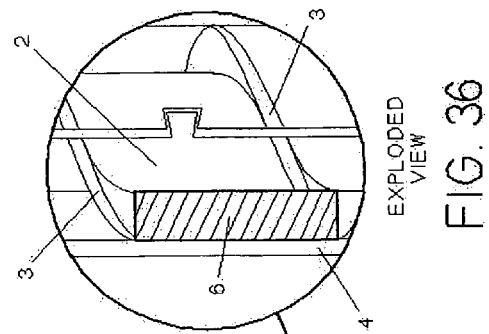
FIG. 35
FIG. 36

FIG. 46 TOP VIEW

TOP VIEW

TOP VIEW co-axial flow heat transfer structure deviated well grid

FIG. 84 RIGHT SIDE VIEW

FIG. 86 LEFT SIDE VIEW

FRONT VIEW

SECTION D-D

SECTION B-B

COAXIAL-FLOW HEAT EXCHANGING STRUCTURE FOR INSTALLATION IN THE EARTH AND INTRODUCING TURBULENCE INTO THE FLOW OF THE AQUEOUE-BASED HEAT TRANSFER FLUID FLOWING ALONG THE OUTER FLOW CHANNEL WHILE ITS CROSS-SECTIONAL CHARACTERISTICS PRODUCE FLUID FLOWS THEREALONG HAVING OPTIMAL VORTEX CHARACTERISTICS THAT OPTIMIZE HEAT TRANSFER WITH THE EARTH

RELATED CASES

This Application is a Continuation of U.S. application Ser. No. 11/372,224 filed Mar. 9, 2006; which is a Continuation-in-Part of U.S. application Ser. No. 11/076,428 filed Mar. 9, 2005 now U.S. Pat. No. 7,347,059; each said Application being owned by Kelix Heat Transfer Systems, LLC of Tulsa, Okla. and incorporated herein by reference as if fully set forth herein.

BACKGROUND OF THE INVENTION

1. Field of Invention

The present invention relates to a novel method of and apparatus for transferring heat using heat exchanging fluids that are safely isolated from the environment above and below the Earth's surface and circulated within a sealed heat exchanging structure so as to improve the heat transfer performance of aqueous-based fluid heat transfer systems, wherein the ground, a lake, a river, or sea water is used as the primary or secondary heat sink or heat source in the sealed heat exchanging structure.

2. Brief Description of the State of Knowledge in the Art

The development of refrigeration processes, associated equipment, and two-phase chemical refrigerants evolved primarily in response to mankind's need to preserve food. Over the years, several different kinds of heat transfer systems have been developed for dissipating heat removed from the food to the exterior of the food storage container.

One type of heat transfer system is a typical refrigeration system which includes an evaporator for absorbing heat from one location, a condenser for dissipating heat to another location, a compressor for compressing the vaporous two-phase refrigerant exiting the evaporator for delivery into the condenser where the refrigerant is condensed back into a liquid, and a two-phase throttling device connected to the evaporator inlet for receiving the liquid refrigerant and refrigerant expansion, to complete a refrigeration cycle.

Condensers can be constructed in various configurations, namely: as an arrangement of tubing with air-cooled fins, or as a water-cooled "tube and shell configuration".

In FIGS. 1 and 1A, the fluid flow characteristics of conventional tubing used in heat exchangers is schematically depicted. FIG. 1 illustrates how the velocity of a fluid traveling through a tube decreases from the center of the tube towards the inner surface of the tube. As shown, fluid enters tube A through inlet opening C. A laminar fluid flow profile D is caused by friction along a boundary layer E on the inner surface of the tube A. In the general, the annular region of flow B does not contain eddy currents during laminar flow. The shape of the laminar fluid flow profile D is influenced by the viscosity of the fluid passing through the tube. Fluids having lower viscosities cause a thinner boundary layer E to form, whereas fluids with higher viscosities, such as propylene glycol mixture (anti-freeze) and other viscosity increasing additives, causes a thicker boundary layer E to form, which reduces heat transfer. Fluids with lower viscosities, such as pure water, can transition into turbulent flow at lower fluid velocities.

Turbulence can be regarded as a highly disordered motion of matter (e.g. water, air etc.) resulting from the growth of instabilities in an initially laminar flow, and it is generally agreed that the transition from laminar to turbulent flow may be described as a series of events that take place more or less continuously. Additionally, it is known that turbulent fluid flow characteristics, due to eddy currents, can increase heat transfer across heat conducting surfaces. During turbulent flow, the annular flow region contains eddy currents which increase heat transfer. Fluids with higher viscosities, such as propylene-glycol, require higher fluid velocities in order to transition into turbulent flow. This requires more pump energy to transfer the same quantity of heat energy as pure water. Also, tubing with a rough inner surface allows the fluid to transition into turbulent flow at a lower fluid velocity.

FIG. 1A illustrates how flow velocities within annular regions of fluid flow B, C and D are influenced by frictional forces generated from boundary layer E. Within the boundary layer E, against the inner surface of the tube, the velocity of the heat transfer fluid can be zero. In the annular flow region B, the fluid is shown moving at 3 feet per minute, and faster in areas closer toward the annular flow region C, which has a flow velocity of 3 feet per minute. The fluid in the annular flow region D has the highest velocity of 10 feet per minute. Typically, the reduction in fluid flow velocity adjacent the inside surface of a tube results in a decrease in the rate of heat energy transferred from the fluid into the tube material.

The primary method of compensating for such heat transfer constraints (imposed by laminar fluid flows through conventional tubing structures) has been to use larger tubes and more powerful pumps in conventional heat transfer systems, which has resulted in higher installation costs at lower operating efficiencies.

At this juncture, it is appropriate to continue surveying prior art systems with such considerations in mind.

In the water-cooled tube and shell condenser, the rate of heat transfer between the refrigerant in the refrigeration-sealed system, and the water flowing around the tube and shell condenser tube, is much higher than the rate of heat transfer between the refrigerant in the refrigeration-sealed system and air flowing around the tubes of the air-cooled fin and tube condenser. A water-cooled tube and shell condenser is normally connected with pipes to a cooling tower and a water pump. The heat is absorbed by the water while circulated through the condenser. The heat in the water entering the cooling tower is then dissipated into the atmosphere from the water, completing a closed-loop water-cooled refrigeration process.

Environmental concerns have caused strict restrictions to be placed on water-cooled tube and shell condenser systems utilizing a water pump to gather water from natural sources such as a lake, a river, sea water, and other fluid systems, for circulation through the water-cooled tube and shell condenser of such heat transfer systems. Environmental contaminations vary but are mostly related to chemical concentrations and temperature variations being dispensed into the water source.

A water-cooled tube and shell condenser can be connected to a ground-source heat transfer well using pipes, to dissipate heat into the Earth. In various manufacturing processes, the required operating temperature and capacity (i.e. volume) of heat transfer fluid circulated through the ground source heat transfer well, may not require adding refrigeration to the system.

Ground loop heat transfer installations vary from trenched horizontal loops to multiple vertical loops. In FIGS. 1B and 1C, vertical installations are schematically illustrated in two different heat transfer modes.

In FIG. 1B, a (field assembled) conventional "U" tube type heat transfer tube is shown buried in the Earth for the purpose of dissipating heat energy from the system into the Earth. Typically, tube sections G and I are buried beneath the Earth a few inches apart from one another. During operation, a heat transfer fluid flows into inlet F in a laminar manner at 110 degrees Fahrenheit, and is forced to flow down tube section G. Heat energy in the laminar flowing fluid is transferred into the Earth at 55 degrees Fahrenheit, along the entire outer surface of the tube G. As illustrated, a portion of the heat from tube section G is actually transferred into tube section I after the heat transfer fluid has reversed its flow direction when flowing along elbow section H. Using this ground loop arrangement, the net amount of heat energy actually transferred into the Earth is diminished due to the heat transfer from tube section G into tube section I. Thus, the overall heat transfer capacity offered by this system design is significantly diminished due to (i) the laminar flow profile of the heat transfer fluid within the "U" tube construction (illustrated in FIG. 1), and (ii) the commingling of heat energy exchanges between underground tube sections G and tube I.

In FIG. 1C, a (field assembled) conventional "U" tube type heat transfer tube is shown buried in the Earth for the purposes of collecting heat energy therefrom. In this configuration, a heat transfer fluid flows at 40 degrees Fahrenheit into inlet F in a laminar manner, and is forced to flow down tube section G into the Earth. Along the entire outer surface of the tube section G, heat energy is transferred from within the 55 degree Fahrenheit Earth, into the heat transfer fluid maintained at 40 degree Fahrenheit. Since the 15 degree Fahrenheit temperature difference between the heat transfer fluid inside tube section G is higher than that of the heat transfer fluid occupying tube section I, more heat energy is absorbed by tube section G than is absorbed by tube section I. Also, a portion of the heat energy transferring into tube section G originates from tube section 4 and is actually transferred into tube section G after the heat transfer fluid has reversed its flow direction along elbow section H. Again, the overall heat transfer capacity offered by this system design is significantly diminished due to (i) the laminar flow profile of the heat transfer fluid within the "U" tube construction (illustrated in FIG. 1), and (ii) the commingling of heat energy exchanges between underground tube sections G and tube I.

Residential and commercial comfort air conditioning systems using "air-cooled condensers" are also well known in the art. Air-cooled condensers are also used extensively world-wide on air conditioners employing heat pumps. In contrast, "water-cooled tube" and shell condensers are typically used in large tonnage commercial and industrial applications such as in high-rise buildings, natural gas dehydration, and liquefied natural gas gasification systems.

A heat pump, originally called a reverse refrigeration system, reverses the refrigeration process through the use of sealed system valves and controls causing the evaporator to dissipate heat while causing the condenser to absorb heat. In its cooling mode of operation, an air conditioning system employing a ground-source heat-pump will dissipate heat into the Earth while, and absorb heat from the Earth in its heating mode of operation.

Over the years, the ground/water source type heat pump has proven very useful as a very efficient form of heating and cooling technology. The use of ground/water source type heat pumps have three distinct advantages over air source type heat pumps, namely: during the peak cooling and heating seasons, the ground/water source usually has a more favorable temperature difference than the atmospheric air; the liquid-refrigerant exchanger on the heat pump permits a closer temperature approach than an air-refrigerant exchanger; and there is no concern with frost/snow/ice/dirt buildup or removal on the heat exchanger.

In general, prior art heat pump installations have employed undersized ground loops (constructed using conventional U type tubing) because refrigerant-based fluids can provide a sufficient temperature difference between the fluid and the ground so that enough heat is transferred to and from the ground to match the heating/cooling load on the heat pump. However, the use of undersized ground loops is also known to reduce the SEER rating of the heat-pump system. Also, the design goals of prior art heat pump systems have been to minimize the length of the metal pipe (i.e. tubing) used in the ground loop, while just passing the minimum standards for efficiency.

When prior art heat pump systems experience peaks or spikes in heating/cooling loads during daily operations, thermal storage solutions are oftentimes added to the system in order to average the load over the time period of interest. Thermal storage solutions also help reduce the cost of the ground loop by allowing the loop to be sized for the average base load over the day, week or season. In fact, many large buildings and residences use thermal storage solutions in order to reduce the cost of heating and cooling by (i) using less expensive night-time electrical loads to heat/cool the thermal mass, and then (ii) using the thermal mass to heat/cool the building during the day. In order to reduce capital cost of the heat pump system, prior art heat pump system installations often use the metal rebar in the foundation or piling as a major part of the thermal mass of the ground loop portion of the heat pump system.

Ground source or water source type heat pumps can use a closed or open loop as a heat exchanger. Open loops include water circulated to cooling towers; water circulated between wells, geothermal steam wells, water circulated in a body of water such as a river or lake. Closed loops include aqueous-based fluids and refrigerant-based fluids circulated in cooling/heating coils that transfer heat to air, water, and ground. Most power plants use at least one open loop to generate steam (the burner exhaust) and one open loop (cooling towers or lake) to condense the steam back to water. The de-ionized steam source water is preserved in a close loop to prevent scale buildup in the heat exchanger. Most conventional refrigerators, freezers and air conditioners use a closed loop of refrigerant to cool the load and an open loop of external air to condense the refrigerant.

The shortcomings and drawbacks of using air to transfer heat from the condenser coil is that air requires a high temperature differential and a large condenser coil surface area to achieve reasonable heat transfer rates. The high temperature differentials translate to a high-pressure differential which implies higher energy costs to transfer a unit of heat. When a heat pump uses a liquid, from a water or ground loop, to transfer heat from the condenser coil, a smaller coil and a lower temperature and pressure differential can be used to transfer the same unit of heat as the air cool condenser coil which, in turn, improves efficiency and reduces energy costs.

When closed loops are used in the ground or water source of a heat pump system, there is a trade off between using (i) metal tubing with a high heat transfer coefficient (i.e. which is subject to corrosion and thermal expansion), and (ii) plastic tubing with a low heat transfer coefficient, which is resistant to corrosion and thermal expansion. For average soil conditions, plastic tubing usually will require about three (3) times the heat transfer area of the metal tubing to maintain an equivalent heat transfer rate. Metal tubing is usually reserved for refrigerant-based fluids due to the high fill pressures and the reactivity of the refrigerant with plastic tubing.

While protective coatings and grouting can reduce the corrosion rates of metal tubing, pin holes in the coating or grout can actually concentrate the anode corrosion rate in the pin-hole area. Electrical measurements have shown that circulating aqueous based fluids between the ground loop and heat pump can cause the flow of a low level current between the building and the ground.

In accordance with convention, a close-loop ground/water source heat pump can use a refrigerant based fluid or an aqueous-based fluid. With refrigerant-based fluids, the heat pump can use a high differential temperature to transfer heat between the ground and the fluid in the tubing, but extra energy load reduces the SEER rating of the heat pump system. Metal tubing is used to contain the pressurized refrigerant-based fluid and minimize the volume of refrigerant in the ground loop system due to the high heat transfer coefficient of the metal.

As discussed in U.S. Pat. No. 5,025,634 to Dressler, refrigerant based fluids have very high maintenance cost when a small leak develops in the ground/water loop and a very high environmental impact when there is a release of the refrigerant. Also, over a long period of time, field experience has shown that high pressure head loss can develop in the closed ground/water source loop when lubricating oil from the compressor collects low spots in horizontal loop or at the bottom of the bore hole in vertical loop.

With most aqueous-based fluid ground/water source loops, the heat pump uses a small close-loop refrigerant heat exchanger to transfer heat to or from the aqueous fluid. The small heat exchanger reduces the capital cost of the heat pump and reduces the chances of refrigerant releases to the environment. In areas with ground movement, such as earthquakes zones, subsidence bowls, and deep freeze/thaw zones, the borehole thermally-conductive outer tube and transfer piping can develop leaks due to repeated damage over time as discussed in U.S. Pat. No. 4,993,483 to Kurolwa.

As disclosed in U.S. Pat. No. 4,644,750 to Lockett and Thurston and in U.S. Pat. No. 4,325,228 to Wolf, a horizontal ground loop's performance is affected by fluctuation in atmospheric surface temperature and soil moisture content, whereas, the ground loop based on multiple bore holes has a stable fluid temperature and heat transfer coefficient for both heating and cooling thermal loads. For heat and cooling loads located on small land surfaces or arid land, the ground loop heat exchanger based on multiple bore holes can provide a heat pump with a stable heat sink or source as described in U.S. Pat. No. 4,392,531 to Ippolito.

The first major improvements to ground loop fluid heat transfer using metal tubing and refrigerant based fluids are disclosed in U.S. Pat. No. 5,816,314 to Wiggs et. al, U.S. Pat. No. 5,623,986 to Wiggs, U.S. Pat. No. 5,461,876 to Dressler, U.S. Pat. No. 4,867,229 to Mogensen, and U.S. Pat. No. 4,741,388 by Kurolwa where metal tubing was bent into a helix shape to increase heat transfer between the refrigerant and the ground. These five patents disclose that the 'vertical helical heat exchanger' or the 'bore-hole helical heat exchanger' provides the heat pump with a stable heat sink or source for heating and cooling. The shortcoming of these designs is the increased capital cost of helical bending of the tubing and the increased installation cost involved in running bent helical tubing in a deviated well.

Another popular technique used in prior art heat pumps involves insulating the metal, fluid-return tube from the bottom of the bore hole so to prevent heat transfer from incoming fluid, which significantly improves the heat exchanger performance. The deficiency of such prior art insulating methods has caused a significant increase in installation costs and a significant increase in capital cost associated with insulating materials. Notably, as the return line was far enough away from the loop to not cause any significant thermal interference, insulating the fluid return tube was not required for earlier horizontal ground loop heat exchangers.

U.S. Pat. No. 5,623,986 to Wiggs also discloses that external helically shape fins can be used to drill short vertical heat exchangers into sand-loam soils or mud bottoms, but field experience has shown that there is too much fin damage when installing vertical heat exchangers in hard rock/ground surfaces.

U.S. Pat. No. 5,937,665 to Kiessel et al., discloses other improvements to refrigerant based groundloops, wherein an air heat exchanger is used to the system to reduce the load on the ground loop.

U.S. Pat. No. 6,138,744 by Coffee discloses using a large storage tank of water to a horizontal ground loop that is continuously replenished by an external water source such as water well. This technique involves combining an open water loop and a lose ground loop.

U.S. Pat. No. 6,615,601 by Wiggs discloses combining a solar heating loop and a water evaporative cooling loop to the ground loop so as to supplement the heating and cooling load.

U.S. Pat. No. 6,212,896 to Genung discloses a ground loop with large well bores to make room for a vertical thermal siphon to enhance the heat transfer in the large well bore. The shortcoming of this idea is that the heat is transfer to the thermally-conductive outer tube wall with a laminar flow of fluid.

U.S. Pat. No. 6,672,371 to Amerman et al. created a ground loop by drilling multiple well bores from one pad and using plastic U-tubes for the heat exchanger. By using many plastic U-tubes with low heat transfer in series, an equivalent metal heat exchanger performance can be achieved in the ground loop.

Also, U.S. Pat. No. 6,789,608 to Wiggs discloses a technique for extending the performance of the U-tube heat exchanger by installing an insulating plate between the tubes to make two close separate half wells with minimal thermal interference between each well.

Thus, while various advances have been made in heat transfer system design and implementation, there is still a great need in the art for an improved method of and apparatus for transferring heat from above or below the Earth's surface using a sealed fluid circulation system, while overcoming the shortcomings and drawbacks of prior art methodologies and equipment.

SUMMARY AND OBJECTS OF THE PRESENT INVENTION

Accordingly, it is a primary object of the present invention is to provide a coaxial-flow heat exchanging (i.e. transferring) structure for installation in an ambient environment and facilitating the transfer of heat energy between an external heat energy producing system and the ambient environment, while overcoming the shortcomings and drawbacks of prior art methodologies.

Another object of the present invention is to provide such a coaxial-flow heat exchanging structure having a proximal end and a distal end for exchanging heat between a source of fluid at a first temperature and the environment (e.g. ground, water, slurry, air, etc.) at a second temperature.

Another object of the present invention is to provide such a coaxial-flow heat exchanging structure having an input port, provided at the proximal end, for receiving a heat (energy) transferring or carrying fluid at a first temperature from the external heat energy producing system, and an output port, also provided at the proximal end, for outputting the heat transferring fluid at a second temperature to the heat energy producing system or the like.

Another object of the present invention is to provide such a coaxial-flow heat exchanging structure further comprising an inner tube section having an outer wall surface extending between the proximal and distal ends, and supporting an inner flow channel having a substantially uniform inner diameter along its entire length, and into which the heat exchanging fluid can be introduced from the input port, and along which the heat exchanging fluid can flow in a substantially laminar manner towards the distal end.

Another object of the present invention is to provide such a coaxial-flow heat exchanging structure further comprising an outer tube section, disposed coaxially around the inner tube section, and having an inner wall surface extending between the proximal and distal ends, and the outer tube section being in thermal communication with the ambient environment.

Another object of the present invention is to provide such a coaxial-flow heat exchanging structure, wherein an outer flow channel of helical geometry is provided between the outer wall surface of the inner tube section and the inner wall surface of the outer tube section, and capable of conducting heat exchanging fluid from the distal end, along the outer flow channel towards the proximal end, and exiting from the output port.

Another object of the present invention is to provide such a coaxial-flow heat exchanging structure, wherein a turbulence generating structure is disposed along a substantial portion of the length of the outer flow channel so as to introduce turbulence into the flow of the heat exchanging fluid flowing along the outer flow channel, from the distal end towards the proximal end, and thereby improving the transfer of heat energy between the heat exchanging fluid and the ambient environment along the length of the outer flow channel.

Another object of the present invention is to provide such a coaxial-flow heat exchanging structure, wherein the turbulence generating structure comprises a helically-arranged fin structure disposed along a substantial portion of the outer flow channel.

Another object of the present invention is to provide such a coaxial-flow heat exchanging structure, wherein the helically-arranged fin structure is mounted to the outer surface of the inner tube section.

Another object of the present invention is to provide such a coaxial-flow heat exchanging structure, wherein the laminar fluid flow along the inner tube section provides an insulating effect between the wall of the inner tube section and the inner flow channel.

Another object of the present invention is to provide such a coaxial-flow heat exchanging structure, for sinking heat into the ground during cooling operations, or sourcing heat from the ground during heating operations.

Another object of the present invention is to provide a heat pump system employing the coaxial-flow heat exchanging structure of the present invention, wherein the heat transfer performance of aqueous-based fluid heat transfer is substantially improved, and wherein the ground, a lake, a river, or sea water can be used as the primary or secondary heat sink or heat source.

Another object of the present invention is to provide such a heat pump system which may or may not incorporate the use of a refrigeration subsystem.

Another object of the present invention is to provide such a heat pump system, wherein the heat transfer performance of aqueous-based fluids is substantially improved by using heat-pump heating/cooling heat exchangers where the ground is used as the primary or secondary heat sink/source in a closed loop.

Another object of the present invention is to provide such a heat pump system, wherein capital/installation cost of the total heat pump system is substantially reduced.

Another object of the present invention is to provide a heat pump system employing a coaxial-flow heat exchanging structure which is installed into the Earth, a lake, a river, sea water or other heat sink or heat source to absorb heat or dissipate (i.e. radiate) heat energy into or from the heat transfer fluid by isolating the heat transfer fluid entering the center insulating tube, from the helically flowing fluid exiting the assembly. The interior surface of the thermally-conductive outer tube section is the primary heat transfer surface of the coaxial-flow heat exchanging assembly.

Another object of the present invention is to provide a coaxial-flow heat exchanging structure that can be used in diverse kinds of heat pump systems, wherein the coaxial-flow heat exchanging structure can be manufactured as a primary system, a system sub-component, or a sub-component kit.

Another object of the present invention is to provide a coaxial-flow heat exchanging structure for use in a heat pump system, wherein the heat exchanging surface area of the structure is increased by fluting the plastic surface of the outer thermally-conductive outer tube and by increasing the length of the bore into the ground (bore length) as a result of drilling deviated-type wells in aquifer zones of the Earth.

Another object of the present invention is to provide a coaxial-flow heat exchanging structure for use in a heat pump system, wherein as the heat transfer surface area and the contact volume of the ground/water source loop increase, the circulating fluid temperature will approach the average ground temperature through out the full duration of the heating and cooling seasons.

Another object of the present invention is to provide such a heat pump system, wherein a uniform bore hole is drilled into an aquifer zone and a smooth metal pipe or a fluted plastic pipe is installed within the bore hole so that the coaxial-flow heat exchanging structure of the present invention can be constructed within most geologic ground types, without major changes in installation/construction procedures.

Another object of the present invention is to provide a method of and apparatus for enhancing the heat transfer in aqueous based fluid ground/water source loop systems so that a low differential temperature, high mass-rate heat pump can be used to cool or heat a thermal load from a building or industrial process.

Another object of the present invention is to provide a ground/water source heat-pump system that has a SEER rating that exceeds air-source heat pump systems and ground-source heat-pump systems using a refrigerant-based heat-transfer fluid.

Another object of the present invention is to provide an improved heat pump system, wherein the aqueous-based fluid contains a biodegradable anti-freeze and dye to minimize the environmental impact of leaks in the ground loop and improve leak detection in the ground loop multi-well grid.

Another object of the present invention is to provide apparatus for manufacturing the helically-finned tubing employed within the coaxial-flow heat transfer (exchanging) structure of the present invention.

Another object of the present invention is to provide a coaxial-flow heat-transfer structure, wherein the temperature of the heat transfer fluid is substantially maintained until it reaches the bottom of the well, so that a higher temperature difference is maintained between the turbulent flowing fluid in the outer flow channel between the inner tube section and the outer tube section, thereby increasing the rate of heat transfer into the inside wall of the outer tube section and consequently into the grout cement and eventually into the Earth, rock, and aquifer, if an aquifer exists.

Another object of the present invention is to provide a coaxial-flow heat exchanging structure which employs a fluid return and injection manifold employing a plurality of small holes formed in a cap structure to achieve a low friction-created pressure drop, or alternatively, a single medium size hole for achieving a higher friction-created pressure drop.

Another object of the present invention is to provide a coaxial-flow heat exchanging structure which employs a fluid return and injection manifold cooperating with a compression-ring type cap installed on the proximal end of the coaxial-flow heat exchanging structure, to seal the system and prevent fluid leaks.

Another object of the present invention is to provide a coaxial-flow heat exchanging structure which employs a fluid return and injection manifold cooperating with a clamped-type cap installed on the coaxial-flow heat exchanging structure, wherein the cap has an O-ring or U-ring seal around the proximal portion of the thermally-conductive outer tube section to prevent fluid leaks.

Another object of the present invention is to provide a coaxial-flow heat exchanging structure, wherein a manifold is joined to a plurality of small holes formed in a cap portion provided on the proximal portion of the outer tube section, so that heat exchanging fluid exits perpendicular to central axis of the thermally-conductive outer tube section.

Another object of the present invention is to provide a coaxial-flow heat exchanging structure, wherein a manifold is joined to a plurality of small holes formed in a cap portion provided on the proximal portion of the outer tube section, so that heat exchanging fluid exits parallel to central axis of the thermally-conductive outer tube section.

Another object of the present invention is to provide a coaxial-flow heat exchanging structure, wherein a pair of tube fittings are welded or fused to the side of the thermally-conductive outer tube section, for the injection and returning heat exchanging fluids to the inner and outer flow channels realized therein.

Another object of the present invention is to provide a coaxial-flow heat exchanging structure, which is installed in a deviated well bore in the Earth, wherein the horizontal section of the structure is drilled into an aquifer zone and the vertical section thereof connects the horizontal section back to the Earth's surface.

Another object of the present invention is to provide a coaxial-flow heat exchanging structure, which is installed in a near horizontally bored well in the side of a mountain, mesa, or hill, wherein the well bore path is deviated to follow an aquifer zone if available at the site, and wherein, for buildings with a deep basement or built on the side of a hill, the deviated well bores are drilled in the wall of the basement.

Another object of the present invention is to provide a coaxial-flow heat exchanging structure, which is installed in a well bore that is capped below the surface to prevent significant heat transfer to the ground/water surface or atmosphere, and wherein for areas that have significant ice or freeze/thaw movement, the distribution pipes would be protected against damage and, if possible, the well should be capped below the frost line.

Another object of the present invention is to provide a coaxial-flow heat exchanging structure, which is installed vertically in foundations or pilings of a bridge pier or like structure.

Another object of the present invention is to provide a coaxial-flow heat exchanging structure, which is installed horizontally in the foundations or pilings of a building, bridge, or other structure.

Another object of the present invention is to provide a coaxial-flow heat exchanging structure, which is suspended horizontally in an aqueous solution or mud.

Another object of the present invention is to provide a coaxial-flow heat exchanging structure, which is installed in a bridge component or piling, wherein in earthquake areas, the pilings are wrapped in a metal sheath to prevent structural damage in the earthquake, and helically extending outer flow channels provide a ground/water source heat to prevent icing of the road way or sidewalks during the winter.

Another object of the present invention is to provide a coaxial-flow heat exchanging structure, which is installed within the Earth about a residential home, wherein an optional thermal bank tank is provided for night time operation when the electrical energy costs are cheaper, or for daytime operation when solar cells can provide electrical energy.

Another object of the present invention is to provide a plurality of coaxial-flow heat exchanging structures installed below the ground so as to prevent icing or snow accumulation on side walks, bridges and heavily traveled intersections or steeply pitched roads.

Another object of the present invention is to provide a coaxial-flow heat exchanging structure, wherein sea water is used as the heat-pump heat sink for gas dehydration and oil de-waxing, and wherein one or more coaxial-flow heat exchanging structures of the present invention are installed in the ocean above the ocean floor, for the purpose of extracting heat from the gas so as to cause the temperature thereof to drop, thereby condensing water vapor and/or light hydrocarbon vapors in the gas stream.

Another object of the present invention is to provide a coaxial-flow heat exchanging structure, wherein ballast water is used as the heat-pump heat sink for gas dehydration and oil de-waxing, and wherein one or more coaxial-flow heat exchanging structures of the present invention are installed in the ocean above the ocean floor, for the purpose of extracting heat from the gas so as to cause the temperature thereof to drop, thereby condensing water vapor and/or light hydrocarbon vapors in the gas stream.

Another object of the present invention is to provide a coaxial-flow heat exchanging structure, employed in a ground-loop heat exchanging system, designed for dehydrating, on shore, pipeline-quality gas produced from remote off shore wells Another object of the present invention is to provide a coaxial-flow heat exchanging structure, installed in a ground-loop heat exchanger used in a natural gas dehydration and condensate separation system constructed on land for a platform well or a gathering system.

Another object of the present invention is to provide a coaxial-flow heat exchanging structure within a natural gas dehydration system, wherein the gas in the liquid separator is cooled to a temperature near the aquifer temperature, and then gas is cooled with a heat pump to a temperature near the gas hydrate temperature using a rotating heat exchanger.

Another object of the present invention is to provide a submarine employing a coaxial-flow heat exchanging structure of the present invention installed within a seawater heat exchanging subsystem for centralized air conditioning and equipment cooling.

Another object of the present invention is to provide a submarine employing a coaxial-flow heat exchanging structure of the present invention installed within a seawater heat exchanging subsystem for decentralized air conditioning and equipment cooling.

Another object of the present invention is to provide an air-conditioning system employing a plurality of coaxial-flow heat exchangers of the present invention, wherein the outer tubes of the heat exchangers are made of metal and are provided with external fins so as to provide maximum heat transfer with the ambient environment.

Another object of the present invention is to provide a plurality of coaxial-flow heat exchanging structures of the present invention installed within a plurality of deviated wells, wherein each coaxial-flow heat exchanger is installed in thermally-conductive cement, and connected together using piping so as to form a heat pumping network.

Another object of the present invention is to provide a coaxial-flow heat exchanging structure, wherein segmented, helically-extending finned inner tube sections having alternating left and righted handed twists are installed within thermally-conductive outer tube sections, so that a mixing zone is provided for turbulently mixing the heat exchanging fluid flowing along the helically-extending outer flow channel, to break up boundary layers that may form on the outer flow channel wall surfaces, and thereby increasing the efficiency of the system to exchange heat energy with the ambient environment.

Another object of the present invention is to provide a coaxial-flow heat exchanging structure, wherein a segmented helically-finned inner tube section, with integrated mixing zones, is installed in the outer tube sections of the coaxial-flow heat exchanging structure.

Another object of the present invention is to provide a coaxial-flow heat exchanging structure, wherein segmented helically-finned inner tube sections, with fluid mixing zones formed there-between, are realized using tube segments made of extruded pieces that are joined together by plastic couplings that are glued or welded together.

Another object of the present invention is to provide a coaxial-flow heat exchanging structure having an inner tube section with helically-finned segments applied to the outer surface thereof.

Another object of the present invention is to provide a coaxial-flow heat exchanging structure having an inner tube section with wrap-around type single fin segments applied thereabout so as to realize helically-finned inner tube sections within the thermally-conductive outer tube section of the structure.

Another object of the present invention is to provide a coaxial-flow heat exchanging structure having an inner tube section with wrap-around single fin segments applied to the outer surface of the inner tube section, wherein the wrap-around single fin segments have an integrated base layer that has been extruded flat and parallel while heated to its plastic point, and wherein the segment can be wrapped around a mandrel so as to provide the fin with a helical pitch to match the tubing or hose size to be employed within a coaxial-flow heat exchanging structure.

Another object of the present invention is to provide a coaxial-flow heat exchanging structure having an inner tube section with a plurality of wrap-around single fin segments applied to the outer surface thereof, wherein said fin segments have a left hand twist.

Another object of the present invention is to provide a coaxial-flow heat exchanging structure having an inner tube section with a plurality of single helical fin segments installed on the outer surface thereof, and the inner tube section contained within the outer tube section, and provided with a re-mixing zone between the helical fin segments for the turbulent mixing of heat exchanging fluid along a helically-extending outer flow channel realized between the inner and outer tube sections.

Another object of the present invention is to provide a coaxial-flow heat exchanging structure having an inner tube section supporting segmented single helical fin segments, having alternating left and righted handed twists, and providing a re-mixing zone between the helical fin segments for the turbulent mixing of heat exchanging fluid along a helically-extending outer flow channel realized between the inner and outer tube sections.

Another object of the present invention is to provide a coaxial-flow heat exchanging structure having an inner tube section with multiple-fin segments applied about the outer surface thereof so as to realize a helically-finned inner tube section employed in the coaxial-flow heat exchanging structure.

Another object of the present invention is to provide a coaxial-flow heat exchanging structure having an inner tube section with multiple-fin segments applied about the outer surface thereof so as to realize the helically-finned inner tube sections employed in the coaxial-flow heat exchanging structure.

Another object of the present invention is to provide a coaxial-flow heat exchanging structure having an helically-finned that is formed using plastic molding techniques.

Another object of the present invention is to provide a coaxial-flow heat exchanging structure having an helically-finned inner tube section that is formed using extrusion techniques.

Another object of the present invention is to provide a coaxial-flow heat exchanging structure having an helically-finned inner tube section that is formed using plastic molding techniques.

Another object of the present invention is to provide a coaxial-flow heat exchanging structure having an helically-finned inner tube section constructed from molded plastic fin segments, wherein the pitch on the fin segments is selected based on the amount of rotational fluid flow needed in the helically extending outer flow channel formed between the inner and outer flow channels of the coaxial-flow heat exchanging structure.

Another object of the present invention is to provide a coaxial-flow heat exchanging structure having an helically-finned inner tube section constructed from molded plastic fin segments, wherein tabs and slots are provided on the base of the fin segments so as to snap together the segments about the outer surface of the inner tube section, after which the connection points can be glued or welded together.

Another object of the present invention is to provide a coaxial-flow heat exchanging structure having an helically-finned inner tube section constructed from molded plastic fin segments, wherein at least one pair of the fin segments have the same twist directions within the outer tube section for supporting a mixing zone along the helically-extending outer flow channel formed between the inner and outer tube sections.

Another object of the present invention is to provide a coaxial-flow heat exchanging structure, wherein a pair of multi-finned segmented tubing sections with (flow-guiding) fins having alternating twist directions are installed within an outer tube section for supporting a mixing zone along a helically-extending outer flow channel formed between the inner and outer tube sections.

Another object of the present invention is to provide a coaxial-flow heat exchanging structure installed within a well bore formed in Earth, and surrounded by thermally-conductive cement containing carbon and/or aluminum oxide flakes, or metallic fibers or other thermal conductivity enhancing particles.

Another object of the present invention is to provide a coaxial-flow heat exchanging structure installed in a well bore formed in the Earth and surrounded by thermally-conductive cement that was pumped within the well bore and filled up the interstices of the well bore during the installation phase.

Another object of the present invention is to provide a coaxial-flow heat exchanging structure having an helically-finned inner tube section, a thermally-conductive outer tube section, and a fluid re-mixing zone along an outer flow channel formed between the inner and outer tube sections, for mixing a helically-rotating fluid flowing there-along so as to increase the heat transfer efficiency of the system.

Another object of the present invention is to provide a coaxial-flow heat exchanging structure having a thermally-insulated inner tube section, a thermally-conductive outer tube section and an outer flow channel formed therebetween, wherein a plurality of rows of zig-zaging fluid turbulence generators/projections are provided as segments on the outer surface of the inner tube section for the purpose of generating turbulence in the heat exchanging fluid flowing through the outer flow channel.

Another object of the present invention is to provide a coaxial-flow heat exchanging structure having a thermally-insulated inner tube section, a thermally-conductive outer tube section and an outer flow channel formed therebetween, wherein a plurality of fluid turbulence generators/projections provided on the outer surface of the inner tube section for the purpose of generating turbulence in the heat exchanging fluid flowing through the outer flow channel.

Another object of the present invention is to provide a coaxial-flow heat exchanging structure having a thermally-insulated inner tube section, a thermally-conductive outer tube section and an outer flow channel formed therebetween, wherein the inner tube section and its plurality of helically extending fins are formed by an extrusion process, and subsequently inserted within the outer tube section to form the helically-extending flow channels between the inner and outer tube sections.

Another object of the present invention is to provide a coaxial-flow heat exchanging structure, wherein the inner tube section has a single helically-extending fin structure, of discrete structure, disposed along the outer flow channel between the inner and outer tube sections, for the purpose of generating turbulence in the flow of exchanging fluid along the outer flow channel.

A coaxial-flow heat exchanging structure of the present invention, wherein the inner tube section has multiple rows of discrete fin segments helically-extending along the outer flow channel between the inner and outer tube sections, and formable as flexible planar segments (through modeling techniques) and then applied about the outer surface of the inner tube structure.

Another object of the present invention is to provide a coaxial-flow heat exchanging structure, wherein a continuous helically-extending turbulence generating structure along the outer flow channel between the inner and outer tube sections.

These and other objects of the present invention will become apparent hereinafter and in the Claims to Invention.

BRIEF DESCRIPTION OF DRAWINGS

For a more complete understanding of how to practice the Objects of the Present Invention, the following Detailed Description of the Illustrative Embodiments can be read in conjunction with the accompanying Drawings, briefly described below, in which visual descriptions are provided showing the installation of the present invention in the ground, water, air, and/or mud line environments, with like reference numerals indicating like structures.

FIG. 1 is a schematic representation of a longitudinal cross-section of a prior art tube section carrying a flowing fluid, illustrating a laminar fluid flow profile across the interior of the tube, in which the velocity of the fluid traveling through the tube is maximum in the center of the tube and decreases from the center to the inner surface of the tube.

FIG. 1A is a schematic representation of a traverse cross-section of the prior art tube of FIG. 1, further illustrating that the friction presented at the boundary surface layer between the tube and the fluid causes (i) a gradient in velocities across the tube (giving rise to different annular flow velocities), and (ii) a corresponding reduction in capacity of heat energy transfer from the fluid into the tube wall material during fluid flow.

FIG. 1B is a schematic representation of a prior art "U" tube type heat transfer ground loop system buried in the Earth for the purpose of transferring (i.e. sinking) heat energy into the Earth, and illustrating that the overall capacity of the system to transfer heat energy into the Earth is diminished due to the heat energy exchange between adjacent tubes in the system.

FIG. 1C is a schematic representation of a prior art "U" tube type heat transfer ground loop system buried in the Earth for the purpose of extracting heat energy from the Earth, and illustrating that the overall capacity of the system to transfer heat energy into the Earth is diminished due to the heat energy exchange between adjacent tubes in the system.

FIG. 25 is a front view of a fluted thermally-conductive outer tube section for use with the coaxial-flow heat transfer structure of the present invention, wherein the flutes on the thermally-conductive plastic outer tube section provide additional surface area to counteract the low heat transfer coefficient of the plastic material, and provide the thermally-conductive plastic outer tube additional strength when grouted in the Earth using thermally conductive cement.

FIG. 26 is a top view of the fluted thermally-conductive outer tube section of FIG. 25, taken along line 26-26 therein.

FIG. 27 is a side view of the fluted thermally-conductive outer tube section of FIG. 26, taken along line 27-27 therein.

FIG. 31 is a front, partially cross-sectional view of a coaxial-flow heat transfer structure of the present invention having a fluted thermally-conductive outer tube section with a single helically finned inner tube section installed therein so as to provide a helically-extending outer flow channel that corresponds with the fluted surfaces along the outer tube section.

FIG. 32 is a cross-sectional view of the coaxial-flow heat transfer structure of the present invention, taken along line 32-32 in FIG. 31.

FIG. 33 is a front, partially cross-sectional view of a coaxial-flow heat transfer structure of FIGS. 31 and 32, showing the helical flow pattern of heat exchanging fluid as it is pumped down the helically-extending outer flow channel and flows up the coaxially-arranged inner flow channel of the coaxial-flow structure.

FIG. 35 is a schematic representation of a heat transfer system comprising conventional heat transfer equipment in collaboration at least one coaxial-flow heat transfer structure of the present invention, as generally depicted in FIG. 2.

FIG. 36 is an enlarged view of a section of the helically-extending outer flow channel provided in the coaxial-flow heat transfer structure of FIG. 35, showing that the cross-sectional dimensions of the outer flow channel can be selected/designed to produce fluid flows therealong having optimal vortex characteristics that optimize heat transfer between the fluid within the outer flow channel and the surface of the thermally-conductive outer tube section.

Figure 118:
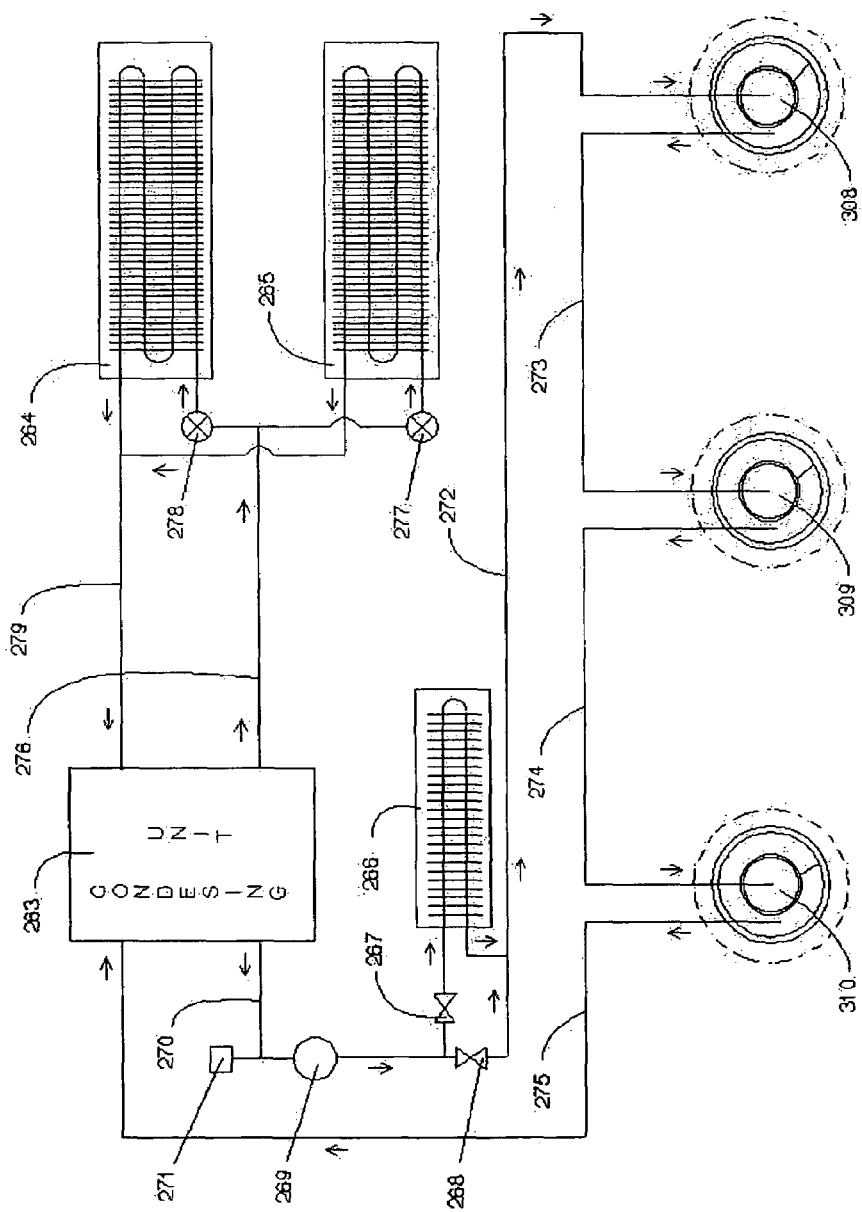

FIG. 118 is a schematic diagram of an air conditioning system employing a system of ground loop heat transferring wells employing coaxial-flow heat transfer structures of the present invention therein, functioning as a heat transfer sub-system connected to a water-cooled ground source condensing unit found on a typical air conditioning system, where an electric or gas fired furnace is used during the heating mode of operation.

Figure 119:
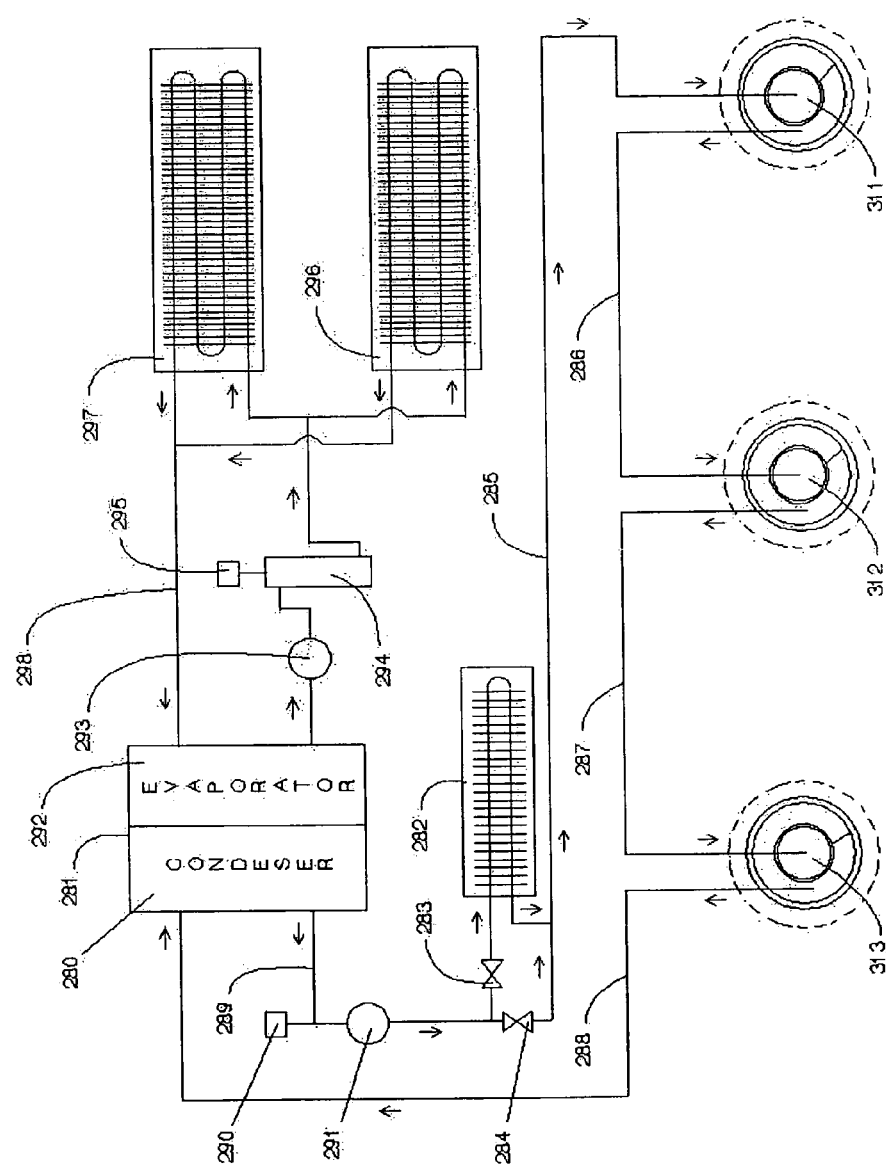

FIG. 119 is a schematic diagram of an air conditioning system employing a system of ground loop heat transferring wells employing coaxial-flow heat transfer structures of the present invention therein, functioning as a heat transfer sub-system connected to a water-to-water air conditioning heat pump.

Figure 120:
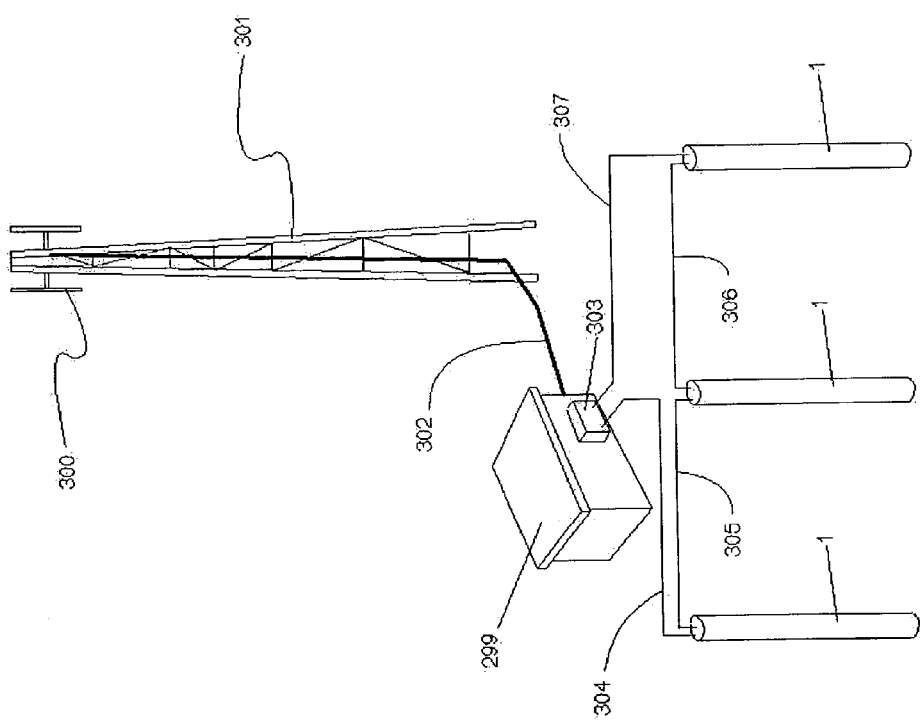

FIG. 120 is a schematic representation of a RF (or microwave) transmission/reception tower and accompanying base station housing (i.e. shelter) sensitive electronic equipment within an environment that is thermally controlled by a system employing a plurality of coaxial-flow heat exchanging structures of the present invention installed in a plurality of vertical well bores, using thermally conductive cement.

DETAILED DESCRIPTION OF THE ILLUSTRATIVE EMBODIMENTS OF THE PRESENT INVENTION

Referring to the figures in the accompanying Drawings, the various illustrative embodiments of the coaxial-flow heat exchanging (i.e. transferring) structure of the present invention will be described in great detail, wherein like elements will be indicated using like reference numerals.

Figure 2:
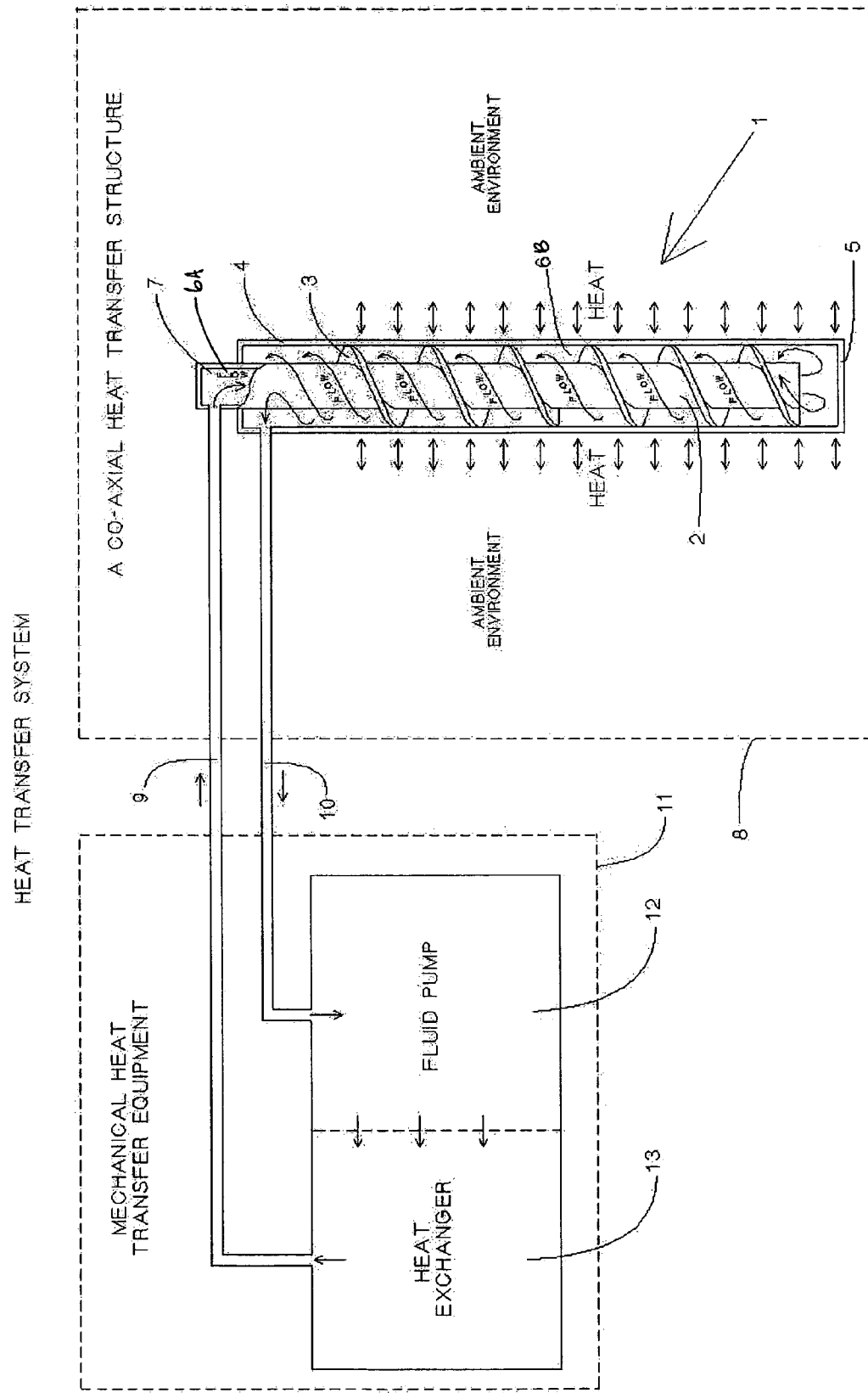
FIG. 2 is a schematic representation of a heat transfer system employing conventional mechanical heat transfer equipment, and at least one coaxial-flow heat transfer (i.e. exchanging) structure of the present invention comprising (i) a thermally conductive outer tube section, and (ii) an inner tube section having an inner flow channel having a substantially uniform inner diameter along its entire length and being coaxially installed within the outer tube section, and supporting helically-arranged turbulence generating fins on its outer surface, so as to form at least one helically-extending outer flow channel between the inner and outer tube sections, so that heat energy contained within a heat exchanging fluid flowing down the inner flow channel and along the helically-arranged outer flow channel, is exchanged through the walls of the outer tube section and into the ambient environment.

As shown in FIG. 2, the present invention relates to a coaxial-flow type heat transfer structure 1 for installation in an ambient environment 8 for facilitating the transfer of heat energy between an external heat energy producing system 11, 12, and 13, and the ambient environment. As shown in the illustrative embodiment of FIG. 2, the coaxial-flow type heat transfer structure 1 comprises: a proximal end 7, and a distal end 5; an input port 9, provided at the proximal end, for receiving a heat (energy) transferring fluid at a first temperature from an external heat energy producing system 11, 12 and 13; an output port 10, provided at the proximal end, for outputting the heat transferring fluid at a second temperature to the heat energy producing system; an inner tube section 2 having an outer wall surface extending between the proximal and distal ends, and supporting an inner flow channel 6 having a substantially uniform inner diameter along its entire length, and into which the heat exchanging fluid can be introduced from the input port, and along which the heat exchanging fluid can flow in a substantially laminar manner towards the distal end; an outer tube section 4, disposed coaxially around the inner tube section 2, and having an inner wall surface extending between the proximal and distal ends, and the outer tube section being in thermal communication with the ambient environment.

As shown in FIG. 2, an outer flow channel 6B of annulus geometry is provided between the outer wall surface of the inner tube section and the inner wall surface of the outer tube section, and capable of conducting heat exchanging fluid from the distal extend, along the outer flow channel 6B towards the proximal end, and exiting from the output port 10. A turbulence generating structure (e.g. a helically-arranged fin structure) is disposed along a substantial portion of the length of the outer flow channel 6B so as to introduce turbulence into the flow of the heat exchanging fluid flowing along the outer flow channel, from the distal end towards the proximal end, and thereby improving the transfer of heat energy between the heat exchanging fluid and the ambient environment along the length of the outer flow channel 6B.

Figure 3:
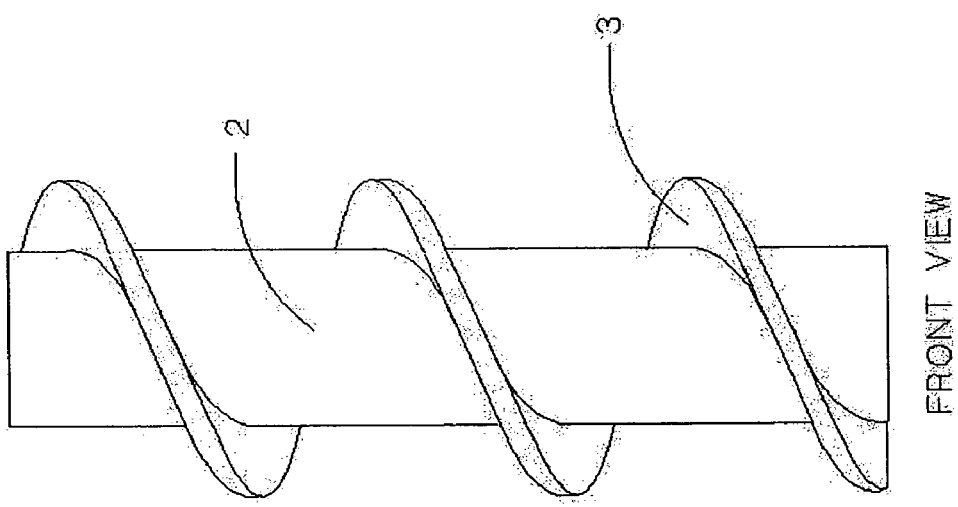
FIG. 3 is a front elevated view showing a section of helically-finned inner tube section used to create the helically-extending outer flow channel between the inner and outer tube sections of the coaxial-flow heat exchanging structure of the present invention.
Figure 4:
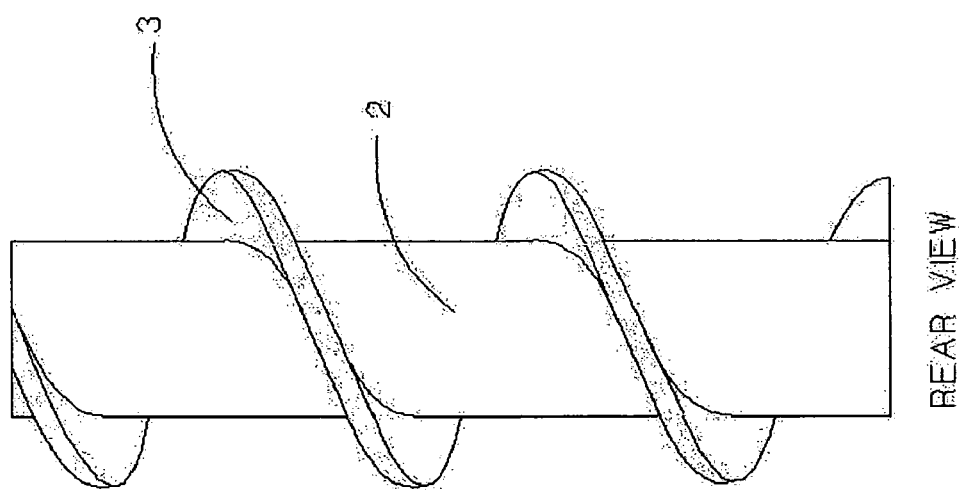
FIG. 4 is a back elevated view of the section of helically-finned inner tubing shown in FIG. 3.

In FIGS. 3 and 4, reference numeral 3 indicates the turbulence generator realized as a single helically-extending fin structure projecting from the surface of the inner tube section 2. The helically-extending fin structure 3 can be made out of plastic or metal depending on the static load on the fin 3. The outer wall of the helically-finned inner tube section 2 can be made out of metal or plastic depending on the crush, buckling or tensile load of the tubing laying or hanging in the well bore.

Figure 106:
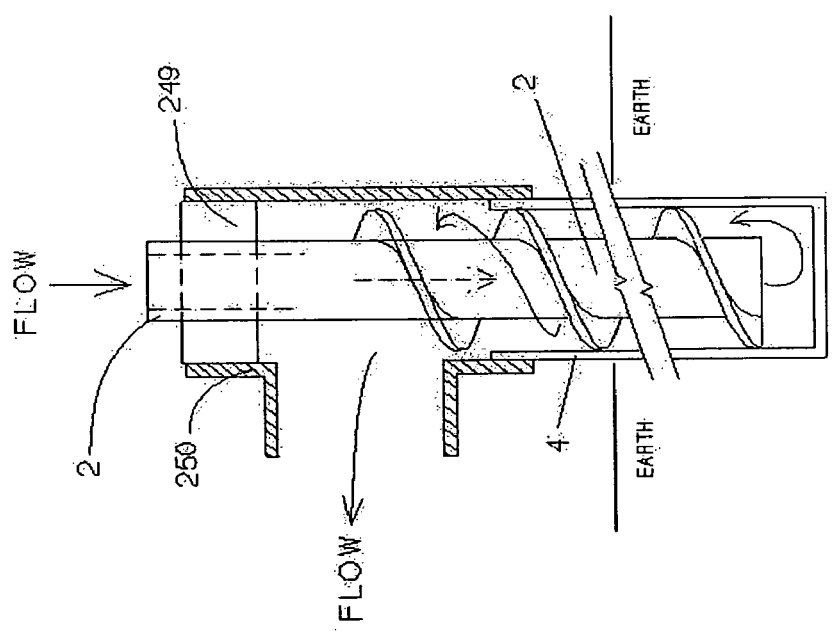
FIG. 106 is a cross-sectional view of a well head illustrating how commonly found metallic or plastic fittings can be used to connect piping used to direct the heat transfer fluid to and from heating, cooling or other heat transfer circulating devices and equipment in connection with an arrangement of coaxial-flow heat exchanging structures of the present invention.

As shown in FIGS. 3 and 4, a single helically-finned 3 insulated inner tube section 2 is used to create a helically-extending outer flow channel 6B within the coaxial-flow heat exchanging structure of the present invention. As shown, this small-diameter, helically-finned inner tubing can be delivered rolled on a large spool to install in the thermally-conductive outer tube section 4 of the system, and the helically-finned inner tubing can be cut to size and the well cap structure fused on as shown in FIG. 106.

Figure 5:
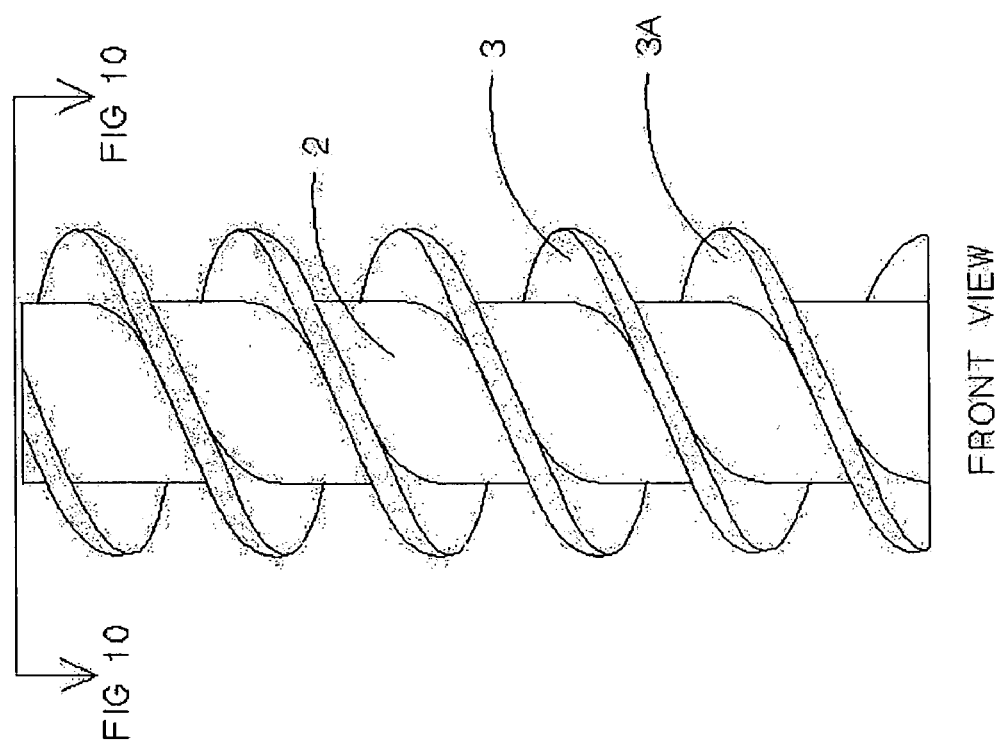
FIG. 5 is a front elevated view showing an inner tube section supporting, on its outer surface, double sets of helically-extending fins for use in creating a double helically-extending outer flow channel between the inner tube section and the thermally-conductive outer tube section of the coaxial-flow heat transfer structure of the present invention.

FIG. 5 shows the front view of double helically-finned inner tube section. Reference numeral 2 points to the insulated helically-finned inner tube section. Reference numeral 3 indicates the first helically-indicating fin structure while 3A points to the second helically-extending fin structure. The number of helically-extending fin structures (e.g. turbulence generating structures) used in any particular application is determined by the cross-sectional shape of the outer flow channel and this topic is discussed in detail with reference to FIGS. 35 through 42.

Figure 30:
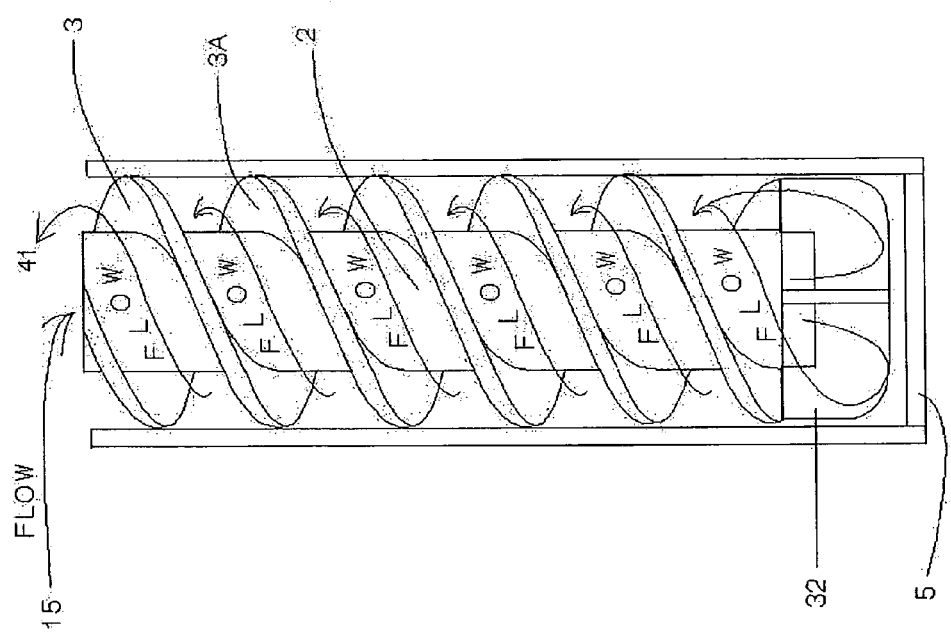
FIG. 30 is a partial cross-sectional view of a coaxial-flow heat transfer structure of the present invention employing a double helically-finned inner tube section installed within a thermally conductive outer tube section, shown operated in its forward flow direction, wherein a heat exchanging fluid is pumped through the input port and down the inner flow channel of the inner tube section, where upon it reverses direction at the distal portion of the coaxial-flow heat transfer structure, and then flows along the outer helical flow channel and out the output port at the proximal end.

The linear, leading and trailing edges of a number of the multiple angular fins can be angular or filleted. As shown in FIG. 5 and 30, a double helically-extending fin set is shown used to create helical fluid flow along the helically-extending outer flow channels of between the inner and outer tube sections. In this design, the friction pressure drop in the ground loop can be reduced, and the number of fin sets can be increased to reduce the flow path length in the well bore. Also, as the diameter of the thermally-conductive outer tube increases, the number of helically-extending fins can be increased to keep the aspect ratio of the outer flow channel shape close to 2 to 1, as shown in FIGS. 35 through 42.

Figure 6:
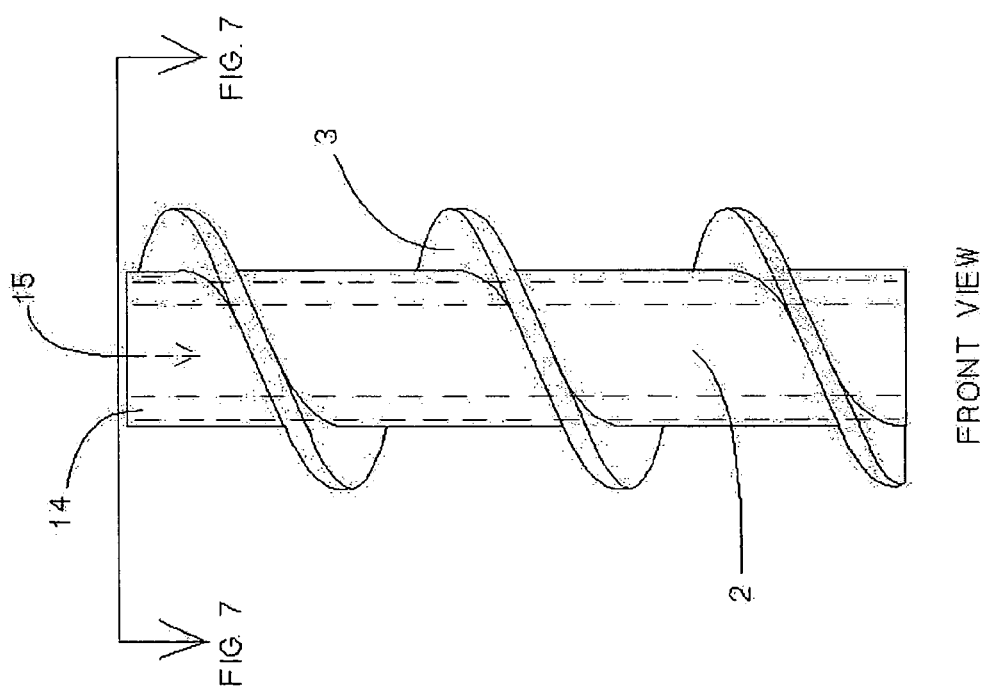
FIG. 6 is a front view showing a central tube section inserted within an inner tube section supporting, on its outer surface, single helically-extending fin, for use in creating a single helically-extending outer flow channel between the inner tube section and the thermally-conductive outer tube section shown in FIG. 3.
Figure 7:
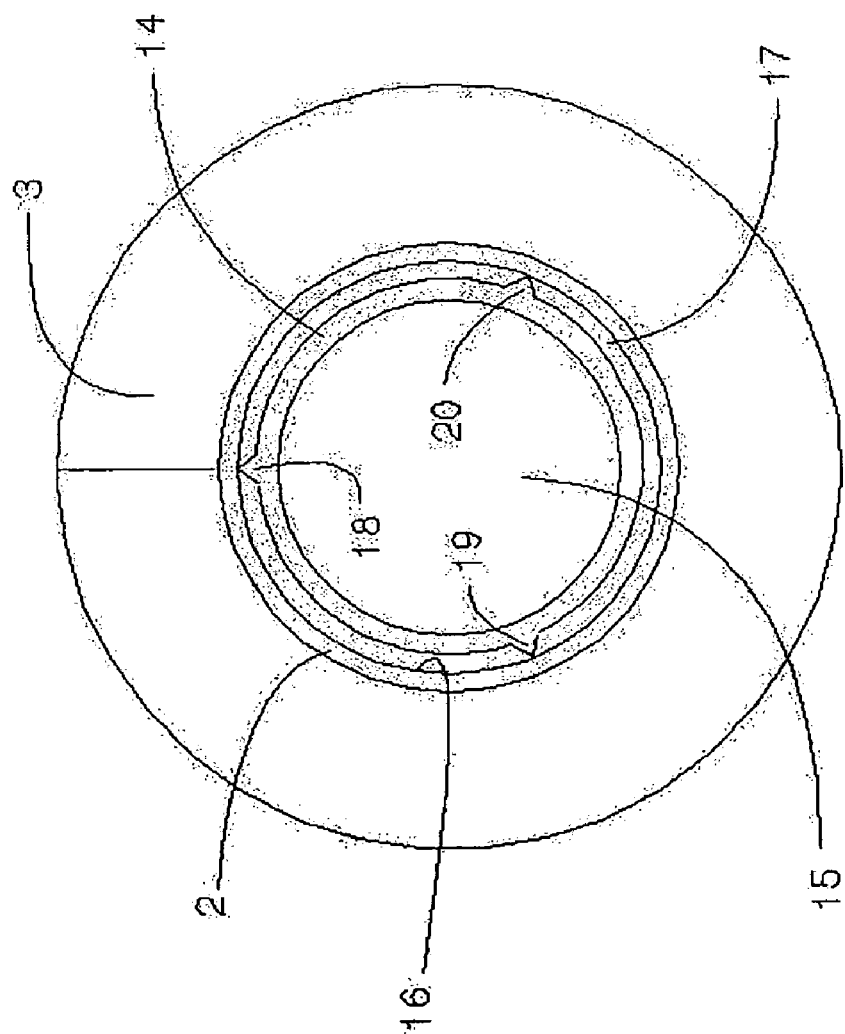
FIG. 7 is the top view of a single helically-finned tube subassembly shown in FIG. 6, wherein the gas gap between the central tube section and the helically-finned inner tube section provides thermal insulation to the heat transferring fluid flowing along the inner flow channel of the central tube section, and wherein the gap distance between the walls of these tube sections remains substantially uniform along the length of the subassembly, due to a plurality of standoffs provided on the outer surface of the central tube section.

In FIGS. 6 and 7, a single thermally-insulated helically-finned inner tubing section is shown for installation in the thermally-conductive outer tube section 4 of FIG. 2. In this inner tube section design, a gas gap 17 is formed between a central insulated inner tube 14 and the helically-finned inner tube 2, which provides thermal insulation between the inner and outer flow channels. The gap distance between the walls remains uniform due to the three standoffs 18, 19 and 20 provided on the central insulation tube. Reference numeral 14 indicates the wall thickness of the center tube in helically-finned inner tubing section. In the illustrative embodiment, the wall thickness of the center tube is calculated using the following factors: the material strength; the buckling load of setting the inner tubing down on the thermally-conductive tube shoe, shown in FIG. 20; the tensile load of supporting the inner tubing from the thermally-conductive outer tube cap, and the crush pressure rating of the tube.

In FIG. 6, reference numeral 15 indicates the inner flow channel. The diameter of the inner flow channel is determined from the amount of thermal storage required in the ground loop, or from the friction pressure drop. Reference numeral 2 indicates the wall thickness of the helically-finned inner tube section which must support the tensile load of the tubing and turbulence generators 3 (i.e. helical fins) hanging from the cap component of the thermally-conductive outer tube and it must support the shear stress of installing the inner tubing in the thermally-conductive outer tube 4. The surface of the fins 3 should be smooth to reduce the pressure drop created by surface friction on the flowing fluid. Reference numerals 18, 19 and 20 indicate the stand offs on the center tube used to create the static or dead gas space 17 between the center tube and the helically-finned inner tube section. The standoffs can have a triangular shape for installation at the factory, or a half cylinder shape for center tube installation in the field. The number of standoffs used is determined by the center tube diameter and center tube material. When used for insulating the inner tube inside the assembly shown in FIG. 115, the center tube 14 can be extruded as a whole assembly with standoffs 18, 19 and 20 integrated therewith.

For fin structures having small outside diameters, the edge can be flat, but for fin structures having large diameters, the edge should be radius to prevent fin damage caused by hanging up on an edge in the thermally-conductive outer tube section. The static or dead gas space 17 can also be filled with a ceramic fiber, ceramic paper, or other suitable insulating material. The gas space can be pressurized with an inert, non-condensable gas such as argon, nitrogen, refrigerant gases, methane, or ethane. The charge gas pressure should be equivalent to half the hydrostatic pressure in the well bore. Reference numeral 16 indicates the interior surface of the outer helically-finned inner tube section. The surface should be smooth to reduce friction pressure loss and could be curved to promote tangential rotation of the circulated heat exchanging fluid. To reduce the heat transfer between the center tube and outer tube, the surface could be coated with a reflective metal such as aluminum, silver or gold or coated with a reflective ceramic powder such as titanium dioxide.

Figure 8:
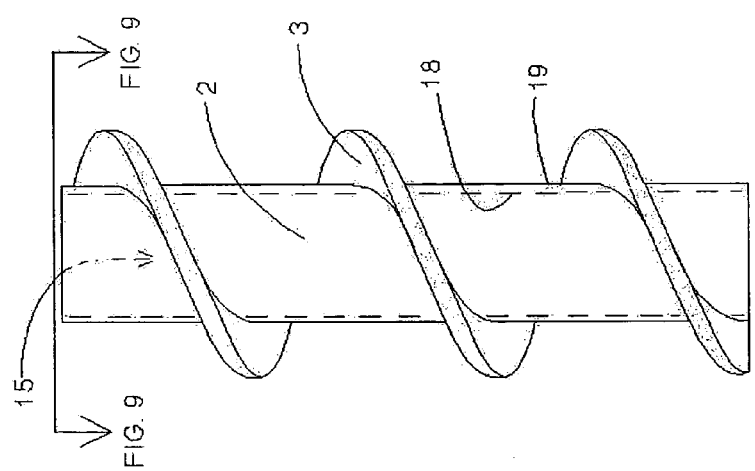
FIG. 8 is the front elevated view of an inner tube section supporting, on its outer surface, a single helically-extending (fluid-guide) fin that can be extruded with the inner tube section for small diameters, or alternatively can be extruded over a tube of larger diameter, wherein for diameters exceeding 18 inches or 0.5 meters, the helically extending fins can be rolled from flat stock and welded on the outer surface of the inner tube.
Figure 9:
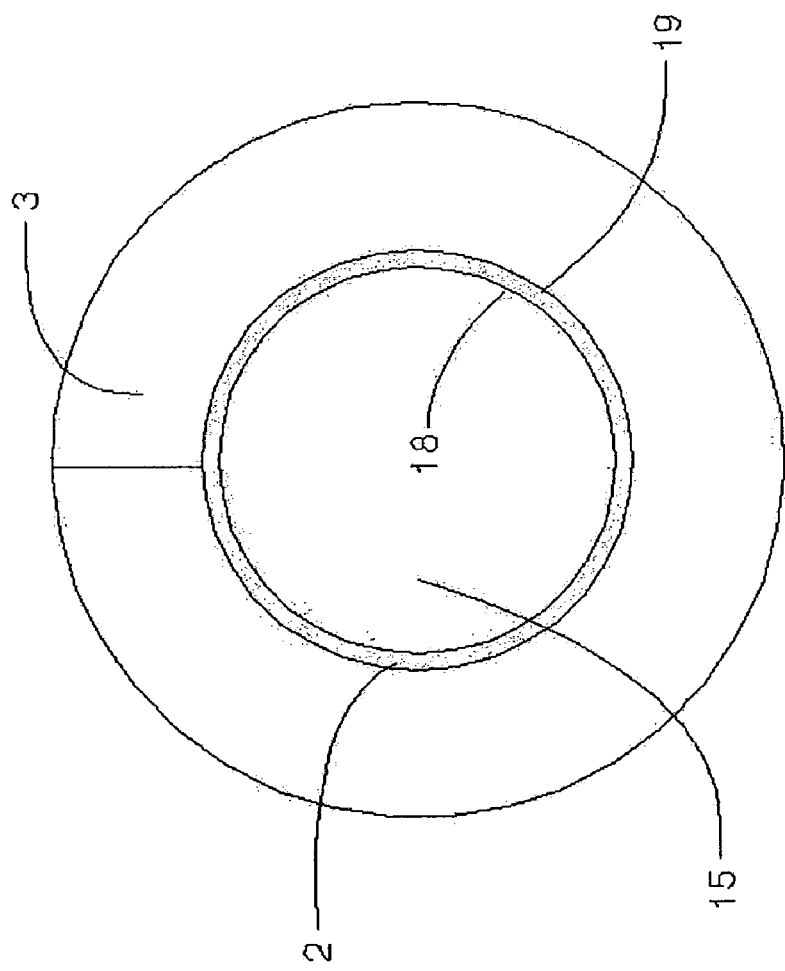
FIG. 9 is the top view of the single helically-finned tube subassembly shown in FIG. 8.

In FIGS. 8 and 9, the single helically-finned inner tubing section of FIGS. 6 and 7 is shown without the inner/central insulation tube installed. In this design, the fins 3 can be extruded with the tubing for small diameters or extruded over a larger diameter tube section. For diameters exceeding 18 inches or 0.5 meters, the fins can be rolled from flat stock and welded on the tubing section. Reference numeral 18 indicates the inner diameter of the helically-finned inner tube section where in the center tube will be assembled. Reference numeral 19 indicates the exterior diameter of the helically-finned inner tube section. While not shown in these figures, both the top and bottom surfaces of the helical fin 3 can be curved to promote tangential rotation of the fluid and to prevent slow flowing areas in the corners of the helical outer flow channel.

Figure 10:
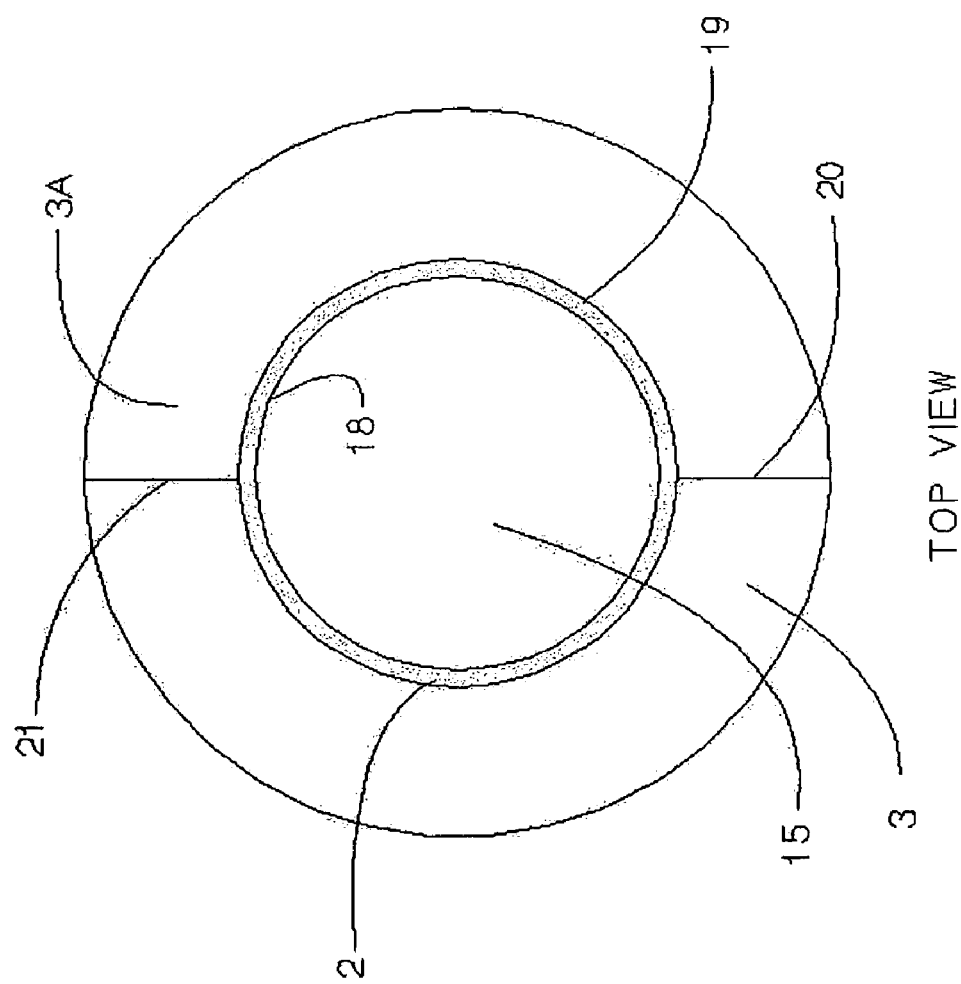
FIG. 10 is the top view of the double helically-finned tube subassembly shown in FIG. 5, designed for installation within a thermally-conductive outer tube section of the coaxial-flow heat transfer structure of the present invention.

As shown in FIG. 10, reference 18 indicates the interior surface of the helically-finned inner tube section 2. This surface could be coated with a reflective metal such as aluminum, silver or gold or coated with a reflective ceramic powder such as titanium dioxide. Reference numeral 19 indicates the exterior surface of the helically-finned inner tube section. This surface should be smooth to reduce the friction pressure of the circulating fluid. The surface could also be fluted to promote the tangential rotation of the circulating fluid. Reference numeral 20 shows the start of the clock-wise rotation of the helical fin structure 3 and numeral 1 shows the start of the clock-wise rotation of the helical fin structure 3A.

For fins having small outside diameters, the edge should be flat to increase the friction pressure drop of the slot flow so the circulating fluid follows (or is guided by) the helically-extending fins instead of trying to bypass it. But for large diameters, the edge should be radius with additional thickness to prevent helically-extending fin damage by hanging up on an edge in thermally-conductive outer tube collar. The difference in thickness between reference numerals 18 and 19 indicates the wall thickness of the helically-finned inner tube section. The wall thickness is determined by the material used and the compressive, tensile and shears loads the tubing wall will be exposed to during installation and operation.

Figure 11:
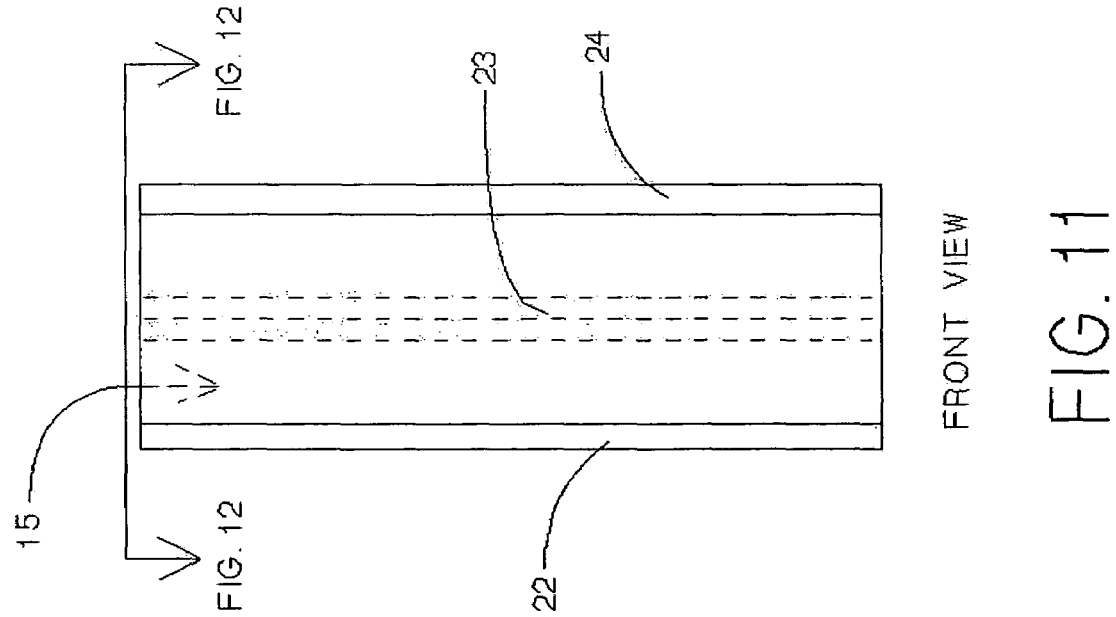
FIG. 11 is a front view of the central tube section that can be installed in the coaxial-flow heat transfer structure of the present invention, wherein its standoffs provide a gas gap needed for insulation between the central tube section and the helically-finned inner tube section, and wherein the insulation gas can be argon, nitrogen, or even ethane.
Figure 12:
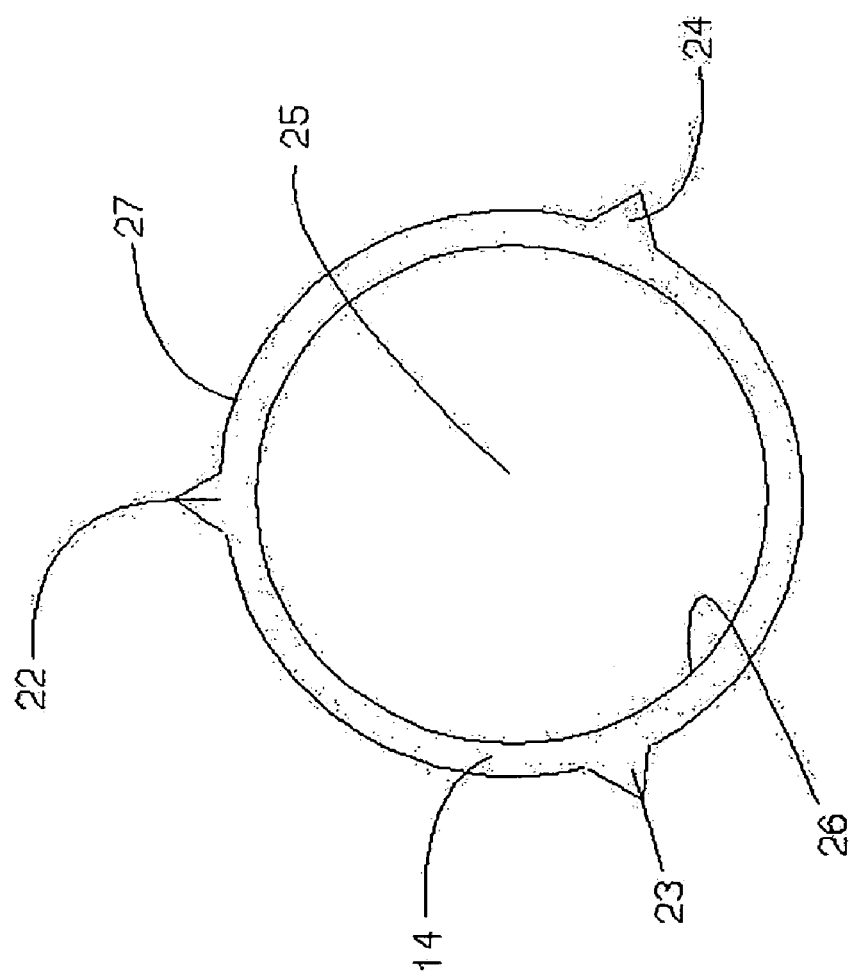
FIG. 12 is the top view of a central tube section shown in FIG. 11.

As shown in FIGS. 11 and 12, the standoffs 22, 23 and 24 on the central tubing provide the gas gap needed for insulation between the central insulation tube 14 inside surface 26 and helically-finned inner tube, wherein the fill gas can be argon, nitrogen, or even ethane. In this design, a vacuum is established in the field to check for leaks, then the gap is filled with gas to half of the bottom hole (well) pressure. Notably, the standoffs shown in FIG. 12 have a cross-sectional rounded shape instead of the triangular shape, for easier installation in the field and to prevent damage to the edge of the standoffs during installation in the field. Reference numeral 26 indicates the inside surface of the central tube where a heat transfer fluid can pass through the center 15.

Figure 13:
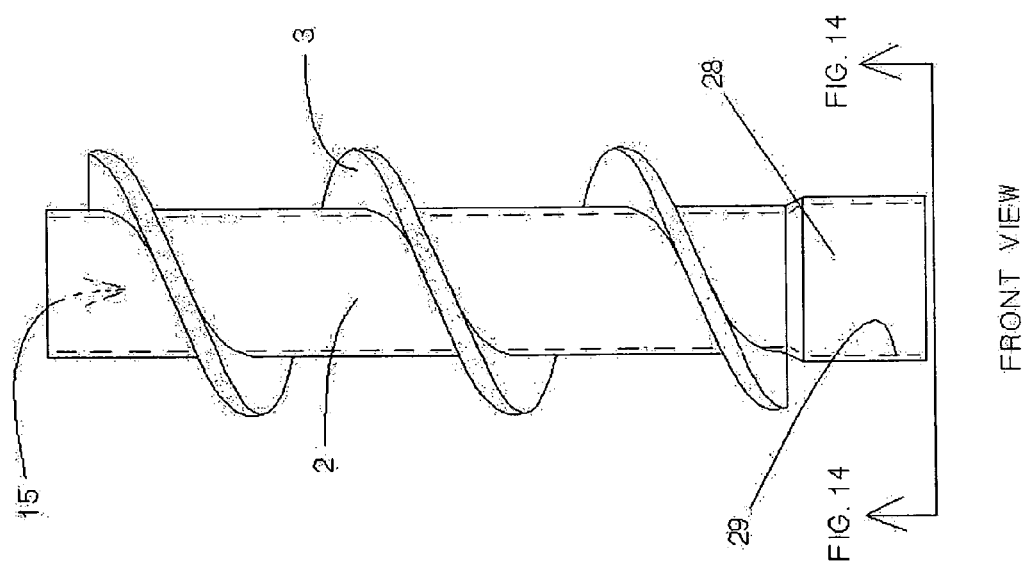
FIG. 13 is an elevated front view of a helically-finned inner tube section fitted with a thermally-insulated central tube section and a joint collar for use in coaxial-flow heat transfer structures having outer tube sections with large diameters.
Figure 14:
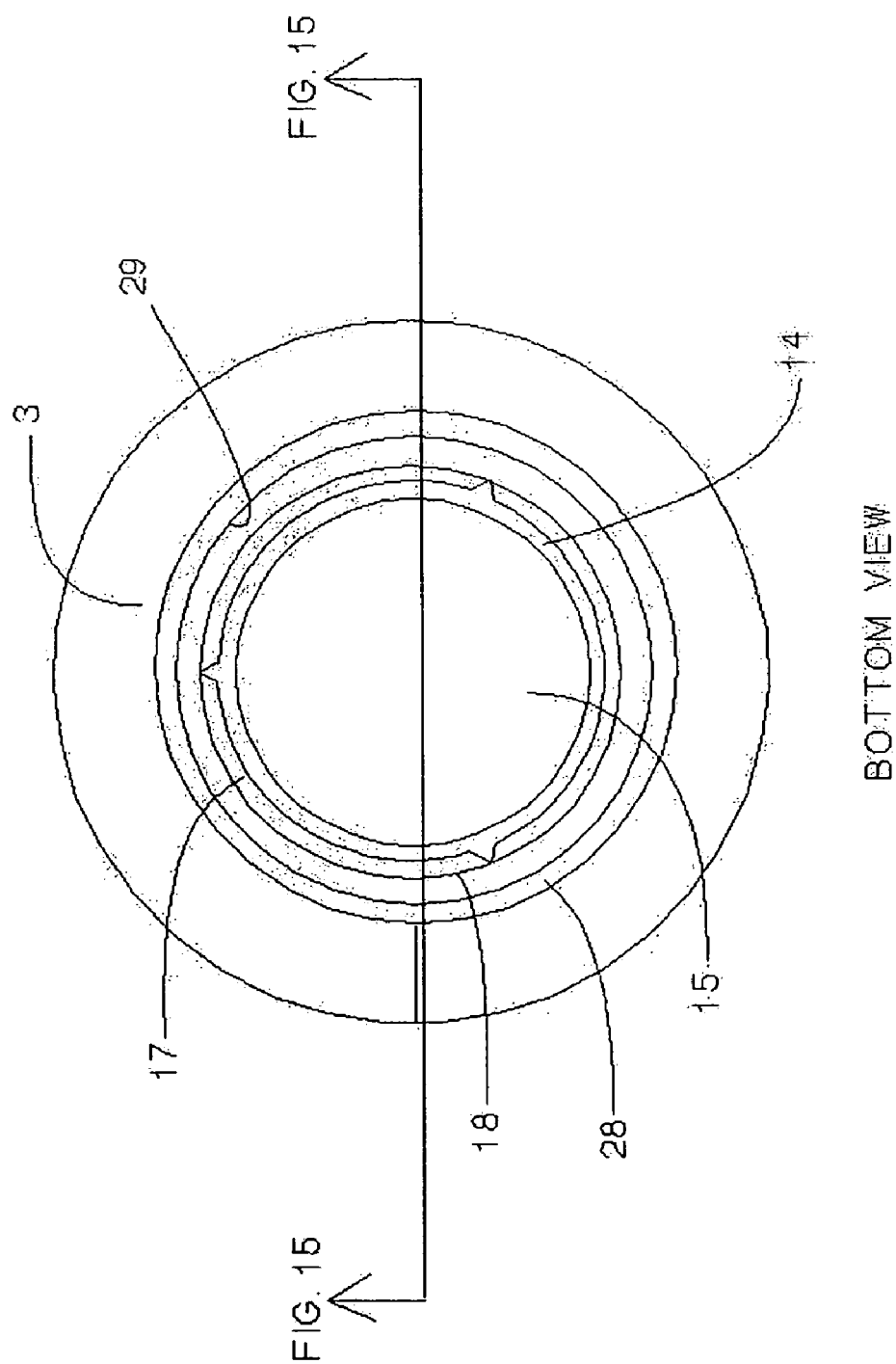
FIG. 14 is a bottom view of the thermally-insulated helically-finned inner tube section shown in FIG. 13.
Figure 15:
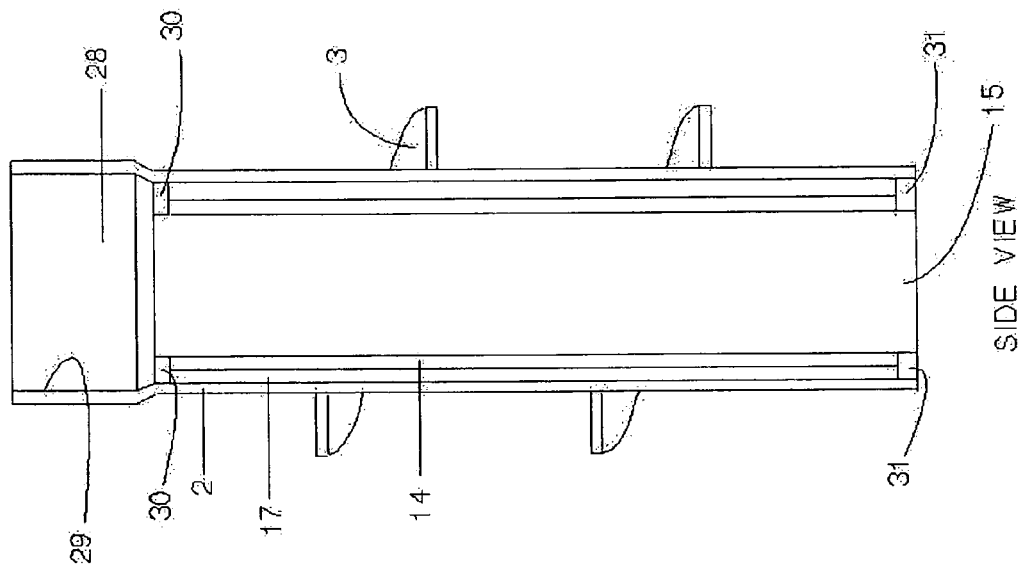
FIG. 15 is a cross-sectional view of the thermally-insulated helically-finned inner tube section shown in FIG. 14, taken along the line 15-15 thereof showing the insulated central inner tube section or sleeve (e.g. made from high density, foamed plastic) that is fusion welded on both ends inside the helically-finned inner tube section of a coaxial-flow heat transfer structure of the present invention, so as to provide a gas gap, filled with high pressure argon or other gas before being fusion welded together.

In FIGS. 13, 14 and 15, thermally-insulated helically-finned inner tubing is joined with a collar 28 for large diameter helically-finned tubing that cannot be rolled on spool. In this application, the collar can be fusion welded or threaded on the inside surface 29 to the next joint in the field to make a continuous piece of tubing for installation in the thermally-conductive outer tube providing fluid flow through the inner flow channel 6A to the distal end of the structure. Preferably, the central tube 14 is fuse welded at the factory on both ends 30 and 31 of the inner tube to provide the seal for the gas gap between these two tube sections, to allow charging with gas at the factory.

Figure 16:
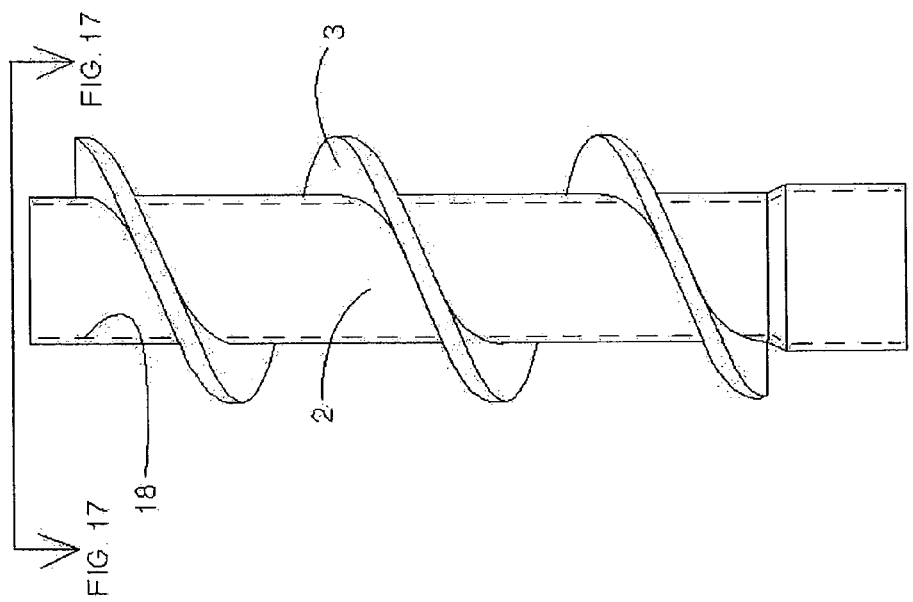
FIG. 16 is an elevated front view of a helically-finned inner tube section fitted with a joint collar but without a thermally-insulated central tube section, for use in coaxial-flow heat transfer structures having outer tube sections with large diameters.
Figure 17:
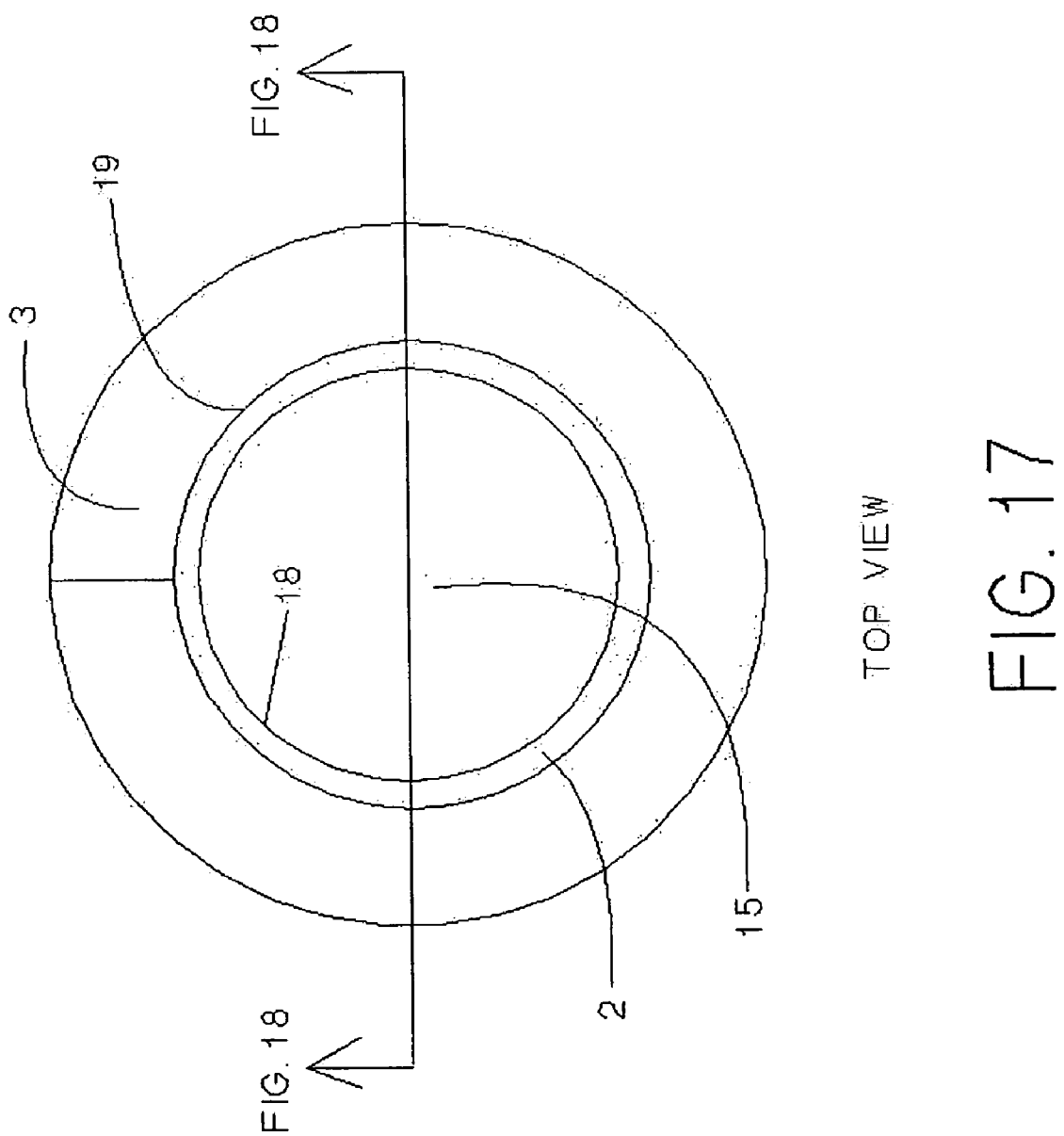
FIG. 17 is a top view of the helically-finned inner tube section shown in FIG. 16.
Figure 18:
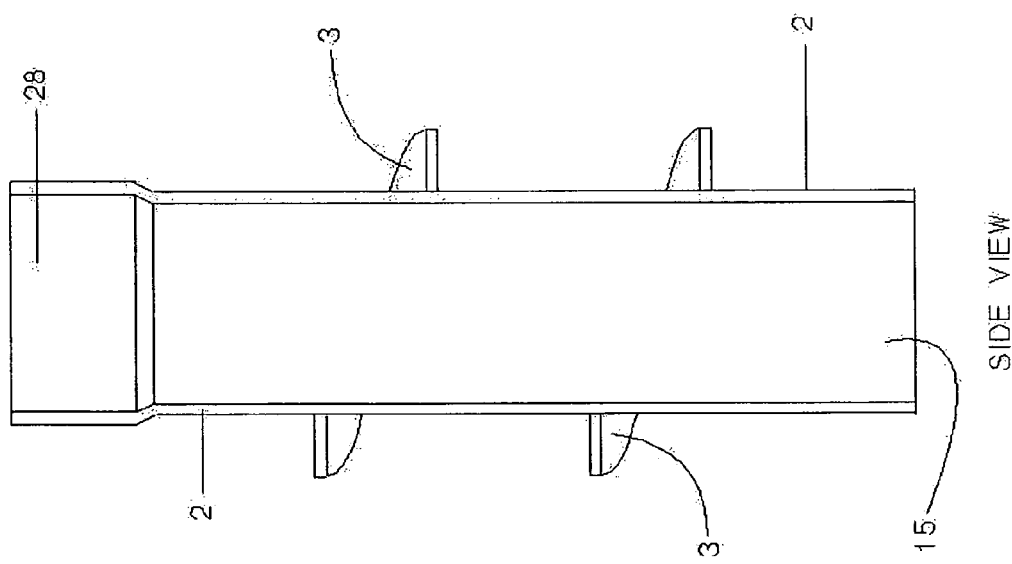
FIG. 18 is a cross-sectional view of the helically-finned inner tube section shown in FIG. 16, taken along the line 18-18 thereof.

FIGS. 16, 17, and 18 show a helically-finned inner tubing section 2 that has a (joining) collar 28 but not a central insulating tube installed. In this application, the collar is usually threaded for metal inner tubing sections, slip for short lengths of plastic tubing, or even provide with a twisted lock with O-ring seal for long lengths of plastic tubing. Preferably, the wire coil in the collar can be used to fusion weld plastic tubing in the field during installation.

Figure 19:
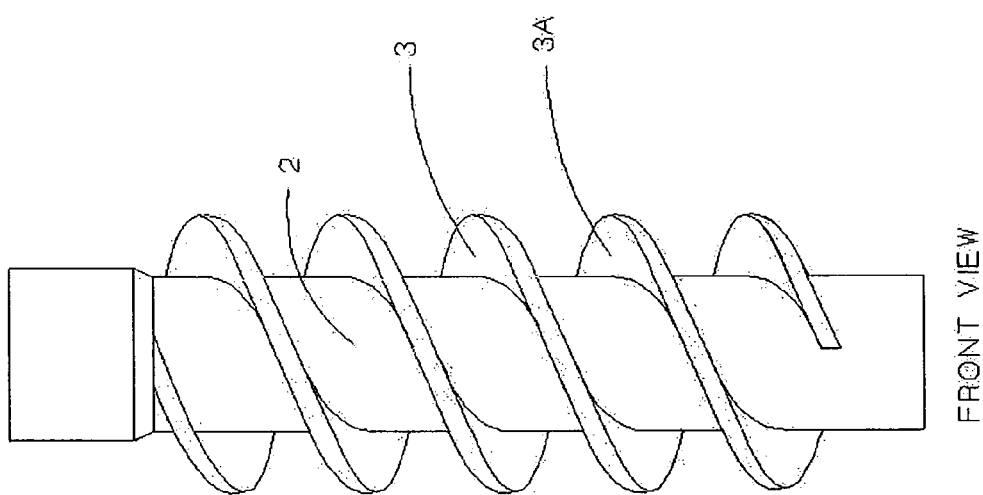
FIG. 19 is an elevated front view of a helically-finned inner tube section fitted with a thermally-insulated central tube section supporting, on its outer surface, double sets of helically-extending fins for use in creating a double helically-extending outer flow channel between the inner tube section and the thermally-conductive outer tube section of the coaxial-flow heat transfer structure of the present invention.

In FIGS. 19, illustrates how the structure in FIG. 5 can be extruded with a (oining) collar as shown FIG. 16.

Figure 20:
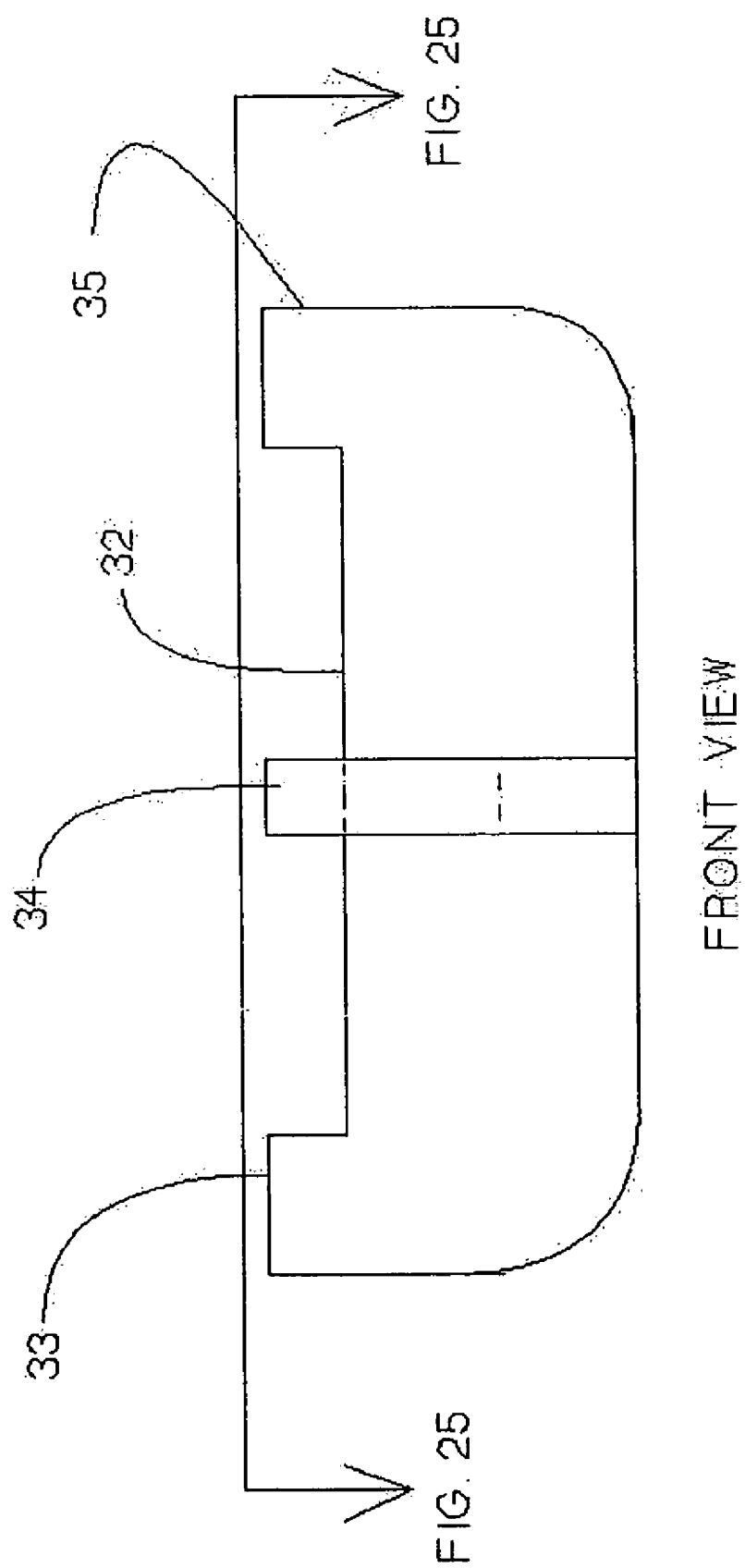
FIG. 20 is a front view of a tubing shoe structure that is fusion welded to the bottom of the helically-finned inner tube section of the coaxial-flow heat transfer structure of the present invention, so as to protect the helically-extending fins during the installation process.
Figure 21:
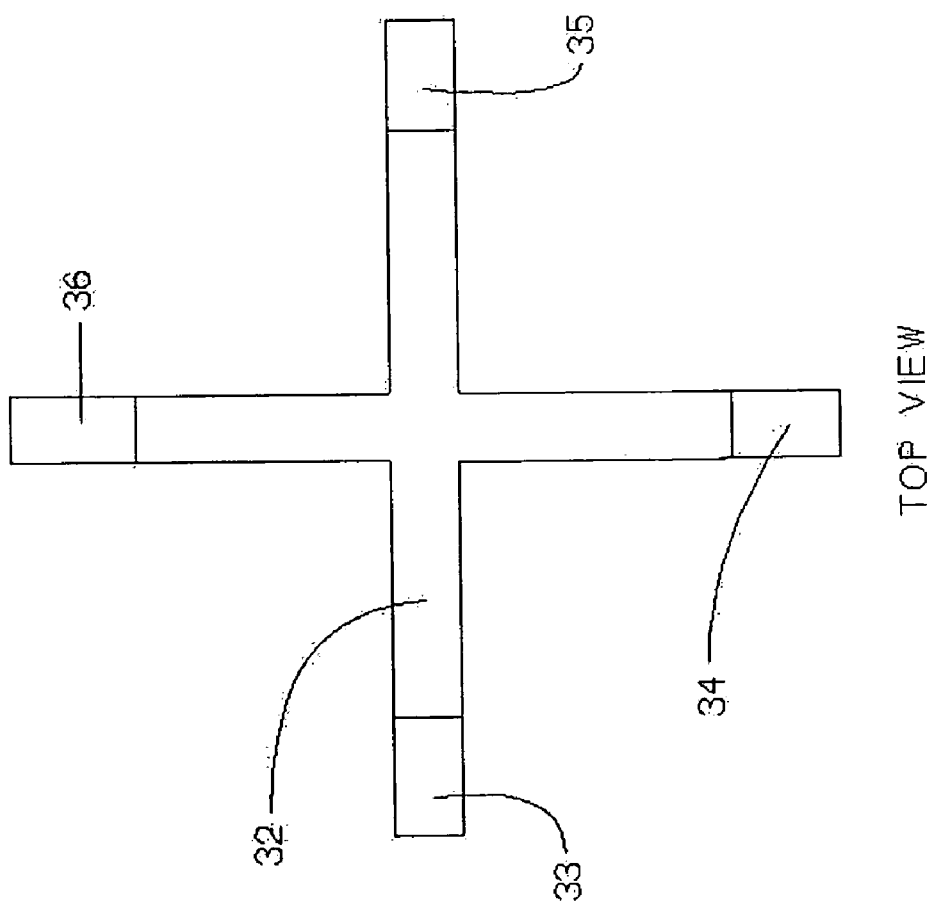
FIG. 21 is a top view of the helically-finned tubing shoe shown in FIG. 20.

FIGS. 20 and 21 show a shoe structure (i.e. fin protection structure). This structure can be fusion welded at points on surface 32 to the bottom (i.e. distal) end of the helically-finned inner tubing section. The shoe has a number of protectors 33, 34, 35 and 36 having a wider radial distance (from the shoe center) than the outer diameter of the helically-finned inner tubing outer diameter so as to provide a way of and means for protecting the helical fins during the installation process.

Figure 24:
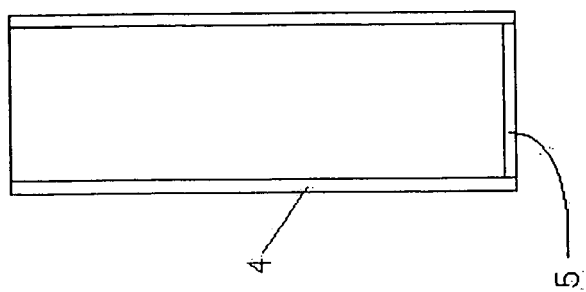
FIG. 24 is a side view of the thermally-conductive outer tube section of FIG. 26.
Figure 23:
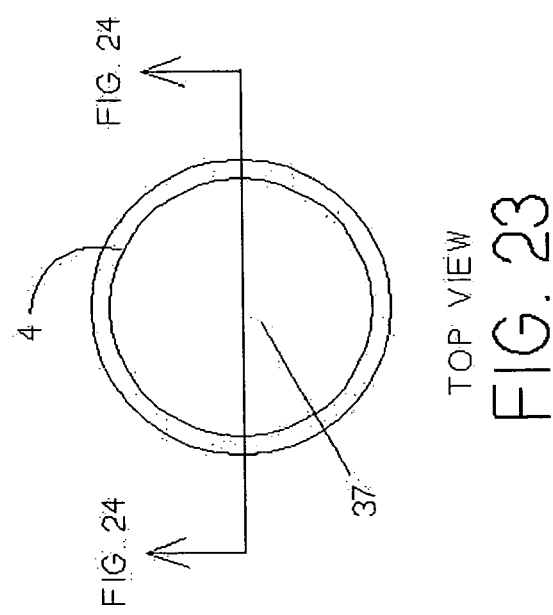
FIG. 23 is a top view of the thermally-conductive outer tube section of FIG. 22.
Figure 22:
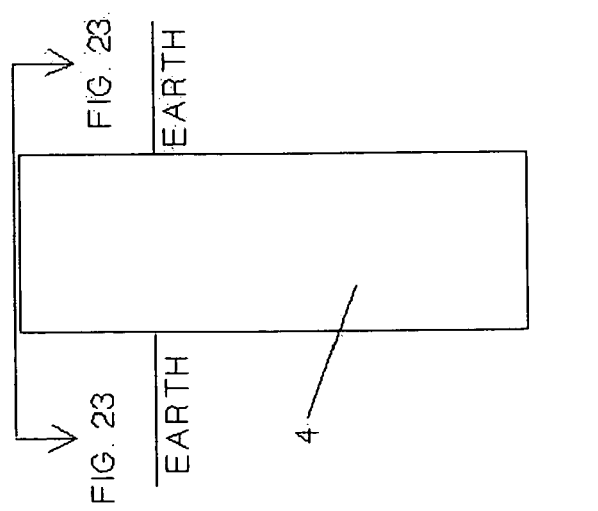
FIG. 22 is a front view of a smooth thermally-conductive outer tube section for use in the coaxial-flow heat transfer structure of the present invention, wherein the outer tube section is preferably made from metal to provide a high heat transfer coefficient, and has threaded collars for attaching the joints of tube sections together, and is grouted in the Earth using thermally conductive cement to maximize

In FIGS. 22, 23 and 24, a smooth thermally-conductive outer tube section, sealed at the distal end 5 with a cap structure 37, is shown from various views. During the installation process, this outer tube structure 4 is grouted in the Earth using thermally-conductive cement. Preferably, the smooth thermally-conductive outer tube is constructed from metal to ensure that it has a high heat transfer coefficient. In the illustrative embodiment, the collars, threaded, thermally fused, and specialty adhesives, are used to attach the outer tube sections together, and the thermally-conductive outer tube shoe shown in FIG. 20 can contain a cement valve and a plug catcher. Small diameter tubing is used inside the thermally-conductive outer tube 4 to prevent grout contamination therewithin and to flush the mud out of the outer tube after grout placement. Such precautions should be taken because hardened grout inside the outer tube can damage the plastic helical edges during insulation as well as reduce the heat transfer coefficient of the metal wall. One such precaution involves placing a small diameter coiled tubing in the annulus space between the well bore and the outer surface of the outer tube section, and pumping through this coiled tubing to fill the annulus at substantially the same rate as the coiled tubing is pulled our of the annulus to the Earth's surface. A quantity of grouting material should be left to set up at the bottom of the hole to hold the outer tube in place during the rest of the grouting procedure. Water can be added inside the outer tubing 4 giving it weight, guarding against excessive buoyancy and possible crushing which can occur during the grouting procedure before the grout has time to solidify.

Figure 28:
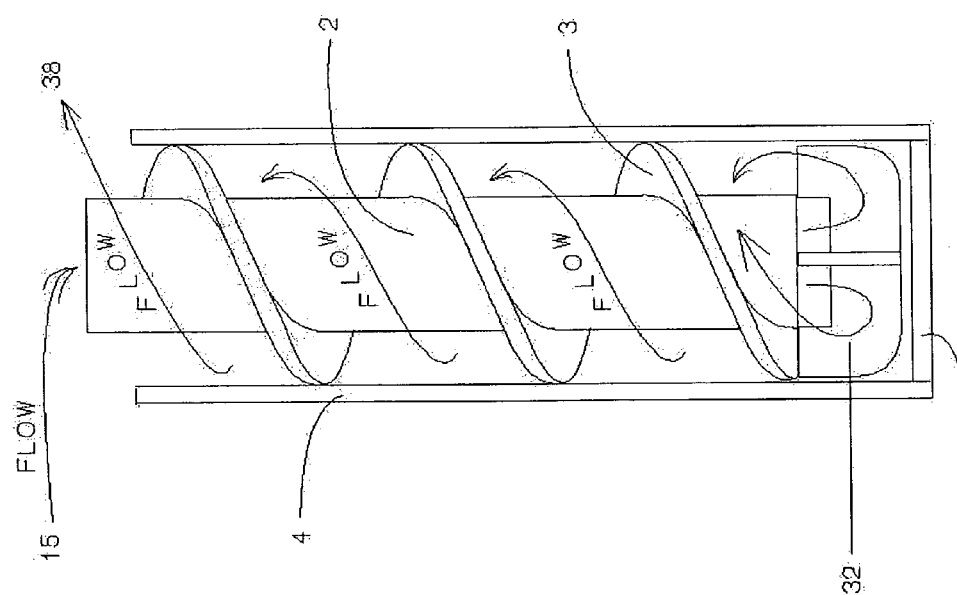
FIG. 28 is a partial cross-sectional view of a coaxial-flow heat transfer structure of the present invention employing a single helically-finned inner tube section installed within a thermally conductive outer tube section, and shown being operated in its forward flow direction, wherein a heat exchanging fluid is pumped through its input port and down the inner flow channel of the inner tube section, where upon reaching the bottom of the inner tube section, the fluid reverses its direction at the distal portion of the coaxial-flow heat transfer structure, and then flows along the helically-extending outer flow channel and out the output port at the proximal end.
Figure 29:
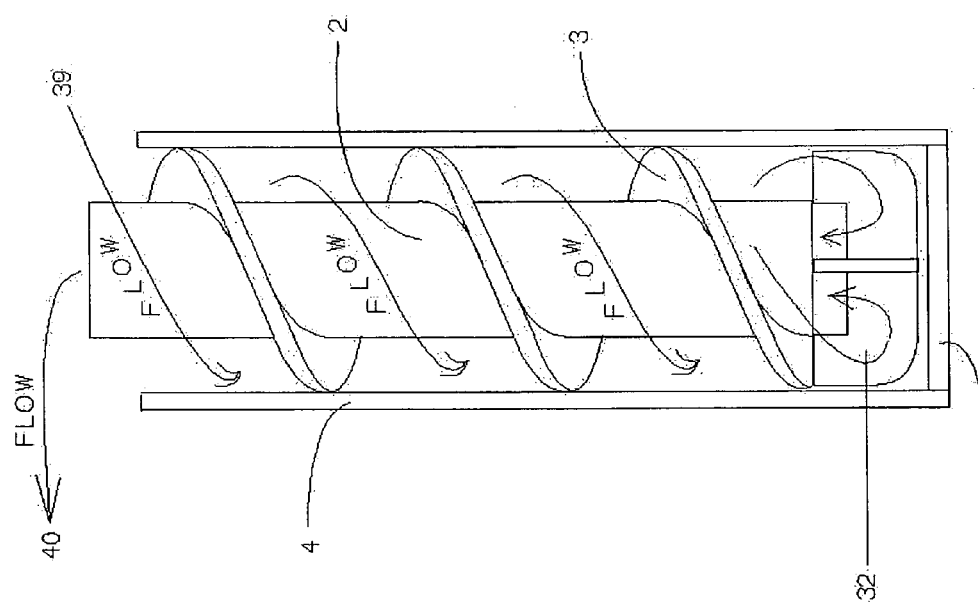
FIG. 29 is a partial cross-sectional view of a coaxial-flow heat transfer structure of the present invention employing a single helically-finned inner tube section installed within a thermally conductive outer tube section, shown operated in its reverse flow direction, wherein a heat exchanging fluid is pumped through its input port and down the outer helical flow channel between the outer and inner tube sections, where upon it reverses direction at the distal portion of the coaxial-flow heat transfer structure, and then flows along the inner flow channel and out the output port at the proximal end.

In FIGS. 25, 26 and 27, a fluted thermally-conductive outer tube section 4A is shown. In this design, the flutes on a thermally-conductive outer tube provides additional surface area to counteract the low heat transfer coefficient of the plastic. The flutes also provide the thermally-conductive outer tube with additional strength. If the desired thermally-conductive outer tubing material has sufficient burst pressure strength. The thermally-conductive outer tube cap 5 can also have metal forks to dig into the wall of the hole to prevent the thermally-conductive outer tube from floating when the grout is pumped to surface. An option to prevent the thermally-conductive outer tube from floating off the bottom of the hole is to flash set a small volume of grout in the bottom of the hole. This will serve to hold the thermally-conductive outer tube down while the rest of the grout is pumped to the In FIGS. 28 and 29, the forward flow pattern 15 and 38 and the reverse flow pattern 39 are illustrated in a coaxial-flow heat transfer structure having a smooth thermally-conductive outer tube section and single helically-finned inner tube section. During the cooling season, pumping heat exchanging fluid down the outer flow channel provides the best approximation to a cross flow heat exchanger for liquid-gas mixtures where the liquid adsorbs the gas phase when the pressure increases as the mixture is pumped down the thermally-conductive outer flow channel. As the gas phase is absorbed, the fluid temperature increases with depth, which in turn increases the heat transfer to the ground or water. During heating season or winter operation, pumping a cold aqueous fluid down the outer flow channel provides the best approximation to a cross flow heat exchanger due to the ground temperature increasing with depth. For horizontal or deviated wells, it is better to pump the fluid down the inner flow channel to maximize heat transfer at the distal end of the well.

In FIG. 30, the forward flow pattern 15 and 41 is illustrated in a coaxial-flow heat transfer structure having a smooth thermally-conductive outer tube section and inner tube section 2 having multiple helical fins.

FIGS. 31 and 32 show a coaxial-flow heat transfer structure having a fluted thermally-conductive outer tube 4A and a single helical-fin inner tube section 2, forming a single helically-extending outer flow channel. In this design, the pitch of the helical fins 3, and the fluted thermally-conductive outer tube surface, should be practically close for maintaining the helical flow pattern in the outer flow channel. The fluid will bypass the fins around the space in the flutes. The whole assembly can be extruded together as a tubing-thermally-conductive outer tube joint combination, and the joint combination can be fusion welded in the field with preinstalled wire coils in the collars. To grout the outer tube in a well bore, a small diameter coiled tubing is installed in the annulus of the hole, as described above. The small diameter coiling tubing is then pulled to the surface at substantially the same rate as the grout fills the annulus of the well bore. Water can be added inside the outer tubing 4 giving it weight, guarding against excessive buoyancy and possible crushing which can occur during the grouting procedure before the grout has time to solidify. As shown, 48 illustrates the excentric offset of the proximal end circular surface.

FIG. 33 illustrates the helical flow pattern 39 and 40 within the coaxial-flow heat transfer structure, as the fluid is pumped down the helically-extending outer flow channel and up inner flow channel. For near vertical well bores gives, pumping fluid down the outer flow channel provides the best approximation to a cross flow heat exchanger for ground temperatures close the surface. For a coaxial-flow heat transfer structure installed in horizontal or deviated wells in aquifers, it is better to pump fluid down the inner flow channel to maximize the heat transfer at the distal end of the well bore.

Figure 34:
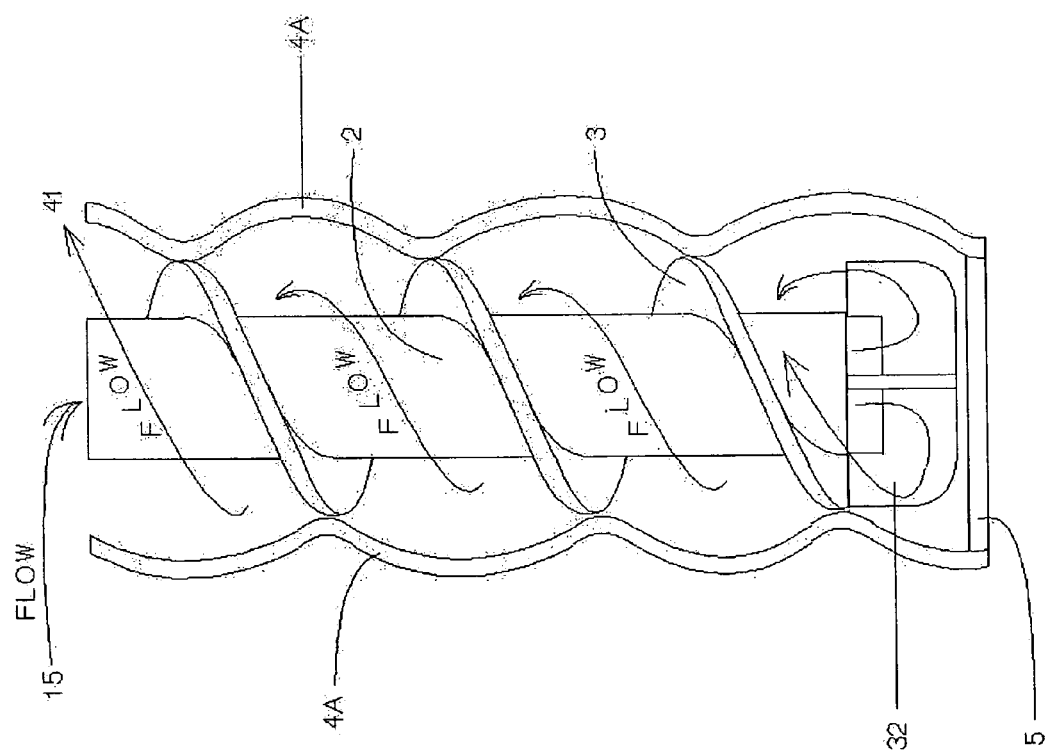
FIG. 34 is a front, partially cross-sectional view of the coaxial-flow heat transfer structure of FIGS. 31 and 32, showing the helical flow pattern of heat exchanging fluid as it is pumped down the inner flow channel and flows up the coaxially-arranged helically-extending outer flow channel of the coaxial-flow structure.

FIG. 34 illustrates the forward flow pattern 15 and 41 for a coaxial-flow heat transfer structure having a double helically-finned inner tube section. In this design, the multiple helical fins are used for large diameter thermally-conductive outer tube. For large diameters, the helically-finned tubing joints can be pre-installed in the thermally-conductive outer tube joints for shipment. O-ring seals are used in the helically-finned tube collars, so when thermally-conductive outer tube joints are joined together, the O-ring seals the helically-finned tubing also. This helps reduce installation cost and shipping cost for large diameter ground loops.

FIG. 35 is a schematic representation of a heat transfer system comprising conventional heat transfer equipment 11 in combination with least one coaxial-flow heat transfer structure 8 of the present invention, as generally depicted in FIG. 2. As shown in FIG. 35, a heat transfer fluid is pumped through the mechanical heat transfer equipment 11, including a heat exchanger, by a fluid pump. The heat transfer fluid travels to the co-axial heat transfer structure 8 through pipe 9, entering the center tube of the co-axial heat transfer structure at the proximal end through input port 7 where the heat transfer fluid begins to travel in a laminar flow profile as shown in FIGS. 1 and 1A down the length of the inner flow channel 6A of the inner tube section 2. The fluid then reverses its flow direction, transitioning into a turbulent flow profile as it travels toward the surface through outer flow channel 6B, along which it encounters helically-extending fin structures (i.e. turbulence generators). The conditioned heat transfer fluid is then returned to the mechanical heat transfer equipment 11 through pipe 10 for conditioning in the system and subsequent recirculation through the co-axial heat transfer structure.

FIG. 36 shows an enlarged view of a section of the helically extending outer flow channel 6 provided for in the coaxial-flow heat transfer structure of FIG. 35. As shown, the cross-sectional dimensions of the outer flow channel 6 between the interior surface of the outer tube section 4, the exterior surface of the inner tube section 2, and the helical flow guide fins 2 can be selected/designed to produce fluid flows therealong having optimal vortex characteristics that optimize heat transfer between the fluid within the outer flow channel 6 and the surface of the thermally-conductive outer tube section 4.

Figures 37, 38, 39:
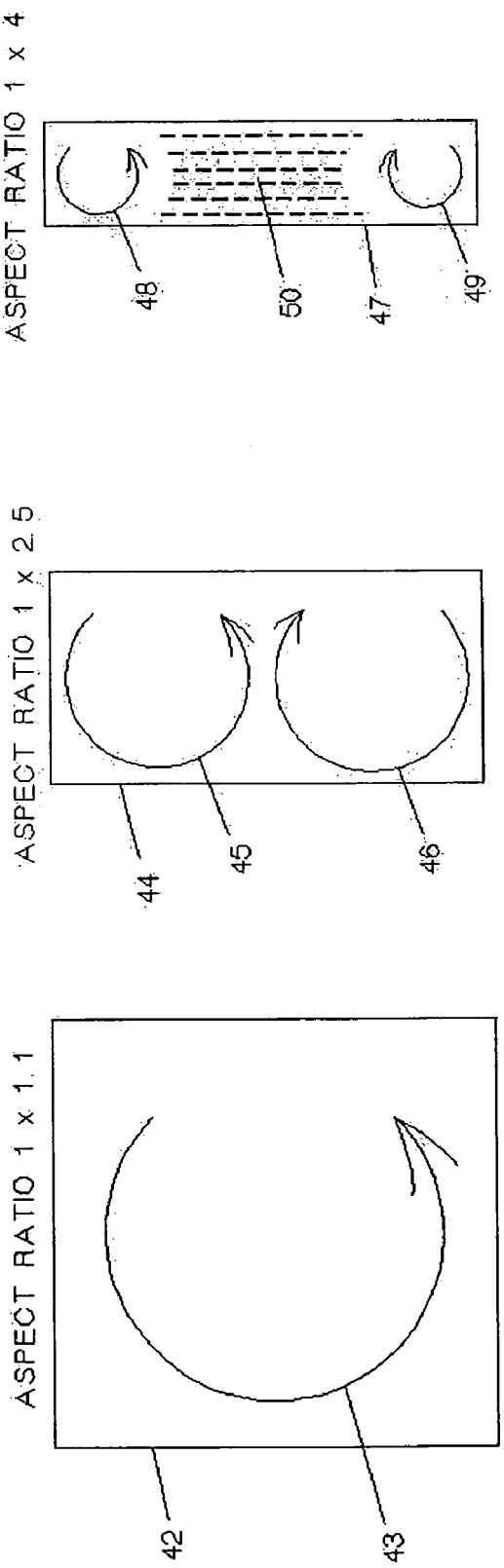
FIG. 37 is a schematic representation of the cross-section of the outer flow channel identified in FIG. 36, wherein when the ratio of the sides of the outer flow channel cross-section approaches 1/1.1 (i.e. indicative of a square-like flow control volume), the resulting fluid flow through the outer flow channel will typically have one vortex for flow rates of interest.
FIG. 38 is a schematic representation of the cross-section of the outer flow channel identified in FIG. 36, wherein when the ratio of the sides of the outer flow channel cross-section approaches 1/2.5 (i.e. indicative of a rectangular-like flow control volume), the resulting fluid flow through the outer flow channel will typically have two vortices for flow rates of interest.
FIG. 39 is a schematic representation of the cross-section of the outer flow channel identified in FIG. 36, wherein when the ratio of the sides of the outer flow channel cross-section approaches 1/4.0 (i.e. indicative of a rectangular-like flow control volume), the resulting fluid flow through the outer flow channel will typically have two vortices (one near each helical fin) with a laminar slot flow region in the center region, for flow rates of interest.

FIG. 37 illustrates the rotational flow characteristics of fluid 43 flowing along the outer flow channel identified in FIG. 36 when the ratio of the sides of the outer flow channel cross-section (i.e. flow channel slot ration 42) approaches 1/1.1 (i.e. indicative of a square-like control volume). Under such geometrical conditions, the resulting fluid flow through the outer flow channel 6 will typically have one vortex 43 for flow rates of interest (e.g. 25 to 35 GPM) at lower than desired velocity with a lower rate of system heat transfer capacity caused by a less affective rotational flow profile 43.

FIG. 38 illustrates the rotational flow characteristics of fluid flowing along the outer flow channel identified in FIG. 36 when the ratio of the sides of the outer flow channel cross-section 44 approaches 1/2.5 (i.e. indicative of a rectangular-like control volume). Under such geometrical conditions, the resulting fluid flow through the outer flow channel 44 will typically have two vortices 45 and 46 for flow rates of interest (e.g. 17 to 24 GPM) at optimum velocity with optimum rate of system heat transfer capacity caused by an optimum turbulent flow profile. Optimizing turbulent flow characteristics further disturbs the boundary layer shown in FIGS. 1 and 1A, thereby increasing heat transfer into surfaces in contact with the heat transfer fluid during fluid flow.

FIG. 39 illustrates the rotational flow characteristics of fluid flowing along the outer flow channel identified in FIG. 36 when the ratio of the sides of the outer flow channel cross-section 47 approaches 1/4.0 (i.e. indicative of a rectangular-like control volume). Under such geometrical conditions, the resulting fluid flow through the outer flow channel 6 will typically have two vortices 48 and 49 (one near each helical fin) with a laminar slot flow region in the center region, for flow rates of interest (e.g. 12 to 20 GPM) at higher than desired velocity with lower rate and heat transfer capacity caused by laminar flow 4 and a smaller turbulent flow profile. The aspect ratio shown as FIG. 39 increases restriction to fluid flow. Increasing pressure will increase the size of the laminar flow 50 decreasing turbulent flow profile shown in FIG. 38.

Figure 40:
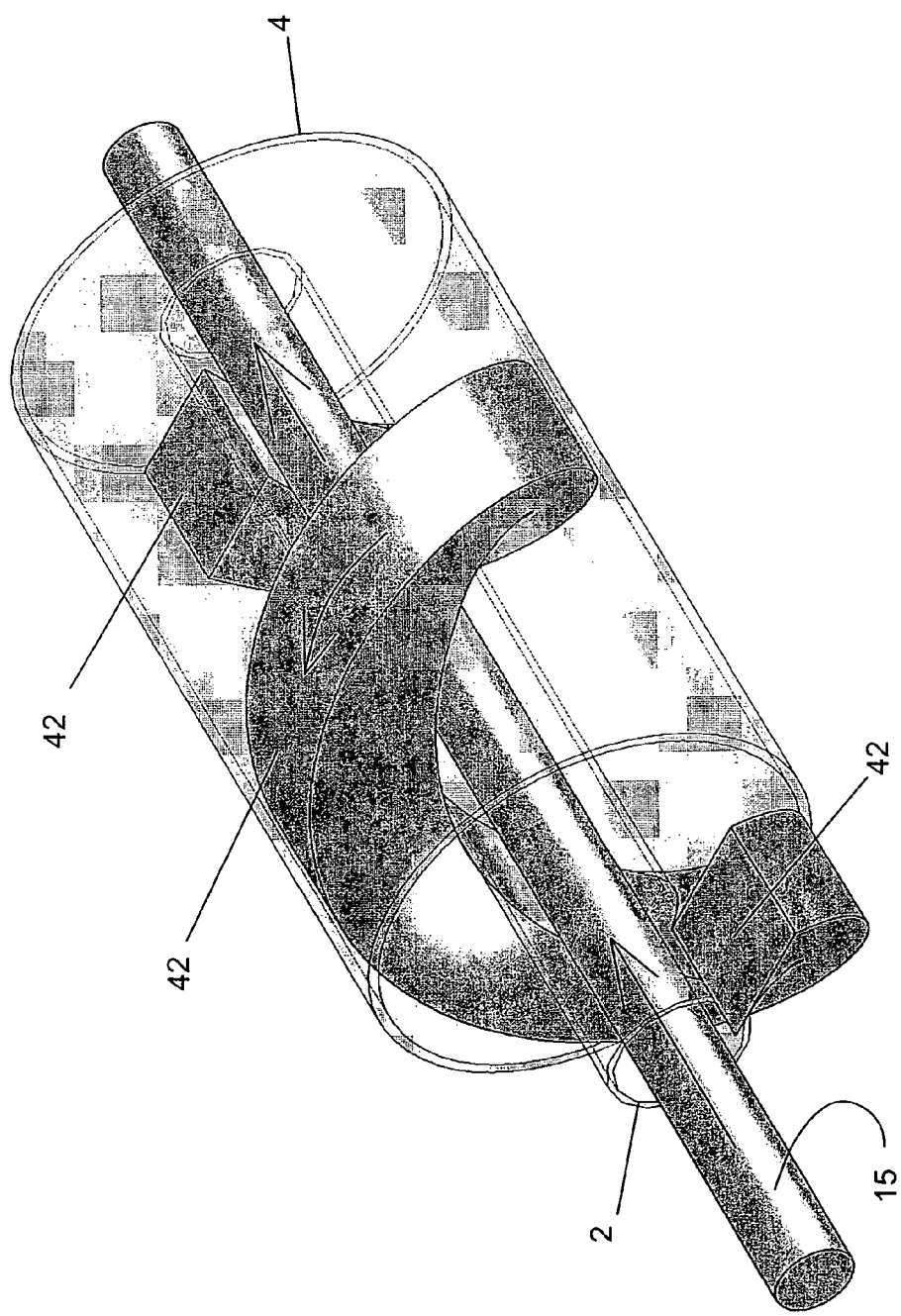
FIG. 40 is a perspective partially cross-sectional view of coaxial-flow heat transfer structure of the present invention illustrated in FIG. 37, when the aspect ratio of the sides of the outer flow channel cross-section approaches 1/1.1 (i.e. indicative of a square-like flow control volume), and the resulting fluid flow through the helically-extending outer flow channel will typically have a single vortex (i.e. rotational flow) for flow rates of interest.

FIG. 40 is a graphical representation of the helical flow characteristics of fluid 42 flowing along the outer flow channel between the outside surface of inner tube section 2 and the inside surface of outer tube section 4, identified in FIG. 37, when the aspect ratio of the sides of face area of the outer flow channel cross-section approaches 1/2.25 (i.e. indicative of a rectangular-like control volume). FIG. 40 also illustrates the laminar flowing fluid 15 flowing through the inner tube section 2.

Figure 41:
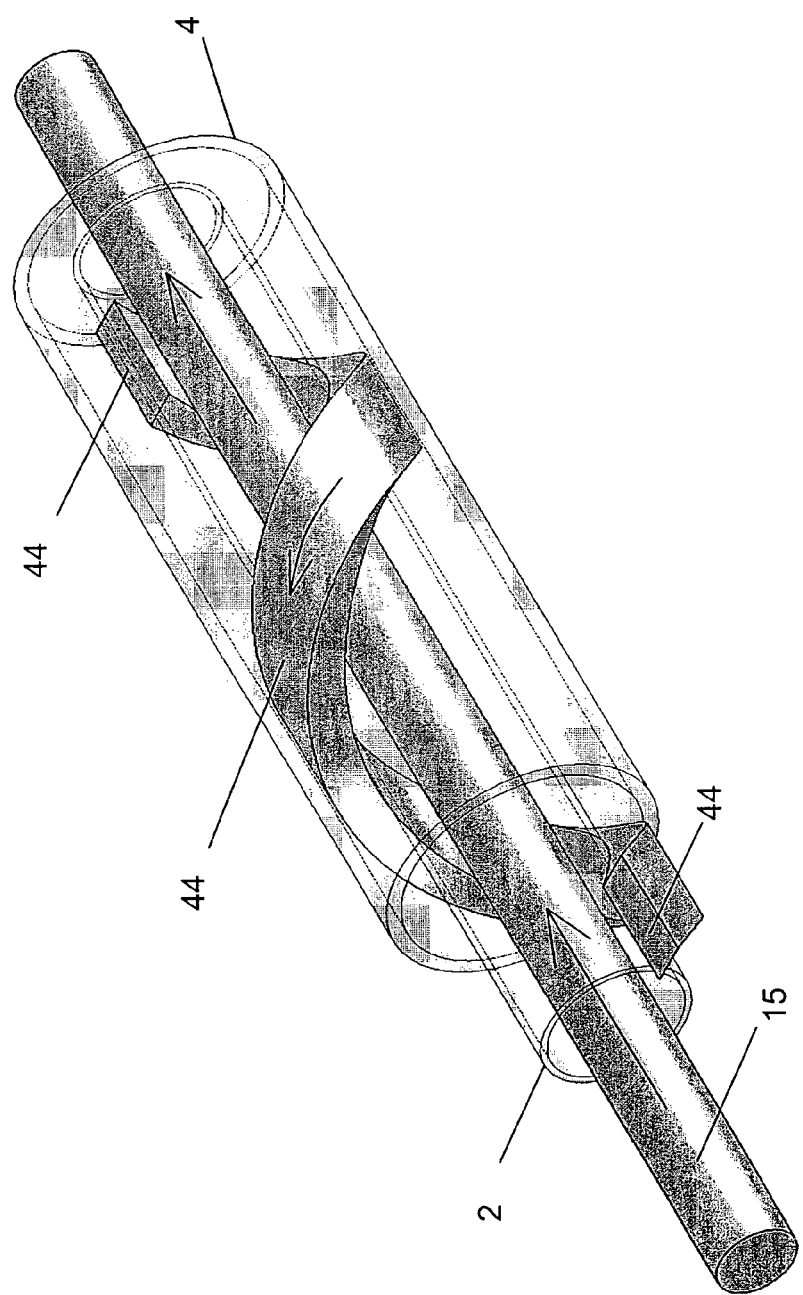
FIG. 41 is a perspective partially cross-sectional view of coaxial-flow heat transfer structure of the present invention illustrated in FIG. 38, wherein when the aspect ratio of the sides of the outer flow channel cross-section approaches 1/2.25 (i.e. indicative of a rectangular-like control volume), the resulting fluid flow through the helically-extending outer flow channel will typically have two vortices for flow rates of interest.

FIG. 41 is a graphical representation of the helical flow characteristics of fluid flowing along the outer flow channel between the outside surface of the inner tube 2 and the inside surface of the outer tube 4, identified in FIG. 38, when the aspect ratio of the sides of face area of the outer flow channel cross-section approaches 1/2.25 (i.e. indicative of a rectangular-like control volume). FIG. 41 also illustrates the laminar flowing fluid 15 flowing through the inner tube 2.

Figure 42:
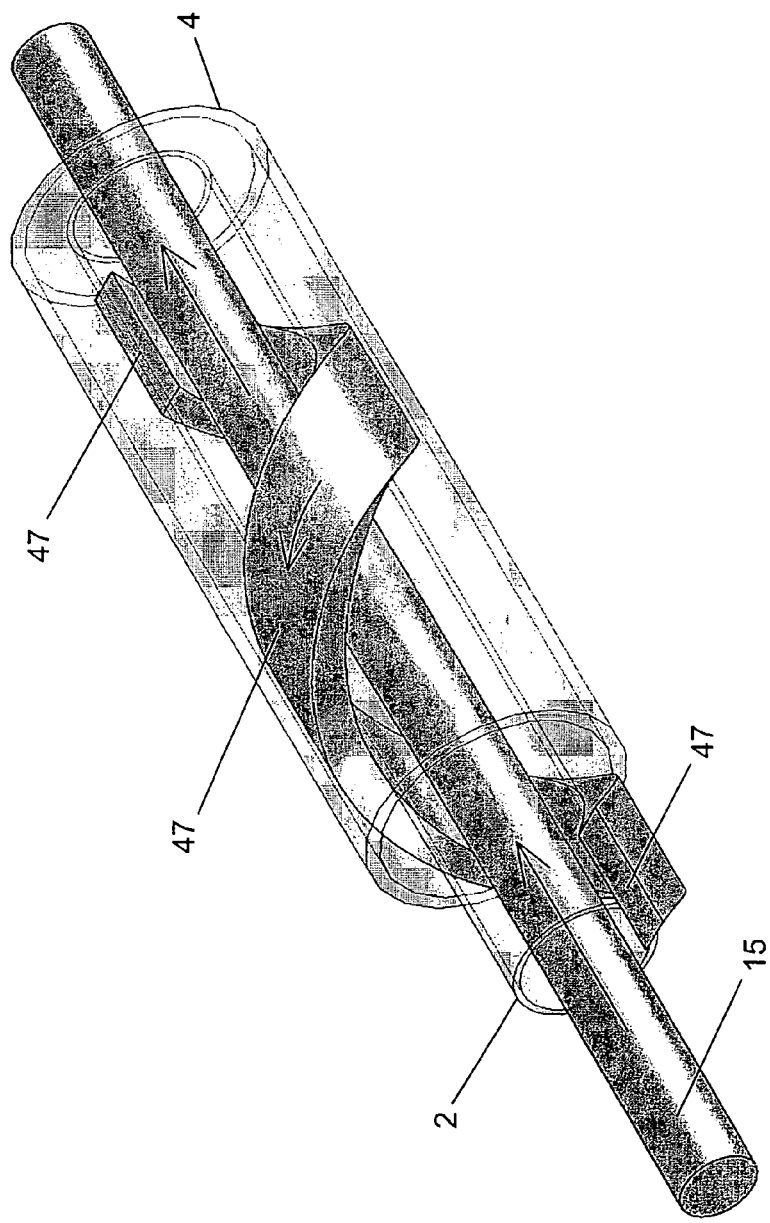
FIG. 42 is a perspective partially cross-sectional view of coaxial-flow heat transfer structure of the present invention illustrated in FIG. 39, wherein when the aspect ratio of the sides of the outer flow channel cross-section approaches 1/4.0 (i.e. indicative of a rectangular-like flow control volume), the resulting fluid flow through the helically-extending outer flow channel will typically have two vortices (one near each helical fin) with a laminar flow region in the center region, for flow rates of interest.

FIG. 42 is a graphical representation of the helical flow characteristics of fluid flowing along the outer flow channel 47 between the outside surface of inner tube 2 and the inside surface of the outer tube 4, identified in FIG. 39, when the aspect ratio of the sides of face area of the outer flow channel cross-section approaches 1/4.0 (i.e. indicative of a rectangular-like control volume). FIG. 42 also illustrates the laminar flowing fluid 15 flowing through the inner tube 2.

Figure 43:
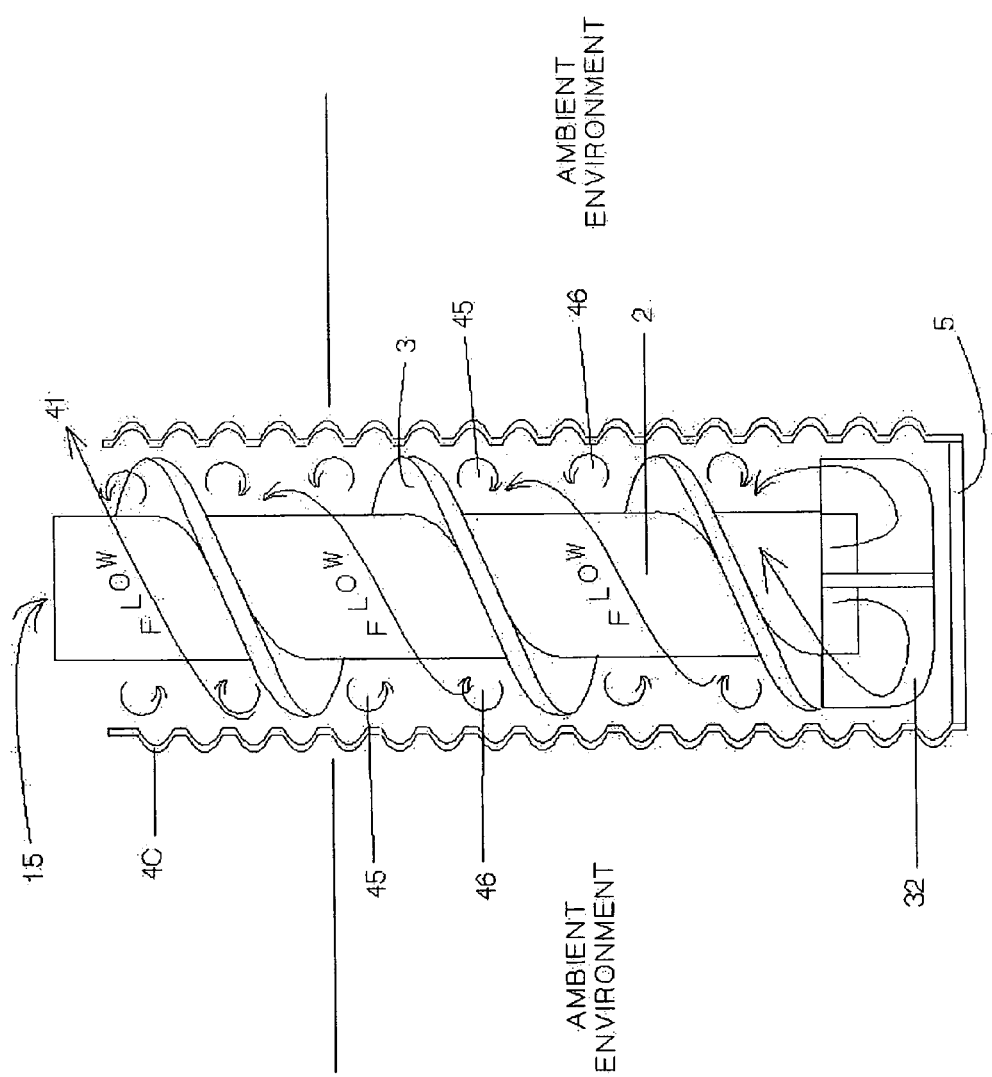
FIG. 43 is a front, partially cross-section view of a coaxial-flow heat transfer structure of the present invention, having a corrugated thermally-conductive outer tube section and a single helically-finned inner tube section, producing a helically extending outer flow channel along which turbulence is produced in the heat exchanging fluid flowing therealong.

FIG. 43 shows a coaxial-flow heat exchanging structure having a helically-finned inner tube section 2 installed coaxially in a corrugated thermally-conductive outer tube 4C, between which a helically-extending outer flow channel is formed generating turbulence 45 and 46 in the heat exchanging fluid flowing therealong. A heat transfer fluid enters at 15 and passes through the inner tube 2 to the end of the inner tube where the fluid passes a shoe 32, (FIGS. 19 and 20) whereupon the fluid direction of flow is reversed and redirected into a helical flow channel. The heat transfer fluid flow transitions into a turbulent flow profile along the length of the outer flow channel. In this design, the corrugated outer tube wall 4C increases the surface area (i.e. compared to a smooth wall pipe or tube), and strength of the thin-walled thermally-conductive outer tube. The period of the corrugation flutes is at least one quarter or less of the helical fin to prevent significant fluid bypass around the fins 3. While the corrugations increase the pressure drop along the outer flow channel by a factor of about 10%, these corrugations will also increase the heat transfer rate and heat exchange surface area by a factor of about 40%. As shown an end cap 5 is welded, glued or otherwise affixed to the distal end of the coaxial-flow structure.

Figure 44:
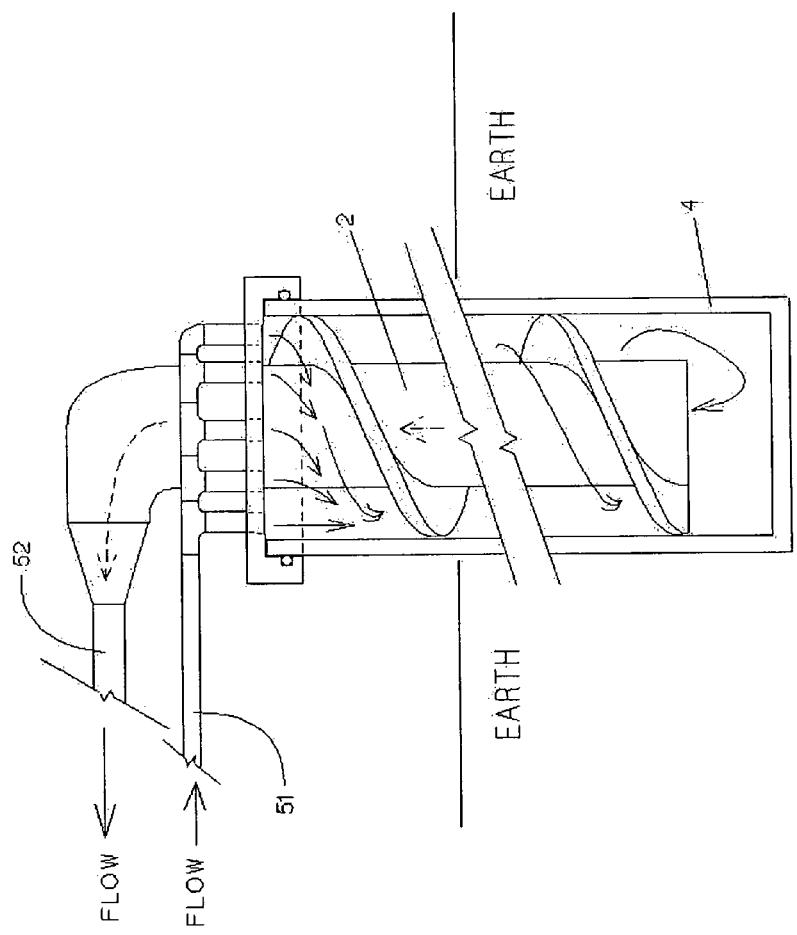
FIG. 44 is a side, partially cross-sectional view of a coaxial-flow heat exchanging structure, graphically illustrating the fluid distribution from a piped manifold around the helically extending annular outer flow channel of the coaxial-flow heat exchanging structure, as well as around the end of the inner tube section at the distal portion of the structure.

FIG. 44 shows a coaxial heat transfer structure showing heat transfer fluid inlet 51 and outlet 52, in which the helically-finned inner tube section is supported in the thermally-conductive outer tube section by way of a well cap structure. As shown, the well cap holds the helically-finned inner tube 2 off the bottom of the thermally-conductive outer tube so as to prevent buckling of the plastic helically-finned tubing while sealing the helically-extending outer flow channel from fluid leaks from and into the environment. In order to prevent buckling of the plastic helically-finned tube section, at least ⅔ of the helically-finned tubing should be hung in tension from the well cap. Using the O-ring seal, well cap provides an easy way to remove the helically-finned inner tubing in the even there is a fluid leak in the thermally-conductive outer tube. The well cap can be attached to the thermally-conductive outer tube section 4 by way of threads, by way of compression bolts, or by way of a compression ring.

Figure 45:
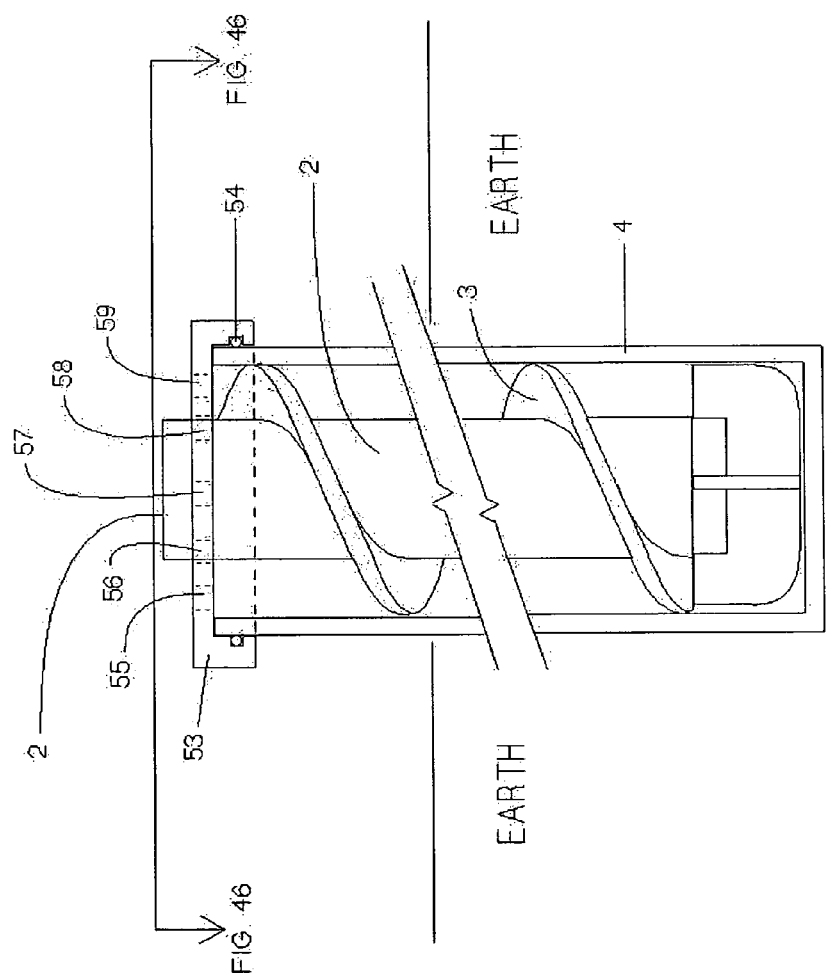
FIG. 45 is a side, partially cross-sectional view of a coaxial-flow heat exchanging structure of the present invention installed in a well bore in the Earth, showing locations of holes punched or threaded into a manifold cap installed at the proximal end, and to securely hold the helically-finned inner tube section away from and off the bottom of the thermally-conductive outer tube that has been grouted into the Earth with thermally-conductive cement and provide field installed pipe connection to the manifold cap shown.
Figure 46:
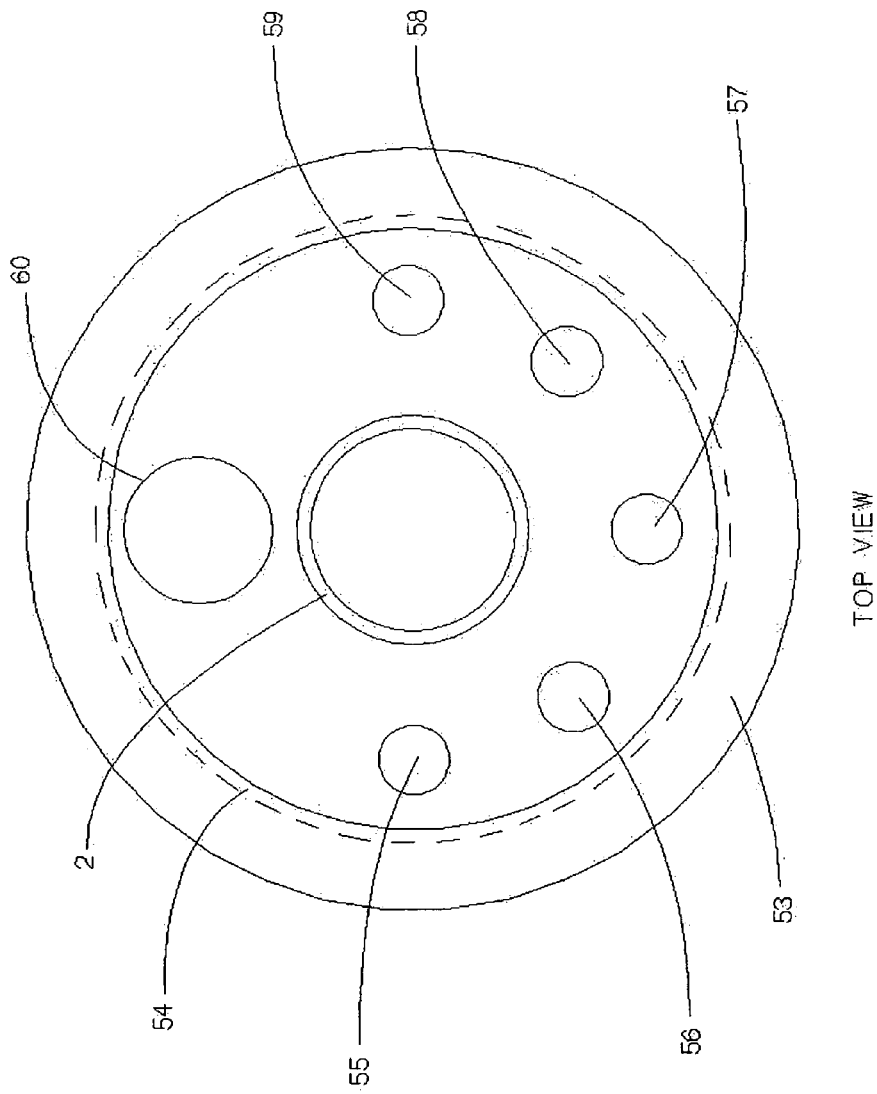
FIG. 46 is a top view of coaxial-flow heat exchanging structure shown in FIG. 45, with the fluid return and injection manifold removed for clarity, and showing the use of several small holes formed in the cap portion to achieve a low friction-created pressure drop, or alternatively, the use of a single medium size hole for a higher friction-created pressure drop.
Figure 50:
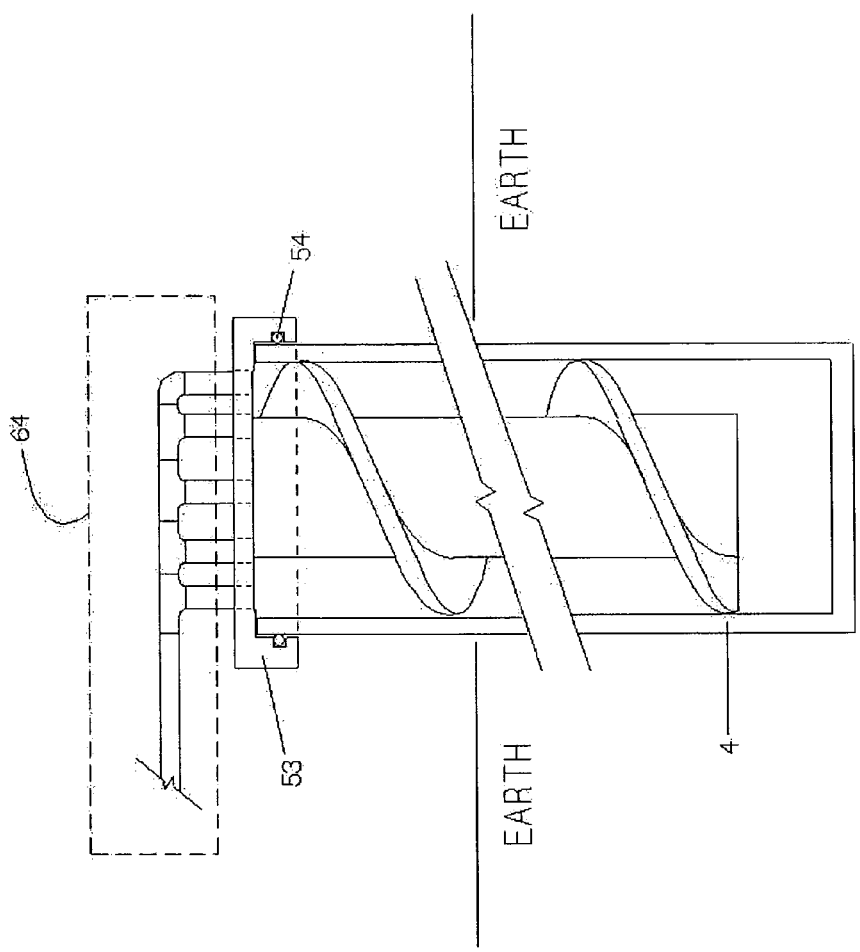
FIG. 50 is a side view of the structure shown in FIG. 44 showing the injection manifold field installed from commonly acquired piping material and fittings.

In FIGS. 45 and 46, a coaxial-flow heat exchanging structure of the present invention is shown employing a well cap 53, at the proximal end thereof, and a shoe structure disposed at the bottom of the thermally-conductive outer tube (i.e. distal end). A O-ring seal 54 is shown sealing the cap to the outer tube 4 exterior surface. In this application, a manifold structure, shown in FIG. 50 is provided for enabling fluid return and injection has been removed for purposes of clarity of illustration. As shown FIGS. 45 and 46, the well cap has a plurality of small holes 55, 56, 57, 58, and 59. Inner tube 2 is shown extending through a hole cut to size for the outside diameter of the inner tube 2 extending from the well cap for connection to piping associated with mechanical heat transfer system. This design provides a low friction pressure drop through the cap structure. Alternatively, a single medium size hole 60 can be formed, or drilled, in the cap for communication with the manifold structure, resulting in a little higher pressure drop due to frictional forces. When using the single medium sized hole and a single pipe, threads can be used for establishing the pipe connection.

Figure 47:
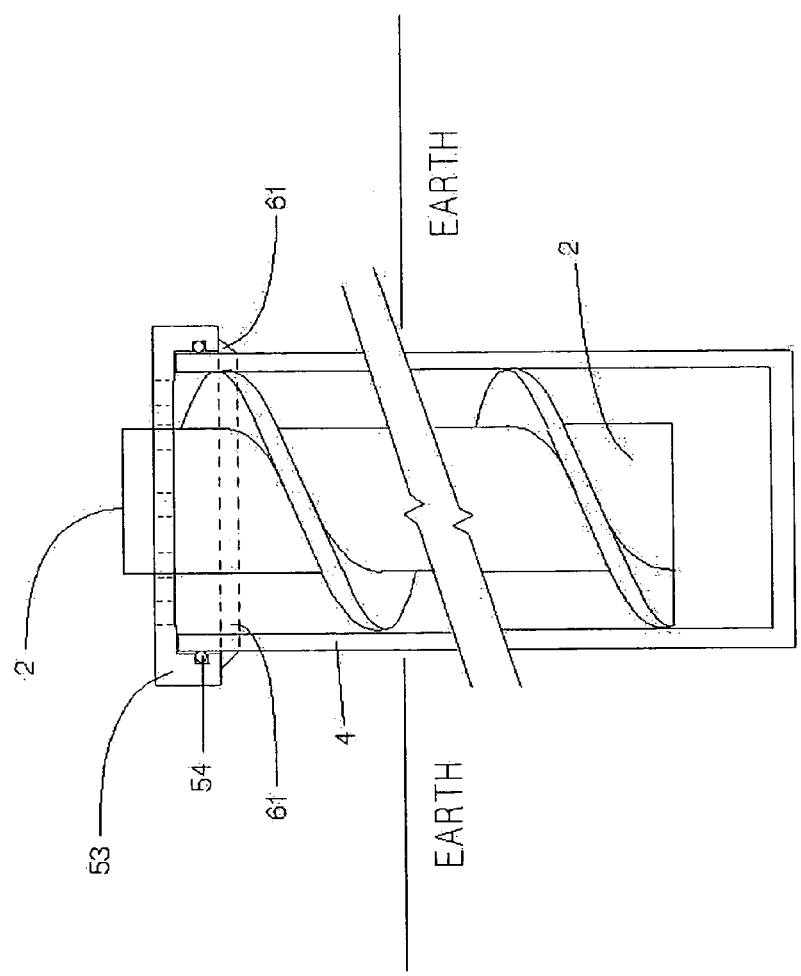
FIG. 47 is a side, partially cross-sectional view of the coaxial-flow heat exchanging structure shown in FIG. 45, with the fluid return and injection manifold removed for clarity of illustration, showing a compression-ring type cap welded onto the proximal end of the coaxial-flow heat exchanging structure of the present invention, wherein the cap employs an O-ring or U-ring seal around the proximal portion of the outer tube section to prevent fluid leaks.

FIG. 47 shows weld joints 61 and 62 connecting a metal cap to a metal outer tube section 4 to hold the cap permanently in place.

Figure 48:
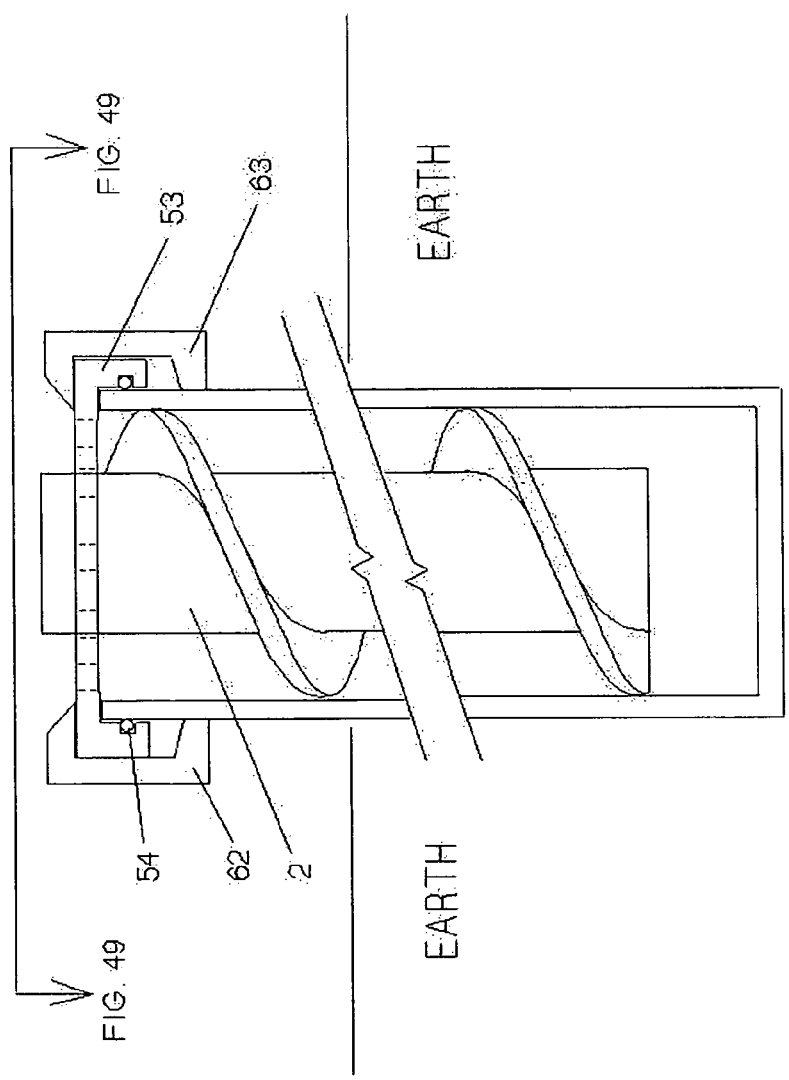
FIG. 48 is a side, partially cross-sectional view of the coaxial-flow heat exchanging structure shown in FIG. 49, with the fluid return and injection manifold removed for clarity of illustration, showing a clamped-type cap installed on the coaxial-flow heat exchanging structure of the present invention, wherein the cap has an O-ring or U-ring seal around the proximal portion of the thermally-conductive outer tube section to prevent fluid leaks.
Figure 49:
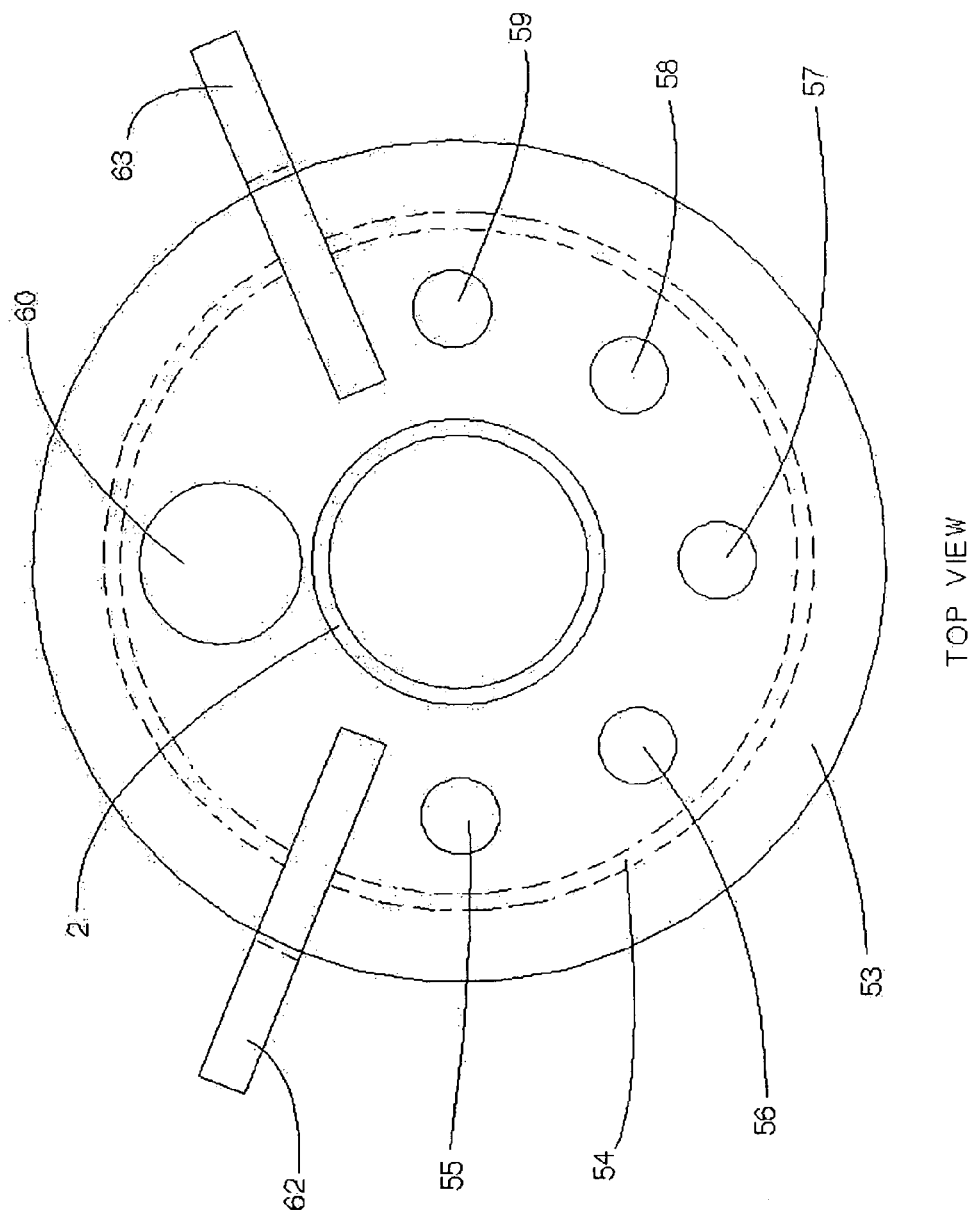
FIG. 49 is a top view of the coaxial-flow heat exchanging structure shown in FIG. 48, taken along line 49-49 in FIG. 48.

FIGS. 48 and 49 shows coaxial-flow heat exchanging structure containing a inner tube 2, fitted with compression ring 54 under a clamped well cap 53. In this design, the cap structure 53 can employ an O-ring 54, or U-ring seal around the proximal end of the thermally-conductive outer tube so as to prevent fluid leaks. The clamps 62 and 63 welded or bolted onto the outer surface of the thermally-conductive outer tube section are provided to prevent fluid pressure from forcing the well cap off the thermally-conductive outer tube section in cases of shallow helical tubing depths or high fluid pressures. For permanent installations in cement structures, the well cap structure can be fusion welded, as shown in FIG. 47 so as to reduce the risk of leaks.

FIG. 50 shows the coaxial-flow heat exchanging structure employing an exemplary manifold structure 64 comprising welded or threaded pipe fittings connected to cap structure 53 and sealed by O-Ring 54.

Figure 51:
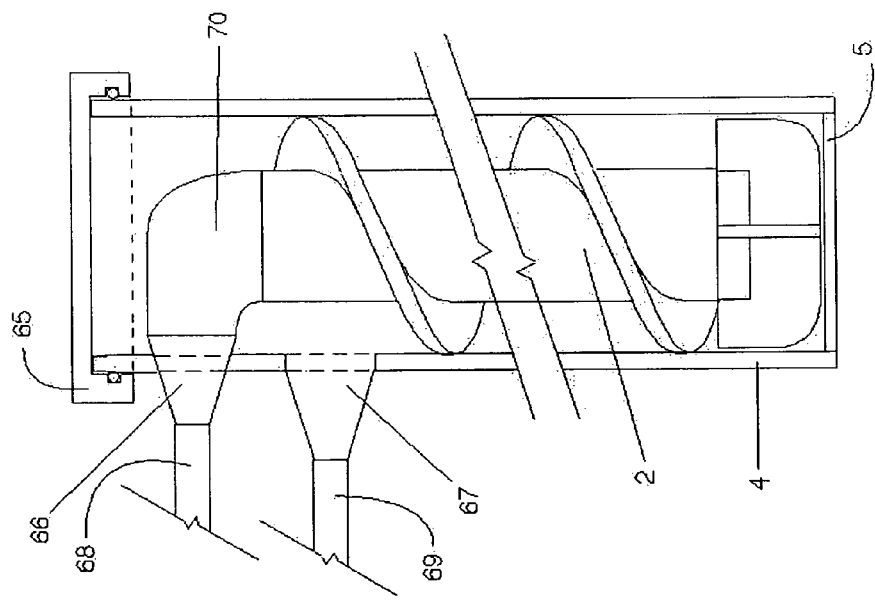
FIG. 51 is a side, partially cross-sectional view of the coaxial-flow heat exchanging structure of the present invention ideal for use in concrete piling or pier installations, wherein a pair of tube fittings are welded or fused to the side of the thermally-conductive outer tube section, for the injection and returning heat exchanging fluids to the inner and outer flow channels realized therein.

FIG. 51 shows a pipe connection arrangement where the coaxial-flow heat exchanging structure uses tube fittings 66, 67, 68 and 69 welded to the side of the thermally-conductive outer tube section 4 for fluid inlet through pipe 68 and 66, then through an internal reducing pipe elbow 70, and into the inner flow channel of inner tube 2. The heat transfer fluid is returned to the heat transfer fluid outlet 69 along the outer flow channel between the inner tube 2 and the outer tube 4 through reducer fitting 67. This arrangement is suitable for use in foundation installations when the tube fittings are in a state of compression. Reference numeral 5 indicates an end cap welded on the distal end of the outer tube 4 to seal against leakage from or into the surrounding environment.

Figure 52:
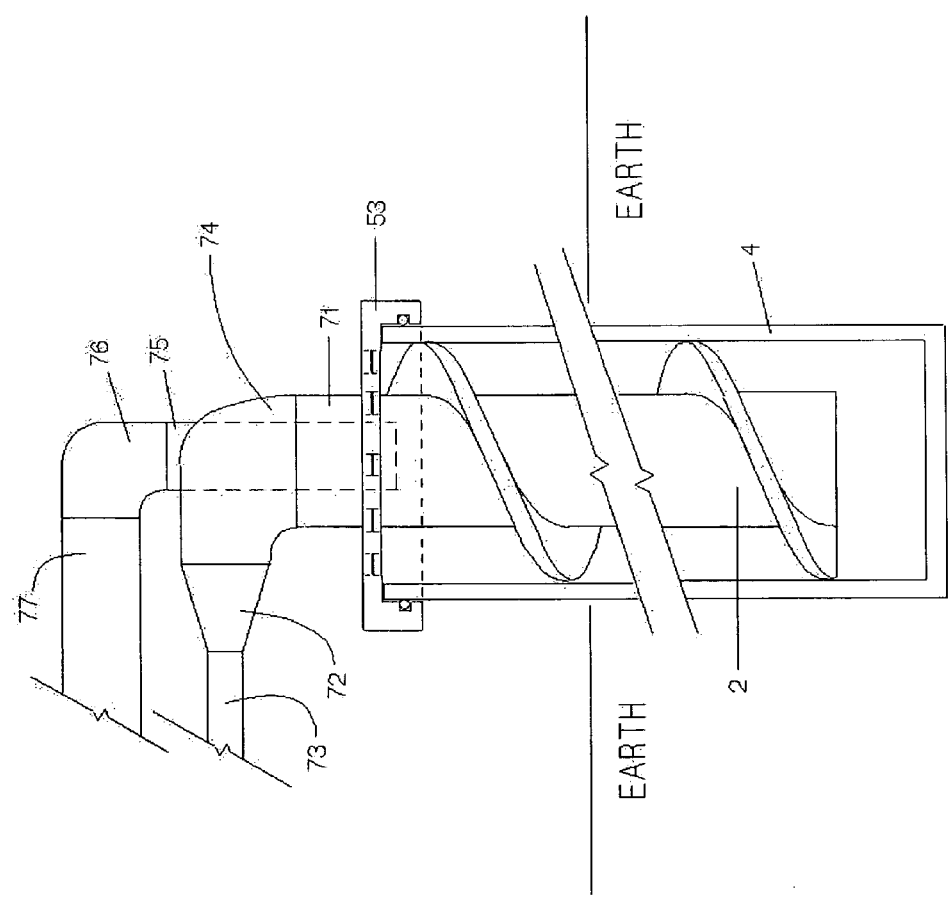
FIG. 52 is a side, partially cross-sectional view of the coaxial-flow heat exchanging structure of the present invention ideal for use in concrete piling or pier installations, wherein a pair of tube fittings are welded or fused to a welded or clamped cap for the injection and returning heat exchanging fluids to the inner and outer flow channels realized therein.

FIG. 52 shows the low pressure coaxial-flow heat exchanging structure using a set of first tube fittings 75, 76 and 77 welded to the medium size hole in cap structure 53 for fluid injection into or withdrawal of fluid from the outer flow channel, and a second set of tube fittings for fluid injection or withdrawal of fluid from the inner flow channel.

Figure 53:
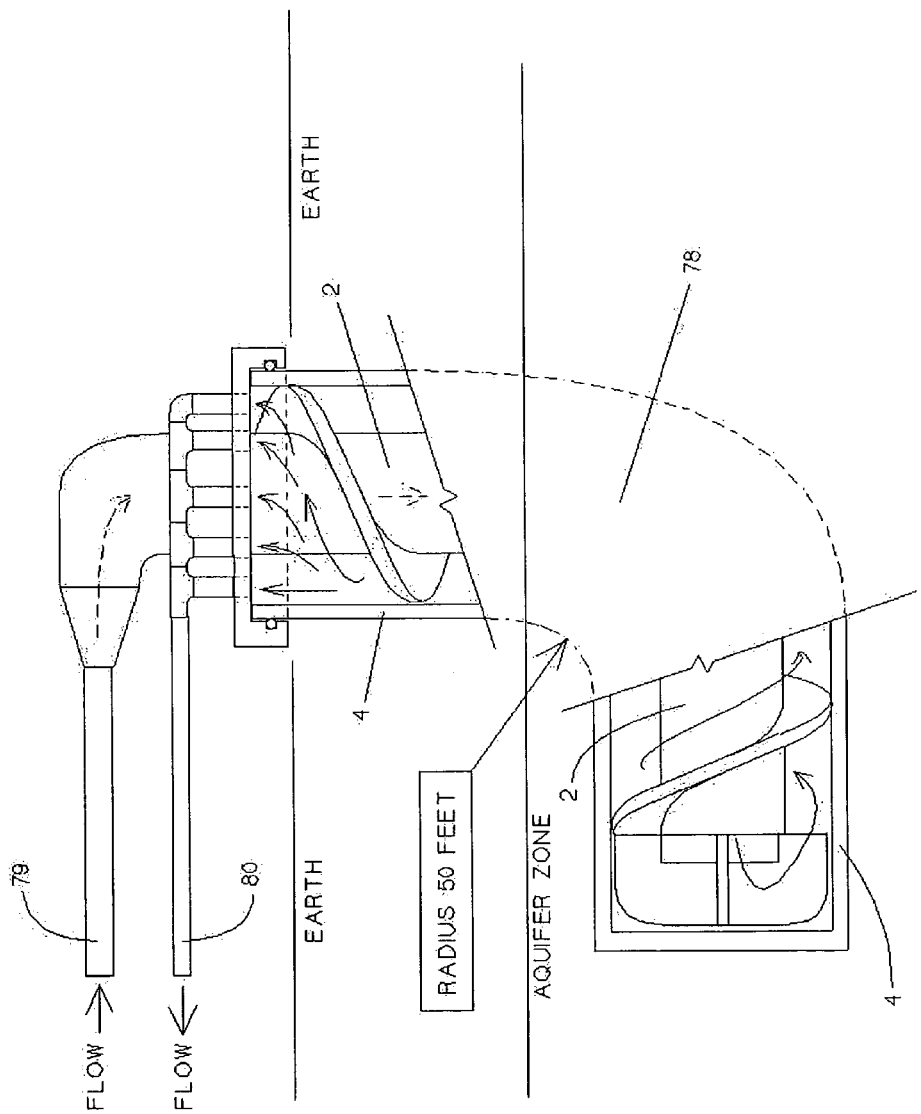
FIG. 53 is a side, partially cross-sectional view of the coaxial-flow heat exchanging structure of the present invention shown installed in a deviated well bore in the Earth, wherein the horizontal section of the structure is drilled into an aquifer zone and the vertical section thereof connects the horizontal section back to the Earth's surface.

In FIG. 53, the coaxial-flow heat exchanging structure 78 is shown installed in a deviated well bore to form a ground-loop system for exchanging heat energy with an aquifer below the Earth's surface. To install this system, a well is drilled with a radius turn (approximately 50 ft. radius) into the aquifer zone. Thereafter, the metal thermally-conductive outer tube 4 is cemented with sanded grout to surface so as to prevent aquifer contamination and increase the heat transfer coefficient to the ground. After cementing operations, the thermally-conductive outer tube is cleaned with a mild acid solution with surfactant to remove mud, mill scale and grout tailings. The helical pitch and number of fins on the helically-finned tubing component are selected to rotate the fluid at the desired circulation rate. Once these parameters have been determined, the helically-finned (insulated) inner tubing is inserted into the interior of the installed outer tube and run to the bottom of the outer tube shoe and sealed off at the thermally-conductive outer tube cap using fusion welding.

As shown in FIG. 53, the design goal for the ground/water source loop of the heat transfer system of the present invention 1 has been to provide enough heat-transfer surface area and ground/water volume to insure the circulating fluid temperature of the ground/water source loop does not go above/below the average ground temperature by 7° F. or 3° C., under continuous load during peak of the heating/cooling season. By maintaining a return fluid temperature within 7° F. or 3° C. of the ground/water source temperature, the SEER rating of the heat pump system will be maximized for the whole heating/cooling season. A commercial objective of the design has been to use a combination of metal and plastic tubing to increase heat transfer to/from the ground while reducing the life-time cost of the ground loop which includes the capital, maintenance and operational cost averaged over the life-time of the system.

If the time averaged heat and cooling loads are nearly equivalent over the thermal seasons, then the core volume of the ground loop can be designed to store heat during the cooling season and, subsequently, the heat can be extracted from the core volume during the heating season. If the time averaged thermal load is mostly heating or cooling, then ground loop is designed to transfer heat without significant storage in the ground volume.

For small spikes over base load, larger well bore diameter or the iron mass in the foundation can be used for thermal storage to average out the operational temperature of the fluid. It has been discovered that when using a helical fin design and a slot (i.e. outer flow channel) aspect ratio (i.e. ratio of dimensions of the helically-extending outer flow channel) ranging from a 1 to 1 square to a 1 to 2.5 rectangle, tubing diameters can exceed 36 inches or 1 meter without significantly reducing heat transfer coefficient to the ground/water source. For large spikes over base load, a larger tank volume can be added to the ground loop for additional thermal storage.

For an estimated yearly thermal load, a thermal simulator can be used to determine the number wells used in the ground loop array, the amount of thermal storage needed to average out the daily peak loads and the amount of core volume needed in the array to store heat from the cooling season to use in the heating season. For large thermal projects, the simulator can be used to optimize capital cost of drilling (horizontal well bore length versus number of wells in array), material cost of the thermally-conductive outer tube (thermally-conductive outer tube diameter versus metal or plastic), the approach temperature of the ground loop and the refrigerant used by the heat-pump system. However, the actual heat transfer rate and time coefficient of the ground-loop array of wells should be determined with a transient temperature test of the ground loop and the actual heat storage of the ground loop should be determined with a complete year of history of circulating fluid temperature and load data.

The well design parameters such as grout thickness, thermally-conductive outer tube material, helical pitch, number of helical fins, insulated wall thickness of inner tube, and fluid composition can be optimized using analytical equations for steady state operation. Most of the well array design parameters such as well depth, well length, well spacing should be optimized for the given aquifer properties with a thermal simulator over a multi-year load to account for the thermal storage of Earth and the seasonal transients. Most of thermal storage parameters for the insulated volume of fluid in a tank or in the array of well bores, or the insulated volume of concrete in the foundation, can be empirically fit with simple equations so that the peak loads can be averaged over the daily operation of the heat pump. The design goal is to install a ground loop with thermal storage so that it can transfer the daily thermal load from the heat pump for the minimum capital cost and operational cost.

Figure 67:
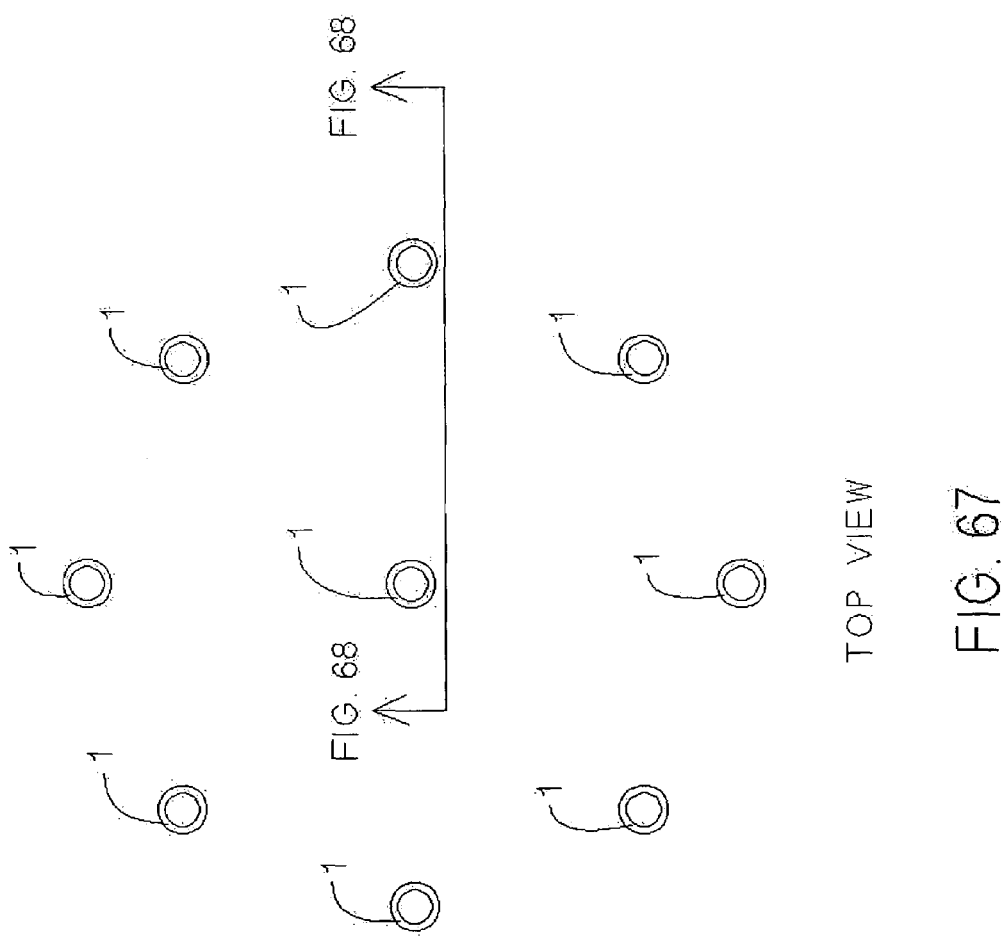
FIG. 67 schematically illustrates a second application where nine deviated wells are pad drilled in order to minimize the ground surface impact, reducing heat loss from horizontal gathering piping and reducing risk of accidental damage from contractor digging operations, wherein long term operation allows the ground loop to thermally bank heat from the cooling season for use in the winter season, and for cooling loads only, a shallow horizontal loop can be added to the ground-loop to remove heat from the thermal bank during the winter season.
Figure 68:
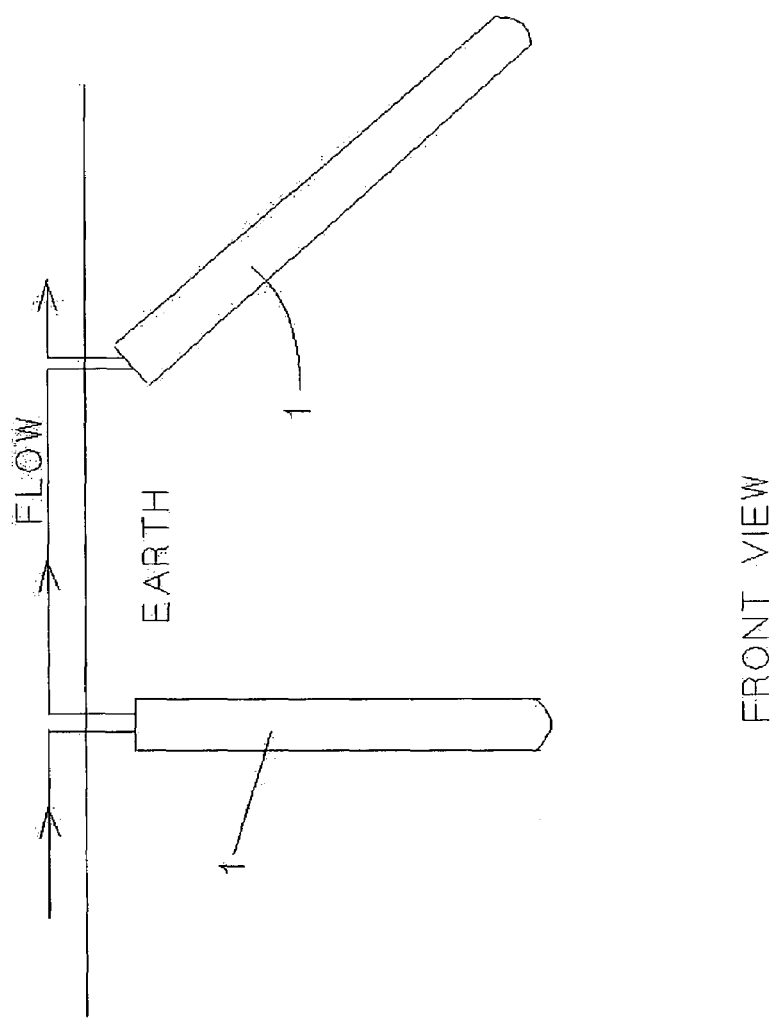
FIG. 68 illustrates the application shown in FIG. 67, taken along line 68-68 in FIG. 68.
Figure 69:
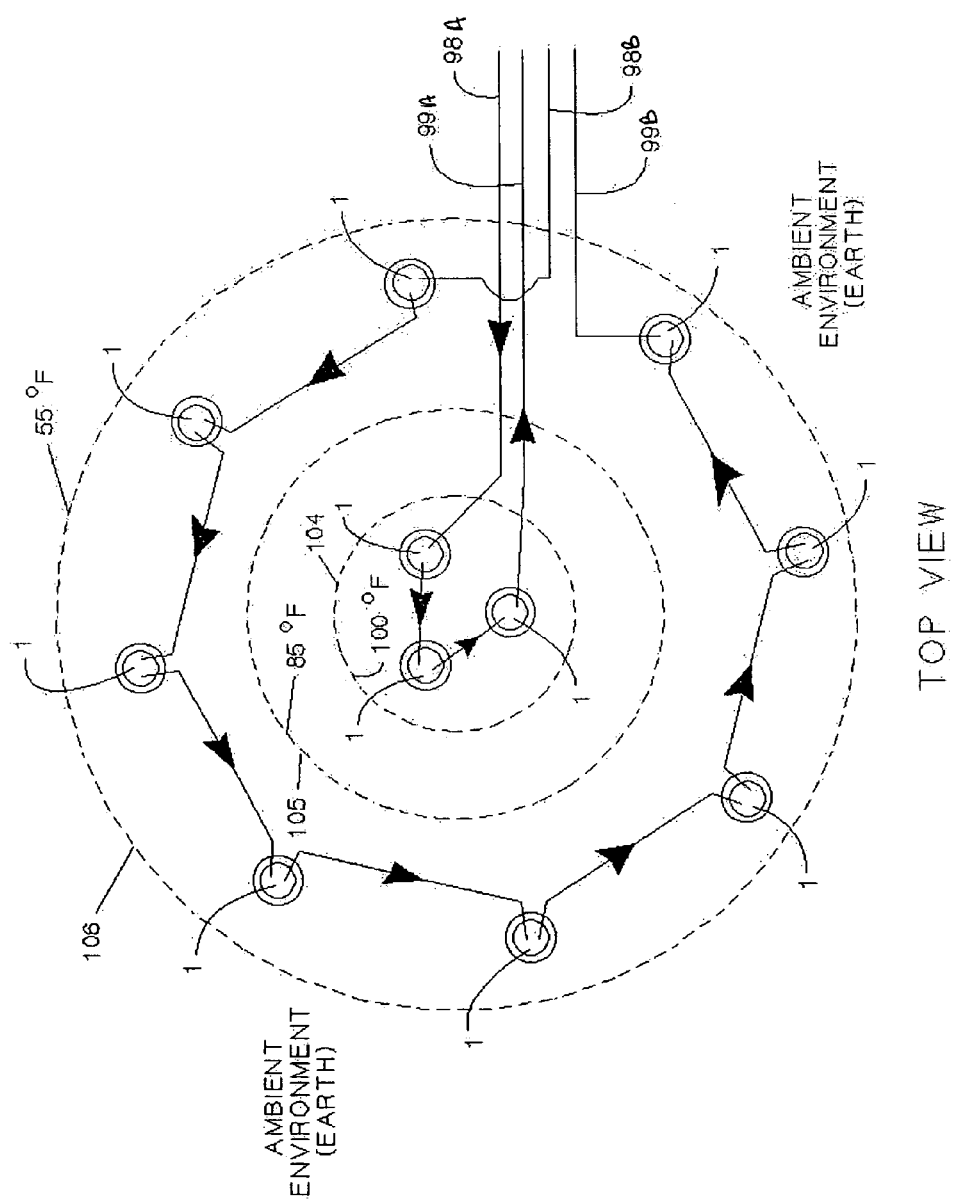
FIG. 69 is a schematic representation of a system comprising eleven deviated wells, in which each coaxial-flow heat exchanger of the present invention is installed in thermally-conductive cement, and connected together using piping so as to form a heat pumping network.

As shown in FIGS. 67, 68 and 69, an array of similar wells can be drilled and coaxial-flow heat transfer structures installed therein, and interconnected to gathering lines for series or parallel operation as a heat exchanger coaxial-flow heat exchanging structures. Finally, the ground loop is filled with an aqueous heat transfer fluid and the air is bled out of the high spots in the system to achieve optimum performance. Using the coaxial-flow heat exchanging structure of the present invention, the installation cost and material costs associated with constructing deviated wells is substantially reduced.

Figure 54:
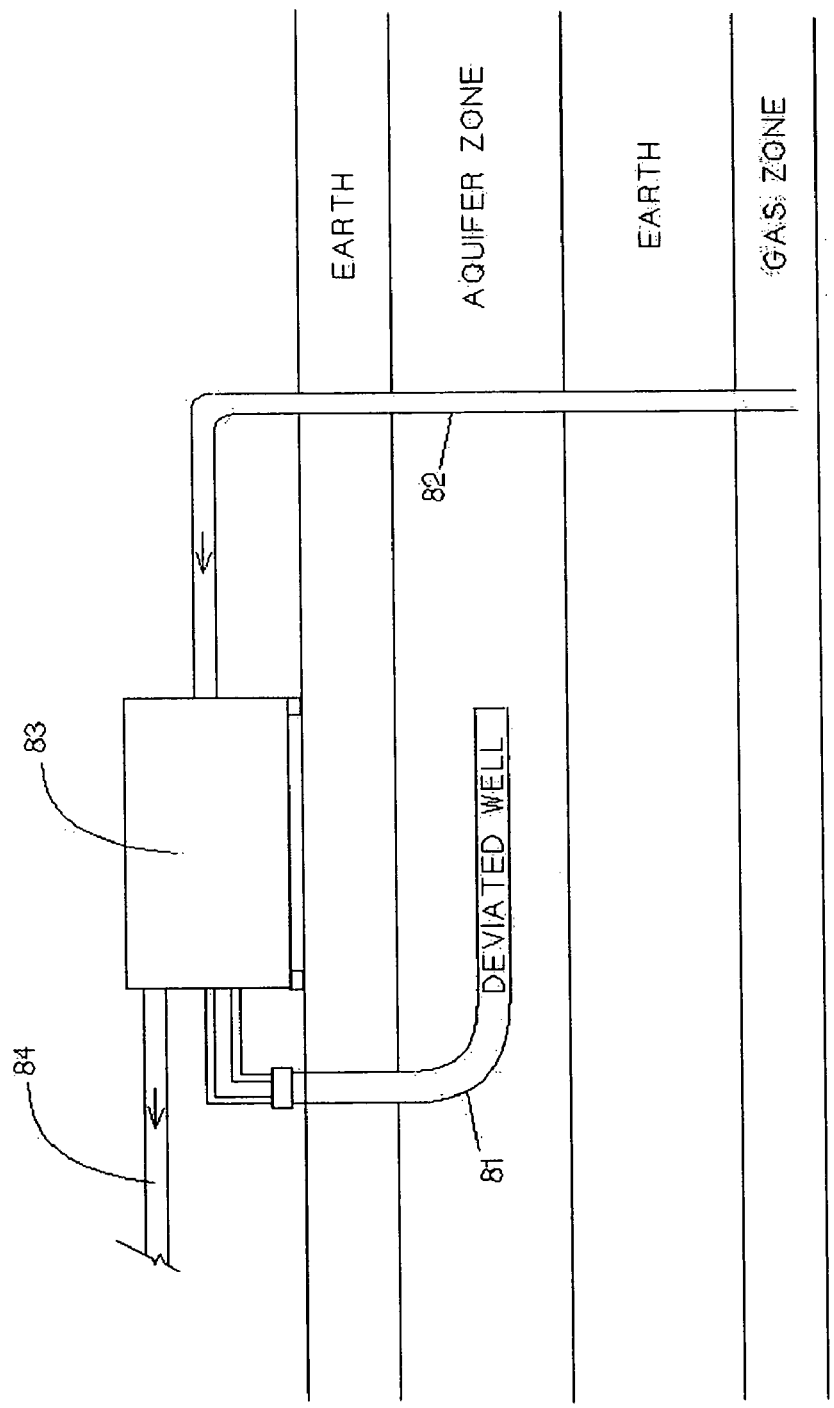
FIG. 54 is a side view of the coaxial-flow heat exchanging structure of the present invention shown installed in a vertical well bore in the Earth, for the purpose of distributing heat into the Earth from the operation of a natural gas dehydration system connected thereto.

FIG. 54 shows a natural gas dehydration system using mechanical heat transfer equipment 83 of the present invention, wherein a deviated well 81 is drilled in an aquifer to create a ground loop employing the coaxial-flow heat transfer system of the present invention.

Figure 55:
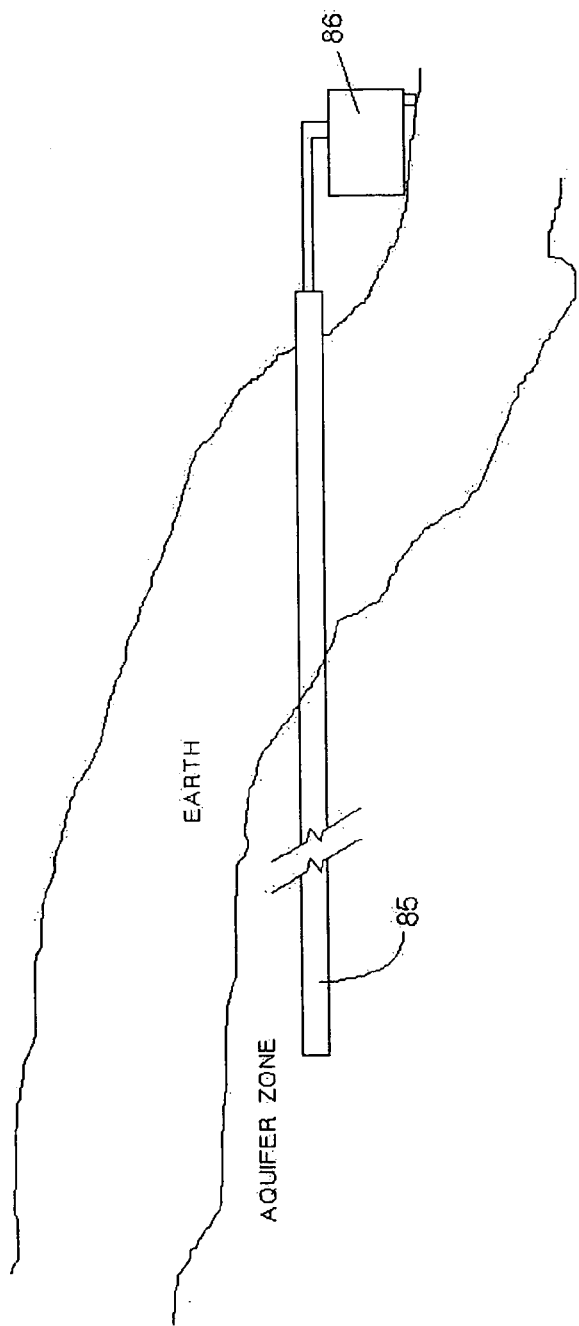
FIG. 55 is a side, partially cross-sectional view of the coaxial-flow heat exchanging structure of the present invention shown installed in a near horizontally-bored well in the side of a mountain, mesa, or hill, wherein the well bore path is deviated to follow an aquifer zone if available at the site, and wherein, for buildings with a deep basement or built on the side of a hill, the deviated well bores are drilled in the wall of the basement.

FIG. 55 shows the coaxial-flow heat exchanging structure of the present invention 85 installed in a near horizontally bored well in the side of a mountain, mesa, hill, or other man made earthen structure. In this application, the well bore path is deviated to follow an aquifer zone if available at the site. For buildings having a deep basement or built on the side of a hill, the deviated well bores can be drilled in and through the wall of the basement. As shown the heat transfer fluid piping is connected to mechanical heat transfer equipment 86.

Figure 56:
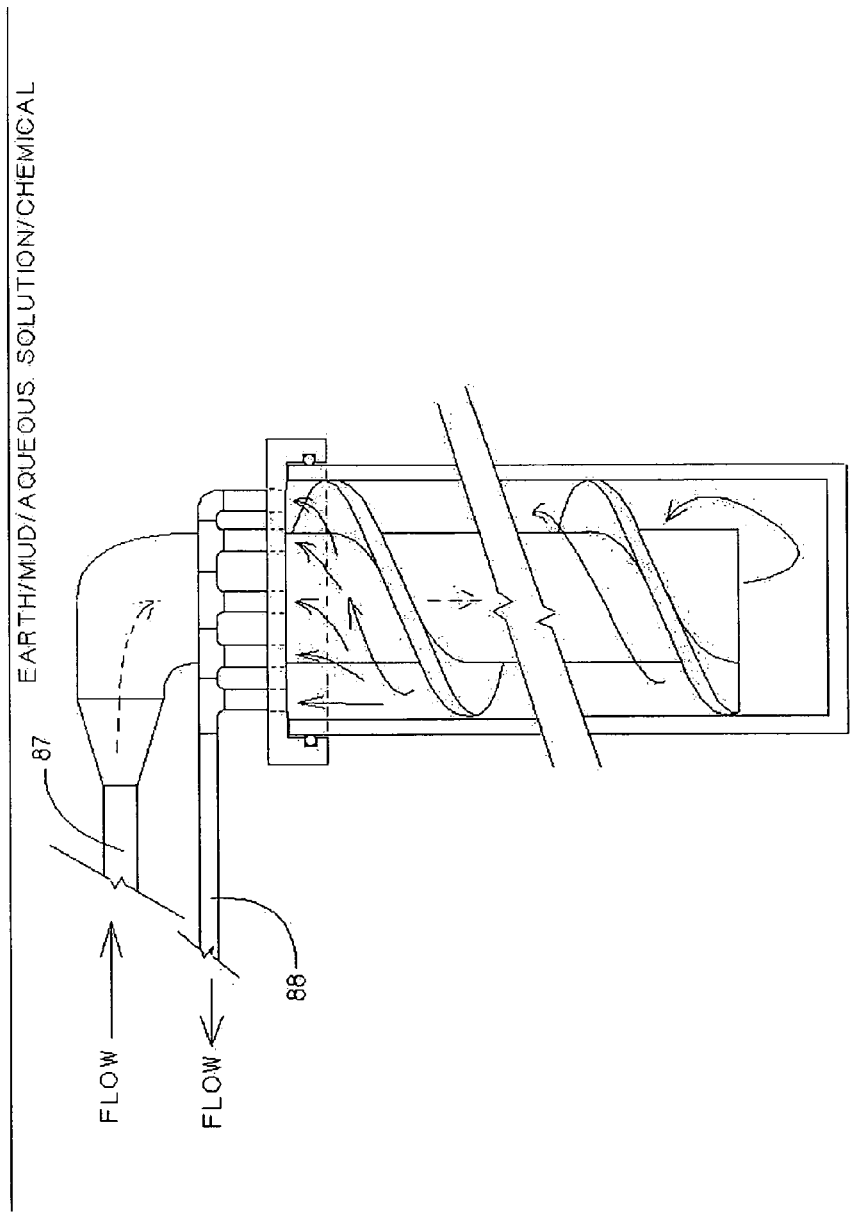
FIG. 56 is a side, partially cross-sectional view of the coaxial-flow heat exchanging structure of the present invention shown suspended vertically in an aqueous solution, Earth, chemical solution or mud.

FIG. 56 shows the coaxial-flow heat exchanging structure of the present invention installed within an earth, mud, aqueous solution or chemical solution. The coaxial-flow heat exchanging structure is capped below the surface to prevent significant heat transfer to the ground/water surface or ambient atmosphere. For areas that have significant ice or freeze/thaw movement, the distribution pipes 87 and 88 should be protected against damage and, if possible, the structure should be capped below the frost line.

Figure 57:
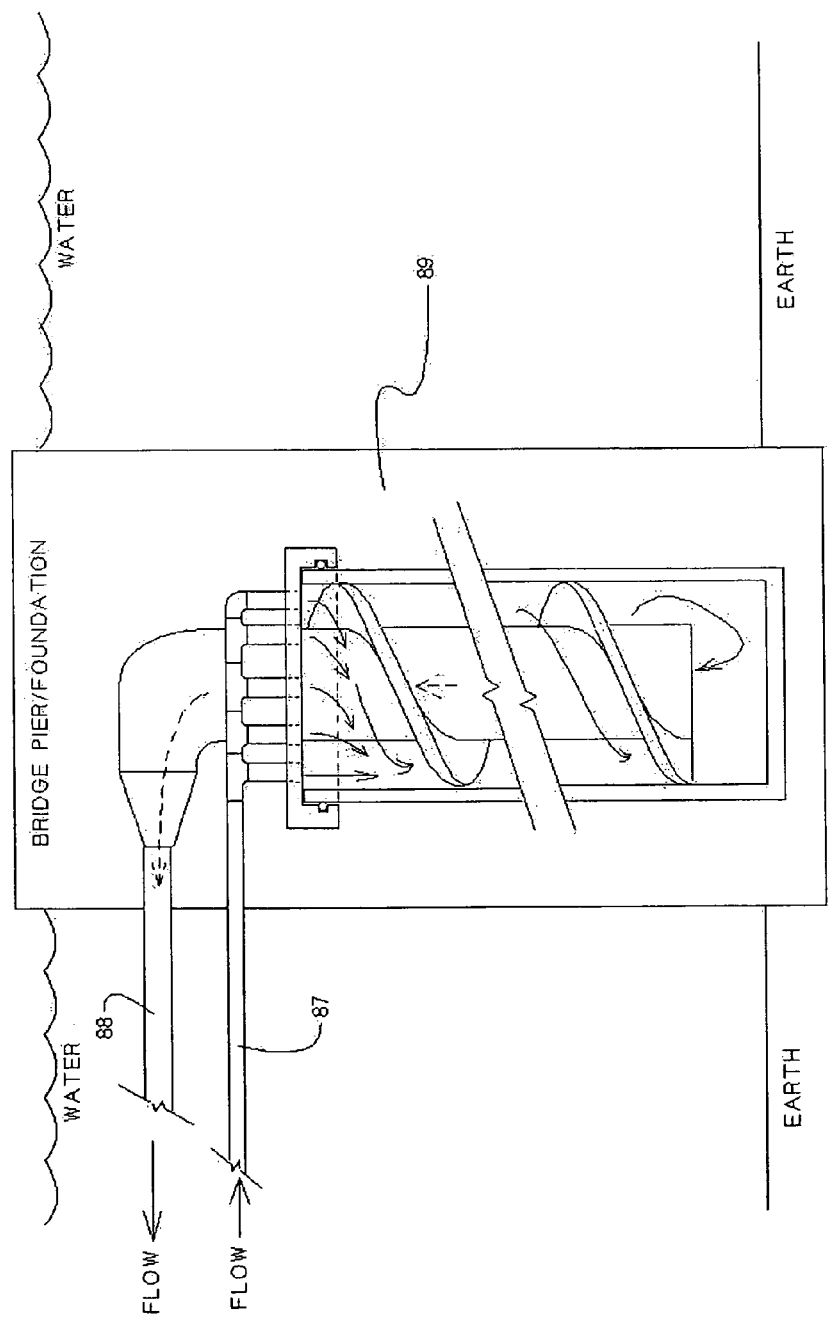
FIG. 57 is a side, partially cross-sectional view of a coaxial-flow heat exchanging structure of the present invention that is ideal for use in foundation installations, wherein the tube fittings are in a state of compression, and wherein a tube fitting is welded to the side of the thermally-conductive outer tube section for returning the heat exchanging fluid to the external system.
Figure 58:
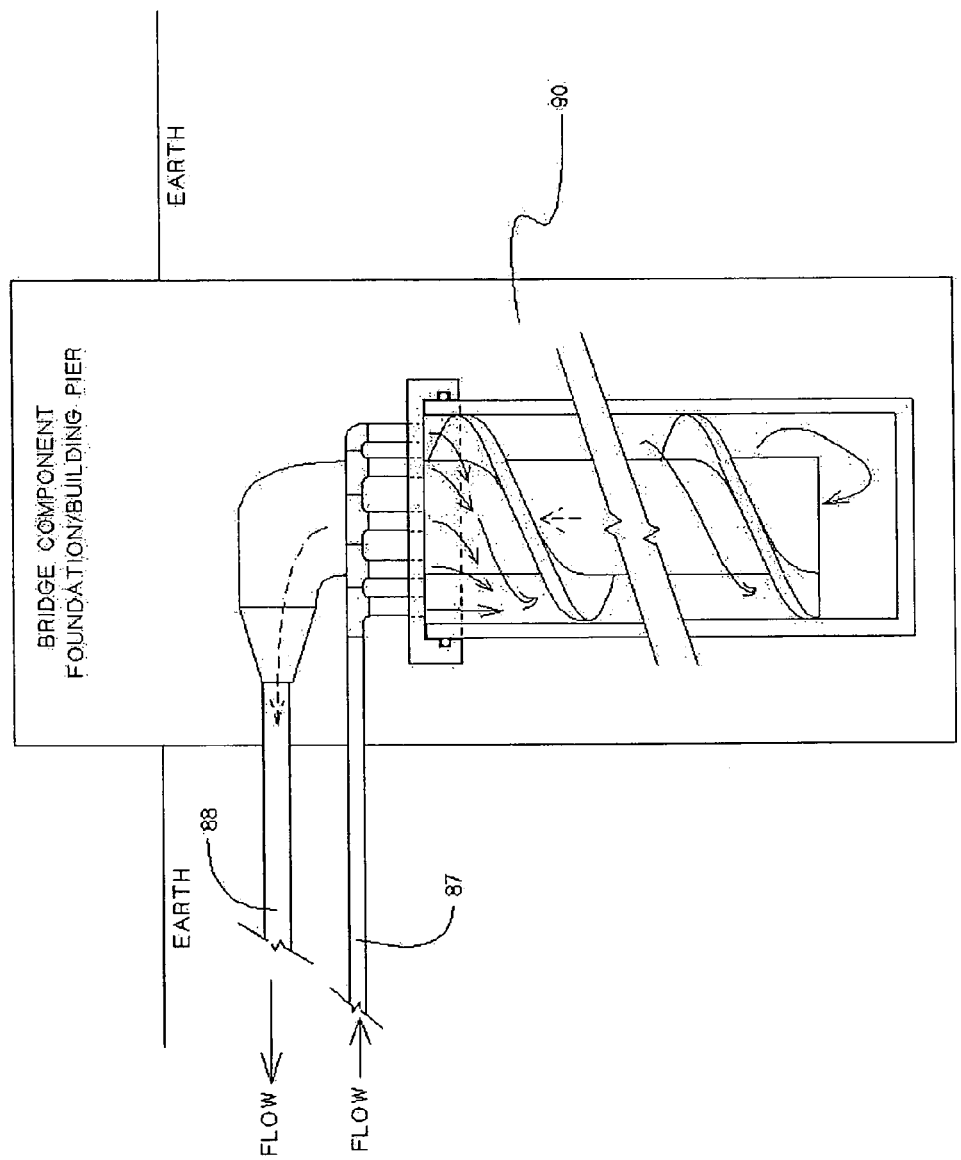
FIG. 58 is a side, partially cross-sectional view of the coaxial-flow heat exchanging structure of the present invention shown installed vertically in foundations or pilings of a bridge pier or like structure.

FIGS. 57 and 58 shows the coaxial-flow heat exchanging structure of the present invention installed vertically, (although it can be horizontally installed) in bridge piers and foundations, or bridge components and foundations and piers of a building or other similar structure. The heat exchanger of the present invention can take advantage of the metal rebar used in the concrete to increase the effective surface area of the outer tube and any thermal storage quality the concrete may have. By installing the co-axial flow heat transfer structure in the ground or water below the structure, the cement/concrete sheath can perform two functions: (1) structural support, and (2) heat transfer to the water or ground. If the heating load is small enough and the temperature difference large enough, then the coaxial-flow heat exchanger can be used in the thermo-siphon mode using the density difference between cold and warm aqueous solution. Otherwise a coaxial-flow heat-pump can be used to increase the heat transfer rate, and as the piling spacing is very close in building foundations, the whole volume of ground contained between the pilings can be converted to a thermal bank for peak loads or even to store heat from the cooling season to be used in the heating season. Also, if the top of basement foundation is isolated with insulation, then cement structure and some surrounding ground can be converted into a thermal bank for peak load averaging during winter heating and summer cooling. The heat transfer fluid enters the co-axial heat transfer structure shown through pipe 87. The heat transfer fluid exits the output port of the co-axial heat transfer structure through pipe 88.

Figure 59:
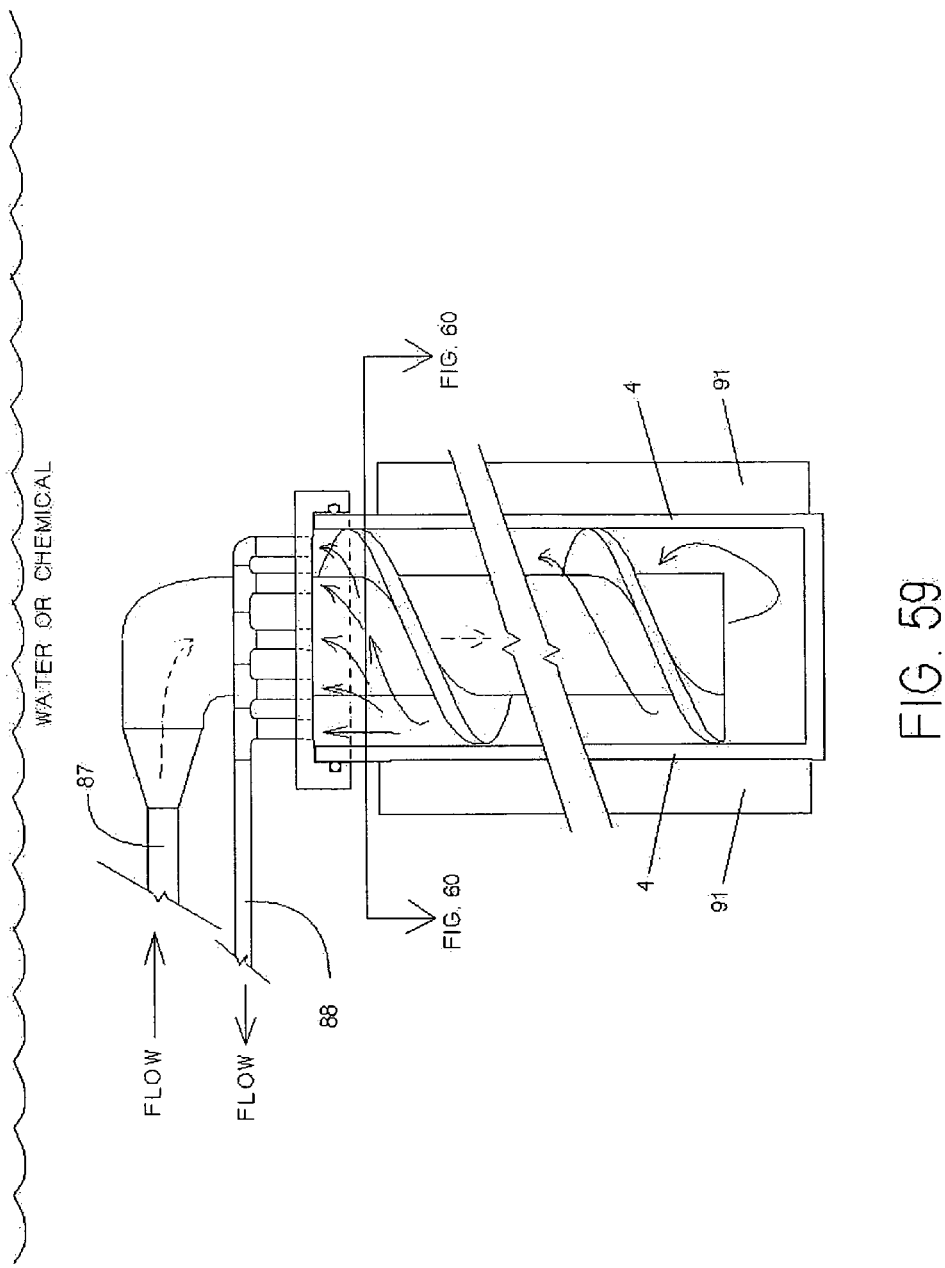
FIG. 59 is a side, partially cross-sectional view of the coaxial-flow heat exchanging structure of the present invention shown suspended vertically in an aqueous solution or mud, wherein radially-extending metal heat exchanging fins are provided on the outer tube section to increase the heat transfer area thereof, thereby making the circulation of aqueous solution thereabout function as an external thermosiphon.
Figure 60:
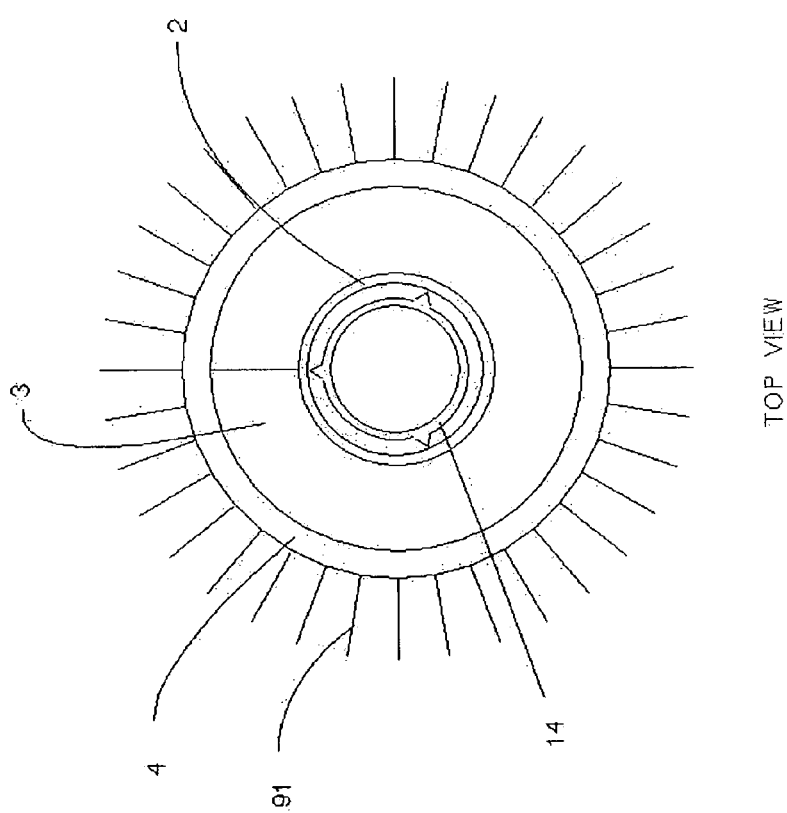
FIG. 60 is a side, partially cross-sectional view of the coaxial-flow heat exchanging structure of the present invention as shown in FIGS. 59 showing how the fins run along the exterior surface of the outer tube.
Figure 61:
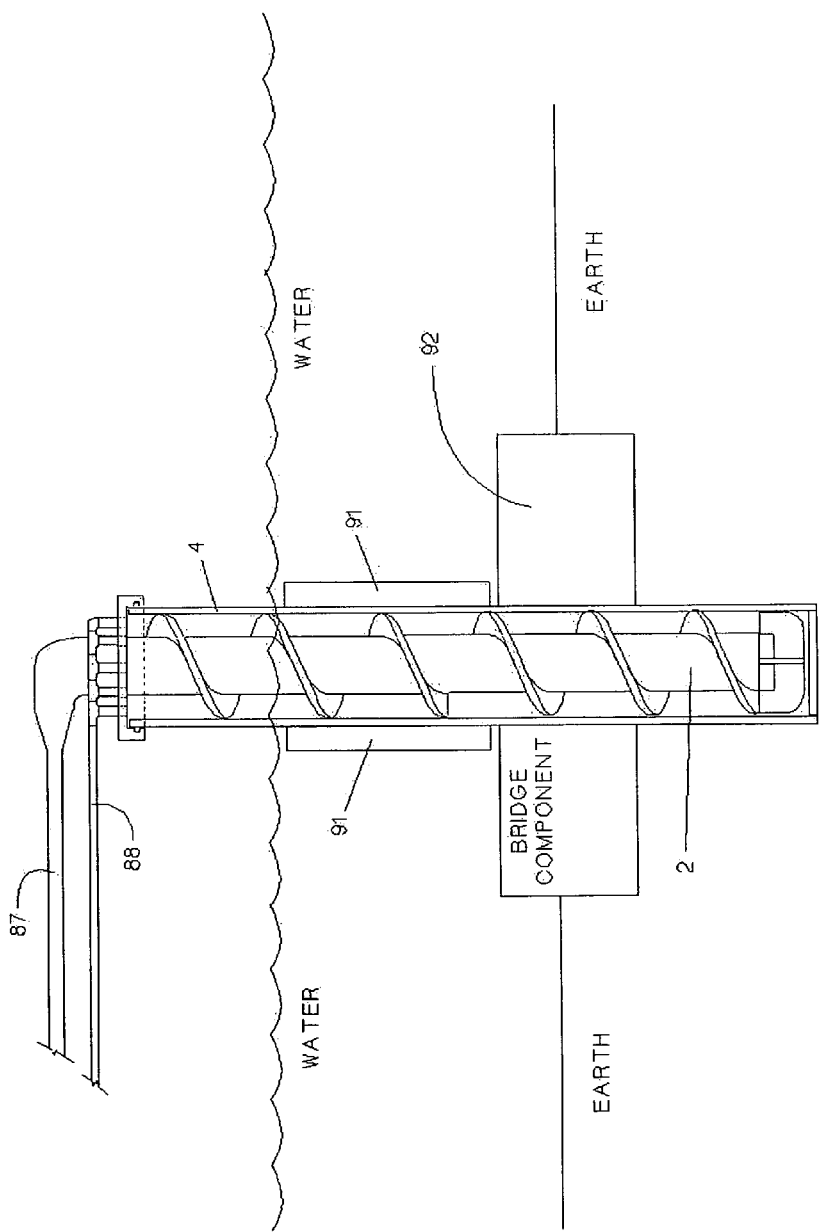
FIG. 61 shows the coaxial-flow heat exchanging structure of the present invention installed in a bridge component or piling, wherein in earthquake areas, the pilings are wrapped in a metal sheath to prevent structural damage in the earthquake, and helically-extending outer flow channels provide a ground/water source heat to prevent icing of the road way or sidewalks during the winter season.

FIGS. 59, 60 and 61 shows the coaxial-flow heat exchanging structure of the present invention suspended in an aqueous solution or mud, e.g. in both horizontal and vertical orientations. In these applications, the thermally-conductive outer tube section has radially-extending metal fins arranged around its outer surface for the purpose of increasing the heat transfer area of the outer tube section 4, i.e. by making it behave as an external thermo-siphon for aqueous solution circulation about such metallic fins. The width of such external metallic fins to its thickness aspect ratio should be less than 10 to 1 so as to optimize the use of metal and heat transfer to the aqueous solution or mud. For installations in bodies of water, se fins can be coated for anode operation to prevent bio-film growth and scaling, which reduces the heat transfer to the aqueous solution.

FIG. 59 shows a cross-section cut-line for a top view FIG. 60 and a co-axial heat transfer structure submersed horizontally in water, mud, or chemical. As shown, the heat transfer fluid enters through pipe 87 and exits the structure through pipe 88. An external fin structure 91 can be installed onto the exterior surface of the co-axial heat transfer structure 1.

FIG. 60 is a top cut-away view of FIG. 59 showing the external radially-extending heat transfer fins 91 attached to the exterior surface of the co-axial heat transfer structure outer tube 4. The top view shows the a central tube 14 with standoffs 23, 24 and 25, as shown in FIG. 11 and 12, allowing a laminar fluid to flow through the center insulating central tube 14.

FIG. 61 shows the coaxial-flow heat exchanging structure of FIGS. 59 and 60 installed in a bridge component or piling 92 and submersed below the water line above the bridge component. As shown the external radial fins 91 are arranged radially and laterally around the exterior of the coaxial-flow heat exchanging structure outer tube. The heat transfer fluid is circulated through the structure through pipes 87 and 88.

Figure 62:
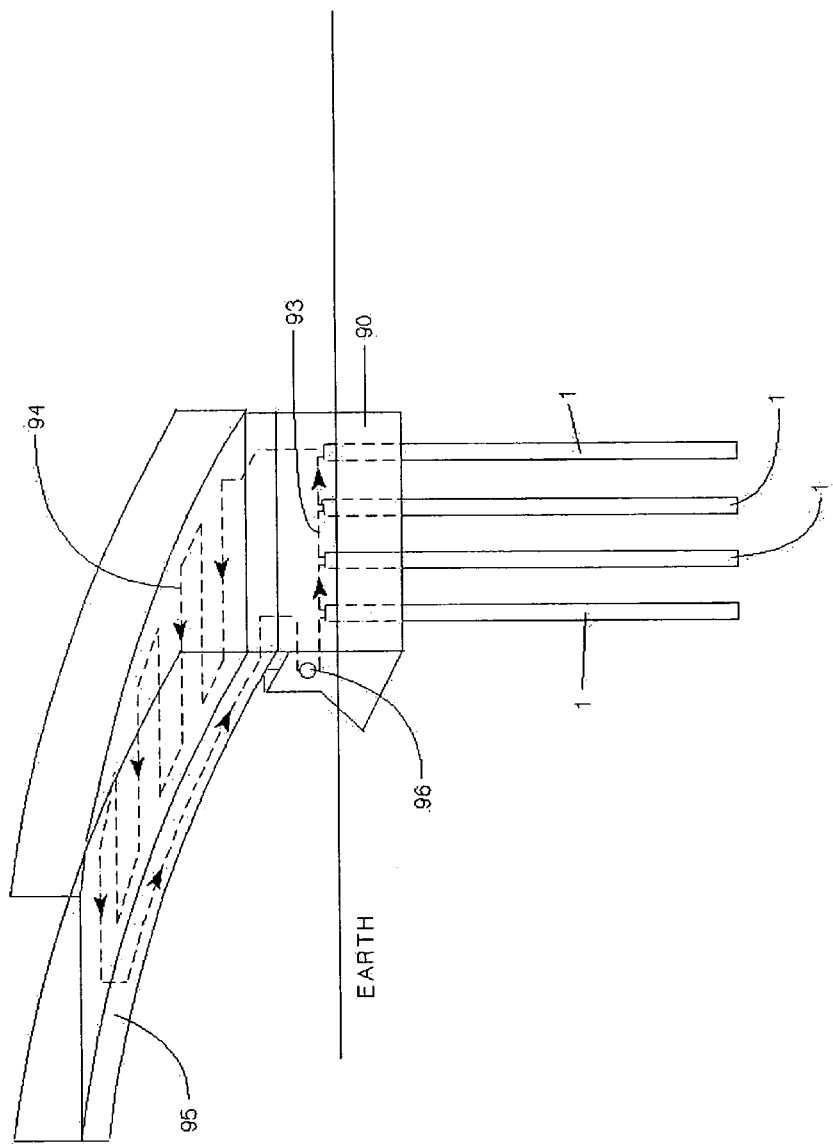
FIG. 62 shows the coaxial-flow heat exchanging structure of the present invention installed in a bridge component or piling, wherein in earthquake areas, the pilings are wrapped in a metal sheath to prevent structural damage in the earthquake, and helically extending outer flow channels provide a ground/water source heat to prevent icing of the road way or sidewalks during the winter.
Figure 63:
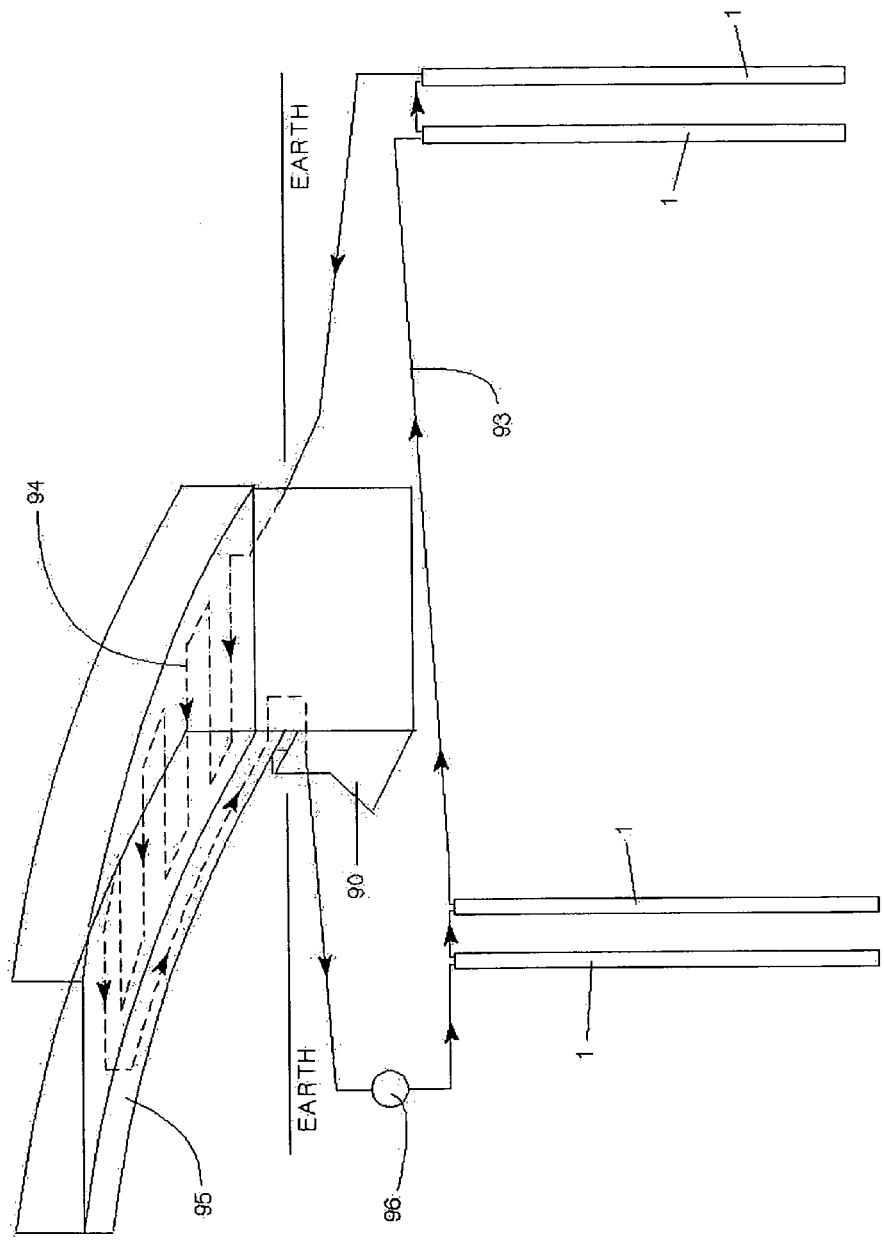
FIG. 63 shows the coaxial-flow heat exchanging structure of the present invention installed in a bridge component or piling, wherein in earthquake areas, the pilings are wrapped in a metal sheath to prevent structural damage in the earthquake, and the helically-extending outer flow channels provide a ground/water source of heat energy to prevent icing of the road way or sidewalks during the winter season.

FIGS. 62 and 63 show small and large coaxial-flow heat exchanging structures of the present invention installed in ground to prevent icing or snow accumulation on bridges, walkways (i.e. side walks, heavily traveled intersections or steeply pitched roads and driveways). In such applications, the ground heat can keep the road surface from icing up and increase the evaporation rate of moisture on the road, providing numerous safely benefits. During spring and summer operations, the system can thermally bank (i.e. store) heat for intermittent winter surface de-icing. In order to reduce energy cost, the pump operation can be remotely computer-controlled by the local authorities before the bad weather conditions move in the area, causing the transfer of heat energy of and preventing the road conditions from becoming dangerous.

FIG. 62 shows a number of coaxial-flow heat transfer structures of the present invention, connected in series with pipe 93, installed within and beneath a bridge component 90 for the purpose of circulating enough heat transfer fluid, using pump 96, through a piped grid 94, sufficient enough to maintain the bridge floor 95 and walkway above freezing temperatures.

FIG. 63 shows a number of coaxial-flow heat transfer structures of the present invention, connected in series with pipe 93, installed adjacent a bridge component 90 for the purpose of circulating enough heat transfer fluid, using pump 96, through a piped grid 94, sufficient enough to maintain the bridge floor 95 and walkway above freezing temperatures.

Figure 64:
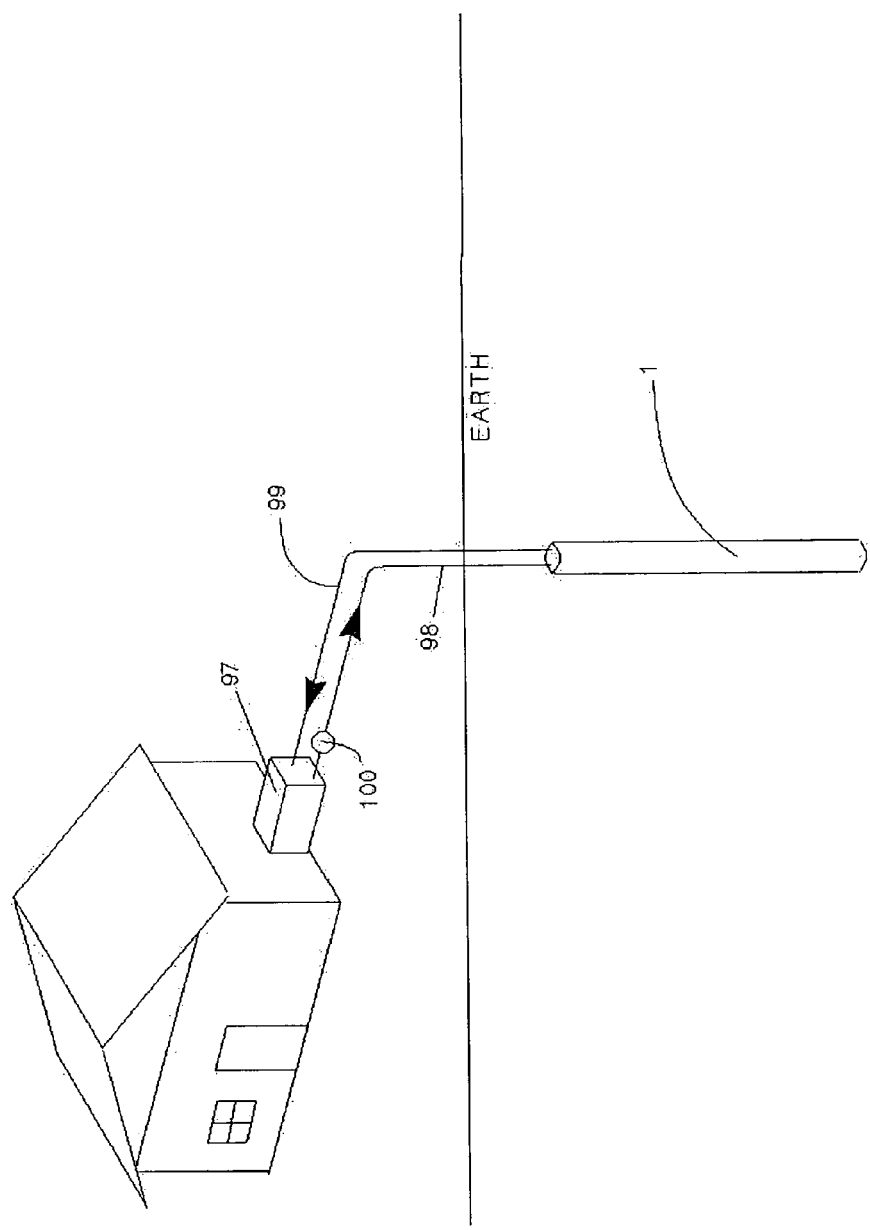
FIG. 64 is a schematic representation of a first application of a single coaxial-flow heat exchanging structure of the present invention installed within the Earth about a residential home.
Figure 65:
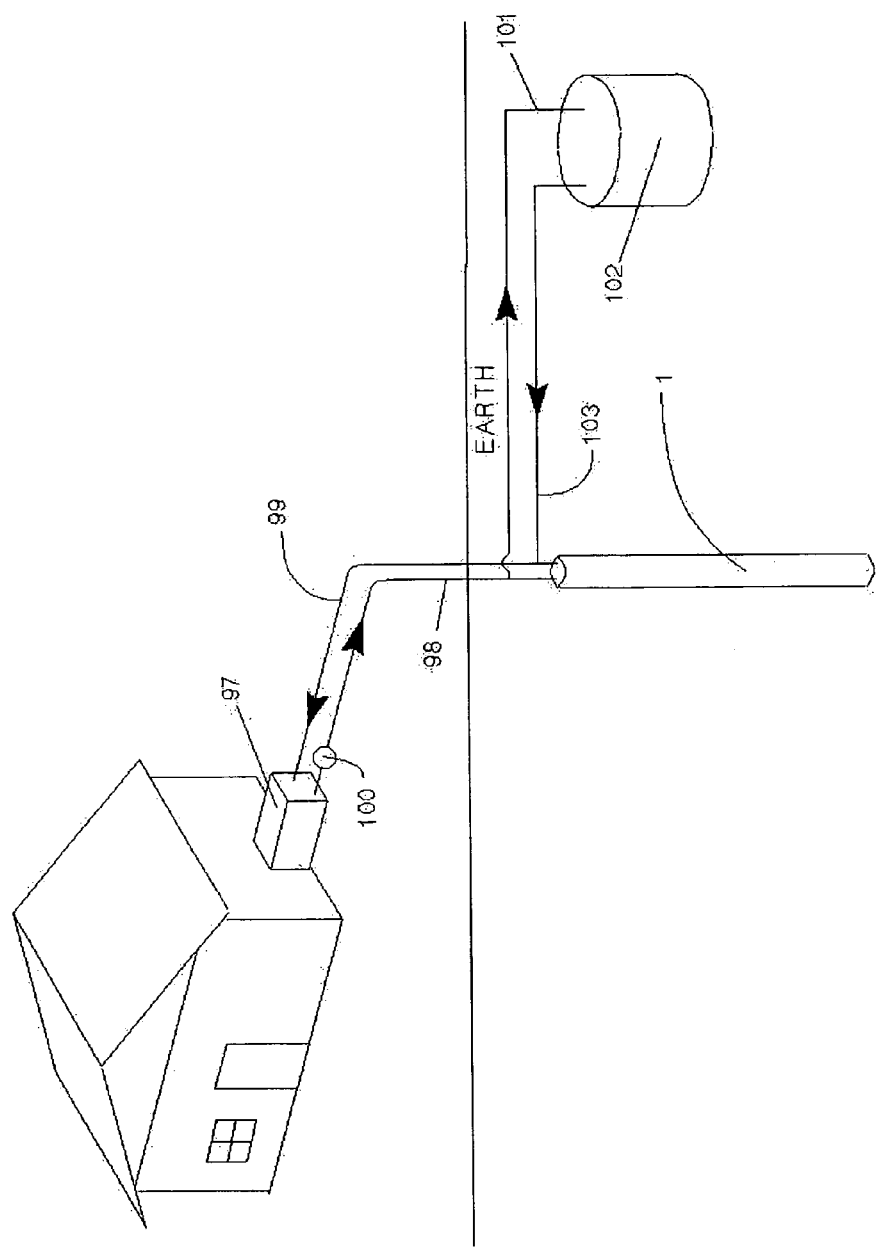
FIG. 65 is a schematic representation of a first application of a single coaxial-flow heat exchanging structure of the present invention installed within the Earth about a residential home, wherein an optional thermal bank tank is provided for night-time operation when the electrical energy costs are less, or for daytime operation when solar cells can provide electrical energy to the home.

FIGS. 64 and 65 show the application of a single coaxial-flow heat transfer structure 1 for a residential home. FIG. 64 shows a building with a self-contained central air conditioning heat pump 97 equipped with a water-cooled refrigeration condenser section therein. Through pipes 98 and 99, pump 100 circulates a heat transfer fluid through the water cooled refrigeration condenser and the coaxial-flow heat transfer structure 1 to either transfer heat into the earth or absorb heat from the earth for distribution within the interior spaces of the building.

FIG. 65 shows the application of a single coaxial-flow heat transfer structure 1 for a building. In this application, an optional thermal bank tank 103 is connected with pipes 102 and 103 provided for night time and mild climate cooling mode of operation during times when electrical energy expense is less for night time modes of operation, and colder day time operation when solar panels can provide heat energy for hydronic heating modes of operation. The said modes of operation can be called the economizer modes of operation. The solenoid valves are used to valve the thermal bank tank either in series with the coaxial-flow heat transfer structure or parallel (shunted).

Figure 66:
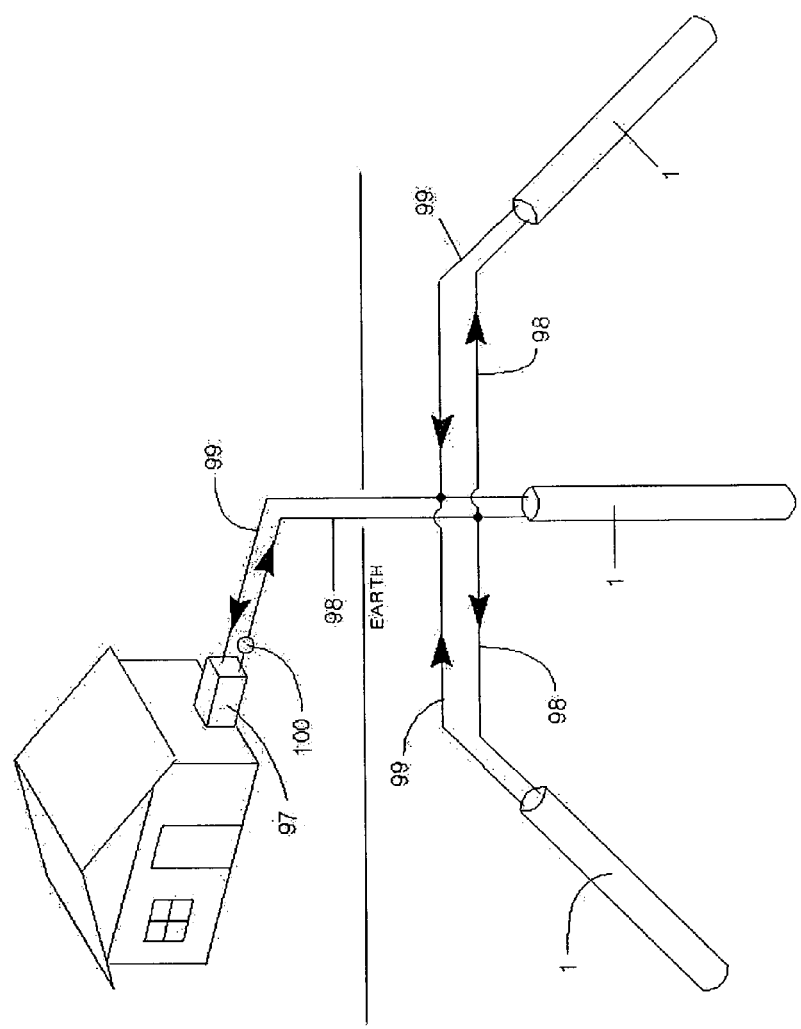
FIG. 66 is a schematic representation of a first application of a three coaxial-flow heat exchanging structure of the present invention installed within the Earth about a residential home.

FIG. 66. shows the building of FIG. 64 but with a number of coaxial-flow heat transfer structures arranged in a parallel configuration with supply pipes 98 and return pipes 99. This system configuration provides three times as much thermal capacity as shown in the system of FIG. 64.

For cooling applications, the addition of soluble gases to the aqueous-based fluid improves the heat transfer to the ground/water source. As the pressure increases with depth of fluid column, the soluble gases are adsorbed by the aqueous fluid; the gases release their stored heat to the fluid, and in turn raise the temperature of the fluid which in turn increases the temperature differential between the fluid and the ground/water source. Carbon dioxide ($CO_2$) and ammonia ($NH_3$) gases foamed with surfactants create stable aqueous-based fluids used in this absorption process. The fluid return line requires insulation to prevent the heat absorption of heat as the gases come out of solution when the fluid returns to the surface. The adsorption and de-sorption process acts like a low differential temperature refrigerant cycle, but it can be quite effective in increasing the heat transfer in the ground/water source loop.

For heating applications, the addition of solid particles to the heat exchanging flow can increase the heat capacity of the aqueous-based fluid. Micron sized heavy metal or metal oxide particles can be mixed with the aqueous based fluid and suspended with a shear thinning polymer such as xanthan gum or borate cross-linked polymer. The fluid must be kept in motion or the particles will eventually settle out and plug the bottom of the co-axial flow heat transfer structure. Micron-sized glass spheres containing a low melting point salt can also be used to increase the heat capacity of the fluid while maintaining a particle specific gravity close to 1. Particle specific gravities near to 1 will prevent settling of the particles in the aqueous fluid, thus allowing a ground loop section to be shut down with out the danger of plugging the heat exchanger with settled particles. Field experience has shown that the composition of the aqueous-based fluid should remain simple to reduce capital cost and that increasing fluid flow rate is a better solution to increase heat capacity of the system, except where very high heat transfer rates are required.

FIGS. 67 and 68 show an application of array pad-drilling nine deviated wells, to minimize the ground surface impact while maximizing the volume of ground contacted by the well bore. FIG. 68 is a front view of the vertical coaxial-flow heat transfer structures shown in FIG. 67 connected in series where one is a vertical well bore and the other is a deviated well bore. Long term operation allows the coaxial-flow heat transfer structure to thermally bank (i.e. store) heat during the cooling season for use during the winter season. For cooling loads only, a shallow horizontal coaxial-flow heat transfer structure can be added to the coaxial-flow heat transfer array shown in FIG. 67 for the purposes of removing heat from the thermal bank during the winter season. The pad drilling process indicated in FIG. 67 also has the advantage of reduced heat loss from horizontal gathering of piping and reduced risk of accidental damage from contractor digging operations.

FIG. 69 shows a system of eleven deviated wells according to the present invention, connected together in a two series array configuration. Pipe 98A and 99A supply and return heat transfer fluid to the center array, while pipes 98B and 99B supply and returns heat transfer fluid to the outer array. Each well contains a coaxial-flow heat transfer structure of the present invention. As shown, the coaxial-flow heat transfer structure of the present invention can be combined in various ways to realize improved heat transfer systems and networks capable of handling diverse thermal loads.

Figure 70:
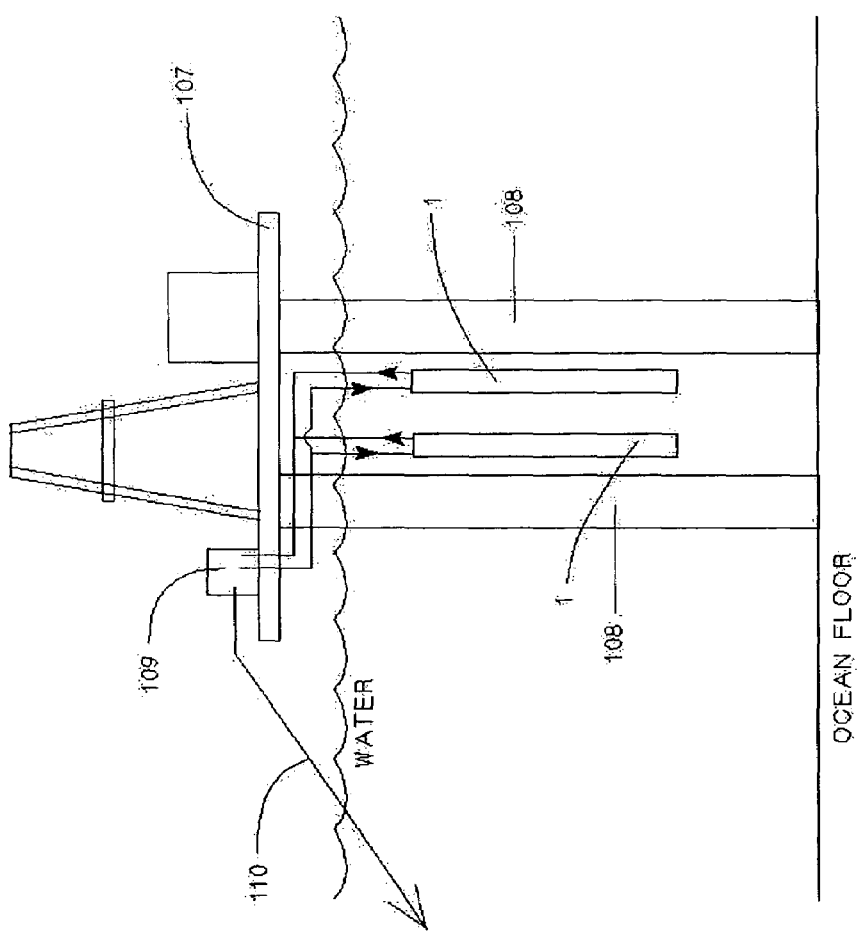
FIG. 70 is a schematic representation of a first application using sea water as the heat-pump heat sink for gas dehydration and oil de-waxing, wherein one or more coaxial-flow heat exchanging structures of the present invention are installed in the ocean above the ocean floor, for the purpose of extracting heat from the gas so as to cause the temperature thereof to drop, thereby condensing water vapor and/or light hydrocarbon vapors in the gas stream.
Figure 71:
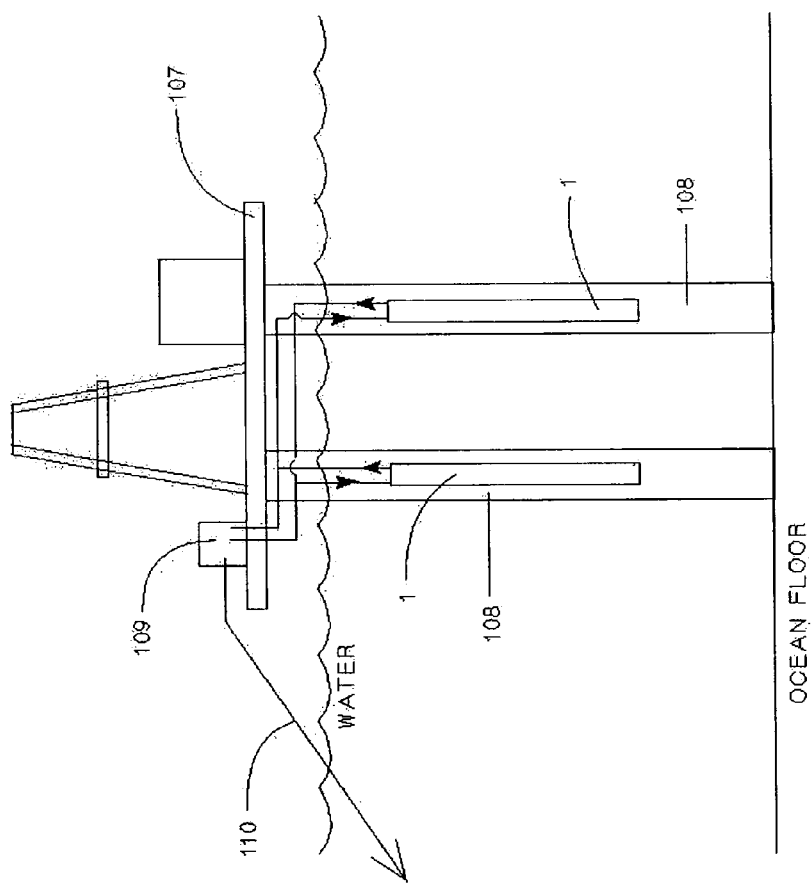
FIG. 71 is a schematic representation of a second application using ballast water as the heat-pump heat sink for gas dehydration and oil de-waxing, wherein one or more coaxial-flow heat exchanging structures of the present invention are installed in the ocean above the ocean floor, for the purpose of extracting heat from the gas so as to cause the temperature thereof to drop, thereby condensing water vapor and/or light hydrocarbon vapors in the gas stream.

FIGS. 70 and 71 show, respectively, applications using seawater or ballast water in a condensing system and heat sink for gas dehydration, and oil de-waxing used on a drilling platform 107. In such applications, the coaxial-flow heat exchanging structures 1 of the present invention can be used on off-shore drilling facilities floating or supported on pier 108 to extract heat from the gas to cause the temperature of the gas to drop which then condenses water vapor and/or light hydrocarbon vapors into disposable liquids. The coaxial-flow heat exchanging structure can also be used to extract heat from oil with a cold structure to cause the wax to build up on the cold finger structure instead of on the pipeline wall transporting the oil to shore 110. A reversible refrigeration condensing system 109 (i.e. heat pump) connected to the coaxial-flow heat exchanging structure can be used to heat the oil to prevent or clean the wax buildup on the pipeline wall. The coaxial-flow heat transfer structure can be submerged in the open seawater, as shown in FIG. 70, or submerged in the ballast water in the structure as shown in FIG. 71. For open sea water, as shown in FIG. 70, the exterior of the coaxial-flow heat exchanger is coated for anode operation to prevent bio-film growth on the outer tube surface thereof. Using a closed-loop coaxial-flow heat exchanging structure submerged in seawater in locations teaming with sea life, greatly reduces the maintenance cost of other types of heat exchangers especially, the type of heat exchangers used in power plants.

Figure 72:
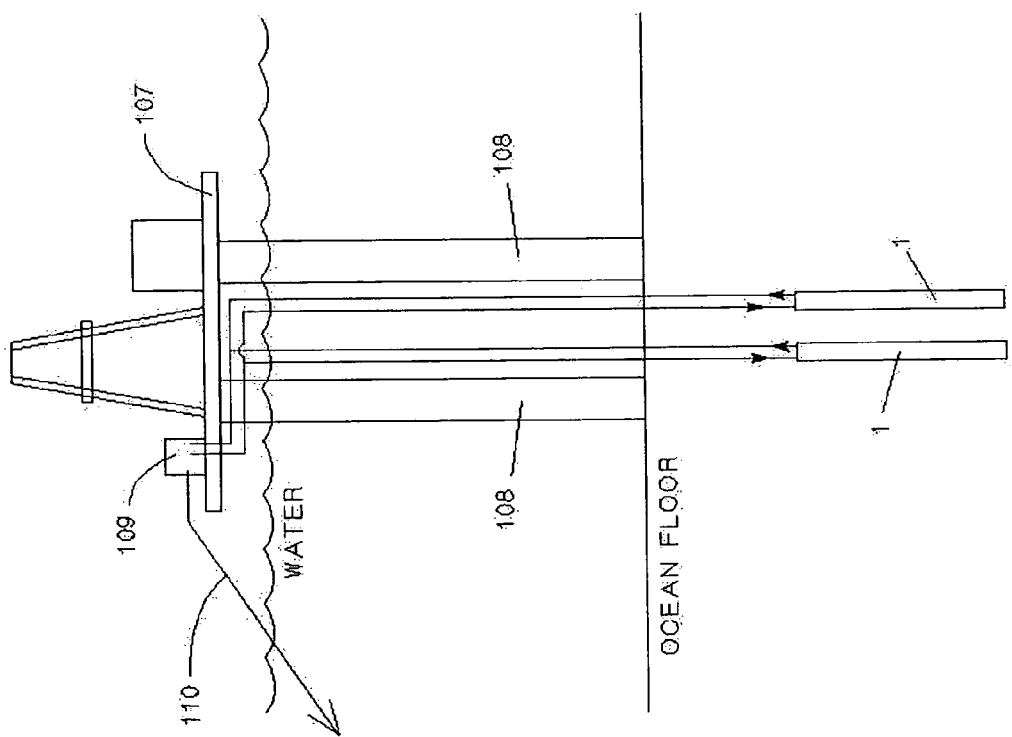
FIG. 72 is a schematic representation of a third application using ballast water as the heat-pump heat sink for gas dehydration and oil de-waxing, wherein one or more coaxial-flow heat exchanging structures of the present invention are installed below the ocean floor, for the purpose of extracting heat from the gas so as to cause the temperature thereof to drop, thereby condensing water vapor and/or light hydrocarbon vapors in the gas stream.

FIG. 72 illustrateas how multiple coaxial-flow heat exchanging structures 1 can be installed below the ocean floor or plowed into a mud like along shore to prevent conditions such as over heating or excessive cooling of the surrounding sea water which can compromise biological life forms residing therein. Coaxial-flow heat exchanging structures used on or in connection with oil and gas production systems shown in FIGS. 70, 71 and 72 can be as shown or combinations of floating, hanging, buried and other field constructed applications of the present invention.

Figure 73:
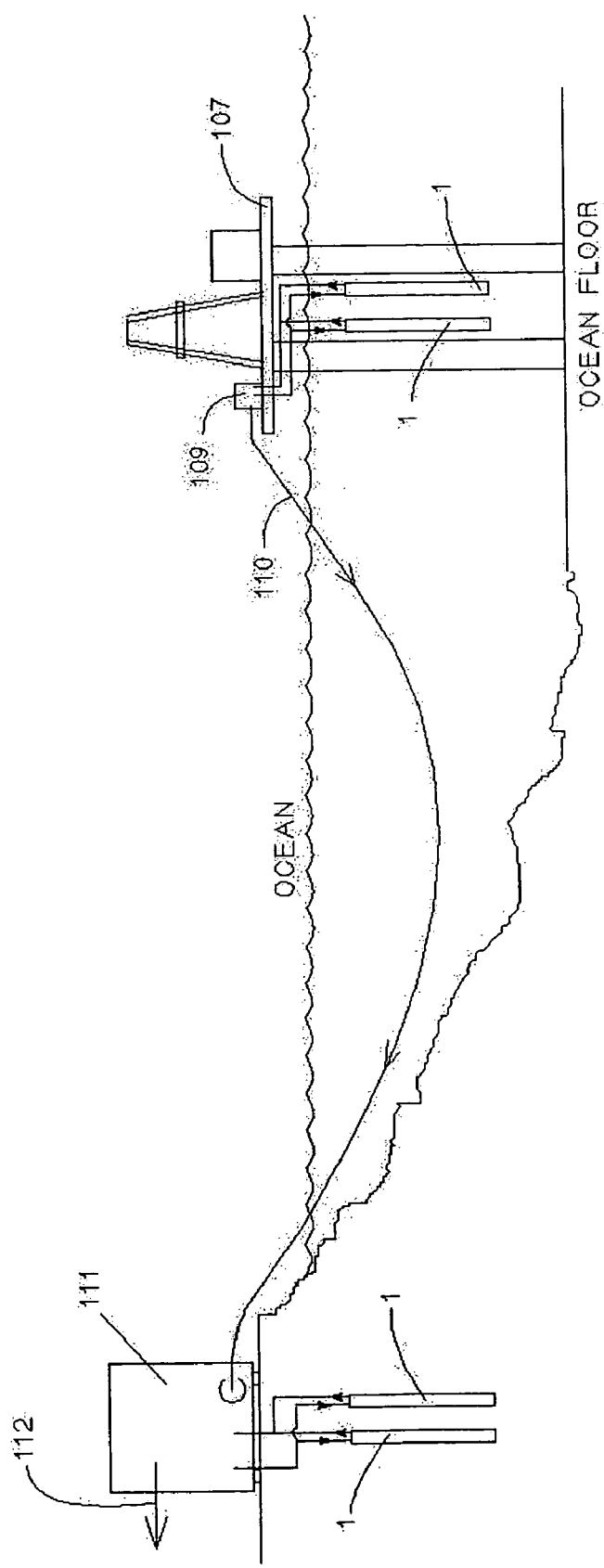
FIG. 73 is a schematic representation of an application of the coaxial-flow heat exchanging structure of the present invention employed in a ground-loop heat exchanging system, designed for dehydrating, on shore, pipeline-quality gas produced from remote off shore wells.

FIG. 73 shows the application of the coaxial-flow heat exchanging structure of the present invention 1 in a ground-loop heat exchanging system used on-shore for pipeline quality gas dehydration. As shown, natural gas produced from a remote off-shore platform 107 is pumped to an on shore plant through pipe 110 to dehydration processing equipment 111 and delivery to process and distribution facilities through pipe 112.

Figure 74:
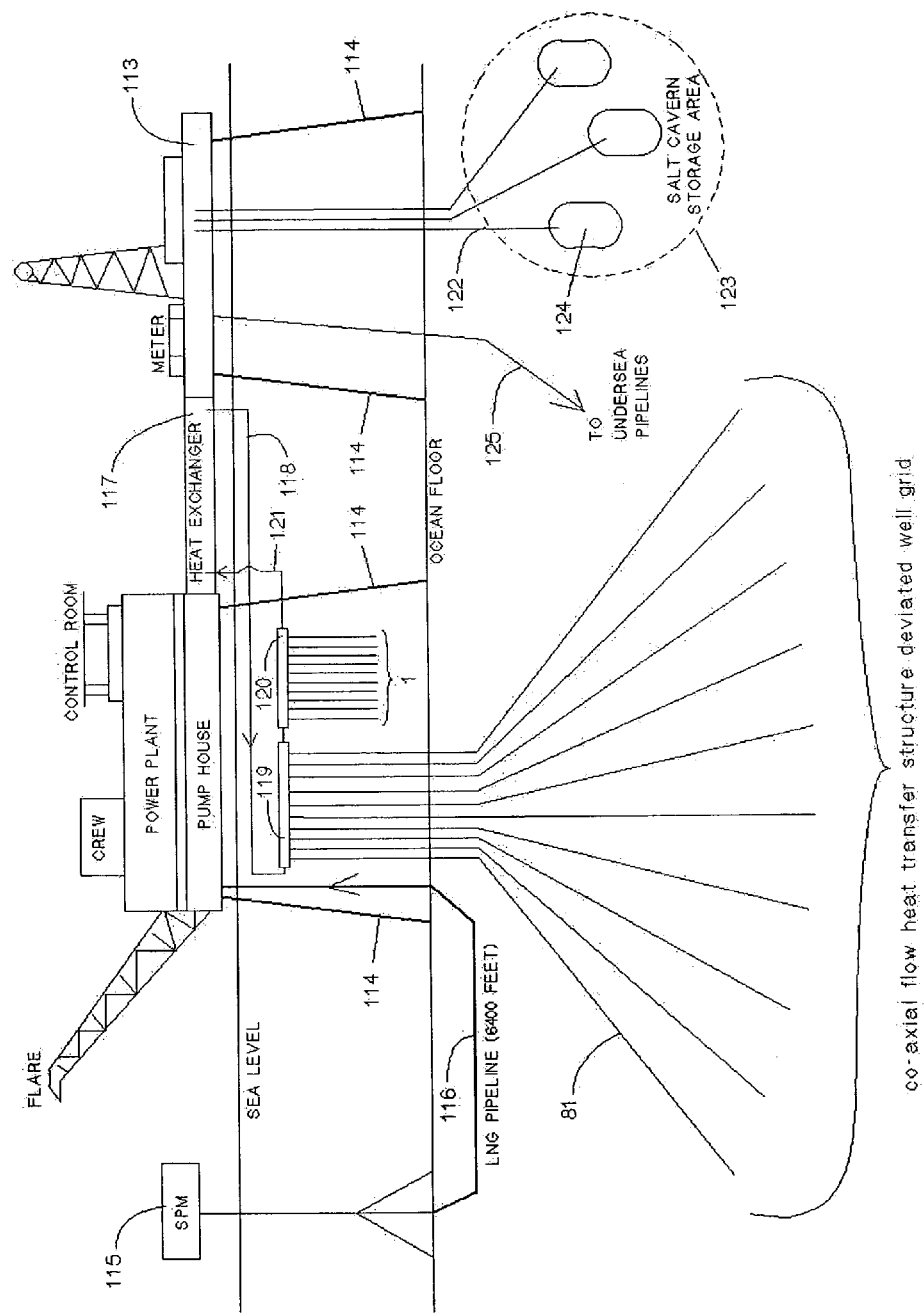
FIG. 74 is a schematic representation of an application of a number of coaxial-flow heat exchanging structures of the present invention shown suspended in sea water, buried beneath the mud line on the ocean floor, and used as a heat exchanger in the evaporative section of the liquid natural gas gasification process equipment, designed for gasifying liquid natural gas for storage and distribution.

FIG. 74 shows a platform, or shore based, liquid natural gas (LNG) receiving port, gasification and storage facility 113 supported on piers 114. The Special Provision for Monitoring (SPM) 115, normally, is in the same location or near to the point where liquid natural gas tanker ships off-load the liquid natural gas for gasification of storage. The natural gas can be stored in a salt cavern 124 through pipe 122, located in a salt cavern storage area encompassing one or more salt caverns, or the natural gas can be fed directly into the gasification process equipment located in the facility. The liquid natural gas is fed through pipe 116 to the gasification equipment, such as gas turbine engines, pumps and generators, as the natural gas changes in state from a liquid to a gas (evaporates) inside the heat exchanger 117 it requires a large amount of heat to cause the change in state. Generally, sea water is taken into the heat exchanger where the heat contained in the water is transferred into the gas. The sea water is then returned back to the sea locally which can have negative environmental consequences, damaging the local aquatic life forms and having a biological impact thereof. To prevent this problem, a heat transfer fluid is circulated through the heat exchanger 117 via pipe 121 from a subsurface grid (array) of a number of deviated coaxial-flow heat transfer structures 81 of the present invention. As shown, these structures 81 are connected together in parallel, with manifold 119, and a secondary array of a number of suspended coaxial-flow heat transfer structures 1, shown connected in parallel with manifold 120. In this arrangement, the heat transfer fluid travels through pipe 118 back to the heat exchanger 117 for heat dissipation and recirculation through the coaxial-flow heat transfer structures shown. If the gasified natural gas is not to be stored but piped to a processing and distribution center, it is normally pumped into on shore or undersea pipeline 125 to a facility on shore. Using a grid of co-axial flow heat transfer structures, installed in deviated wells, beneath the mud line of the ocean floor, prevents damage to the aquatic environment and provide a source of heat rather than burning a portion of the product (natural gas) during the gasification process. The coaxial-flow heat transfer structure shown in FIGS. 83 and 84 can be used to replace conventional heat exchangers currently in use.

Figure 75:
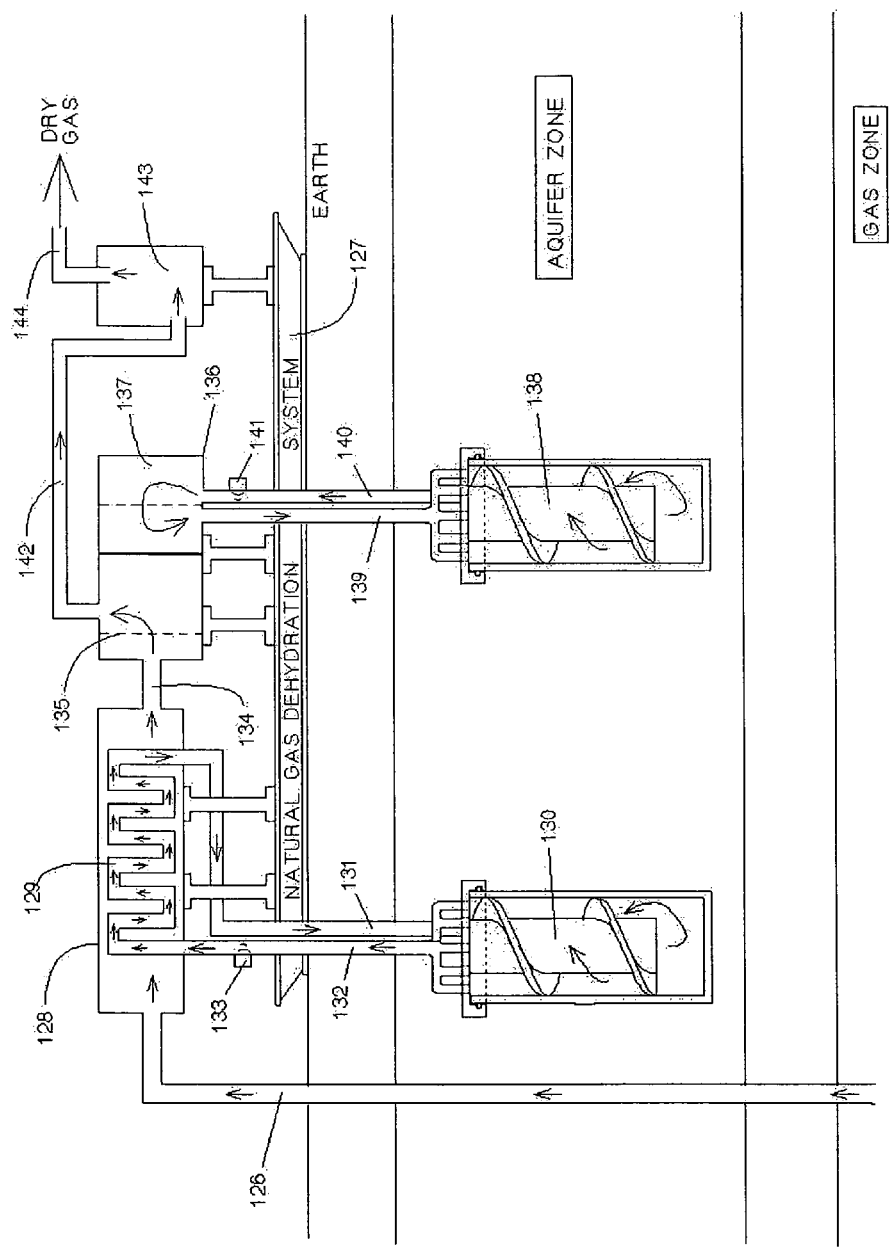
FIG. 75 is a schematic representation of a permanent or skid mounted natural gas dehydration system, also shown in FIG. 73, wherein the gas in the liquid separator is cooled to a temperature near the aquifer temperature, the gas is then cooled using a refrigeration system to a temperature near the gas hydrate temperature, and wherein a glycol cycle or calcium chloride salt cycle is used to remove moisture from the gas-hydrate temperature to the −30° F. dew point for pipeline sales, and wherein the system reduces the energy costs of gas dehydration and eliminates the release of benzene, toluene and other carcinogenetic hydrocarbon vapors to the atmosphere.

FIG. 75 shows a pair of coaxial-flow heat exchanging structures 130 and 138 of the present invention connected to a skid-mounted gas dehydration and condensate separation system 127 (e.g. in an application having a single well or gathering system). The gas enters the system from a well 126 and delivered to process and distribution facilities through pipe 144. In this system, natural gas and other liquids are produced from the well 126 that is completed in the gas zone. The natural gas moves through the separator 128, typically a tube 120 and shell type assembly, where brackish water and hydrocarbon liquids are separated from the natural gas. A heat transfer fluid cooled to a temperature substantially less than the gas temperature by the coaxial-flow heat transfer structure 130 is circulated to the tubes 129 inside the separator shell, via pipe 132 and returned to the coaxial-flow heat transfer structure 130 through pipe 131, causing brackish water and hydrocarbon liquids to condense from the gas for collection for disposal. The natural gas then moves through pipe 134 into the evaporator section 135 of the refrigerated dehydrator 136 where the temperature of the gas is reduced further to condense the water vapor and heavier hydrocarbon vapors from the gas. As shown, heat transferred into a heat transfer fluid from the condenser section 137 travels through pipe 139 to coaxial-flow heat transfer structure 138, where the heat is dissipated into the Earth, and the cooled heat transfer fluid returns back to the condenser section through pipe 140. Finally, the partially dehydrated natural gas passes through pipe 142 and is then polished by a small glycol unit 143 to remove the last traces of water vapor for shipment via natural gas production supply lines.

Notably, in the natural gas dehydration system shown in FIG. 75, the deviated well provides fluid, heated to ground temperature, for the purpose of dehydrating natural gas in a natural gas production environment. However, for other oil field heating and cooling applications, additional large surface holes can be drilled and the coaxial-flow heat transfer structure of the present invention installed and thermally cemented therein.

Figure 76:
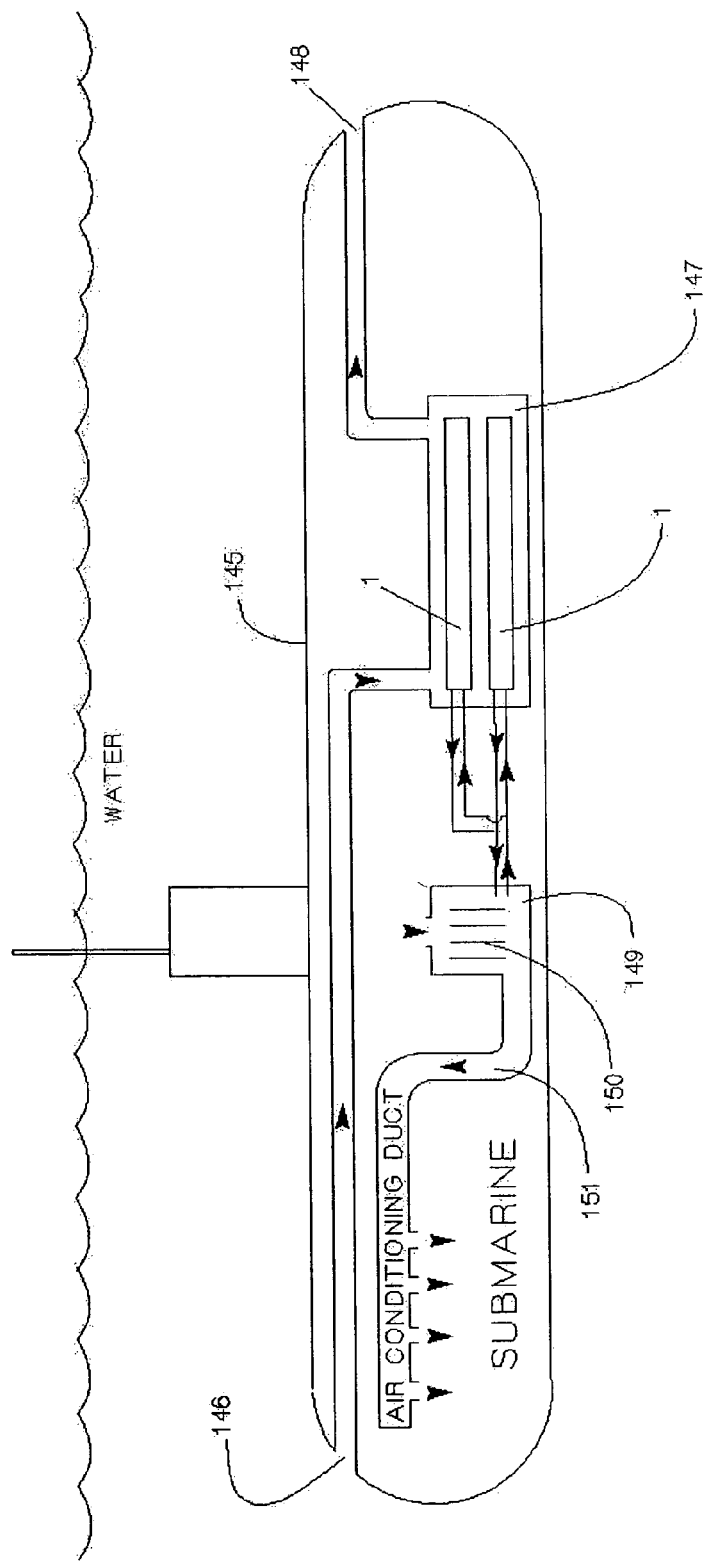
FIG. 76 is a schematic representation of a submarine employing the coaxial-flow heat exchanging structure of the present invention installed within a seawater heat exchanging subsystem for centralized air conditioning and equipment cooling.

FIG. 76 shows a submarine with a seawater intake 146 taking in seawater and delivering it to seawater heat exchangers 1 of the present invention installed in a seawater heat exchanging system 147 aboard a submarine for centralized and zoned air conditioning and equipment cooling normally utilizing heating and cooling heat exchangers 149, (also shown in FIGS. 78 through 82). The conditioned air is then distributed to specific locations aboard the submarine by air distribution ducting 151. In addition to increased heat transfer efficiency, the coaxial-flow heat exchanger helps to reduce noise generation and increase the safety in case of a hull breach. After use, the seawater is then returned to the sea through outlet 148.

Figure 77:
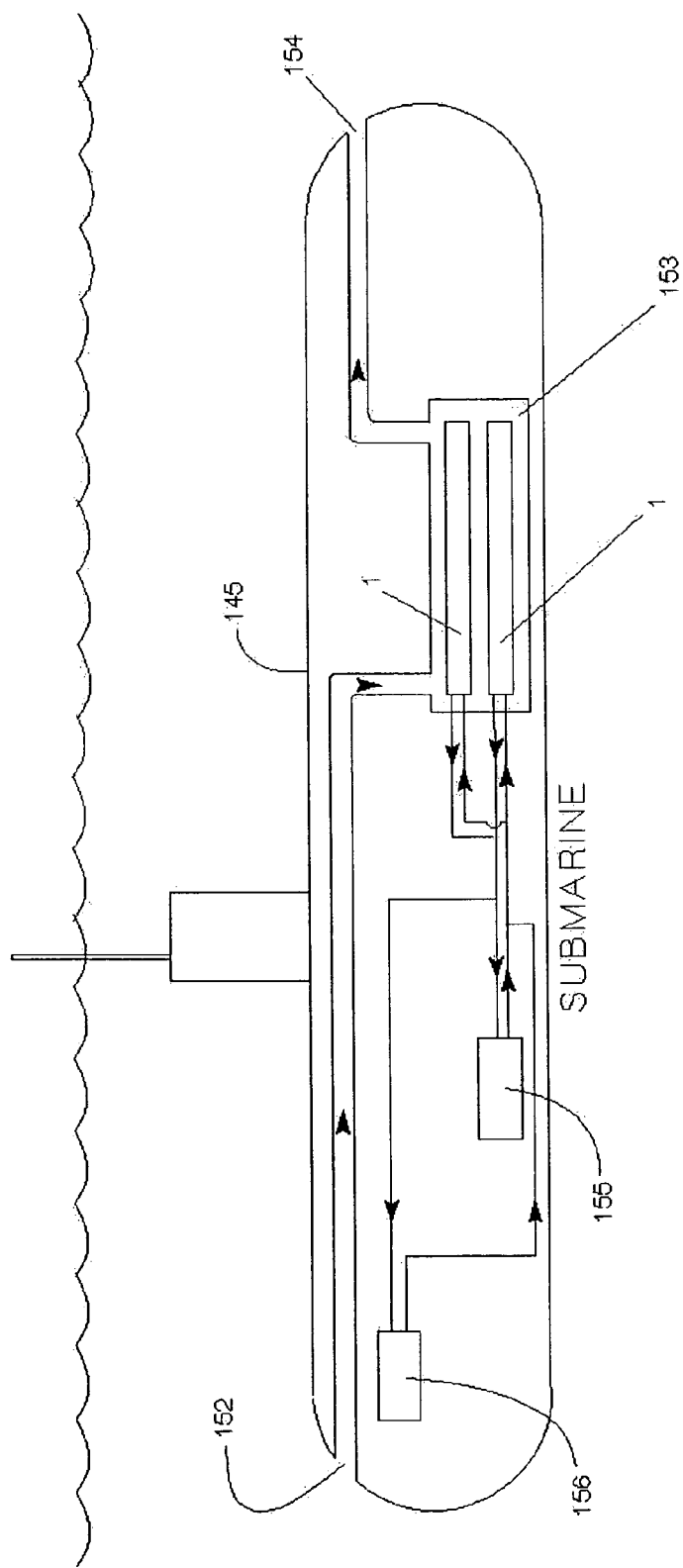
FIG. 77 is a schematic representation of a submarine employing the coaxial-flow heat exchanging structure of the present invention installed within a seawater heat exchanging subsystem for decentralized air conditioning and equipment cooling.

FIG. 77 shows a submarine with a seawater intake 152 taking in seawater and delivering it to seawater heat exchangers 1 of the present invention. As shown, these exchangers are installed in a seawater heat exchanging system 153 aboard a submarine for centralized and zoned air conditioning and equipment cooling normally utilizing heating and cooling heat exchangers 155 and 156, (also shown in FIGS. 78 through 82). In addition to increased heat transfer efficiency, the coaxial-flow heat exchanger helps to reduce noise generation and increase the safety in case of a hull breach. After use, the seawater is then returned to the sea through outlet 154. It is suggested that a mixed oxidant is injected into the seawater or a saltwater chlorinator so as to treat the seawater and prevent bio-film buildup on the fins. The heated seawater can be pre-diluted with fresh seawater to prevent production of a thermal plume around the submarine.

Figure 78:
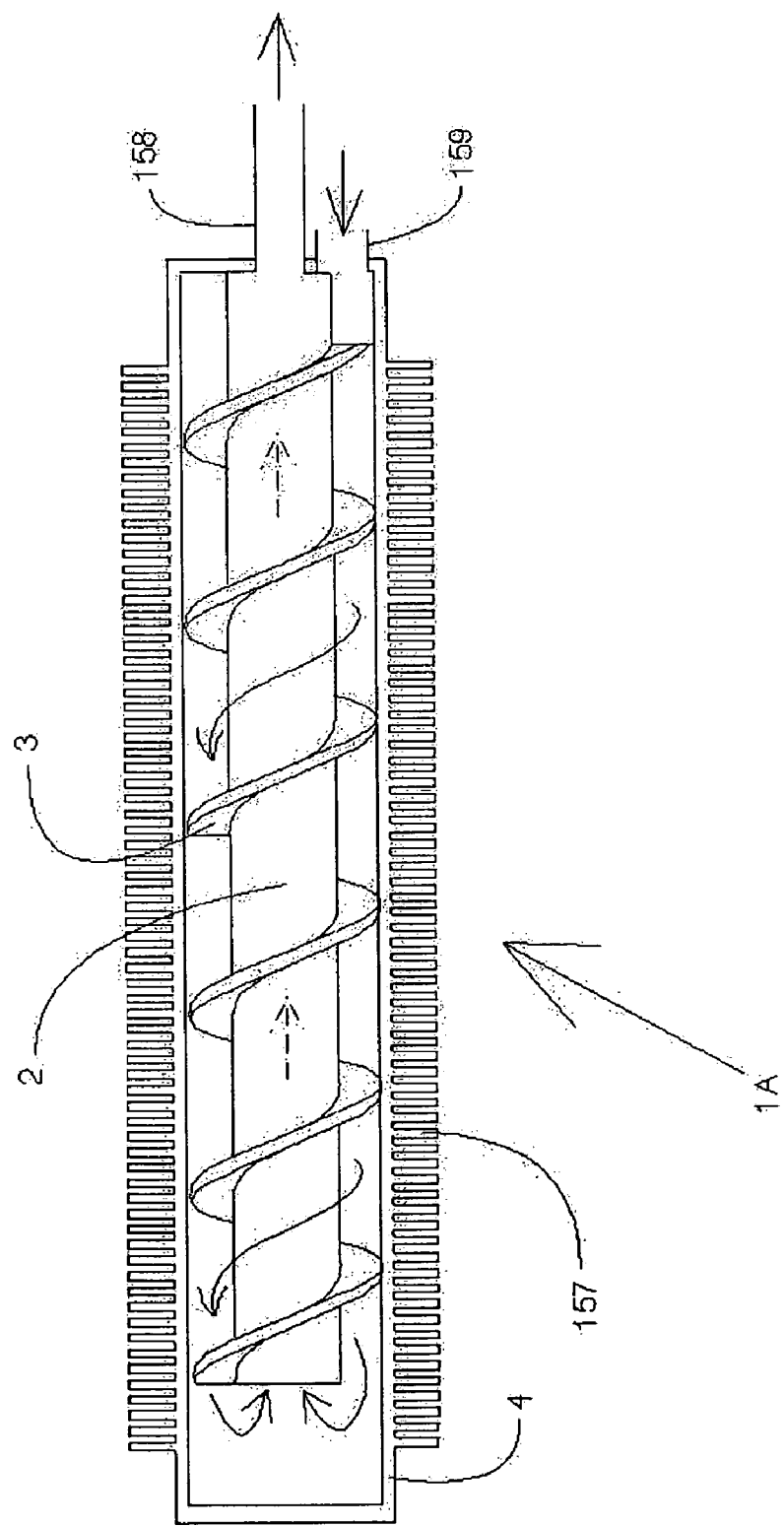
FIG. 78 is a side, partially cross-sectional view of a coaxial-flow heat exchange structure of the present invention constructed having fins about the outer tube exterior to be used as a component of a heat exchanging refrigeration condenser, refrigeration evaporator (cooling coil), heat pump heating and cooling coil, combustion engine radiator, and a component of other air or liquid heat exchangers having a fluid direction of flow as shown.

FIG. 78 is an elevated cross-sectional side view a coaxial-flow heat transfer structure of the present invention. As shown the structure 1A is a component of a heat exchanger assembly shown in FIGS. 80 through 87 showing the heat transfer fluid (i.e. liquid refrigerant from a refrigeration condenser) (i) entering through tube 159, having a turbulent flow profile as shown in FIGS. 38 and 41, (ii) passing through the outer flow channel along the outer tube 4 inside surface, and (iii) returning through the helically-finned center tube 2, having a laminar flow profile (as shown in FIGS.

1 and 1A) to the heat transfer fluid source (i.e. refrigeration compressor) through pipe 158.

Figure 79:
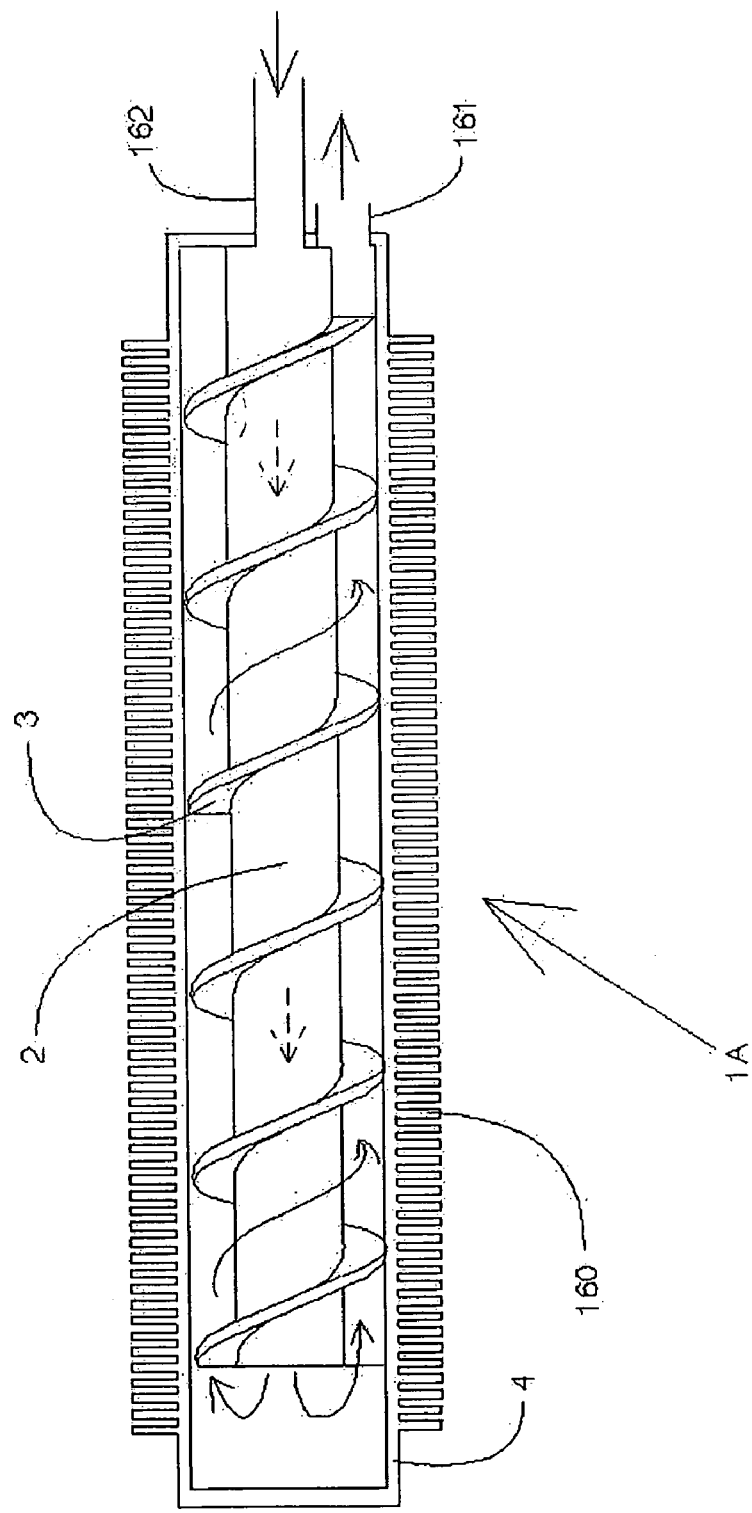
FIG. 79 is a side, partially cross-sectional view of a coaxial-flow heat exchange structure of the present invention constructed having fins about the exterior of the outer tube section to be used as a component of a heat exchanging refrigeration condenser, refrigeration evaporator (cooling coil), heat pump heating and cooling coil, combustion engine radiator, and/or a component of other air or liquid heat exchangers having a fluid flow direction as shown.

FIG. 79 is an elevated cross-section, side view a coaxial-flow heat transfer structure of the present invention. As shown the structure 1A is a component of a heat exchanger assembly shown in FIGS. 80 through 87 showing the heat transfer fluid (i.e. liquid refrigerant from a refrigeration condenser) (i) entering through tube 162, having a laminar flow profile as shown in FIGS. 1 and 1A, (ii) passing through the helically-finned center tube 2, and (iii) returning through the outer flow channel along the outer tube 4 inside surface, having a turbulent flow profile (as shown in FIGS. 38 and 41) to the heat transfer fluid source (i.e. refrigeration compressor) through pipe 161.

Figure 80:
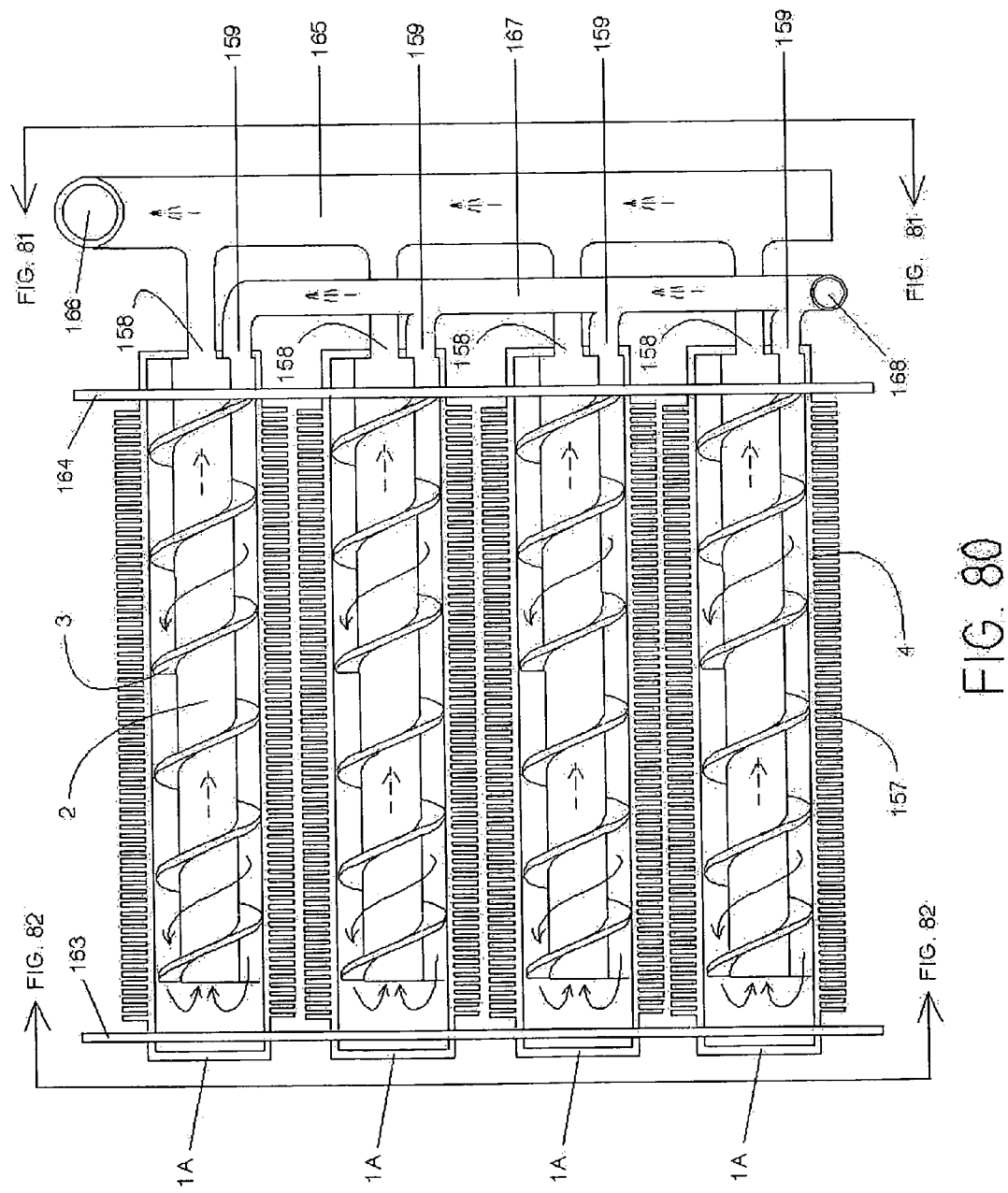
FIG. 80 is a side, partially cross-sectional view of a plurality of coaxial-flow heat exchangers of the present invention, shown used in a submarine application and other air conditioning applications, wherein the outer tube sections are made of metal and are finned so as to provide maximum heat transfer with the ambient environment.

FIG. 80 is a front and cross-sectional view of an array of coaxial-flow heat transfer structures 1A of the present invention, arranged in what is traditionally called a horizontal or block style heating or cooling coil. These coaxial-flow heat transfer structures are securely held in place by compression fitted or welded openings in end plates 163 and 164. The inner tube section of each coaxial-flow heat transfer structure 158 is connected to a manifold tube 165 to provide heat transfer fluid flow through each coaxial-flow heat transfer structure. Preferably, the heat transfer fluid flow is evenly distributed through each coaxial-flow heat transfer structure in the assembly into manifold tube 165. Also, the outer flow channel of each coaxial-flow heat transfer structure is connected by a tube 159 to a manifold tube 167 having an inlet 168 to provide heat transfer fluid flow through each coaxial-flow heat transfer structure. Preferably the heat transfer fluid is evenly distributed through each coaxial-flow heat transfer structure. While traveling through each outer flow channel, as described in FIGS. 38 and 41, the heat transfer fluid is guided by helical fins 3 and transfers heat energy into air, fluid or gases passing over fins 157 attached to the exterior surface of outer tube 4 of the coaxial-flow heat transfer structures 1A mounted in the assembly. The horizontal coaxial-flow cooling and heating coil of the present invention can be used to transfer heat into or out of air, fluid or gas passing over its external surfaces. The horizontal cooling and heating coil can also be used to transfer heat into or out of air, fluid or gas passing over it by circulating a or metered refrigerant into tube 168 provided the refrigerant can evaporate while passing through the coaxial-flow heat transfer structures 1A mounted in the assembly. The horizontal heating or cooling coil of the present invention can be constructed of a variety of materials consisting of metallic and plastic components, considering compatibility of materials and heat transfer fluids and refrigerants. This embodiment of coaxial-flow heat transfer structure can also be used as a radiator to cool a combustion engine.

Figure 81:
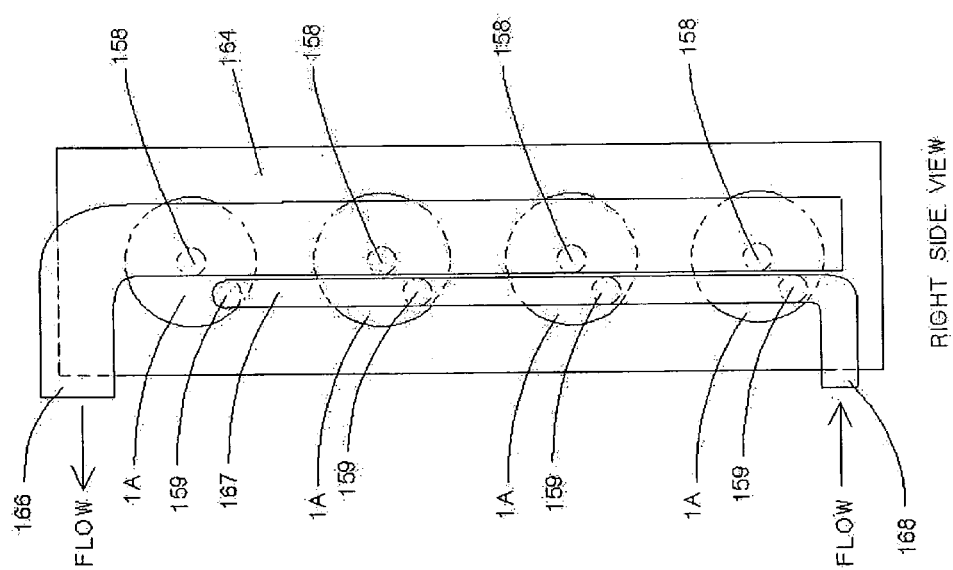
FIG. 81 is a first side view of the plurality of coaxial-flow heat exchangers shown in FIG. 80, taken along line 81-81 therein.

FIG. 81 is an end view of the horizontal heating or cooling coil of the present invention shown in FIG. 80. The end plate 164 is shown holding four coaxial-flow heat transfer structures 1A in their respective positions in the assembly. FIG. 81 shows the tube 166 of manifold tube 165 extended at an angle from the manifold tube 165 and the alignment of manifold tube 165 with each coaxial-flow heat transfer structure tube 158. FIG. 81 also shows the tube 168 of manifold tube 167 extended at an angle from the manifold tube 167 and the alignment of manifold 167 with each coaxial-flow heat transfer structure tube 159.

Figure 82:
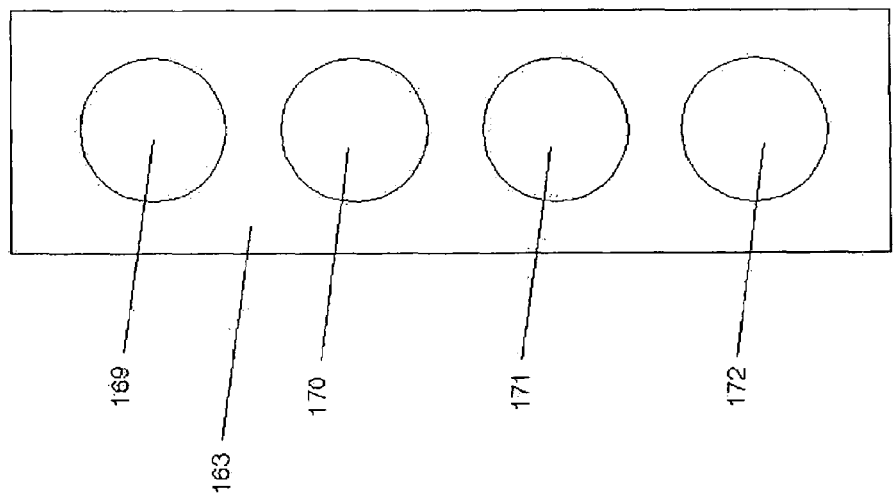
FIG. 82 is a second side view of the plurality of coaxial-flow heat exchangers shown in FIG. 80, taken along line 82-82 therein.

FIG. 82 shows the location of holes 169, 170, 171 and 172 punched in the end plate 163 so as to hold the coaxial-flow heat transfer structures in place.

Figure 83:
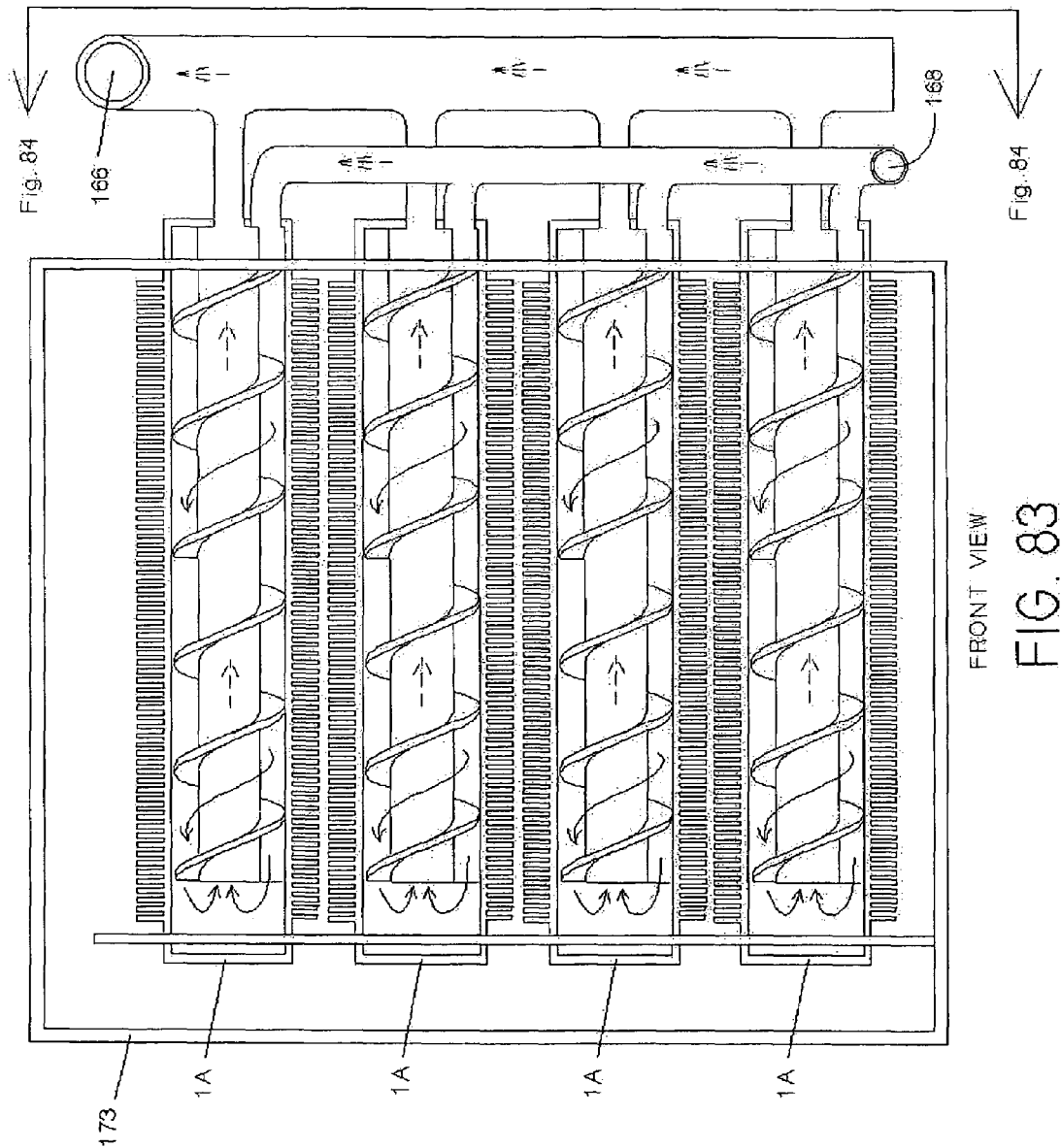
FIG. 83 is a front view of a plurality of coaxial-flow heat exchanging structure of the present invention installed in a pressure vessel used as an aqueous-based fluid-to-fluid, fluid to air, and/or refrigeration evaporator (chiller) or condensing heat exchanger (tube and shell heat exchanger).

As shown in FIG. 83, a plurality of coaxial-flow heat exchanging structures 1A are contained in a pressure vessel 173 which is used as an aqueous-based fluid-to-fluid, fluid to air, and refrigeration evaporator (chiller) or condensing heat exchanger (tube and shell heat exchanger) having a heat transfer fluid (i.e. refrigerant) inlet tube 168 and a heat transfer fluid (i.e. refrigerant) outlet tube 166.

Figure 84:
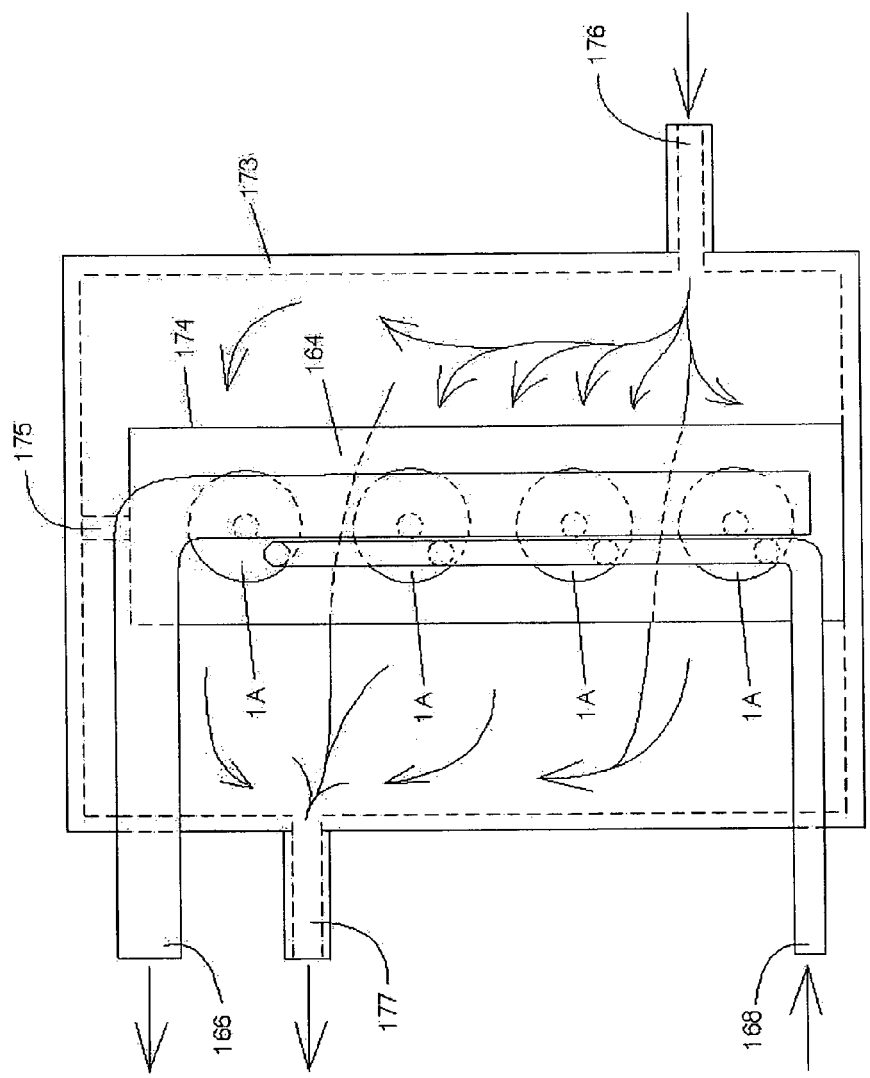
FIG. 84 is a right side view of a coaxial-flow heat exchanging structure of the present invention shown in FIG. 83.

As shown in FIG. 84, process fluid enters through inlet tube 176 to be heated or cooled as it passes by the fins of the coaxial-flow heat transfer structures 1A. The entering process fluid side of the pressure vessel is separated by the outlet side by separator plate 175. After passing over the fins of the coaxial-flow heat transfer structures the conditioned process fluid exits the assembly through tube 177. End plate 164 is welded to the pressure vessel along weld bead 174 to prevent leakage of the process fluid.

Figure 85:
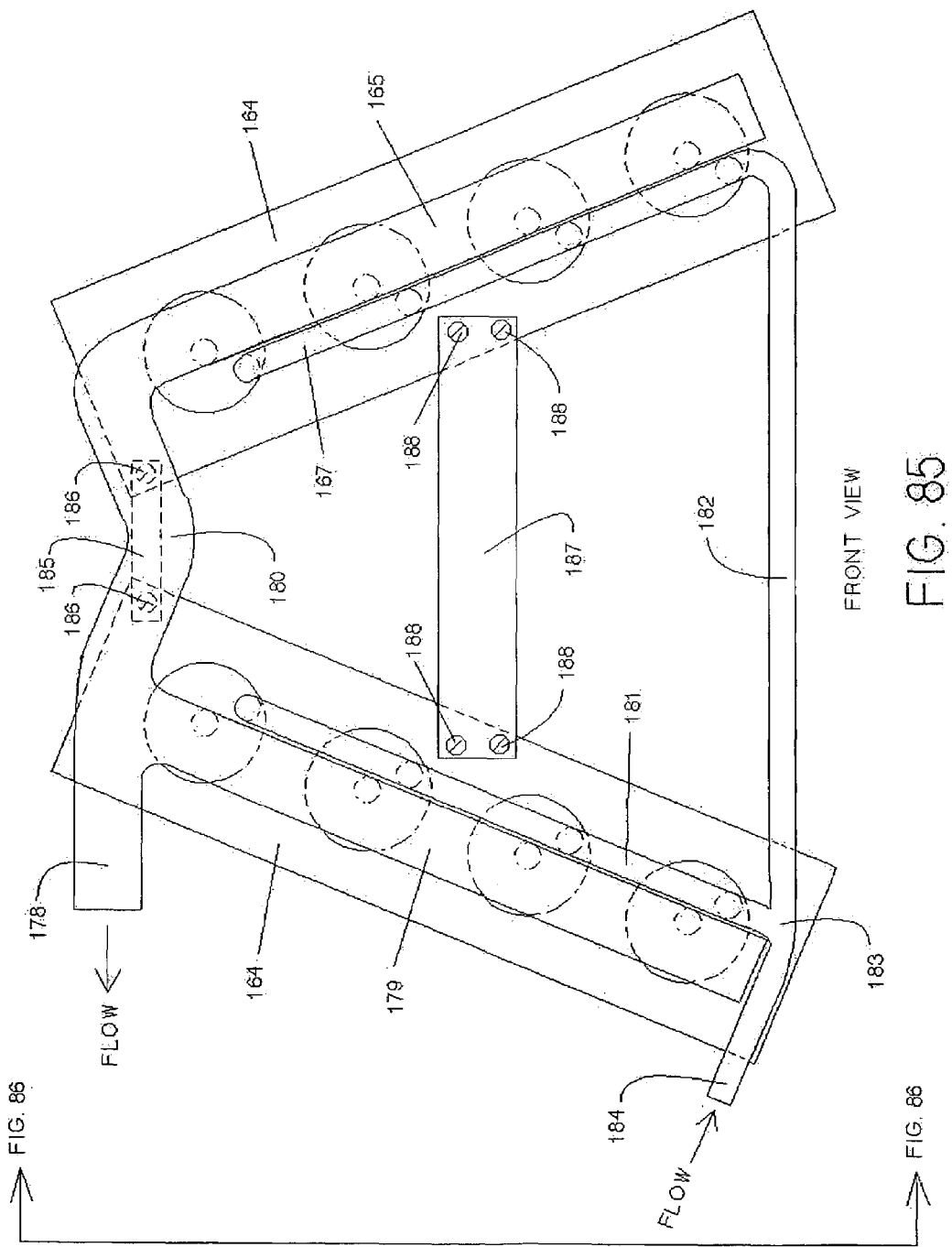
FIG. 85 is a front view of a plurality of coaxial-flow heat exchanging structures of the present invention shown used as an aqueous-based, fluid to air, refrigeration evaporator (chiller) or heat pump condensing heat exchanger.

In FIG. 85, two coaxial-flow heat transfer structures (functioning as horizontal heating and cooling coils) are connected together at an angle with brackets 185 and 187 which are secured to end plates 164 with screws (i.e. rivets or spot welding) 186 and 188. In this application, the heat exchanger (heating and cooling coil) is configured in an 'A' frame style. The two coaxial-flow heat transfer structure (i.e. horizontal heating or cooling coils) are connected/plumbed in a parallel configuration having both manifold tubes 165 and 179 connected together by tube 180 forming a common outlet connection providing a combined fluid flow through tube 178. Manifold tubes 167 and 181 are connected together with tube 182 at wye connector 183 providing combined flow of heat transfer fluid into tubes 167 and 181 from tube 184.

Figure 86:
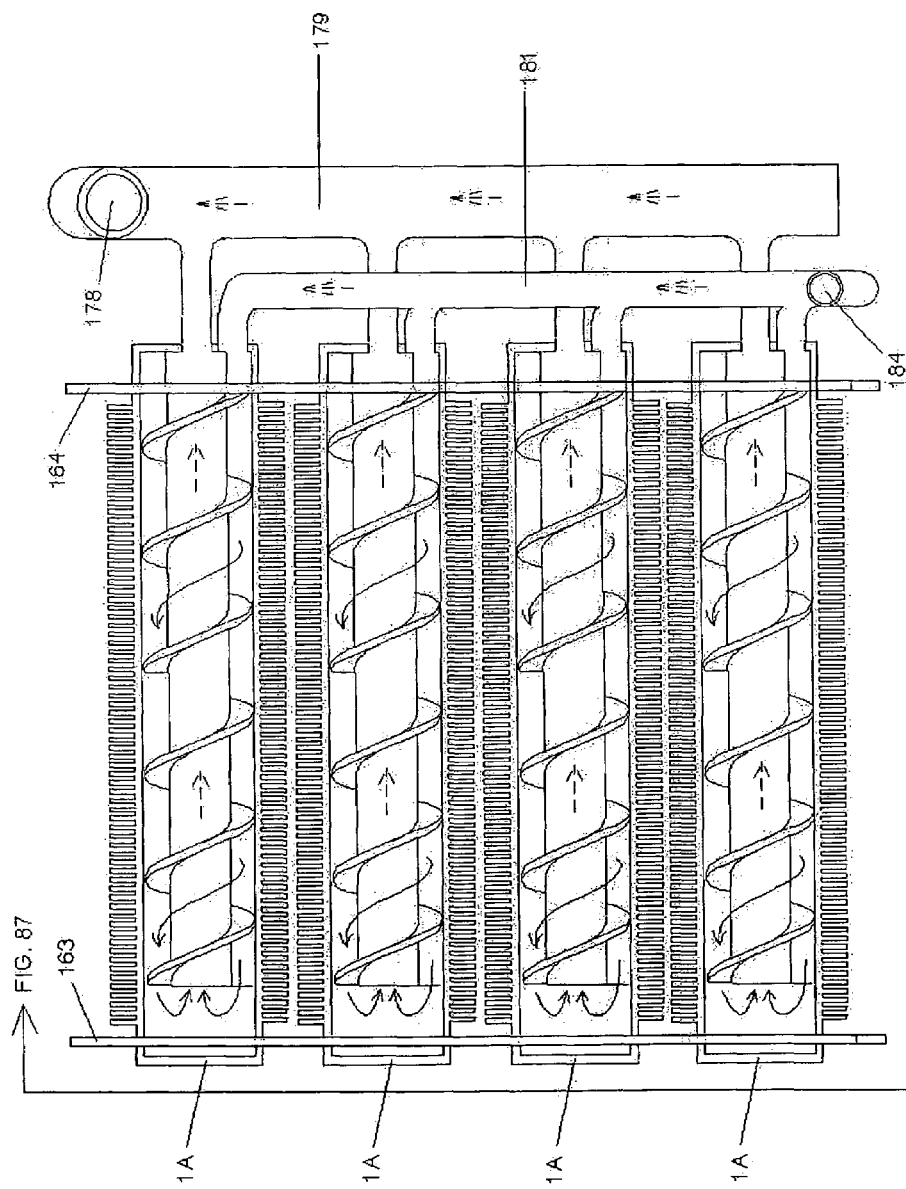
FIG. 86 is a side partially cross-sectional view of the aqueous-based fluid, and refrigerant evaporation based, fluid to air heat exchanger shown in FIG. 85, taken along line 86-86 therein. wherein the outer tubes are made of metal and are finned so as to provide maximum heat transfer with the ambient environment, which can be made of plastic containing heat transfer enhancing additives.

As shown in FIG. 86, an array of coaxial-flow heat transfer structures 1A of the present invention are assembled as components in the "A" style heating and cooling coil shown in FIG. 85. The coaxial-flow heat transfer structures are securely held in place by compression fitted or welded openings in end plates 163 and 164. The inner tube of each coaxial-flow heat transfer structure is connected to a manifold tube 179 to provide a heat transfer fluid flow through each coaxial-flow heat transfer structure 1A. Preferably, the heat transfer fluid flow is evenly distributed through each coaxial-flow heat transfer structure in the assembly. As shown, each coaxial-flow heat transfer structure flow channel is connected by an inlet manifold tube 181 having an inlet 184 to provide heat transfer fluid flow through each coaxial-flow heat transfer structure. Preferably the heat transfer fluid is evenly distributed through each coaxial-flow heat transfer structure in the assembly. While traveling through each flow channel, the heat transfer fluid can transfer heat into air, fluid or gases passing over fins attached to the outer tubes of the coaxial-flow heat transfer structures mounted in the assembly. The horizontal coaxial-flow cooling and heating coil of the present invention can be used to transfer heat into or out of air, fluid or gas passing over its external surfaces. The horizontal coaxial-flow cooling and heating coil of the present invention can also be used to transfer heat into or out of air, fluid or gas passing over it by circulating a or metered refrigerant into tube 184 provided the refrigerant can evaporate while passing through the coaxial-flow heat transfer structures 1A mounted in the assembly. The coaxial-flow heating or cooling coil of the present invention can be constructed of a variety of materials consisting of metallic and plastic components, considering compatibility of materials and heat transfer fluids.

Figure 87:
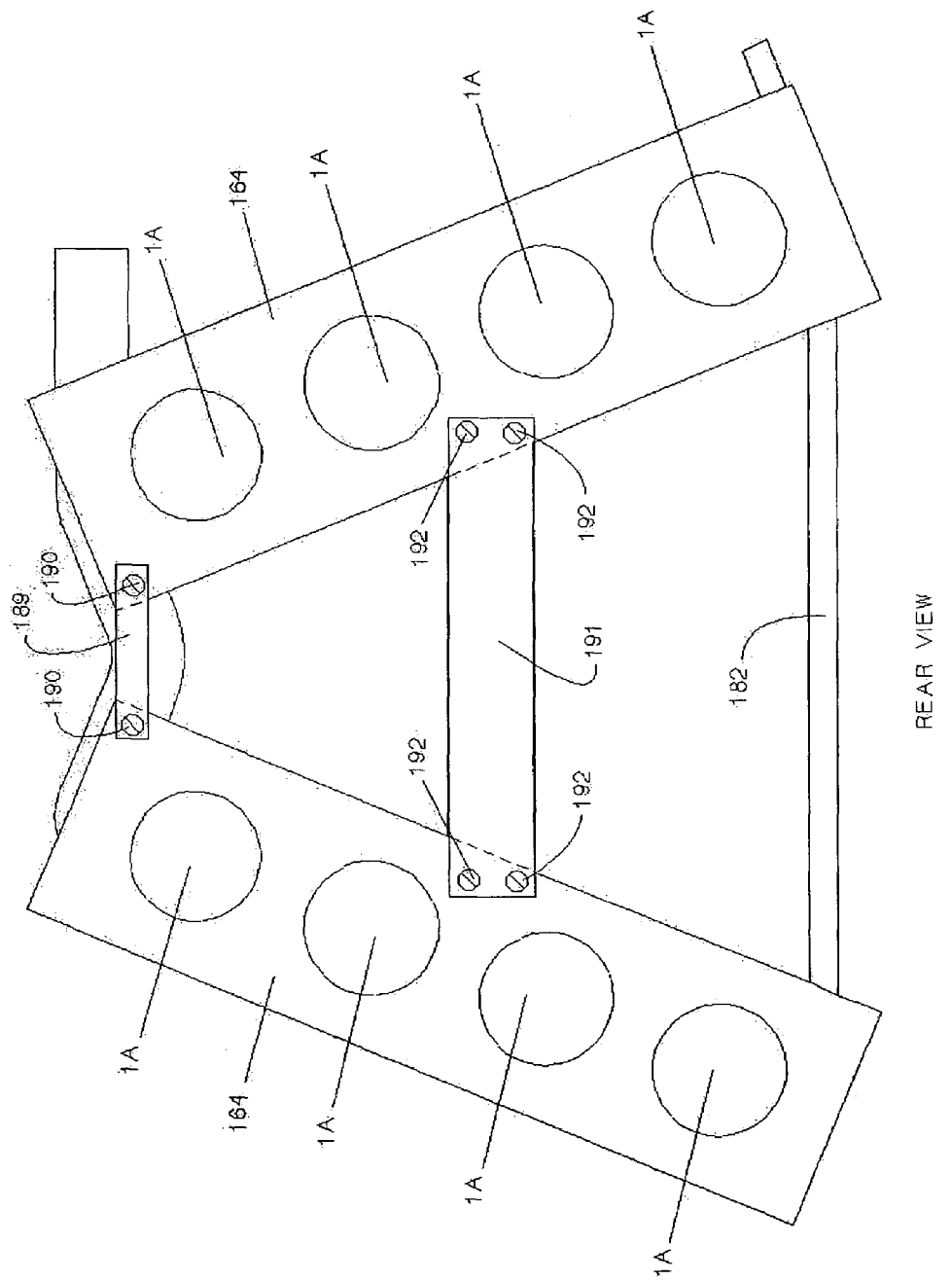
FIG. 87 is a rear view of the aqueous-based fluid, and refrigerant evaporation based, fluid to air heat exchanger shown in FIG. 86, taken along line 87-87 therein.

As shown in FIG. 87, the two horizontal cooling coils 199 are connected at an angle with brackets 189 and 191 which are secured to end plates 163 with screws (i.e. rivets or spot welding) 190 and 192.

Figure 88:
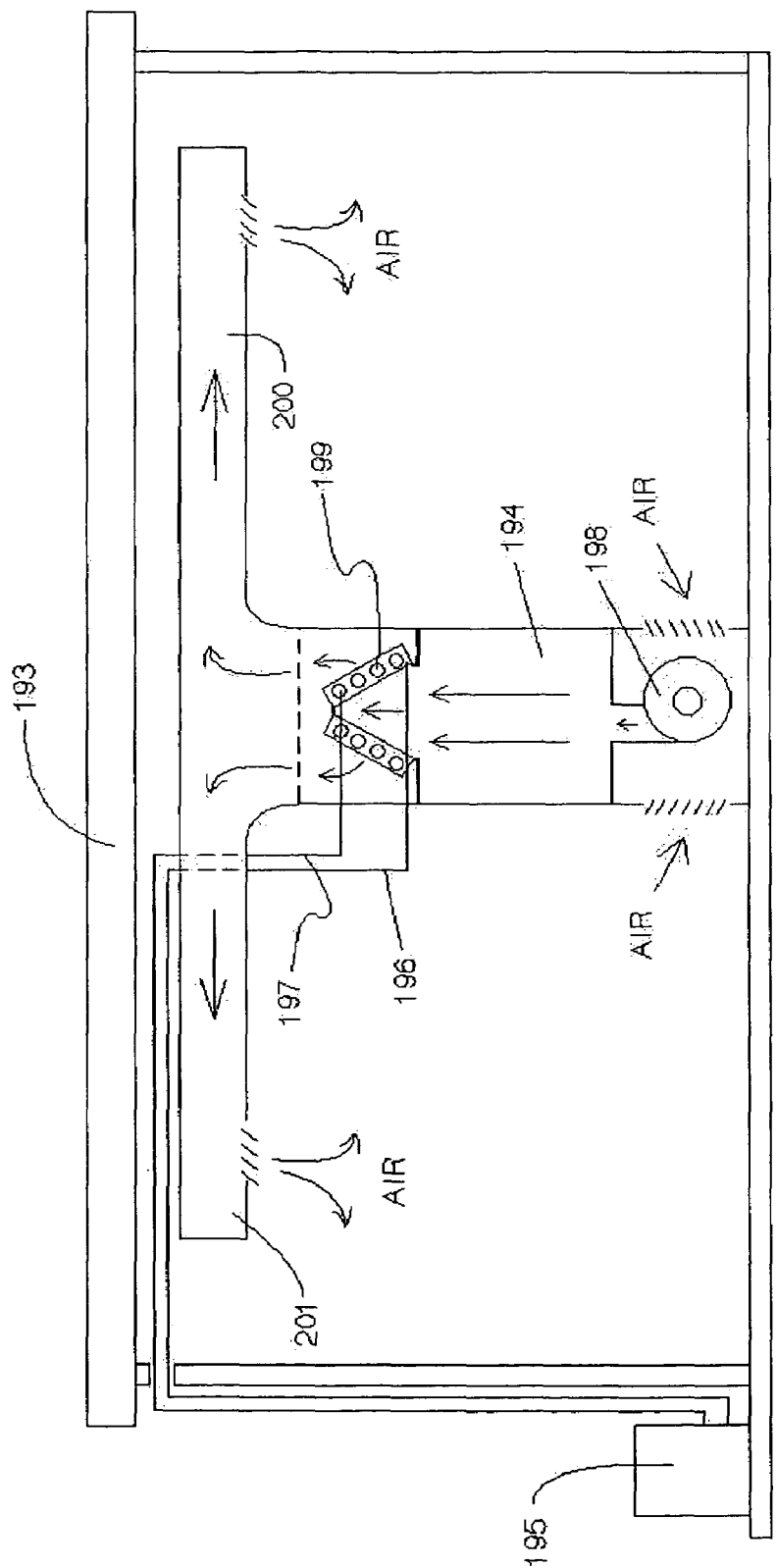
FIG. 88 is a schematic representation of a first application of a coaxial-flow heat exchanging structure of the present invention installed on the outlet of a furnace connected to an outdoor compressor based condensing unit or heat pump, and functioning as a refrigeration cooling coil or heat pump heating and cooling coil

In FIG. 88, a building 193 is shown with a central air conditioning system comprising an electric or gas furnace with an 'A' style heating and cooling coil 199 (as shown in FIG. 86 and 87) arranged in the air flow provided by blower 198. The air passing through the heating and cooling coil 199 is evenly distributed through air ducts 200 and 201. The outdoor aid condensing unit, (i.e. heat pump) is connected to the heating and cooling coil with a liquid refrigerant tube (high side line) 196 and a return tube (suction line) 197.

As taught in the above illustrative embodiments, the coaxial-flow heat exchanging structures of the present invention can be manufactured in various lengths, for example, in ten, twenty or thirty foot lengths, using plastic extrusion techniques, which are then joined and fused using various possible techniques (e.g. PVC cement, ultra-sonic welding, adhesive bonding using glue, etc.). However, in alternative embodiments of the present invention, the coaxial-flow heat exchanging structure of the present invention.

Figure 89:
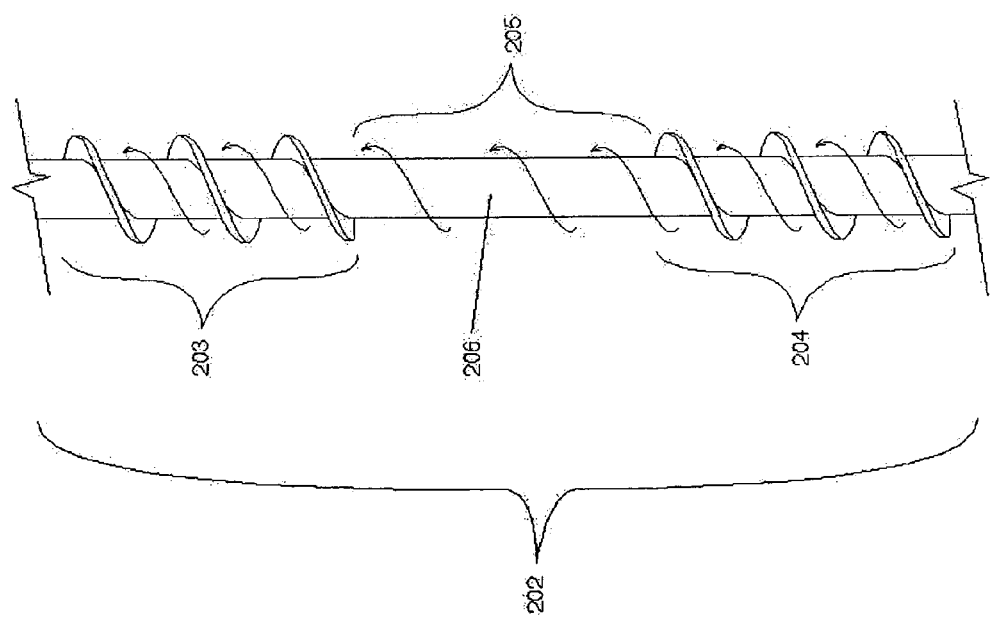
FIG. 89 is a schematic representation of the segmented helically-finned inner tube section, with integrated mixing zones, for installation in the outer tube sections of a coaxial-flow heat exchanging structure as shown in FIG. 90.

For example, as will be described in greater detail below, the helically finned inner tubing component, installed within the outer tube section of the coaxial-flow heat exchanging structure, can be manufactured as relatively short (single or multiple) fin segments that are then applied to the outer surface of flexible inner tubing, as shown in FIG. 89. Thereafter, the flexible tubing, with the applied helical fin segments, can be wound up on a storage spool, and subsequently removed and installed within the outer casing of the coaxial-flow heat transferring structure that has been installed within a bed of thermally conductive cement pumped into well bore at an installation site. Technical details of this embodiment of the present invention will be described hereinafter.

Figure 90:
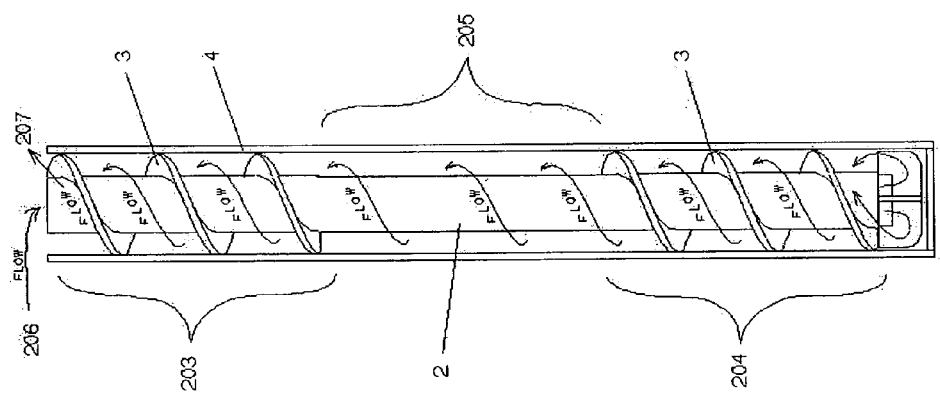
FIG. 90 is a cross-sectional view of the segmented helically finned inner tube section, with integrated mixing zones, installed in the outer tube sections of a coaxial-flow heat exchanging structure.

FIG. 89 shows a segmented helically-finned flexible inner tube section 206 employed in the outer tube section of the coaxial-flow heat exchanging structure of FIG. 90. Reference numeral 202 indicates the repeated segments of a single helically-extending fin structure, 203 and 204. Reference numeral 205 indicates the smooth section in the outer flow channel where the wakes of fluid flow, from each fin, mix before being cut once again by the next set of fins. The segmented helical fins allow the fluid flow to transition from laminar to turbulent-like flow at lower Reynolds numbers, while moderately increasing heat transfer and friction pressure drop. Preferably, the dimensionless twist ratio, y, of the fins should range from about 2 to 8, while the dimensionless spacing ratio, z, of the fins should range from about 2 to 10. In the illustrative embodiments, calculations indicate that the segmented fins should enhance heat transfer by a factor of about 1.1 to 1.5, while increasing the friction pressure drop by a factor of about 1.2 to 1.9 when compared to a continuous helical fin type center tube.

To create a stabilized helical flow within a coaxially-extending outer flow channel, the fluid should preferably travel at least ½ rotation or 180 degrees per linear foot of fluid travel. For a large diameter outer tube section, the number of fins used in the outer flow channel is selected so the slot width to depth ratio ranges from about 1.0 to 3, while the slot length to depth ratio ranges from about 1.5 to 6. Otherwise, too few fins or too many fins create laminar slot flow having minimal or no rotational component, providing additional friction pressure drop, and offering minimal heat transfer enhancement.

FIG. 90 shows the segmented helically-finned inner tubing section 2 installed in outer tube section (i.e. casing) 4 of the coaxial-flow heat exchanging structure of FIG. 1. Reference numerals 203 and 204 indicate the enhanced heat transfer zones of the outer tube 4, while reference numeral 205 indicates the remixing zone provided within the heat transfer structure of the present invention. The mixing zone allows the core fluid in the slot between the helical fins 3 to mix with the fluid that contacts the wall of the outer tube section 4, thus increasing heat transfer. Reference numeral 206 indicates the fluid entering the insulated inner tubing section 2, whereas reference numeral 207 indicates the fluid exiting the helically-extending outer flow channel.

Figure 91:
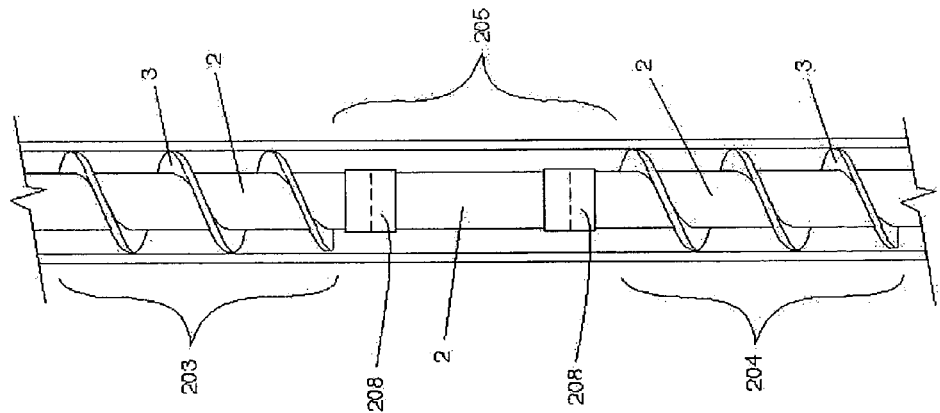
FIG. 91 is a schematic representation of a coaxial-flow heat exchanging structure as shown in FIG. 90, wherein its segmented helically-finned inner tube sections, with fluid mixing zones formed therebetween, are realized using tube segments made of extruded pieces that are joined together by plastic couplings that are glued or welded together.
Figure 92:
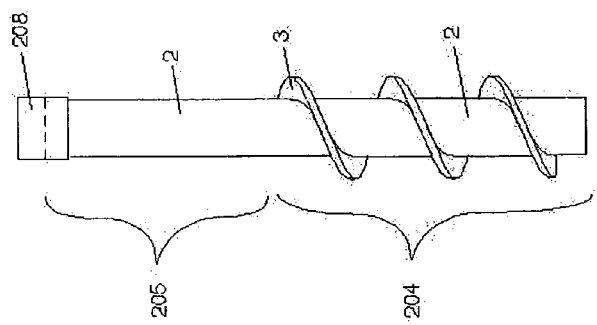
FIG. 92 is a schematic representation of a segment of a coaxial-flow heat exchanging structure, wherein it has one segmented helically-finned inner tube section on one end, and one fluid mixing zone formed on the opposite end, wherein the extruded pieces are joined together by plastic couplings that are glued or welded together.

FIGS. 91 and 92 shows an example of segmented helically-finned inner tubing where the segments 203 and 204 are made from extruded pieces of plastic material. This construction method is suited for large diameter thermal storage well bores where the tubing or hose cannot be rolled onto a spool. FIG. 91 shows separate extrusions for the finned 203 and 204 and smooth inner tube sections 2, while FIG. 92 shows an integral smooth 205 and finned section 204. Reference numerals 203 and 204 indicate the single helically-finned inner tube section, while reference numerals 2 and 205 indicate the smooth section thereof. Reference numeral 208 indicates the threaded or slip couplings used to join the insulated inner tube sections 203, 2 and 204 together. The couplings can be glued or plastic welded together. Segments shown in FIG. 91 and 92 can be made of a metallic material and welded or threaded together to length.

Figure 93:
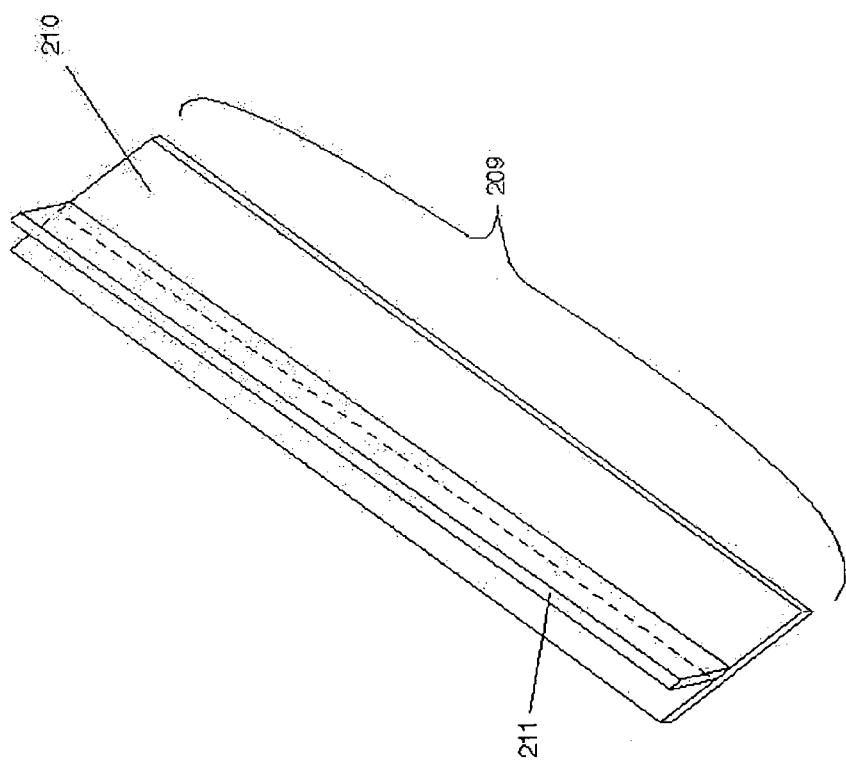
FIG. 93 is a schematic representation of a wrap-around type single fin segment that can be applied about a section of flexible or rigid (inner) tubing so as to realize the helically-finned inner tube sections employed in the coaxial-flow heat exchanging structure of FIG. 96.
Figure 96:
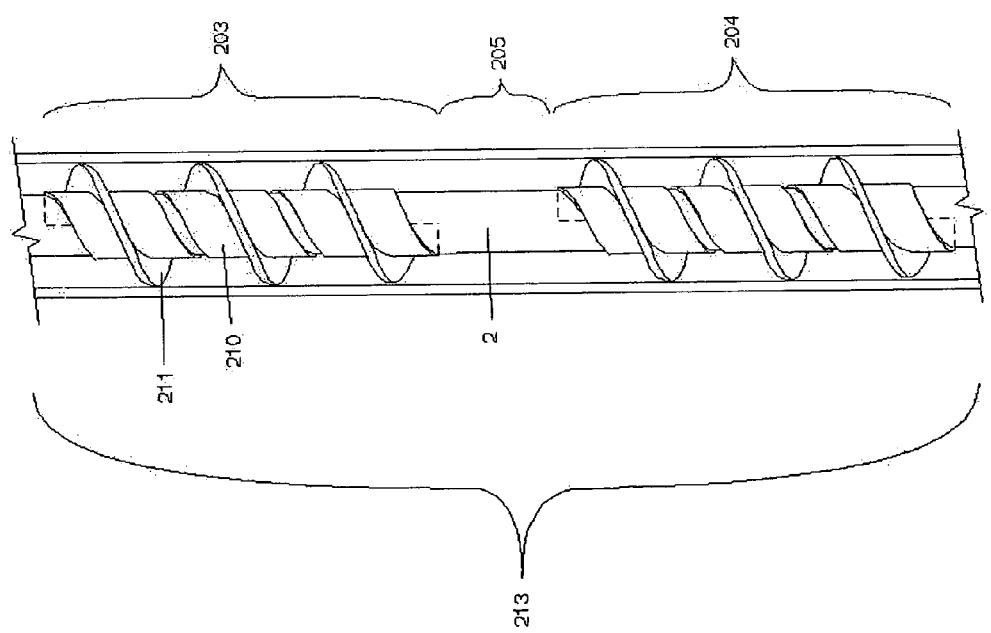
FIG. 96 is a schematic cross-sectional view of the segmented helically-finned inner tube section shown installed within thermally-conductive outer tube sections of the coaxial-flow heat exchanging structure, so that a mixing zone is provided for turbulently mixing the heat exchanging fluid flowing along the helically-extending outer flow channel, to break up boundary layers that may form on the wall surfaces of the outer flow channel, thereby increasing the efficiency of the system to exchange heat energy with the ambient environment.

FIG. 93 shows that the single wrap-around single fin 211 and its integrated base layer 210 can be extruded flat and parallel while heated to its plastic point, and then wrapped around a mandrel so as to give the fin a helical pitch to match the tubing or hose size to be employed within a coaxial-flow heat exchanging structure as shown in FIG. 96. Reference numeral 209 represents the cut length of the segment to be shaped. Preferably, the diameter of the plastic fin shaping mandrel should be about 5-10% smaller than the smallest installed inner tubing or hose in the field because air gaps prevent good glue adhesion. If the fin is made of metal, then the mandrel should be about 5% larger than insulated tubing and it should be tack welded to the tubing wall.

Figure 94:
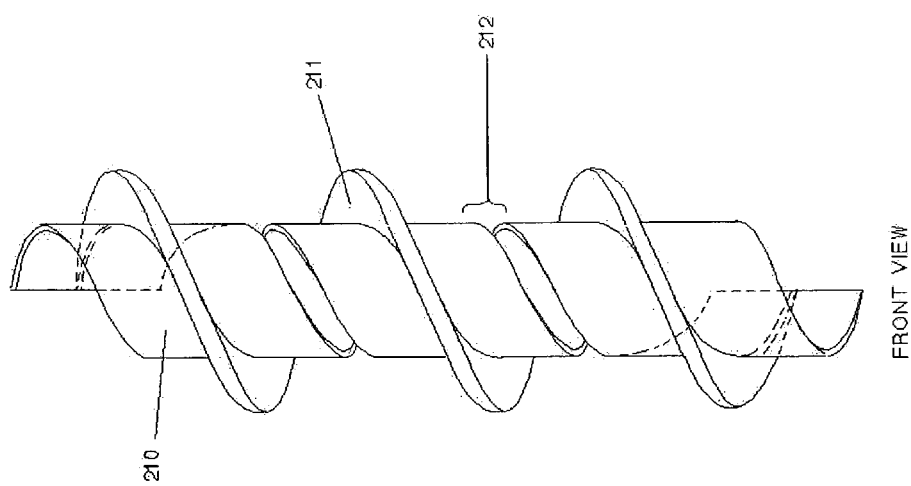
FIG. 94 is a schematic representation of a wrap-around type single fin segment shown as it would appear wrapped in one direction about a section of flexible or rigid (inner) tubing so as to realize the helically-finned inner tube sections employed in the coaxial-flow heat exchanging structure of FIG. 96.

FIG. 94 show a wrap-around single fin segment for application about a section of flexible tubing or hose to be used to realize the insulated helically-finned inner tubing component employed in the coaxial-flow heat exchanging structure of FIG. 89. The single fin 211 and base 210 are adapted for flexing due to the gap indicated by reference numeral 212. The fin can be glued or plastic welded to a hose to prevent movement during installation and use. With this design, the flexible hose with fins can be spooled for shipment to the installation site and unspoiled without damage to the fin shape during installation.

Figure 95:
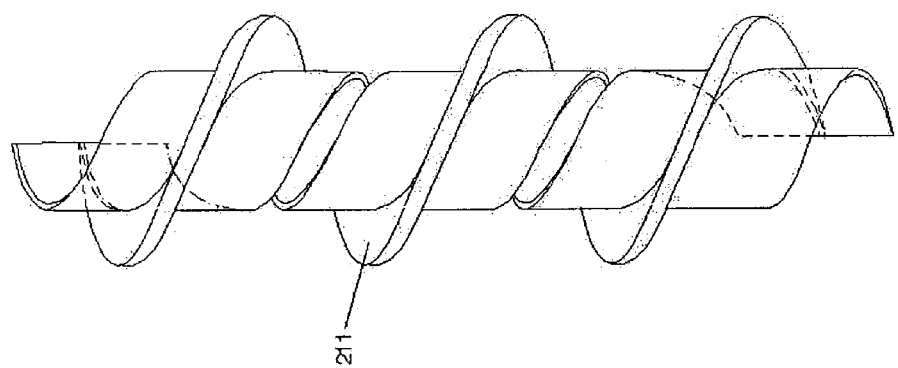
FIG. 95 is a schematic representation of a wrap-around type single fin segment shown as it would appear wrapped in the opposite direction as shown in FIG. 95 about a section of flexible or rigid (inner) tubing so as to realize the helically-finned inner tube sections employed in the coaxial-flow heat exchanging structure of FIG. 96.

FIG. 95 is a wrap-around segment shown in FIG. 93 and 94 but with wrapped twist in the opposite direction around the tubing or hose.

FIG. 96 shows a length 213 of segmented coaxial-flow heat transfer center tube and helically extended finned 211, single wrap-around fin segments 210 creating a mixing zone 205 between turbulent zones 203 and 204 applied on a section of inner tubing or flexible hose 2 installed in a section of outer tube (i.e. casing). The fin segment 210 can be glued or plastic welded to the flexible hose and rolled on a spool for installation in the field.

Figure 97:
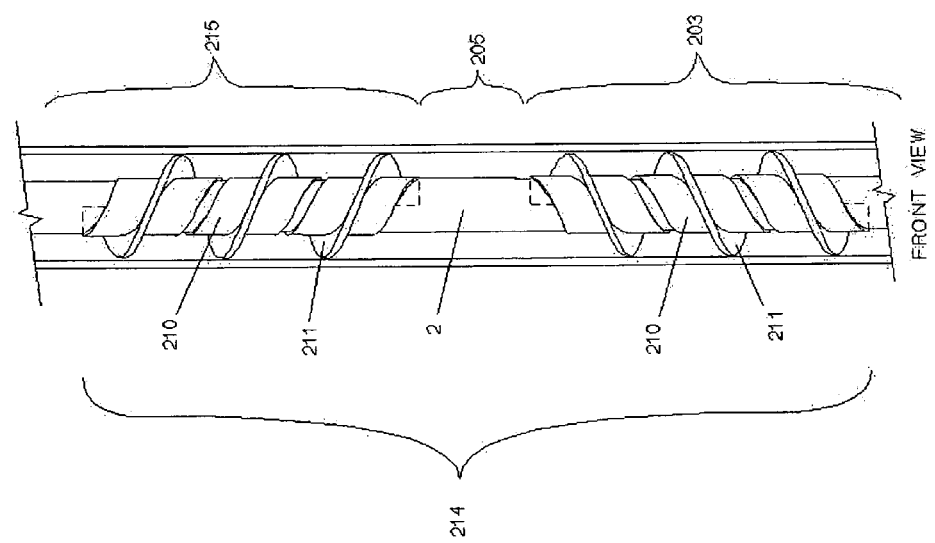
FIG. 97 is a cross-sectional view of an alternative illustrative embodiment of the coaxial-flow heat exchanging structure of the present invention, wherein a segmented, helically-extending finned inner tube sections having alternating left and righted handed twists are installed within thermally-conductive outer tube sections of the coaxial-flow heat exchanging structure, so that a mixing zone is provided for turbulently mixing the heat exchanging fluid flowing along the helically-extending outer flow channel, to break up boundary layers that may form on the outer channel wall surfaces, and thereby increasing the efficiency of the system to exchange heat energy with the ambient environment.

FIG. 97 shows a wrap-around single fin segment 210 having a left hand twist, in comparison with a right hand twist, provided to the wrap-around fin segment shown in FIG. 96. The alternating left and right hand twist combination shown in FIG. 97 is used for large thermal well bores, or where the fluid has a high viscosity or where a laminar flow regime exists in the outer flow channel and should be turbulently disrupted.

Figure 98:
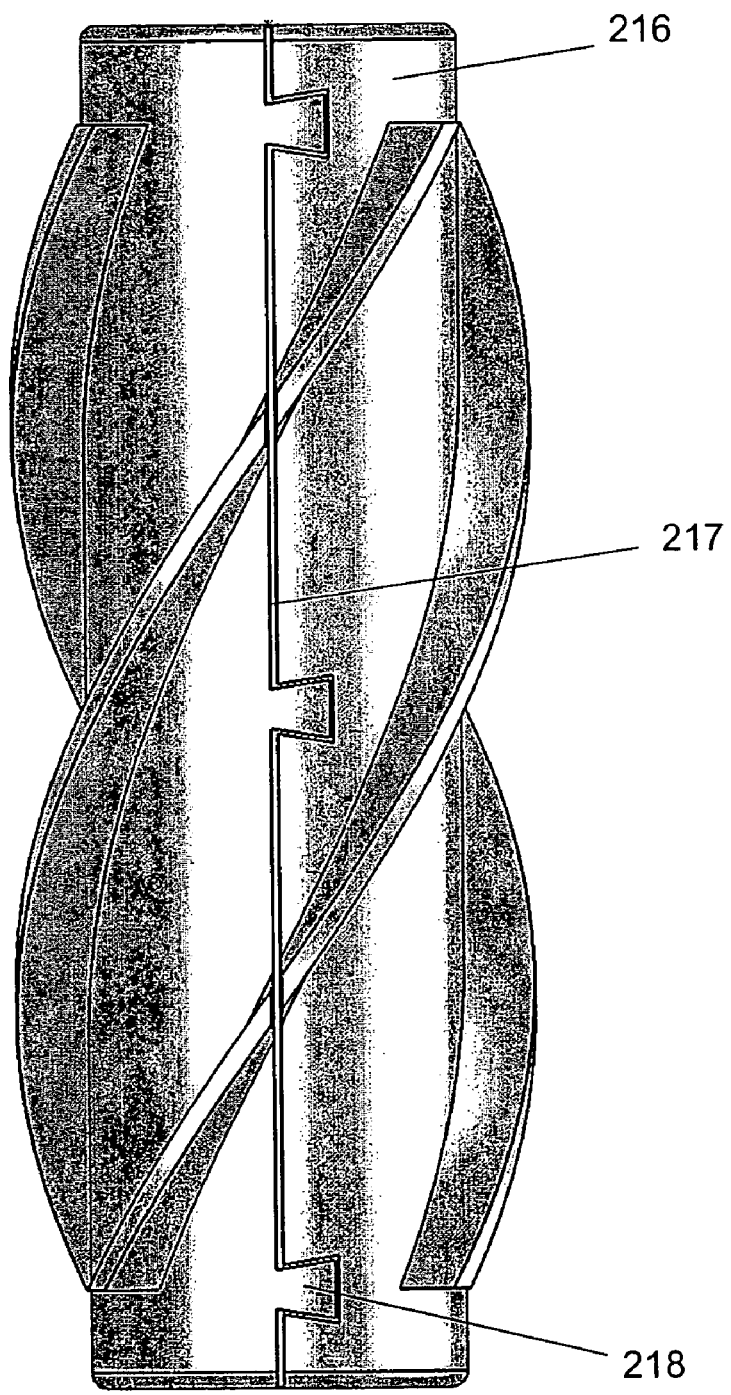
FIG. 98 is a perspective view of the wrap-around single fin segment with its integrated base layer that has been extruded flat and parallel while heated to its plastic point, wherein the segment can be wrapped around a mandrel so as to provide the fin with a helical pitch to match the tubing or hose size to be employed within a coaxial-flow heat exchanging structure as shown in FIG. 90.

FIG. 98 shows an elevated side view of a multiple-finned segment applied about a section of inner tubing or hosing to be used to realize the thermally-insulated helically-finned inner tubing component employed in the coaxial-flow heat exchanging structure of FIG. 96. As shown, the glued-on segment is used for small annular widths where the single fin segment could not create helical flow for enhanced heat transfer. The small annular widths are required for minimum flow velocity when low flow rates are used in large diameter thermal storage wells or when fluids have high viscosity. As shown, reference numeral 216 shows the flexible base, while reference 217 points to the glue seam. Reference numeral 218 points to the tab and slot used to snap together the segment on the inner tube or hosing section during the gluing or welding procedure.

Figure 99:
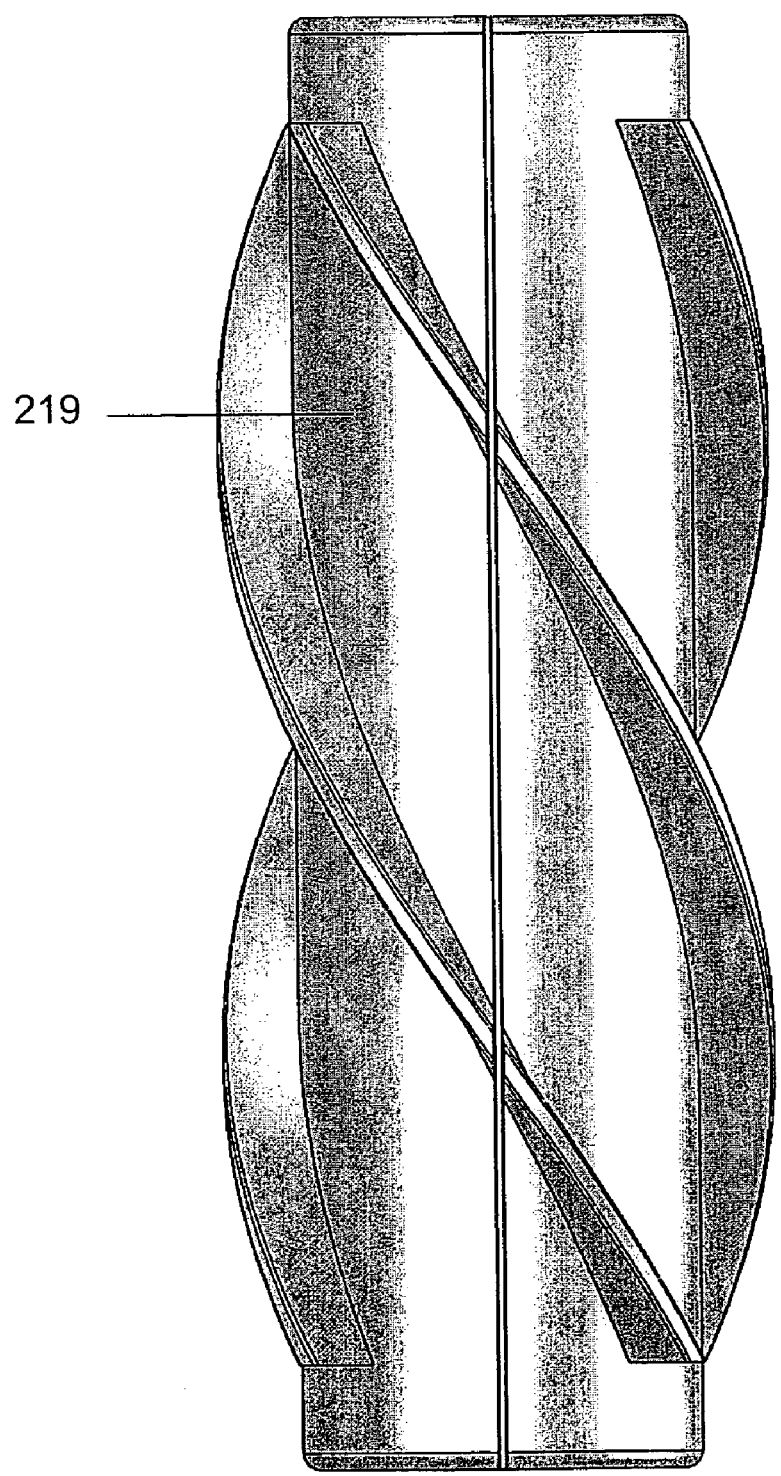
FIG. 99 is a side view of a wrap-around single fin segment having a left hand twist—in comparison with a right hand twist—provided to the wrap-around fin segment shown in FIG. 98.

FIG. 99 shows a segment 219 like the one shown in FIG. 98 except segment 219 has no tab and slot shown in FIG. 98. The removal of the tab and slot can facilitate the high speed welding of numerous segments onto the surface of rolled tubing by an automatic welding machine shown in FIG. 104.

Figure 100:
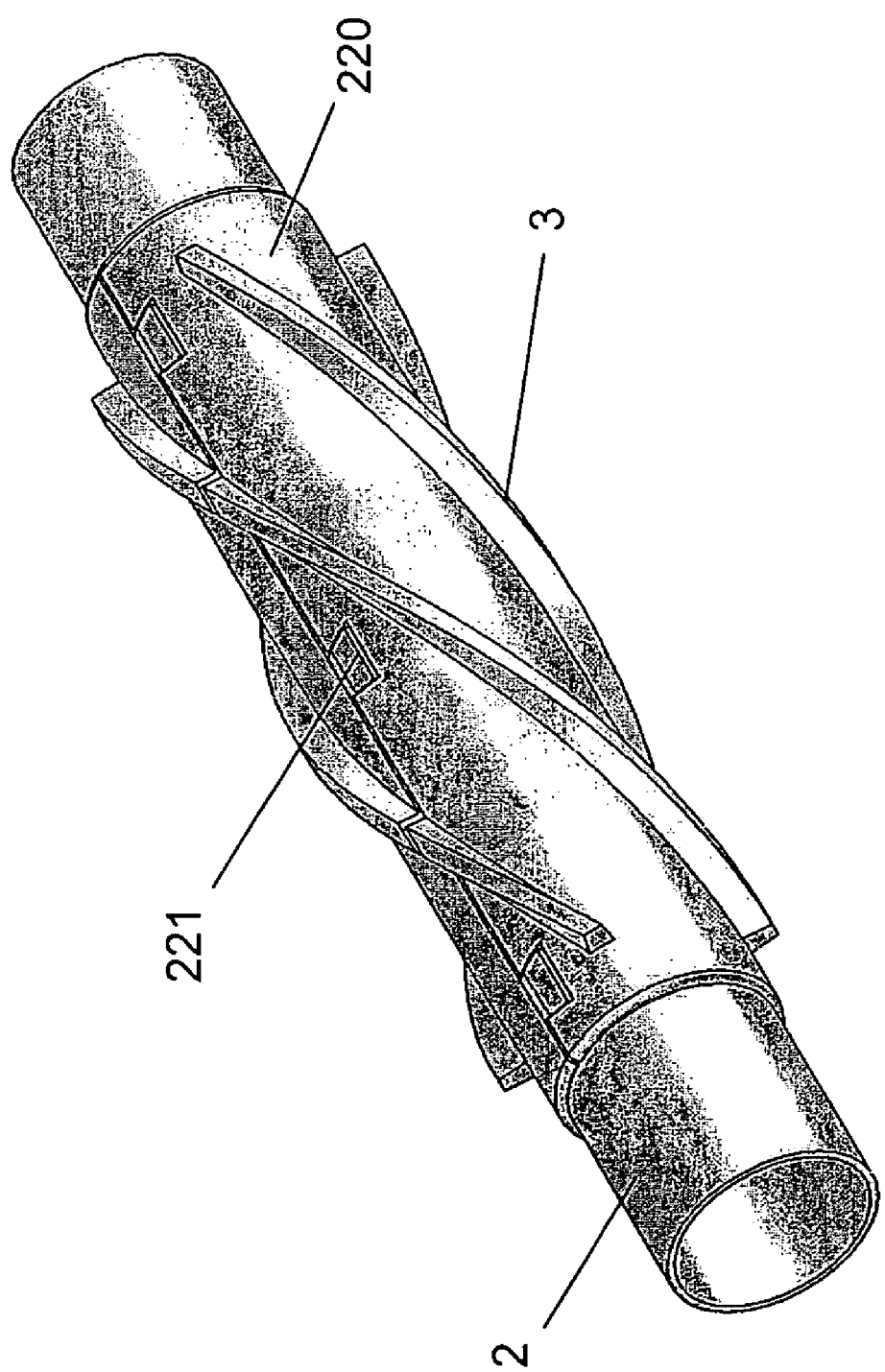
FIG. 100 is a schematic representation of a segmented helically-finned inner tube section employed in the coaxial-flow heat transfer structure of FIG. 90.

FIG. 100 shows a multiple-finned segment applied about a section of inner tubing or hosing 2 to be used to realize the thermally-insulated helically-finned tubing component employed in the coaxial-flow heat exchanging structure of FIG. 96. Reference numeral 220 indicates the flexible plastic base while 3 indicates the smooth fin wall. If tall fins are used, then there can be some buckling of the fin wall when the segment is wrapped around the inner tube or hose section if the storage spool is too small in diameter. Reference numeral 221 indicates the tab and slot used to snap together the opposing ends of the multi-finned segment.

Figure 101:
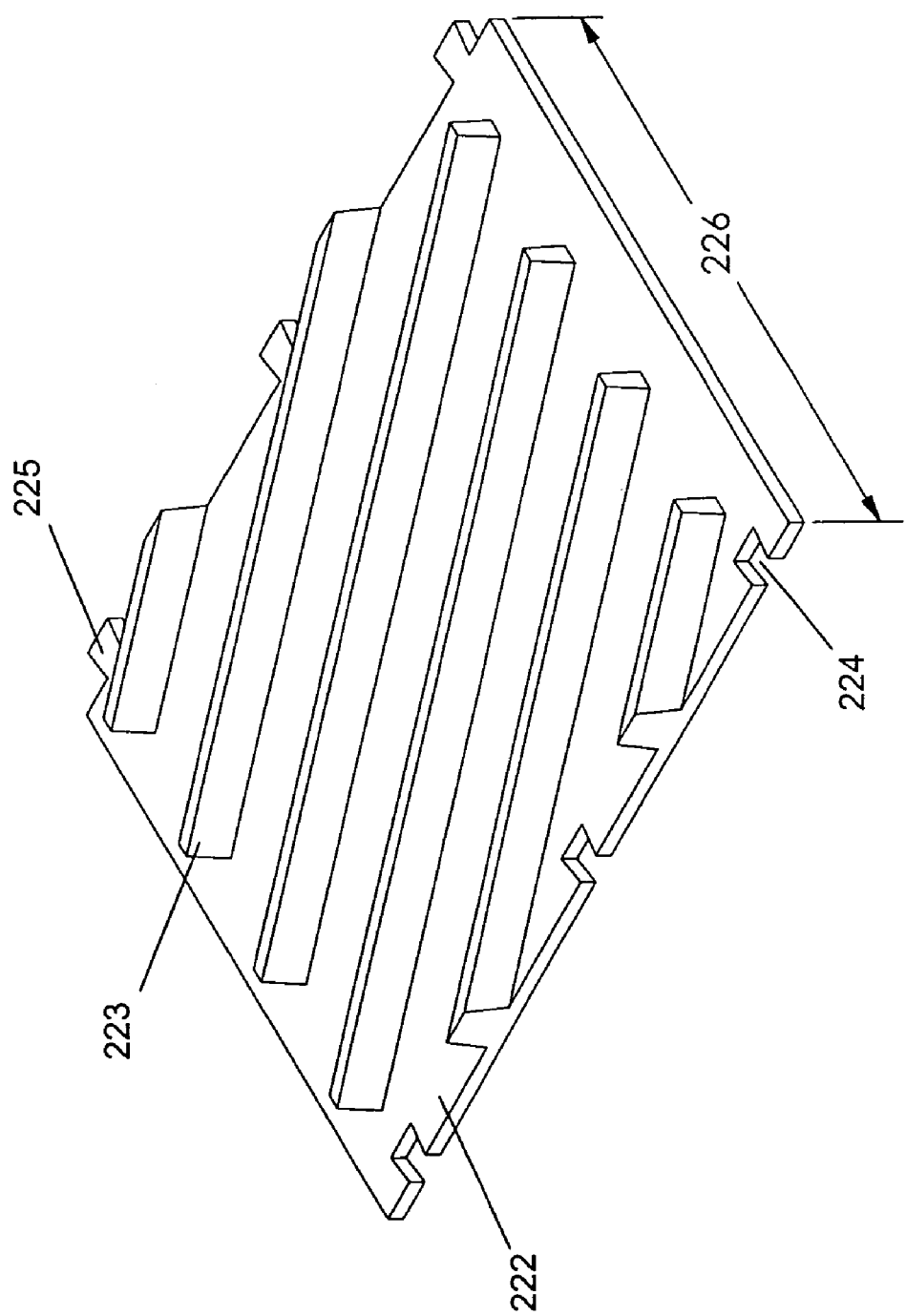
FIG. 101 is a plan view of a molded or extruded multiple-finned segment, shown prior to configuration about inner tube sections installed within a coaxial-flow heat exchanging structure as shown in FIG. 102.
Figure 104:
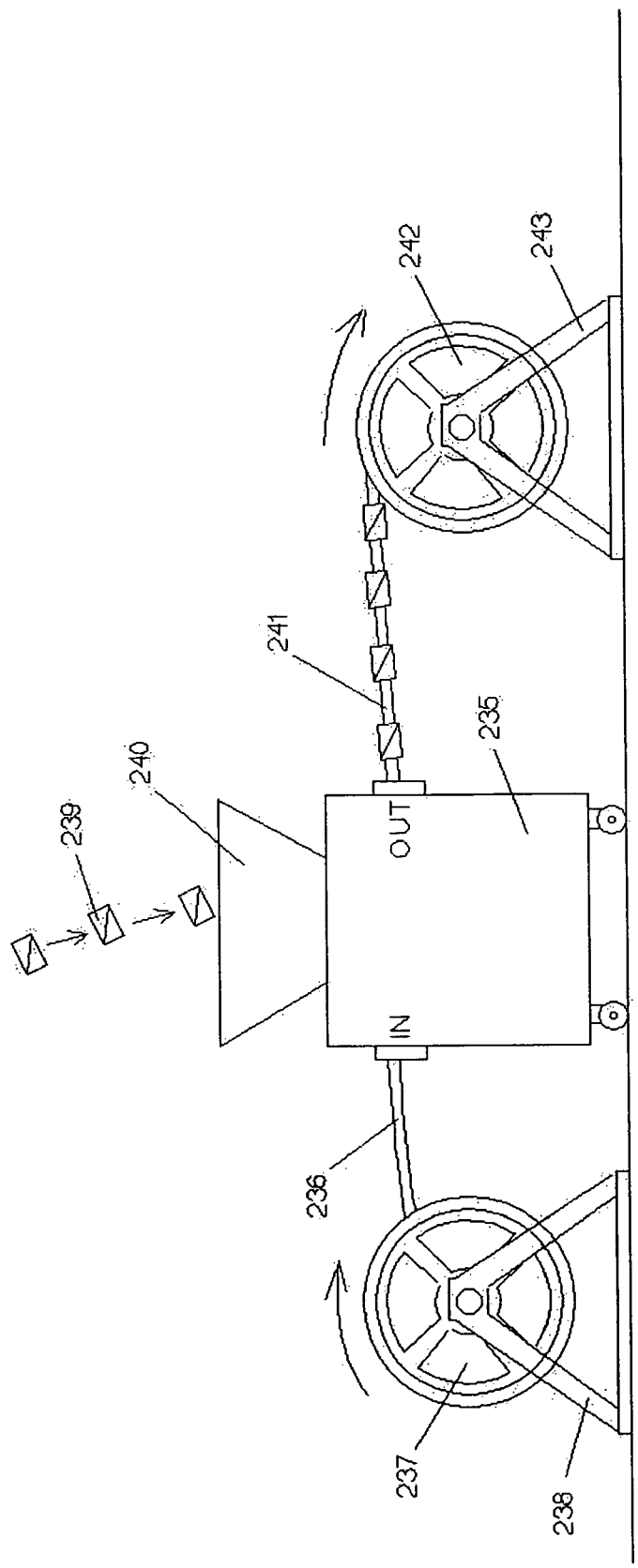
FIG. 104 is a schematic representation of a machine designed to automatically attach single or multi-finned segments onto the outer surface of flexible tubing as the tubing is being rolled off a support spool, and for the assembled finned tubing structure to then be rolled up onto a storage spool for subsequent transport to a site where coaxial-flow heat transfer structures are to be constructed in accordance with the present invention.

FIG. 101 shows a molded or extruded multiple-finned segment employed within a coaxial-flow heat exchanging structure as shown in FIG. 96. As illustrated, this segment is provided with a number of fins after it has been molded or cut from a continuous sheet. Reference numeral 222 indicates the flexible base, whereas reference numeral 223 indicates one of the fins. Reference numerals 224 and 225 point to the tab and slot used to join together the edges while the segment is glued to the outer surface of the inner tube section. Unlike the single fin segment as shown in FIG. 93, the multiple-finned segment length 226 is plus or minus 2 percent for the outside diameter of the inner tubing section that it will be glued to in the field or mechanically as shown in FIG. 104. For factory created multiple-finned segmented inner tube sections, the base of each segment can be straight cut without gluing tabs, as shown in FIG. 99, to length from a roll of molded material and plastic welded to the flexible inner tubing.

Figure 102:
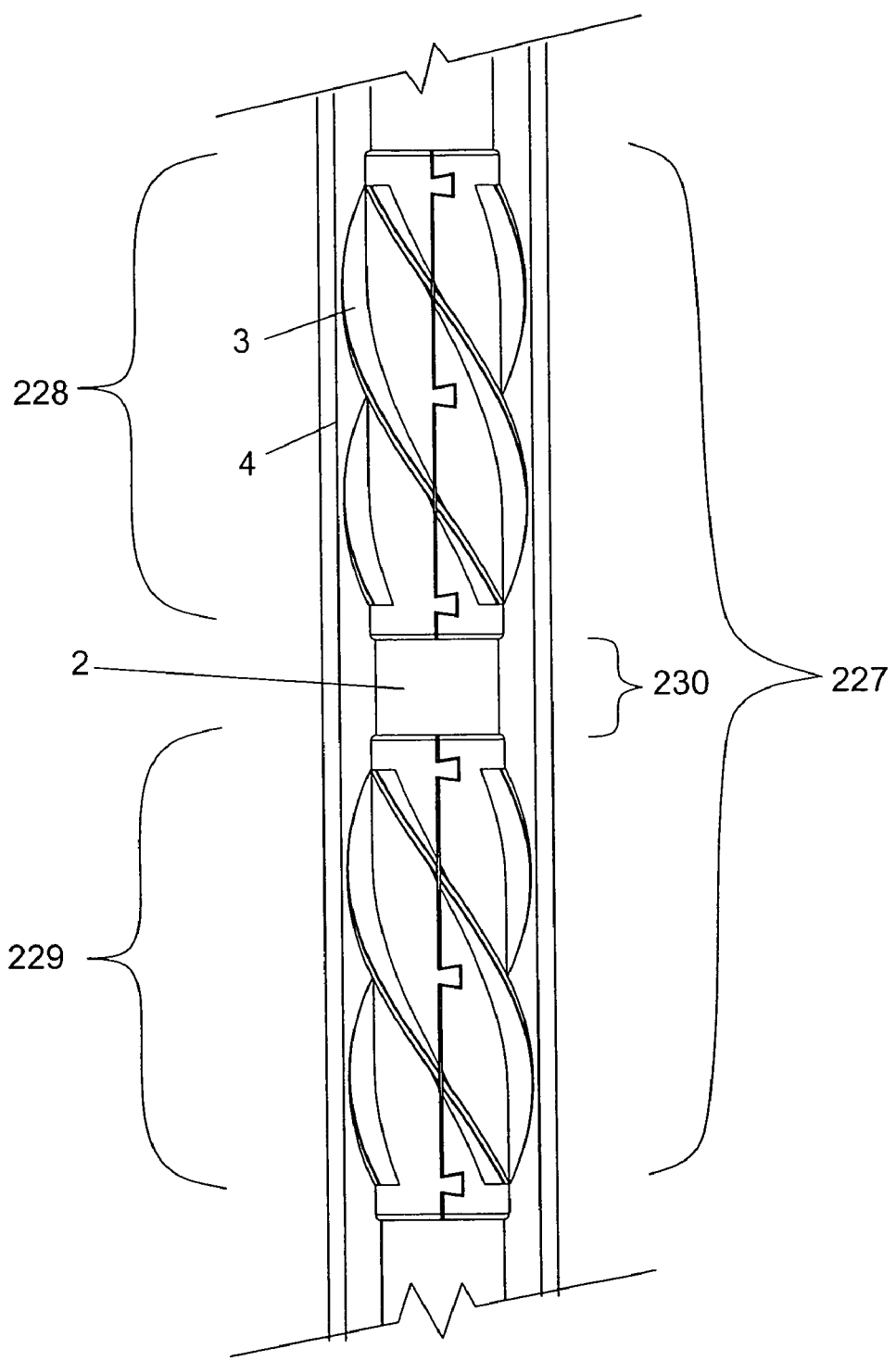
FIG. 102 is a side partial cross-sectional view of the coaxial-flow heat exchanging structure of the present invention constructed from single fin segments installed on one or more inner tube sections contained within the outer tube (i.e. outer casing), and provided with a re-mixing zone between helical fin segments for the turbulent mixing of heat exchanging fluid along the helically extending outer flow channel.

FIG. 102 shows a cross-sectional view of the coaxial-flow heat exchanging structure of the present invention employing segmented-type single helically-extending fin segments, as shown in FIG. 98, installed on the surface of an inner tube section 2. As shown, the finned inner tube section is installed within a thermally-conductive outer tube section (i.e. casing) 4, that has been cemented within a well bore, and a re-mixing zone 230 being provided between its helically-extending outer flow channel. Reference numerals 228 and 229 indicate the segment lengths, while reference numeral 230 indicates the spacing length of the fluid re-mixing zone. As shown, the base 222 from which fin 213 extends is glued to the outer surface of inner tube section 227. For similar fin pitch and number, the extruded segmented fins in FIG. 98 and flexible segmented fins in FIG. 102 should demonstrate substantially the same fluid heat transfer performance through the outer wall of the outer tube section.

Figure 103:
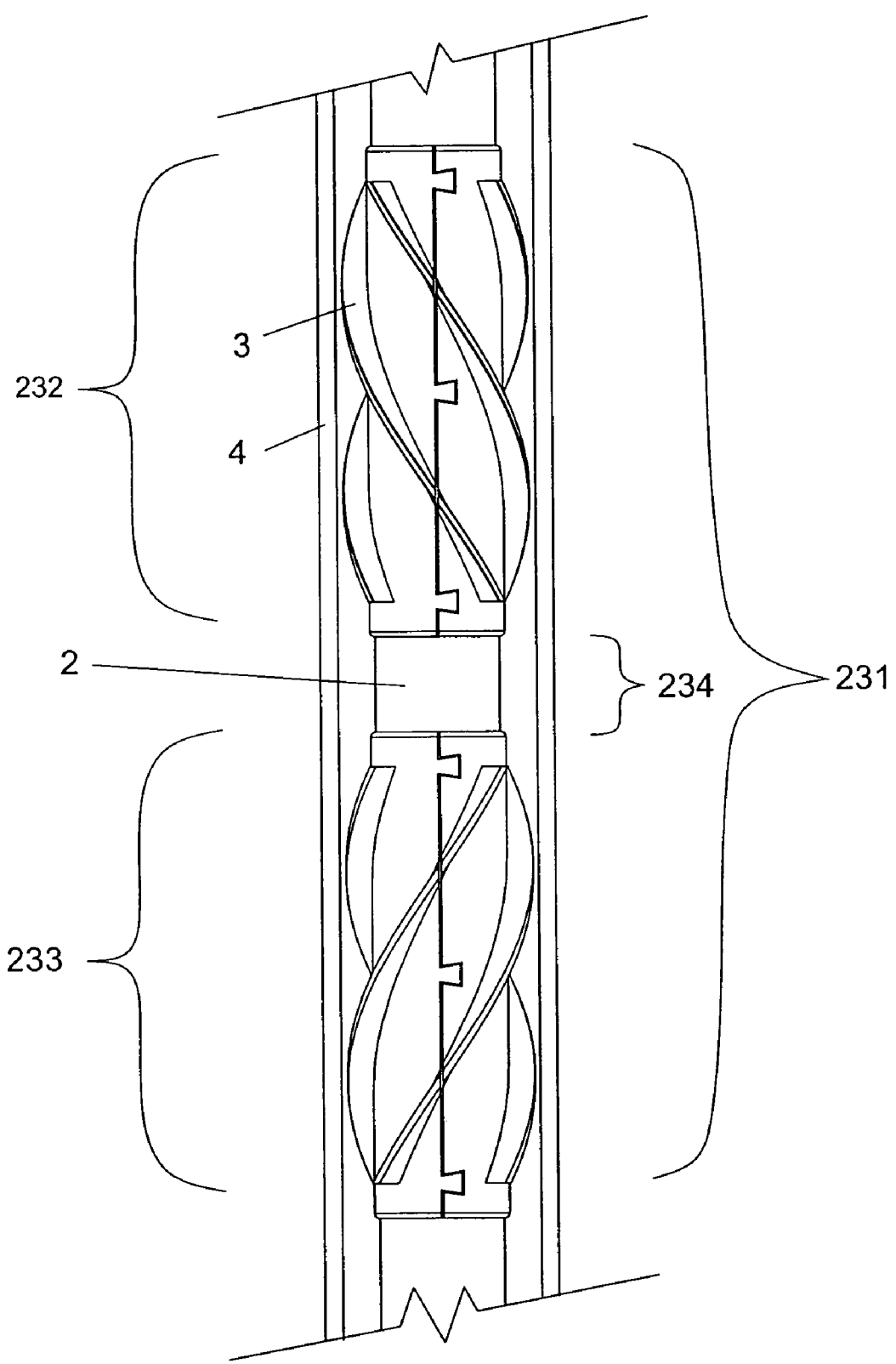
FIG. 103 is a side, partial cross-sectional view of the coaxial-flow heat exchanging structure of the present invention employing segmented single fin segments, having alternating left and righted handed twists, installed on a inner tube sections contained within the outer tube sections of the structure, and providing a re-mixing zone between helical fin segments for the turbulent mixing of heat exchanging fluid along the helically-extending outer flow channel.

FIG. 103 shows the coaxial-flow heat exchanging structure of the present invention employing segmented single fin segments having alternating left and righted handed twists. As shown, the helically-finned inner tube section 231 is installed within the outer tube section 4, and a re-mixing zone 234 provided along the helically-extending outer flow channel. The spacing length of the remixing zone is indicated by reference numeral 234. As shown, reference numerals 232 and 233 indicate the right and left handed twist fins. This arrangement is used for enhancing heat transfer in large-diameter outer tubes, with low-velocity laminar flow or highly viscous flow characteristics in the helically-extending outer flow channel. This arrangement can be also used to enhance heat transfer in short metal pipe runs along beaches, river banks and shores where there is natural water movement in the soil to remove the heat from the near well bore area.

FIG. 104 shows a machine 235 designed to automatically attach single or multi-finned segments 239, fed into machine 235 through bin 240 onto the outer surface of flexible inner tubing 236 as the inner tubing is being rolled off a spool 237 supported on a stand 238. As shown, the assembled segmented finned tubing structure 241 is then rolled up onto a storage spool 242 supported by stand 243, for subsequent transport or shipment to a well site.

Figure 105:
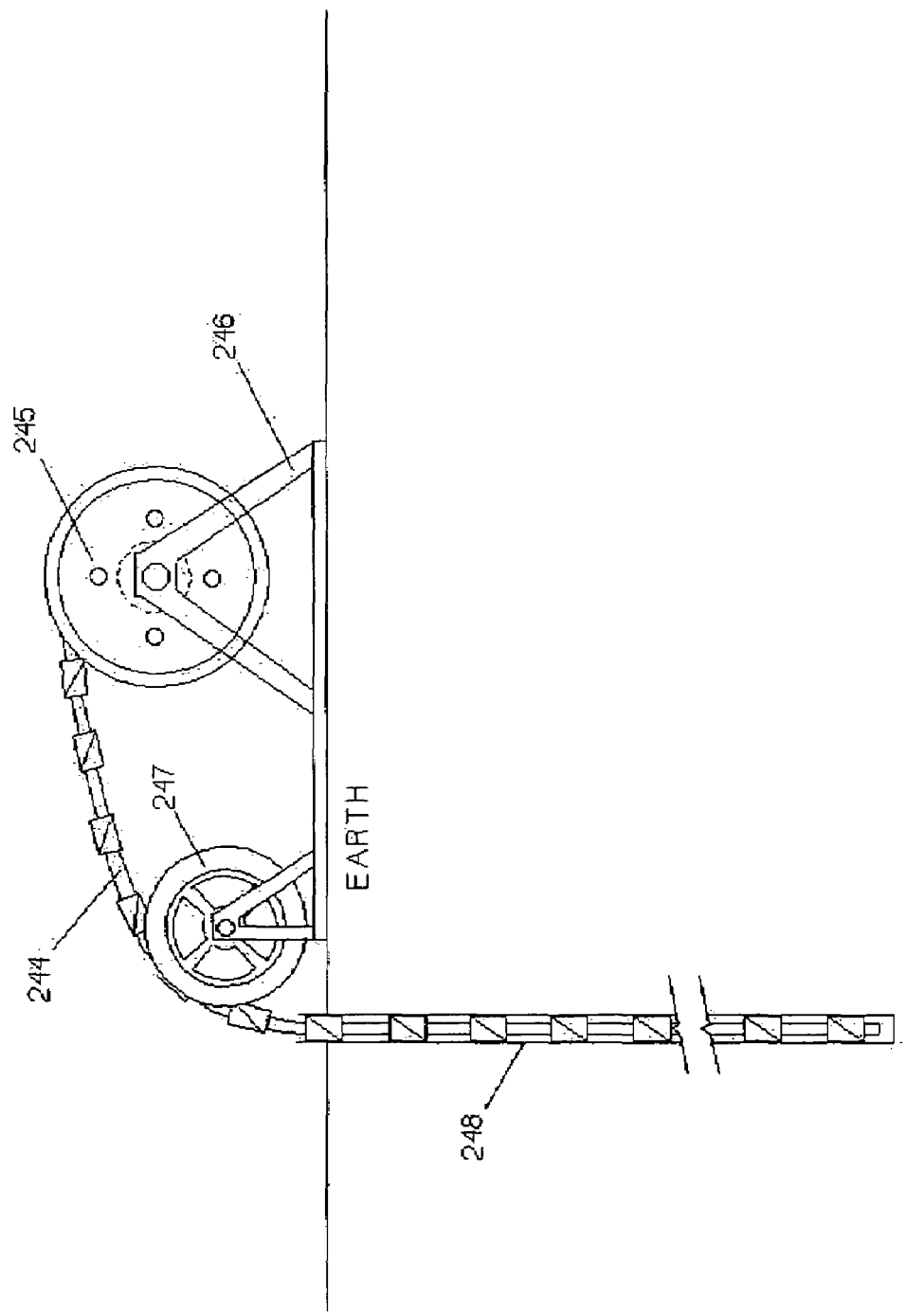
FIG. 105 is a schematic representation of a ground-supported spool of multi-finned heat exchanging segments for use in constructing coaxial-flow heat transfer structures according to the present invention, wherein the spool of segments are shown being loaded into an outer tube section (i.e. casing) that has been installed within a well bore filled with thermally-conductive cement.

FIG. 105 shows a ground-supported spool of coaxial-flow heat exchanging multi-finned segments of the present invention, being loaded into a casing that has been installed within a well bore filled with thermally-conductive cement. Reference numeral 244 indicates a section of tubing (i.e. hose) with the segmented fins attached thereto. Reference numeral 245 indicates the manual or power spool used to lower and raise the segmented fin tubing into the outer casing 248. In the illustrative embodiment, a pulley or wheel 247 is used to prevent pinching the segmented finned inner tubing as it is lower into the outer tube section (i.e. casing). The base 246 of the manual or power spool should be massive enough or anchored to the ground so as to prevent sliding as the segmented finned tubing is lowered into outer tube section 248 cemented into the ground, during construction of the coaxial-flow heat transfer structure of the present invention.

FIG. 106 illustrates how fluid inlet and outlet ports (i.e. well head) associated with the coaxial-flow heat transfer structure of the present invention can be constructed from conventional metallic or plastic fittings. Specifically, as shown, a tee 250 is threaded, welded, or glued to the proximal end of the outer tube section 4. Multi-finned inner tubing section 2 passes through a reducer fitting 249 extending beyond the top run of the tee a short distance 2 for connection to the heat transfer fluid supply piping. Other pipe fittings, not shown, such as reducers, bell pipe fittings and nipples can be connected to the branch of the tee returning the heat transfer fluid back to heating, cooling or other heat transfer devices and equipment. The well head can be installed subsurface to prevent damage thereto due to freezing or vehicular traffic. The direction of heat transfer fluid flow shown in FIG. 106 can be reversed resulting in the same heat transfer characteristics.

Figure 107:
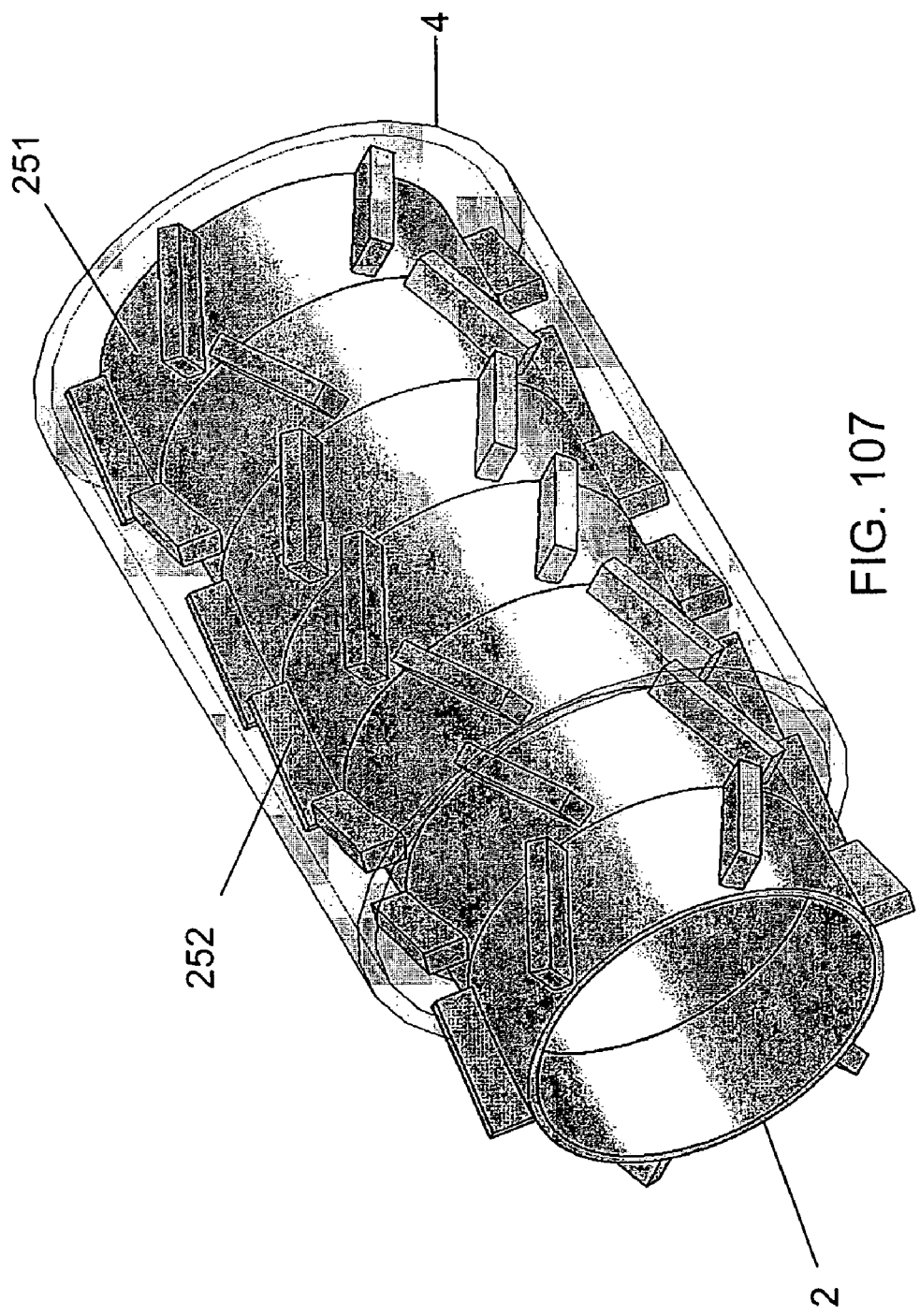
FIG. 107 is a perspective partially cross-sectional view of a coaxial-flow heat exchanging structure of the present invention, wherein a plurality of rows of zig-zaging fluid turbulence generators/projections are provided as segments on the outer surface of the inner tube section for the purpose of generating turbulence in the heat exchanging fluid flowing through the outer flow channel.

FIG. 107 shows a coaxial-flow heat transfer structure employing a number of non-helical turbulence generators 252 arranged on the outer surface of the inner tube section. As shown, multiple discrete turbulence generators 252 of identical or different lengths can be strategically placed on the exterior surface 251 of the inner tube 2 so as to create a significant amount of turbulence along the outer flow channel, between the inner tube and the outer tube 4. The turbulent flow structure shown can be installed inside the entire length of the outer tube section 4 or connected in combination with other said segments along the length as part of the coaxial-flow heat transfer structure.

Figure 108:
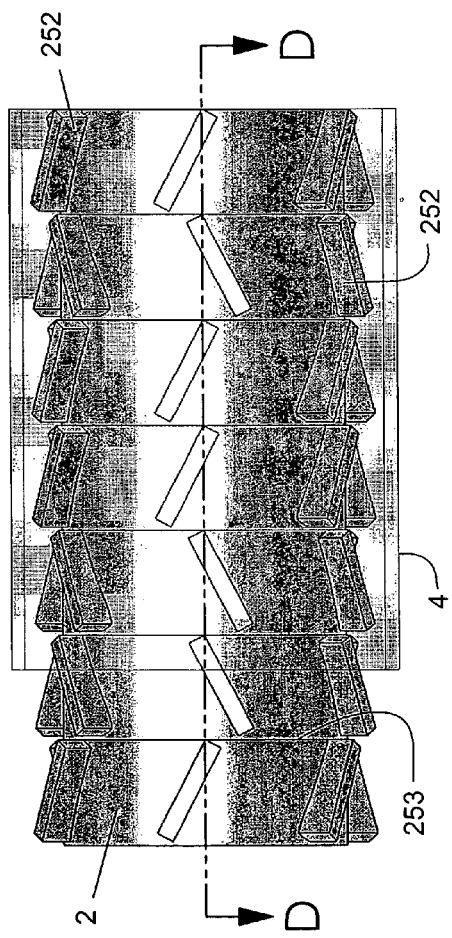
FIG. 108 is an elevated side view of the plurality of fluid turbulence generators/projections provided on the outer surface of the inner tube section of the coaxial-flow heat exchanging structure of FIG. 107.

FIG. 108 shows the coaxial-flow heat transfer structure of the present invention shown in FIG. 107.

Figure 109:
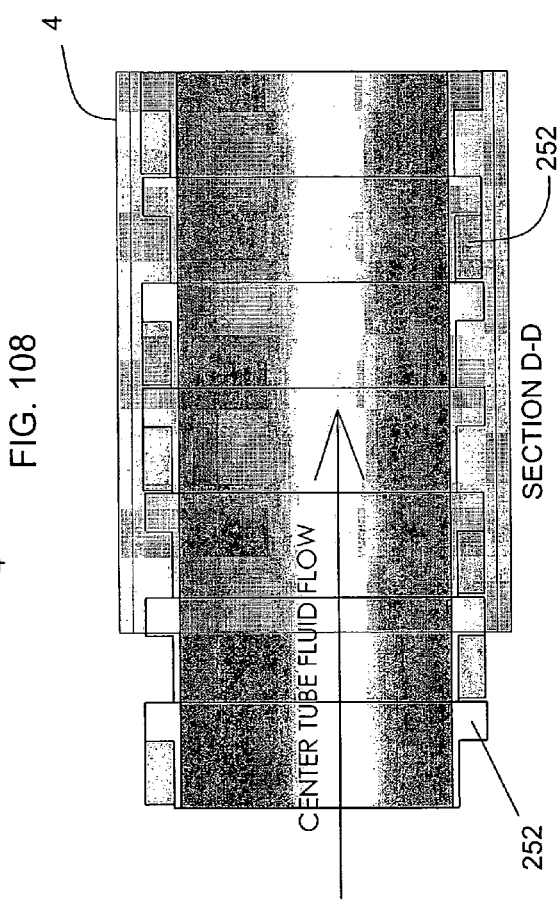
FIG. 109 is a cross-sectional view of the inner tube section of the coaxial-flow heat exchanger, taken along line D-D shown in FIG. 108.

FIG. 109 shows the outer tube 4 and the turbulent flow generators 252.

Figure 110:
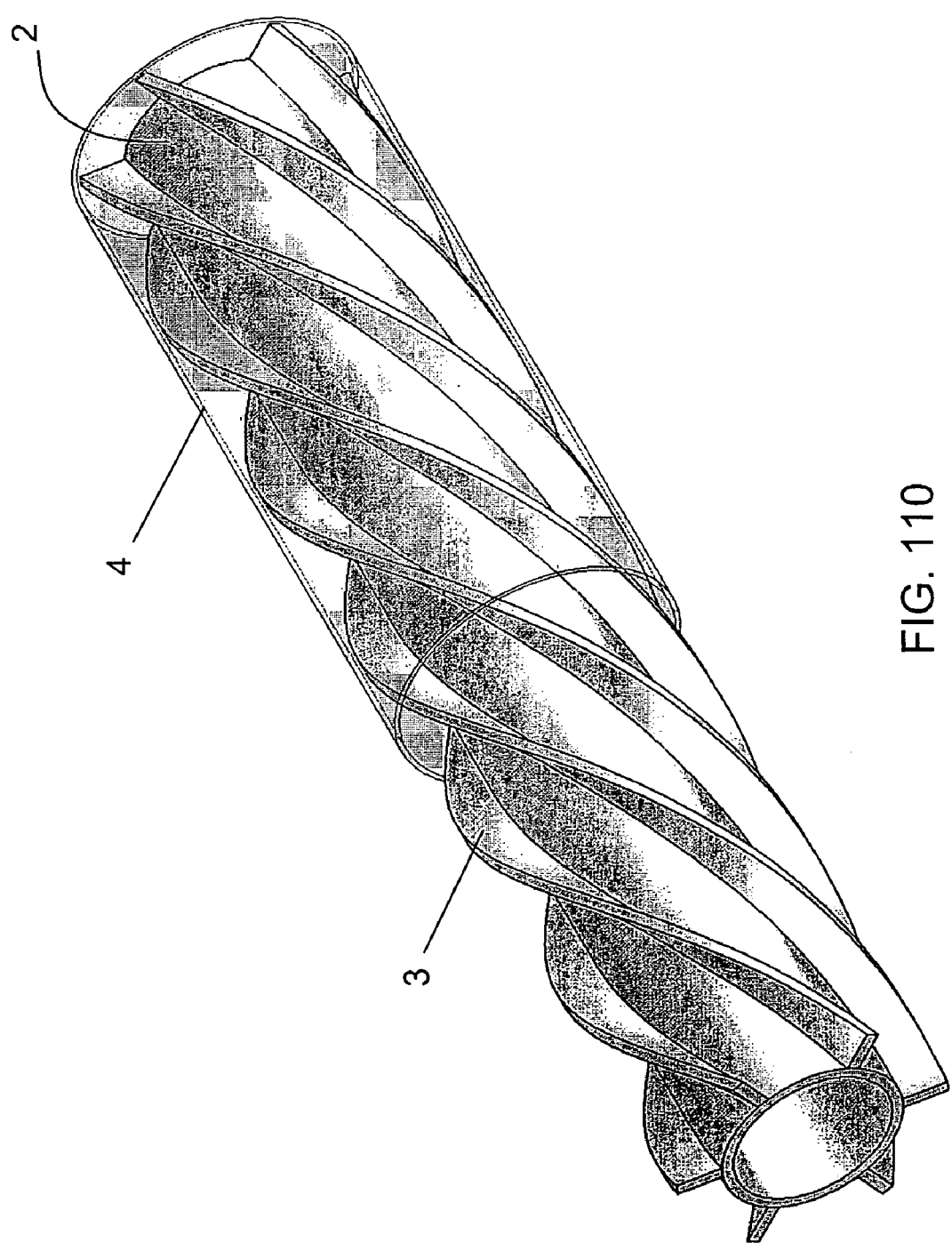
FIG. 110 is a partially transparent perspective view of a coaxial-flow heat exchanging structure of the present invention, wherein the inner tube section and its plurality of helically extending fins are formed by an extrusion process, and subsequently inserted within the outer tube section to form the helically-extending flow channels between the inner and outer tube sections.

FIG. 110 shows a large diameter coaxial-flow heat transfer structure comprised of a number of helically extended fins 3, between the center tube surface 2 and the outer tube 4 inner surface.

Figure 111:
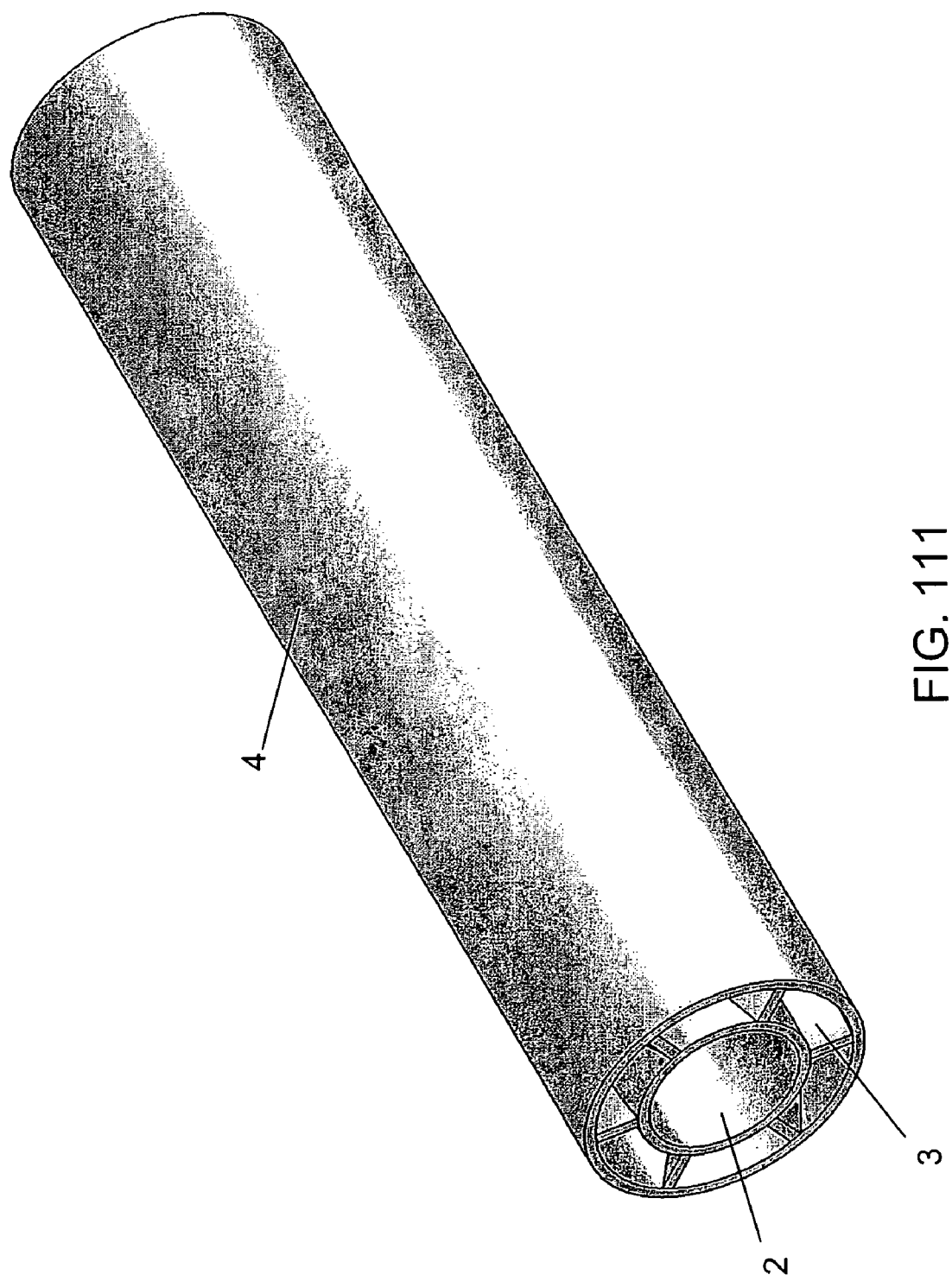
FIG. 111 is an elevated side view of a coaxial-flow heat exchanging structure of the present invention, wherein the outer tube section, inner tube section and helically-extending fins are formed as a unitary product using a plastic extrusion process.

In FIG. 111, a coaxial-flow heat exchanging structure of the present invention is shown, wherein the outer tube section 4, inner tube section 2 and helically-extending fins 3 are formed as a unitary product using a plastic extrusion process. Notably, a rotatable die structure will be used to manufacture this product.

Figure 112:
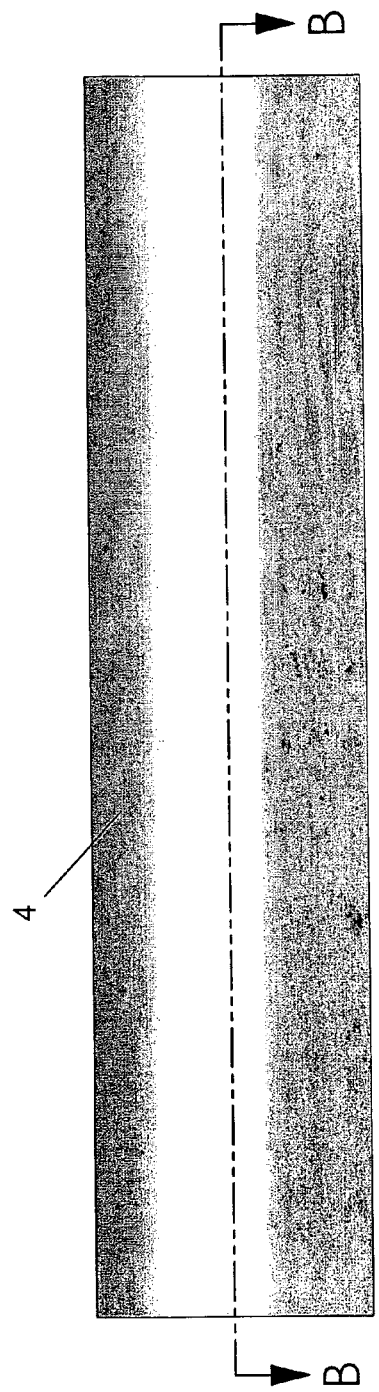
FIG. 112 is a perspective view of the coaxial-flow heat exchanging structure of FIG. 111.

FIG. 112 is a cross-sectional side view of the coaxial-flow heat transfer structure of the present invention shown in FIG. 111.

Figure 113:
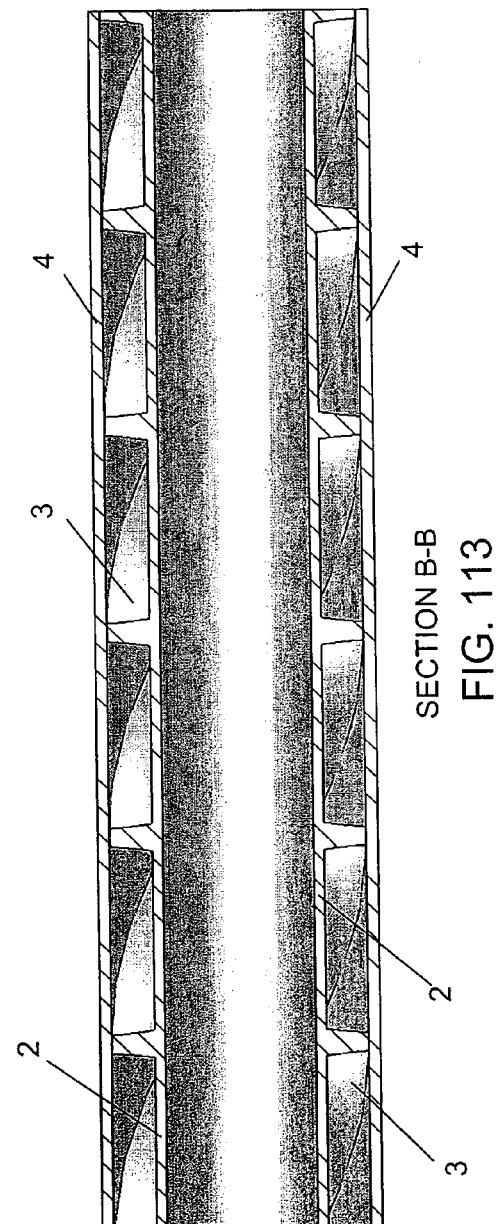
FIG. 113 is a cross-sectional view of the coaxial-flow heat exchanging structure of FIG. 112, taken along line B-B therein.

FIG. 113 is a cut-away view, section B-B, of the coaxial-flow heat transfer structure of the present invention shown in FIG. 111 having internally extruded flow guide fins 3 between the inner flow channel tube 2 and outer tube 4 and showing the center tube opening therethrough.

Figure 114:
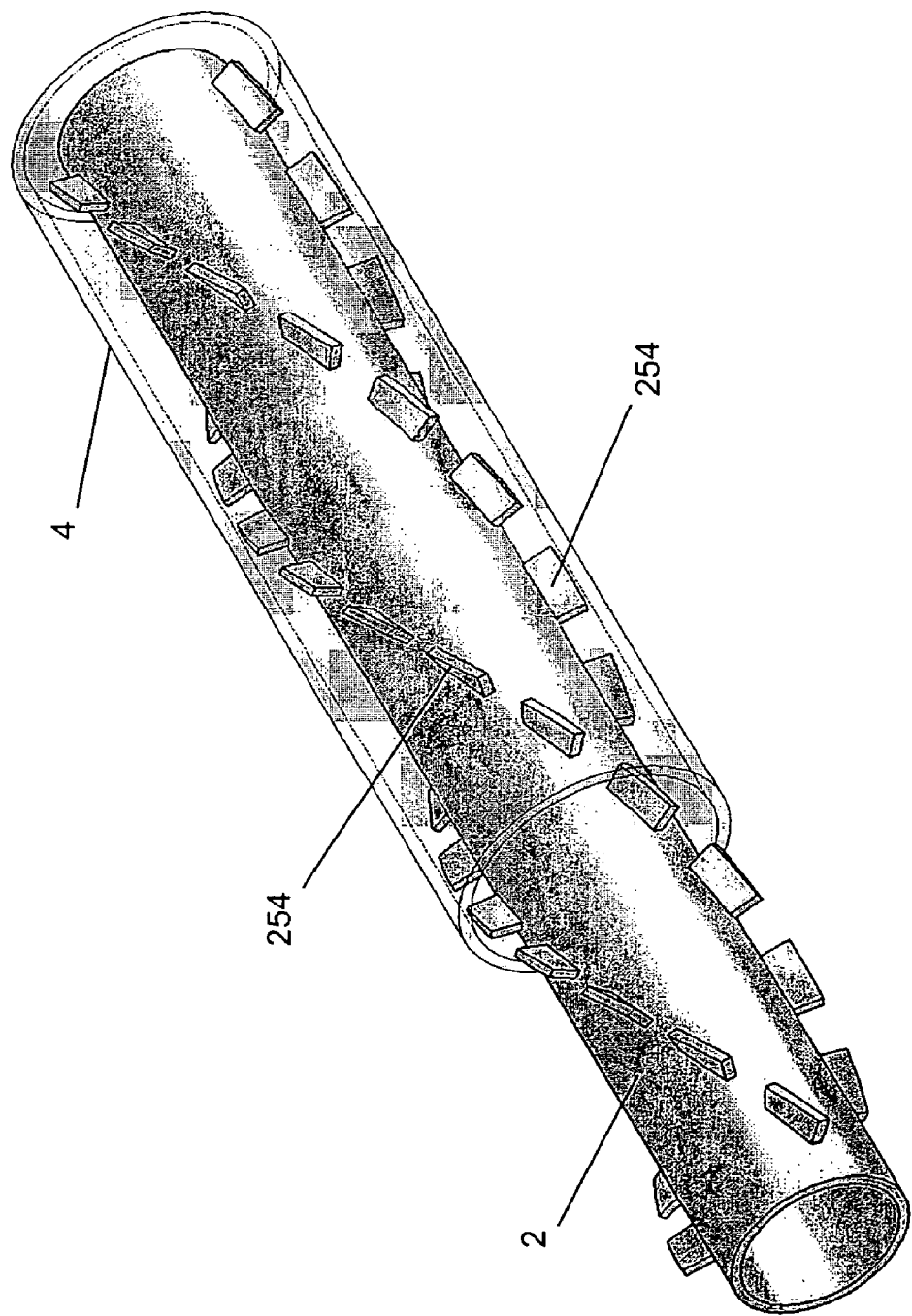
FIG. 114 is a perspective, partially cutaway view of a coaxial-flow heat exchanging structure of another embodiment of the present invention, wherein the inner tube section has multiple rows of discrete fin segments helically-extending along the outer flow channel between the inner and outer tube sections, and formable as flexible planar segments (through modeling techniques) and then applied about the outer surface of the inner tube structure.
Figure 115:
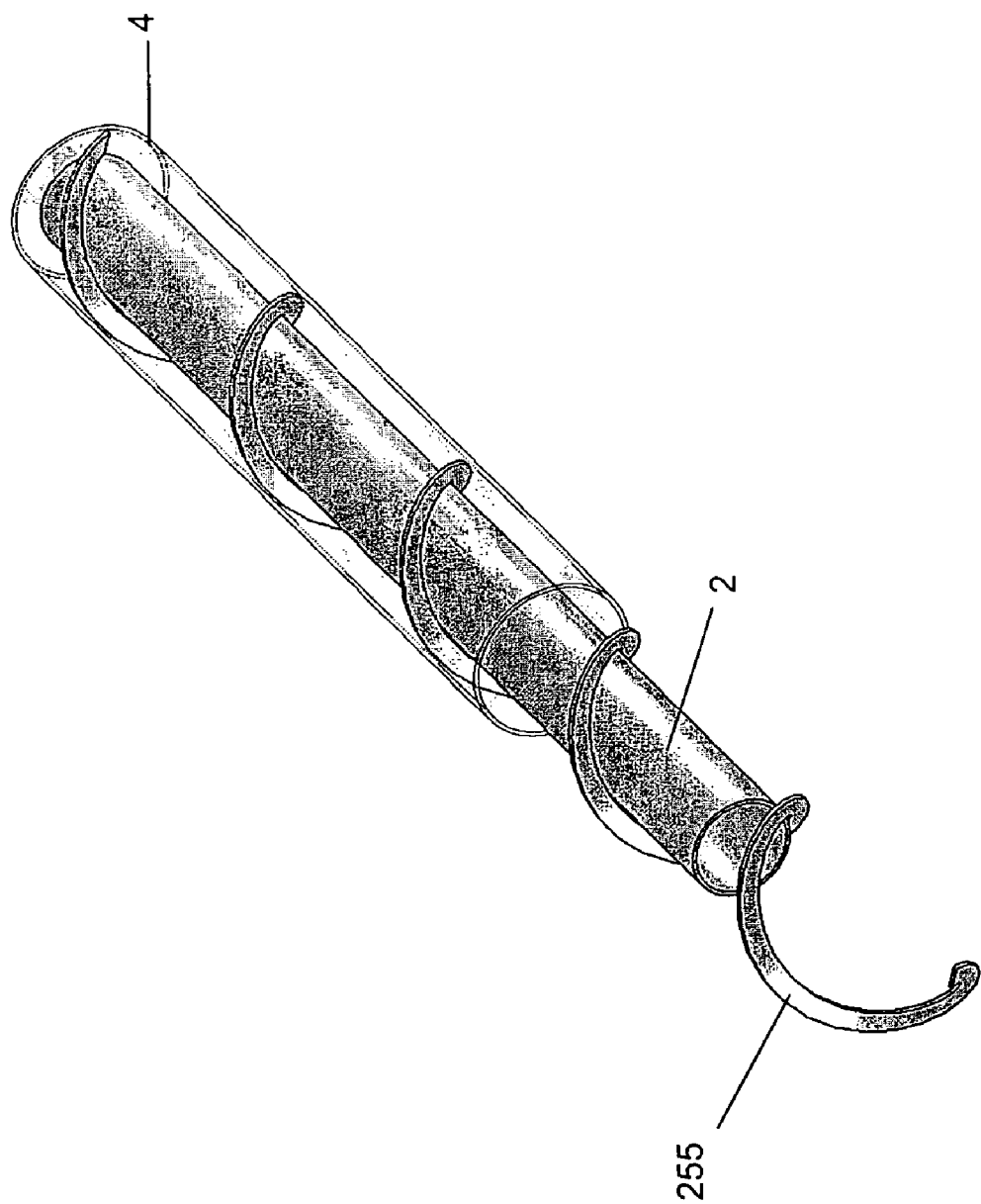
FIG. 115 is a perspective, partially cutaway view of a coaxial-flow heat exchanging structure of another embodiment of the present invention, employing a continuous helically-extending turbulence generating structure along the outer flow channel between the inner and outer tube sections.

In FIG. 114 is a perspective, partially transparent, view of a coaxial-flow heat transfer structure showing the outer tube 4 and a coaxial-flow heat transfer structure wherein the inner tube section 2 has multiple rows of fin segments 254 helically extending along the outer FIGS. 115 shows a coaxial-flow heat transfer structure employing a helical turbulence generator structure 255 that is constructed from a solid, hollow-flat, or tubular metallic, plastic or fiberglass material and installed between the inner tube section 2 and outer tube section 4. As in the other illustrative embodiments described above, the helical structure 255 creates helically-extending outer flow channel(s) along which turbulence fluid flows are generated.

Figure 116:
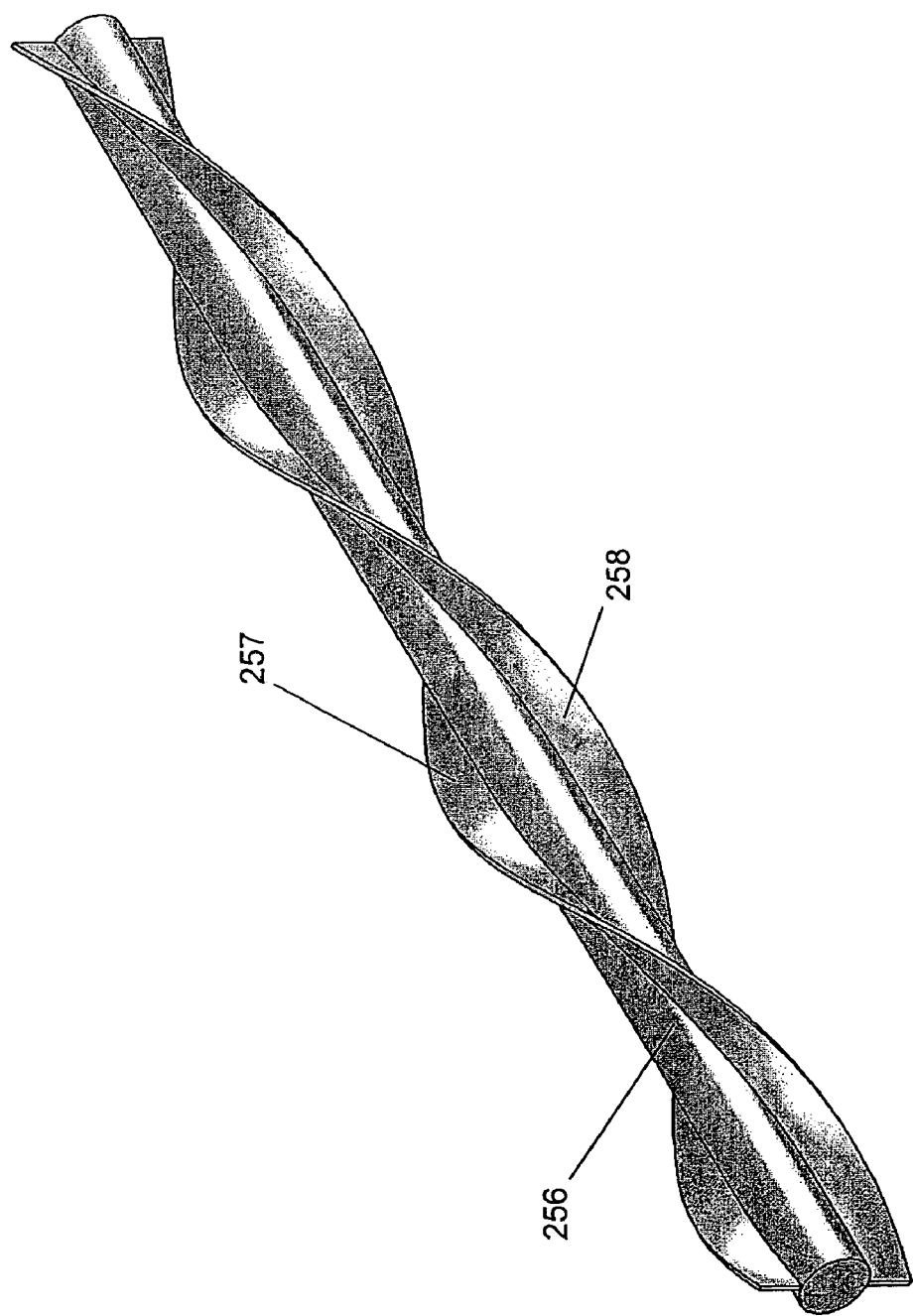
FIG. 116 is a perspective view of a single helically-finned turbulence generating structure having a solid shaft, designed for insertion within conventional tubing for the purpose of generating flow turbulence along the flow channel thereof, and increase heat transfer through the tube walls.
Figure 117:
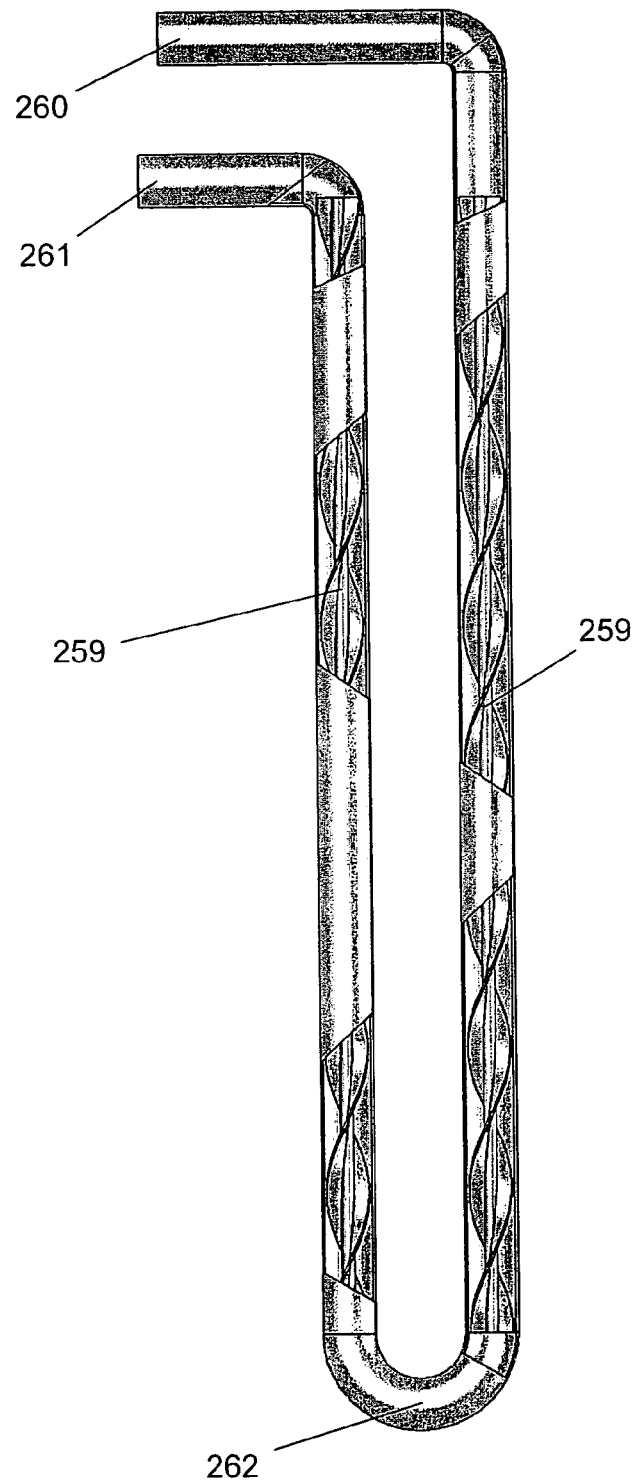
FIG. 117 is a perspective view of a conventional U-tube ground loop, as shown in FIGS. 1B and 1C, with the helically-finned turbulence generating structure of FIG. 116 installed within the flow channel thereof for the purposes of improving heat transfer efficiency to the ambient environment.

FIG. 116 shows a coaxial turbulent flow generator having a number of helically-extending (flow guide) fins 257 and 258 extending from a solid (or hollow) center core shaft 256. The turbulent flow generator is designed for insertion along the central axis of tubular heat exchangers (e.g. tubes or pipes) which require repair or otherwise require an increase its efficiency through the generation of an optimum turbulence in the fluid flowing therethrough. Installation environments include, for example: "U" tube type ground source loops as shown in FIG. 117; tube and shell heat exchangers found in heating, cooling and refrigeration systems; combustion engine radiators; and a variety of other tubular heat transfer systems and components. It could be less expensive to add to or modify heat exchangers of these types using this turbulence flow generator of the present invention rather than replacing the heat exchanger or radiator which can be more costly. The number of flow guide fins, helically-arranged along the length of the center core shaft, can be increased or decreased to produce the desired heat transfer rate and heat transfer fluid flow rate. The coaxial turbulent flow generator shown can be constructed of a plastic or metallic materials depending on fluid and other material compatibilities.

In FIG. 117, there is shown a conventional heat pump ground source loop normally fabricated in the field using commonly available tubing and fittings such as PVC, polypropylene, polyethylene, copper, aluminum, and steel pipe and fittings. A heat transfer fluid is pumped into and out or either of tubes 260 and 261. The "U" bend fitting shown as 262 can be made from a converted plumbing fitting called a "P" trap, but is usually fabricated using two 90 degree (quarter bend) ells glued or welded in place to form a "U" bend as shown. By installing the coaxial turbulent flow generators 259 of the present invention along the linear lengths of the ground loop, the laminar flow profile along the "U" tubes will transition into turbulent flowing profiles shown in FIGS. 38 and 41, thereby increasing the heat transfer efficiency of the tube. The number and thickness of the flow guide fins and the helical linear pitch of the flow guide fins 157 and 158 can be adjusted during manufacturing to arrive at a desired turbulent flow profile inside flow channels existing between the flow guide fins and the inside diameter of the tube or pipe into which the coaxial turbulent generator is to be inserted. The coaxial turbulent generator can be made from plastic, metal or other materials, and can be made flexible so that it can be rolled up into spools for storage and delivery to site locations where it is to be deployed.

FIG. 118 shows an air conditioning system employing a system of coaxial-flow heat transfer structures of the present invention. The coaxial-flow heat transfer structures 308, 309 and 310 function as a heat transfer sub-system connected to a water-cooled ground source condensing unit 283 found on a typical direct expansion air conditioning system where an electric or gas fired furnace is used during the heating mode of operation. The heat transfer fluid being pumped by pump 269 through the ground loop coaxial-flow heat transfer structures first passes through pipe 270 and a hydronic air vent 271 to remove air that might be in the fluid piping system.

In the cooling mode, during times when the outdoor air temperature is higher than the heat transfer fluid entering the coaxial-flow heat transfer structures, through pipe 272, valve 268 is open and valve 267 is closed. When the outdoor air temperature is below the temperature of the heat transfer fluid valve 268 is closed and valve 267 is open allowing the heat transfer fluid to flow through outdoor air heat exchanger 266 allowing heat to be extracted from the heat transfer fluid before it enters the coaxial-flow heat transfer structures through pipe 272. This function increases the heat transfer efficiency of the entire system and promotes heat recovery time of the ground loop and extending the overall life of the coaxial-flow heat transfer structures conductivity. The outdoor air heat exchanger 266 can be constructed without a fan (i.e. natural draft) or with a fan (i.e. forced draft).

In the cooling mode, heat is extracted from the heat transfer fluid as it passes through coaxial-flow heat transfer structures. The heat transfer fluid leaving the coaxial-flow heat transfer structure 308 is transferred to the coaxial-flow heat transfer structure 309 by pipe 173 where more heat is extracted from the heat transfer fluid. The heat transfer fluid leaving coaxial-flow heat transfer structure 309 is transferred to coaxial-flow heat transfer structure 310 by pipe 274 where more heat is extracted from the heat transfer fluid into the Earth. The heat transfer fluid is returned to the water cooled condenser of the air conditioning condensing unit 283 through pipe 275. The heat transfer fluid direction of flow can be reversed entering the ground source wells through pipe 275 and exiting the wells through pipe 272.

As shown in FIG. 118 high pressure, high temperature refrigerant is supplied through pipe 276 to expansion valves 277 and 278 for refrigerant metering (throttling) into evaporators 264 and 265. Once the heat is absorbed by the liquid refrigerant inside the evaporators 264 and 265 the liquid refrigerant changes state into a gas, it is returned to the compressor in the condensing unit 263 through return pipe 279 where it is compressed and re-condensed into a liquid refrigerant for recirculation. The condensing unit 263 shown in FIG. 118 can be a water-cooled heat pump unit with cooling and heating modes of operation.

FIG. 119 shows an air conditioning system employing three coaxial-flow heat transfer structures of the present invention 311, 312 and 313, which function as a heat transfer sub-system connected to a water to water air conditioning unit 281 with hydronic cooling coils 296 and 297. The heat transfer fluid being pumped by pump 291 through the coaxial-flow heat transfer structures 311, 312 and 313 first leaves the water cooled condenser section 280 through pipe 289 passing through a hydronic air vent 290, to remove air that might be in the fluid piping system. In the cooling mode during times when the outdoor air temperature is higher than the heat transfer fluid entering the coaxial-flow heat transfer structures, through pipe 285, valve 284 is open and valve 283 is closed. When the outdoor air temperature is below the temperature of the heat transfer fluid valve 284 is closed and valve 283 is open allowing the heat transfer fluid to flow through outdoor air heat exchanger 282 allowing heat to be extracted from the heat transfer fluid before into the ambient air before it enters the ground source wells through pipe 285. This function increases the heat transfer efficiency of the entire system and promotes heat recovery time of the coaxial-flow heat transfer structures and extending the overall life of the ground loop wells. The outdoor air heat exchanger 282 can be constructed without a fan (i.e. natural draft) or with a fan (i.e. forced draft).

In the cooling mode, heat is extracted from the heat transfer fluid as it passes through the coaxial-flow heat transfer structures 311, 312 and 313 124C. The heat transfer fluid leaving coaxial-flow heat transfer structure 311 is transferred to coaxial-flow heat transfer structure 312 by pipe 286 where more heat is extracted from the heat transfer fluid. The heat transfer fluid leaving coaxial-flow heat transfer structure 312 is transferred to coaxial-flow heat transfer structure 313 by pipe 287 where more heat is extracted from the heat transfer fluid. The heat transfer fluid is returned to the condenser section 281 of the air conditioning heat pump. Heat contained in the heat transfer fluid entering the evaporator section 292 of the air conditioning heat pump is transferred to the condenser section 280 using a conventional refrigeration compressor and associated valves and piping. The heat transfer fluid entering the condenser section absorbs heat as it passes through the water cooled condenser section 280 and moves the heat into the coaxial-flow heat transfer structures 311, 312 and 313. The circulation of the heat transfer fluid can be continuous or cyclic depending on the application. The heat transfer fluid direction of flow can be reversed entering the ground source wells through pipe 288 and exiting the wells through pipe 285.

During operation of the system, heat is absorbed by the heat transfer fluid circulated heat exchangers 297 and 298. Heat is extracted from the heat transfer fluid in the evaporator section 292 of the air conditioning heat pump 281. The heat transfer fluid is pumped from the evaporator section 292 by pump 293. From the pump 293, the fluid passes through hydronic air vent 295 which removes air that might be in the heat transfer fluid. From the hydronic air vent, the heat transfer fluid enters a thermal storage tank 295 which adds to the internal heat transfer fluid volume of the system. The amount or internal volume of heat transfer fluid is determined by the amount of heat being absorbed by heat exchangers 296 and 297 as opposed to the amount of heat that the air conditioning heat pump 281 is capable of transferring. In response to the set point of temperature and conditions within the conditioned spaces, a typical thermostat activates and deactivates the air conditioning heat pump. Heat exchangers 296 and 297 can be constructed with a fan (i.e. forced draft) or without a fan (natural draft) and may be of the type shown in FIGS. 80 through 87.

A digital control system can be employed to monitor and control the operation of the system based on indoor and outdoor temperatures, and temperatures of fluid entering and leaving the coaxial-flow heat transfer structures. Additionally, fans, blowers, compressors, flow meters and flow controls can be monitored and controlled according to a computer control program. Sensors integrated into the manufacture of the coaxial-flow heat exchanging structure of the present invention can be installed at certain depths to further monitor and control heat transfer fluid flow throughout the resulting system. In the event that water is used as the heat transfer fluid, additives can be added to the system to reduce the freezing temperature of the heat transfer fluid to prevent slushing of the heat transfer fluid. Some heat transfer additives can cause a reduction in heat transfer fluid efficacy.

In the heating mode, heat is added to the heat transfer fluid as it passes through ground coaxial-flow heat transfer structures 311, 312 and 313. The heat transfer fluid leaving coaxial-flow heat transfer structure 311 is transferred to coaxial-flow heat transfer structure 312 by pipe 286 where more heat is added to the heat transfer fluid. The heat transfer fluid leaving coaxial-flow heat transfer structure 312 is transferred to coaxial-flow heat transfer structure 313 by pipe 287 where more heat is added to the heat transfer fluid. The heat transfer fluid is returned to the condenser section 281 of the air conditioning heat pump through pipe 288. In the heating mode, the air conditioning heat pump 281 is in reverse cycle where the condenser section 280 and evaporator section 292 interchange function, The condenser section 280 begins to function like an evaporator absorbing heat from the heat transfer fluid and transferring the heat into the evaporator section 292 which begins to function like a condenser using a conventional refrigeration compressor and associated valves and piping, delivering the heat into heat transfer fluid and exchangers 266 and 267 for transfer into the conditioned space. The circulation of the heat transfer fluid can be continuous or cyclic depending on the application. The heat transfer fluid direction of flow can be reversed entering the coaxial-flow heat transfer structures through pipe 288 and exiting the coaxial-flow heat transfer structures through pipe 286. The heat transfer fluid normally flows in one direction through the coaxial-flow heat transfer structures and indoor heat exchangers 296 and 297. Certain applications may require the addition of three-way valves to reverse the direction of heat transfer fluid flow through the piping system.

FIG. 120 is a schematic representation of a RF (or microwave) transmission/reception tower 301, next to the accompanying base station housing 299 (i.e. shelter) containing sensitive electronic equipment connected to antennae 300 by cable 302 and within an environment that is thermally controlled by an air conditioner 303 employing a plurality of coaxial-flow heat transfer structures 1 of the present invention installed in a plurality of vertical well bores, using thermally conductive cement and connected together in series with piping 305, 306 and 307.

Also, it is understood that the coaxial-flow heat transfer structure of the present invention can be readily modified and employing in heat-pipe systems employed in diverse applications from ground-based heat pipes, or thermal management systems in laptop computers. In such an embodiment of the present invention, a coaxial-flow heat transfer structure as illustrated conceptually in FIG. 2 has a proximal end and a distal end which would be installed within an ambient environment having a differential in temperature between the proximal and distal ends. The input and output ports of the structure would be sealed off or otherwise interconnected, after the inner and outer flow channels have been properly charged (i.e. filled) with an appropriate volume of heat transferring fluid (e.g. multi-phase fluid). Wicking or other fluid absorptive material can be disposed along either or both the inner flow channel as well as the helically-extending outer flow channel, formed between the inner and outer tube sections. The advantages of this heat pipe system design is that the length of the helically-extending outer flow channel can be made substantially longer that the length of the inner flow channel, providing more effective surface area and linear length for the heat exchanging fluid to conduct heat energy along the outer flow channel.

While various illustrative embodiments of the present invention have been disclosed in great detail herein above, is understood that the coaxial-flow heat-transfer technology employed in heat pump and transfer systems of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope and spirit of the present invention as defined by the Claims to Invention appended hereto.

What claimed is:

1. A coaxial-flow heat exchanging structure for installation in the Earth, and facilitating the transfer of heat energy in an aqueous-based heat transfer fluid, between said aqueous-based heat transfer fluid and material beneath the surface of the Earth, said coaxial-flow heat exchanging structure comprising:

a proximal end and a distal end;

an input port, provided at the proximal end, for receiving said aqueous-based heat transfer fluid at a first temperature from a heat exchanging subsystem, and an output port, provided at the proximal end, for outputting said aqueous-based heat transfer fluid at a second temperature to said heat exchanging subsystem;

an inner tube section having an outer wall surface extending between the proximal and distal ends, the inner tube section supporting an inner flow channel having a substantially uniform inner diameter along its length and along which the aqueous-based heat transfer fluid can flow in a substantially laminar manner;

a thermally-conductive outer tube section, disposed coaxially around said inner tube section, and having an inner wall surface extending between said proximal and distal ends, and a cap portion at said distal end sealing off said thermally conductive outer tube section from fluid leaks at said distal end;

wherein an outer flow channel is formed between the outer wall surface of the inner tube section and the inner wall surface of said thermally-conductive outer tube section, and is capable of conducting said aqueous-based heat transfer fluid flowing from the distal end of said inner flow channel, and past said cap portion, and along said outer flow channel towards said proximal end, so that said aqueous-based heat transfer fluid can exit from said output port and flow into said heat exchanging system;

wherein a helically-arranged fin structure is disposed along a portion of said length of said outer flow channel so as to introduce turbulence into the flow of said aqueous-based heat transfer fluid flowing along said outer flow channel, thereby improving the transfer of heat energy between the aqueous-based heat transfer fluid and material beneath the surface of said Earth along the length of outer outer flow channel;

wherein the heat transfer process occurring between said aqueous-based heat transfer fluid and material beneath the surface of said Earth is carried out without a change in state of said aqueous-based heat transfer fluid flowing within and along said inner and outer flow channels of each said coaxial-flow heat transfer structure; and wherein the cross-sectional dimensions of said outer flow channel produce fluid flows therealong having optimal vortex characteristics that optimize heat transfer between said aqueous-based heat transfer fluid within said outer flow channel and the inner wall surface of said thermally-conductive outer tube section.

2. The coaxial-flow heat exchanging structure of claim 1, wherein when the ratio of the sides of the cross section of said outer flow channel cross-section approaches 1/1.1, the resulting fluid flow through the outer flow channel will typically have one vortex for flow rates of interest.

3. The coaxial-flow heat exchanging structure of claim 1, wherein when the ratio of the sides of the cross section of said outer flow channel cross-section approaches 1/2.5, the resulting fluid flow through the outer flow channel will typically have two vortices for flow rates of interest.

4. The coaxial-flow heat exchanging structure of claim 1, wherein when the ratio of the sides of the cross section of said outer flow channel cross-section approaches 1/4.0, the resulting fluid flow through said outer flow channel will typically have two vortices (one near each helical fin) with a laminar slot flow region in the center region, for flow rates of interest.

5. The coaxial-flow heat exchanging structure of claim 1, which further comprises: said heat exchanging subsystem installed above the surface of Earth, supporting the flow of a heat conducting stream, and exchanging heat energy between said heat conducting stream and said aqueous-based heat transfer fluid flowing into and out of said heat exchanging subsystem.

6. The coaxial-flow heat exchanging structure of claim 5, wherein said heat exchanging subsystem is a refrigeration system and said heat conducting stream is a refrigerant flowing through said refrigeration system.

7. The coaxial-flow heat exchanging structure of claim 5, wherein said heat exchanging subsystem is a heating or cooling coil unit and said heat conducting stream is a heat conducting fluid flowing through said heating or cooling coil unit.

8. The coaxial-flow heat exchanging structure of claim 1, wherein said helically-arranged fin structure is mounted to the outer surface of said inner tube section.

9. The coaxial-flow heat exchanging structure of claim 1, wherein said helically-arranged fin structure is continuous along said outer flow channel.

10. The coaxial-flow heat exchanging structure of claim 1, wherein said flow of said aqueous-based heat transfer fluid in a substantially laminar manner along said inner flow channel provides an insulating effect between said inner flow channel and said outer flow channel.

11. The coaxial-flow heat exchanging structure of claim 1, enables sinking of heat into the Earth during cooling operations, or the sourcing of heat from the Earth during heating operations.

12. The coaxial-flow heat exchanging structure of claim 1, wherein said thermally-conductive outer tube section is thermally-cemented into a bore drilled into the Earth.

13. The coaxial-flow heat exchanging structure of claim 1, wherein said helically-arranged fin structure has a plurality of fin elements arranged at a predetermined pitch.

14. The coaxial-flow heat exchanging structure of claim 1, wherein said aqueous-based heat transfer fluid includes a heat transfer enhancing additive.

15. The coaxial-flow heat exchanging structure of claim 14, wherein said heat transfer enhancing additive is selected from the group consisting of biodegradable anti-freeze additives, and micron-sized particles for increasing the heat capacity of said aqueous-based heat transfer fluid.

* * * * *